(12) United States Patent
Gifford et al.

(10) Patent No.: US 10,708,397 B2
(45) Date of Patent: Jul. 7, 2020

(54) OPTICAL ACCESSORY FOR ATTACHMENT TO MOBILE DEVICE

(71) Applicant: COGNEX CORPORATION, Natick, MA (US)

(72) Inventors: Michael Gifford, San Leandro, CA (US); David James Stein, Boone, NC (US); Steven Kearns, Fort Myers, FL (US); Bobby Dale Gifford, Hayward, CA (US); John Bryan Boatner, Andover, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 15/997,505

(22) Filed: Jun. 4, 2018

(65) Prior Publication Data

US 2018/0352060 A1     Dec. 6, 2018

Related U.S. Application Data

(63) Continuation-in-part of application No. 15/599,725, filed on May 19, 2017, now Pat. No. 9,990,523, (Continued)

(51) Int. Cl.

| | |
|---|---|
| *G06K 7/14* | (2006.01) |
| *H04M 1/02* | (2006.01) |
| *G06K 7/10* | (2006.01) |
| *H04M 1/21* | (2006.01) |
| *H04B 1/3888* | (2015.01) |
| *H04M 1/22* | (2006.01) |

(52) U.S. Cl.
CPC ...... *H04M 1/0264* (2013.01); *G06K 7/10722* (2013.01); *G06K 7/10821* (2013.01); *G06K 7/10831* (2013.01); *G06K 7/1413* (2013.01); *H04M 1/21* (2013.01); *H04B 1/3888* (2013.01); *H04M 1/22* (2013.01); *H04M 2250/52* (2013.01)

(58) Field of Classification Search
CPC .... G06F 1/1635; G06K 7/0004; G06K 7/089; G06K 7/10722; G06K 7/10732; G06K 7/10752; G06K 7/10811; G06K 7/10881
See application file for complete search history.

(56) References Cited

U.S. PATENT DOCUMENTS

| | | |
|---|---|---|
| 8,346,979 B1 | 1/2013 | Lee |
| 8,832,323 B2 | 9/2014 | Lee |

(Continued)

FOREIGN PATENT DOCUMENTS

EP     2500758 A1     3/2012

OTHER PUBLICATIONS

Extended European Search Report; Application No. 16164426.5; dated Aug. 16, 2017; 10 pages.

(Continued)

*Primary Examiner* — Seung H Lee

(74) *Attorney, Agent, or Firm* — Quarles & Brady LLP

(57) ABSTRACT

An attachment for use with a mobile device with an imaging device and a mobile-device light source can include one or more of an attachment base and an attachment body. The attachment base can be configured to secure the attachment body to the mobile device via a case for the mobile device. The attachment body can include at least one optical device for use with the imaging device, and an optical sensor to receive optical control signals from the mobile-device light source.

20 Claims, 91 Drawing Sheets

Related U.S. Application Data which is a continuation-in-part of application No. 15/285,576, filed on Oct. 5, 2016, now Pat. No. 10,075,572, which is a continuation-in-part of application No. 15/092,028, filed on Apr. 6, 2016, now Pat. No. 9,811,702, which is a continuation-in-part of application No. 14/682,062, filed on Apr. 8, 2015, now Pat. No. 9,990,526, which is a continuation-in-part of application No. 14/682,072, filed on Apr. 8, 2015, now Pat. No. 9,747,482.

(56) References Cited

U.S. PATENT DOCUMENTS

| | | |
|---|---|---|
| 9,107,484 B2 | 8/2015 | Chaney |
| 9,110,355 B1 | 8/2015 | Nourbakhsh |
| 2010/0134679 A1 | 6/2010 | Lin |
| 2013/0013813 A1 | 1/2013 | Lee |
| 2013/0109316 A1 | 5/2013 | Lee |
| 2014/0071547 A1 | 3/2014 | O'Neill et al. |
| 2014/0078594 A1 | 3/2014 | Springer |
| 2015/0199549 A1 | 7/2015 | Lei et al. |
| 2015/0220766 A1 | 8/2015 | Russell et al. |
| 2015/0254485 A1 | 9/2015 | Feng et al. |
| 2015/0356336 A1 | 12/2015 | Hoobler et al. |
| 2016/0188940 A1 | 6/2016 | Lu et al. |
| 2016/0209735 A1 | 7/2016 | Anderson |
| 2016/0232389 A1 | 8/2016 | Gifford |
| 2016/0292477 A1 | 10/2016 | Bidwell |

OTHER PUBLICATIONS

Scandit Case; Ergonomic Barcode Scanning with Smartphones; retrieved from the U.S. Patent Office; U.S. Pat. No. 9990523; 6 pages.

PDF417

| CODABAR | PDF417 |
|---|---|
| CODE 11 | AZTEC CODE |
| CODE 93 | QR CODE |
| OTHER | OTHER |

FIG. 8

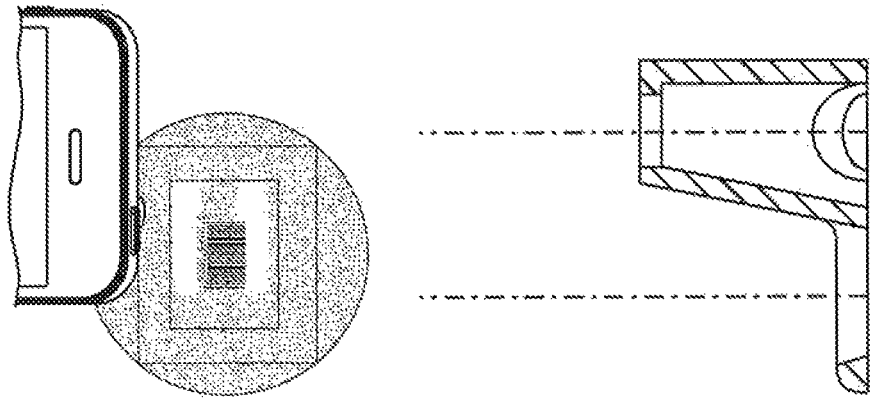
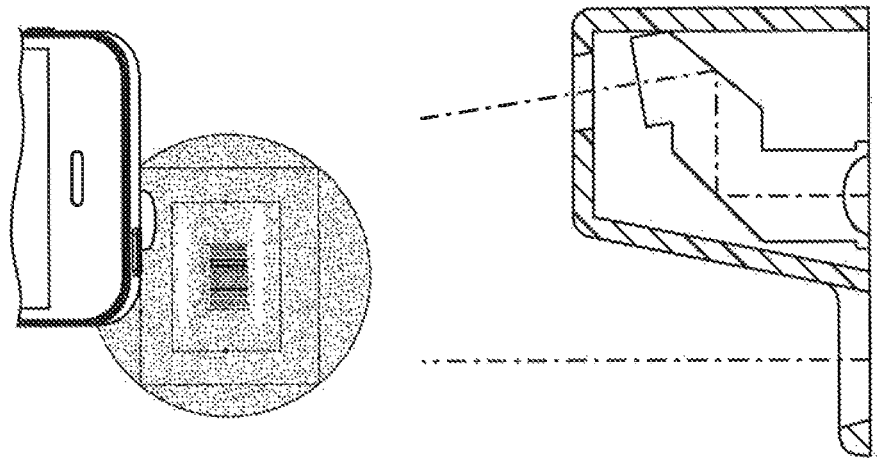
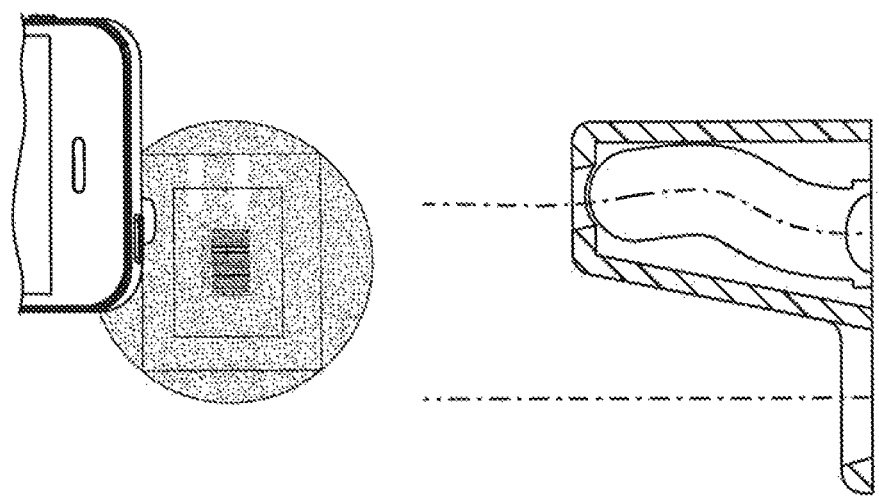
FIG. 21

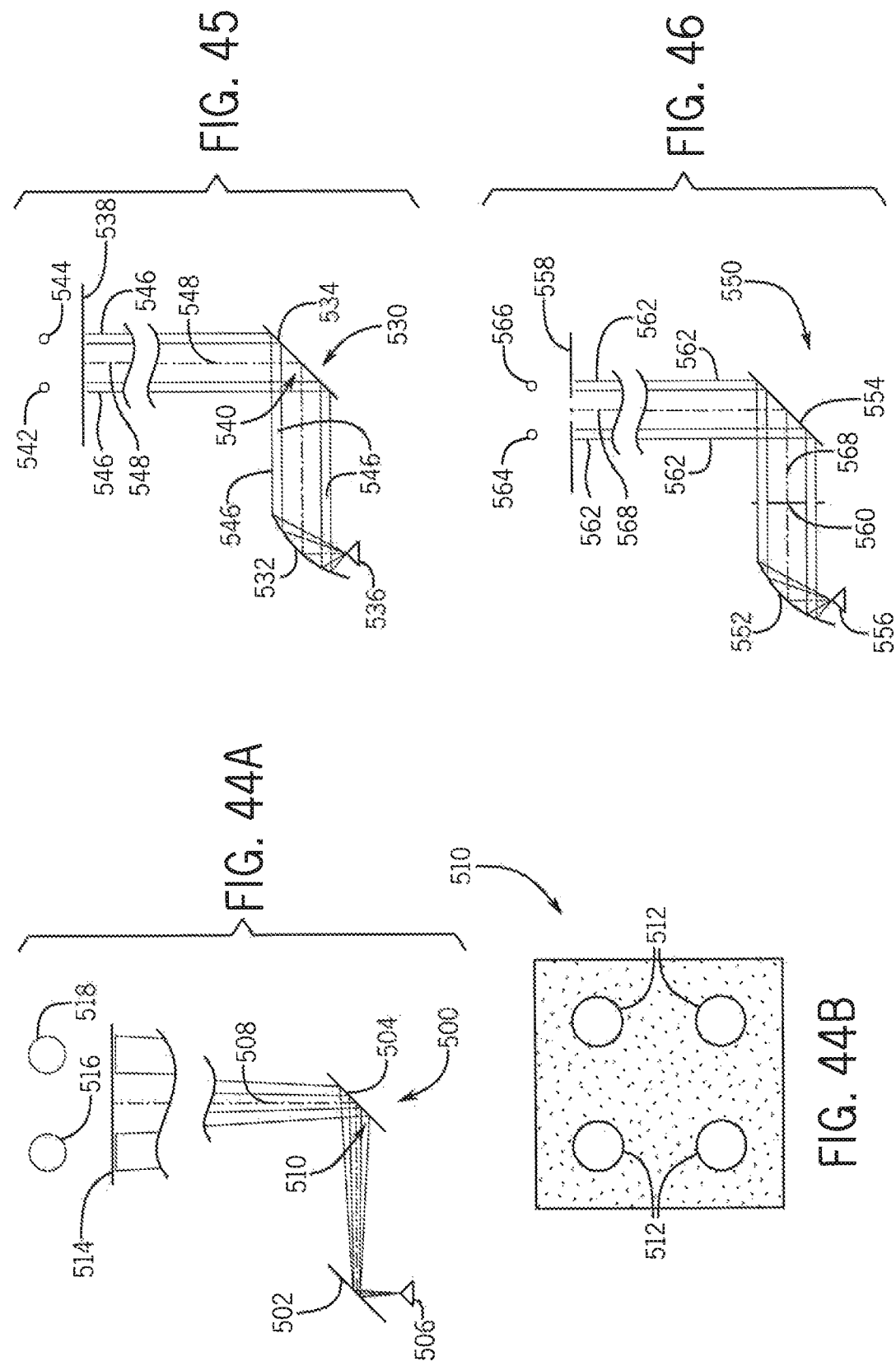

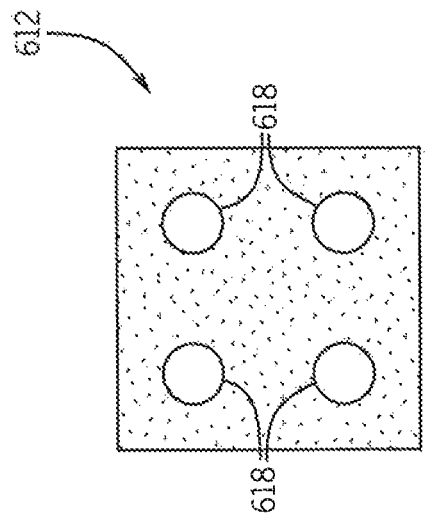
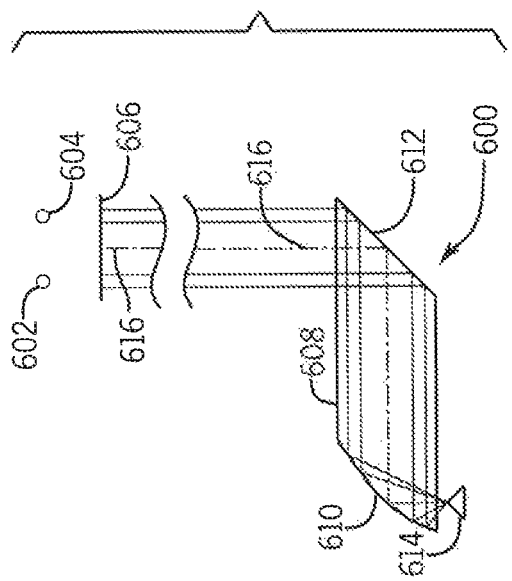
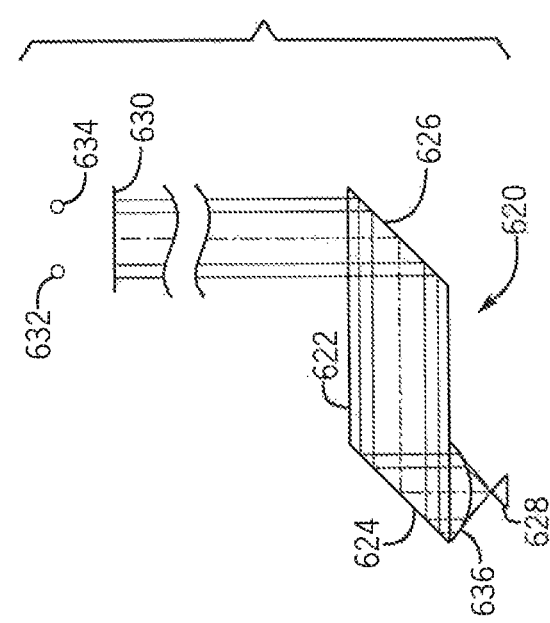

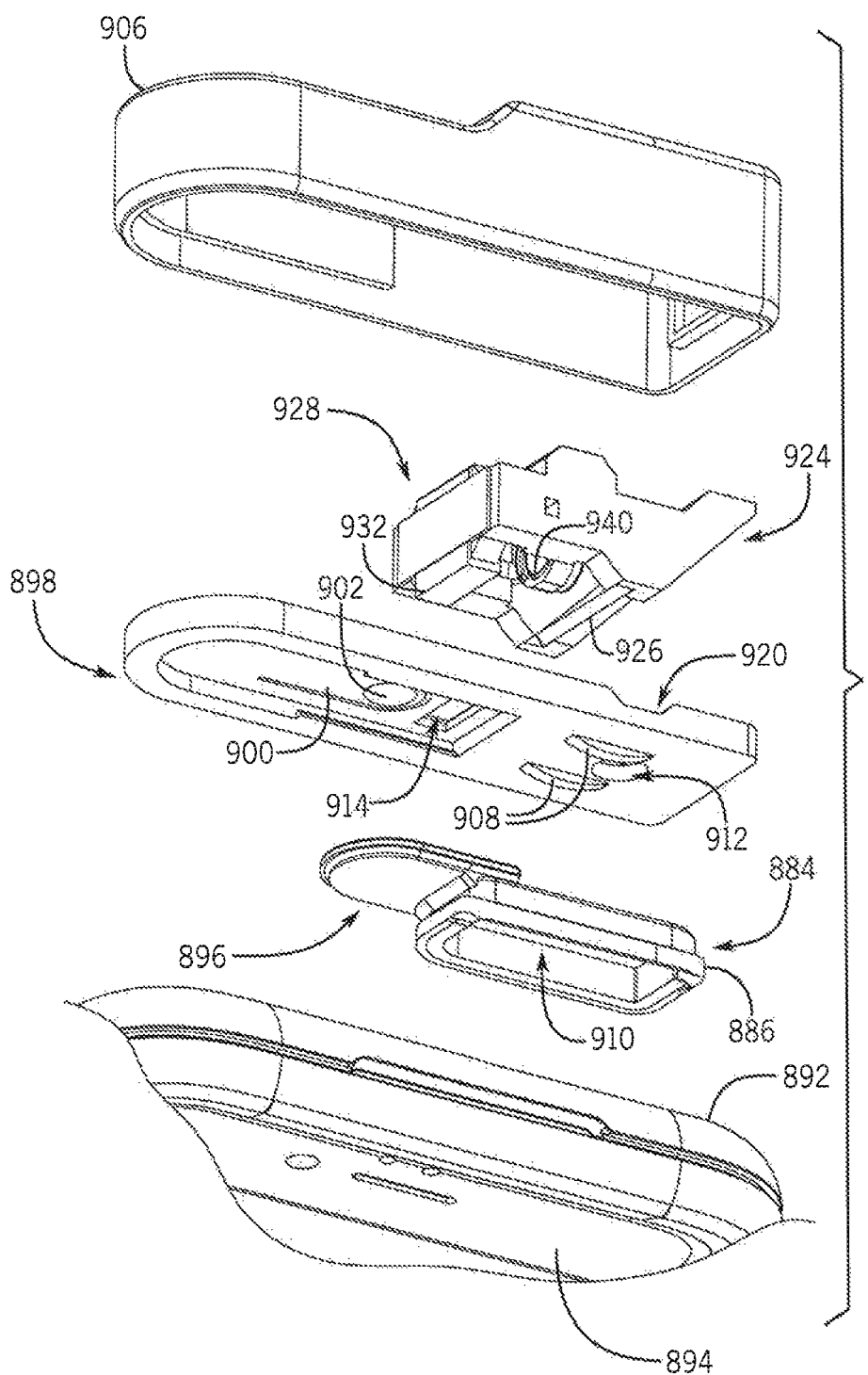

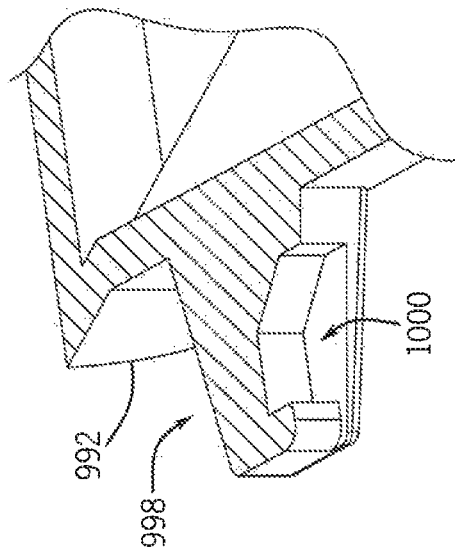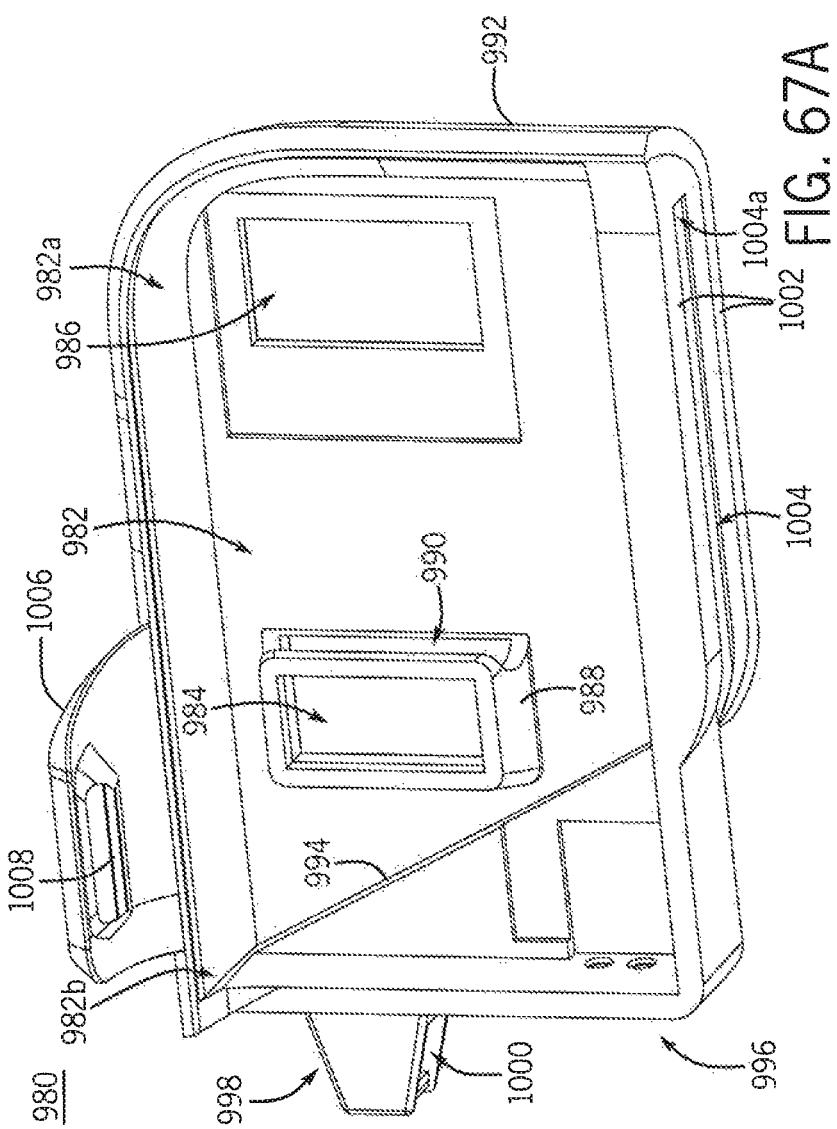

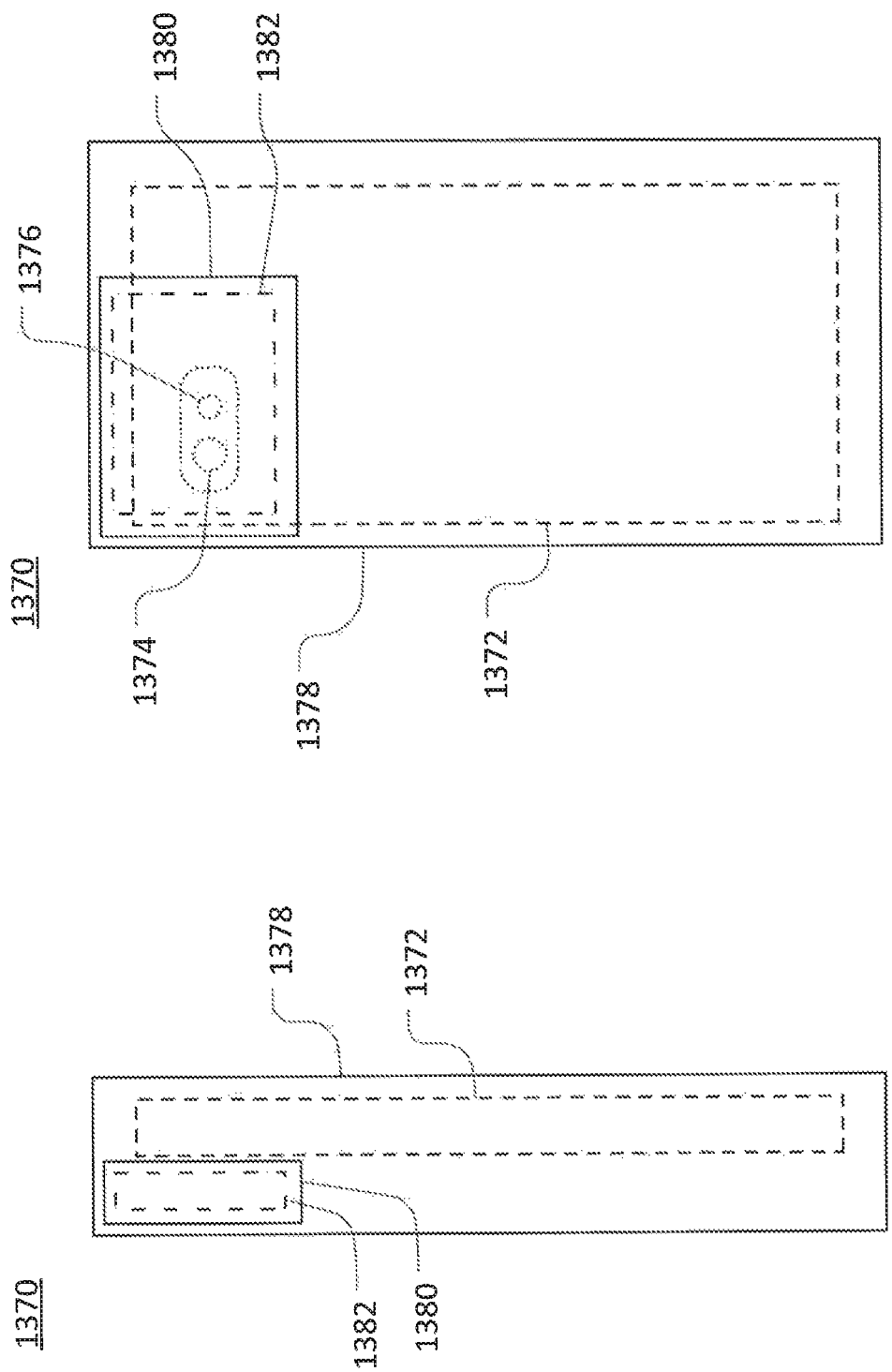

OPTICAL ACCESSORY FOR ATTACHMENT TO MOBILE DEVICE

CROSS-REFERENCE TO RELATED APPLICATIONS

This application is a continuation-in-part of U.S. patent application Ser. No. 15/599,725, titled "Optical Accessory for Attachment to Mobile Device" and filed on May 19, 2017, which is a continuation-in-part of U.S. patent application Ser. No. 15/285,576, titled "Optical Accessory for Attachment to Mobile Device" and filed on Oct. 5, 2016, which is a continuation-in-part of U.S. patent application Ser. No. 15/092,028, titled "Optical Accessory for Attachment to Mobile Device," filed on Apr. 6, 2016, and now issued as U.S. Pat. No. 9,811,702, which is a continuation-in-part of U.S. patent application Ser. No. 14/682,062, titled "System for Capturing a Coded Image" and filed on Apr. 8, 2015, and a continuation-in-part of U.S. patent application Ser. No. 14/682,072, titled "Aimer Accessory for Capturing a Coded Image," filed on Apr. 8, 2015, and now issued as U.S. Pat. No. 9,747,482, all of which are incorporated herein by reference.

STATEMENT REGARDING FEDERALLY SPONSORED RESEARCH OR DEVELOPMENT

Not applicable.

FIELD OF THE INVENTION

The present invention relates to devices for optically acquiring data, and in particular, to optical barcode scanning devices.

BACKGROUND OF THE INVENTION

Handheld image and barcode scanning devices are well known and used in a wide range of enterprise applications. Barcode scanners are regularly used in connection with checkout stations at supermarkets and other retail establishments for reading barcodes on consumer goods. They are also useful in inventory collection and control for warehousing, shipping and storage of products.

Mobile electronic devices, such as smartphones and tablet computers, are well known and leveraged in a wide range of corporate and personal applications. Such devices, executing specialized software, are frequently being utilized to scan and decode barcodes on products, promotions, and coupons. The specialized software, or app, is typically downloaded to the device but may be preloaded. The app configures the smartphone or mobile device to use the built-in camera in the smartphone or mobile device to scan barcodes, such as those found on products or in magazines, stores, websites, and billboards.

Today's enterprise and personal workplace is changing. Technology is becoming more integrated with daily processes and procedures. In a mobile workplace, the mobile electronic device may provide a more cost effective and flexible alternative to traditional, dedicated and purpose-built handheld scanning devices.

However, scanning a barcode with a smartphone or other mobile electronic device can be cumbersome. To scan a barcode, the user is typically required to view the barcode through the display screen of the device in order to aim and focus the camera lens before the barcode can be successfully decoded. If the device's camera is not properly aimed and focused, it may be difficult or impossible to read the barcode, or may take an excessive amount of time to capture, detect, and decode the barcode from an image. As a result, the scanning of barcodes using a mobile electronic device is inefficient whenever there is a need for convenient, rapid, or high volume barcode detection and decoding. Improving the efficiency and ease-of-use of barcode scanning, using the built-in camera along with enhanced decoding software, is desirable.

Thus, methods and devices are needed to improve the efficiency and ease-of-use of scanning a barcode using a mobile device, such as a smartphone.

SUMMARY OF THE INVENTION

Technologies are described for optical devices, and in particular to a system for scanning a barcode using a smartphone and other mobile devices.

Some embodiments of the invention provide an attachment for use with a mobile device and a case for the mobile device. The mobile device can include an imaging device and a mobile-device light source, and the case can include a case optical opening that is optically aligned with one or more of the imaging device and the mobile-device light source when the case is secured to the mobile device. The attachment can include an attachment base and an attachment body. The attachment base can be configured to be secured to the case with the attachment base disposed at least partly within the case optical opening, and the attachment body can be configured to be removably secured to the attachment base. The attachment body can include at least one optical device for use with the imaging device during image targeting and image acquisition. The attachment base can removably secure the attachment body to the case when the attachment body is secured to the attachment base and the attachment base is secured to the case.

Some embodiments of the invention provide a system for communicating with a mobile device, where the mobile device includes an imaging device and a mobile-device light source. The system can include an attachment with a light detector, at least one attachment light source, and a processor. The light detector can be configured to receive optical signals from the mobile-device light source. The processor can be configured to, based upon the optical signals received at the light detector from mobile-device light source, at least one of activate the at least one attachment light source to direct light onto an external target and configure at least one illumination parameter for the attachment. The processor can further be configured to activate the at least one attachment light source to communicate with the mobile device via the imaging device.

Some embodiments of the invention provide a method of communicating information between a mobile device and an attachment, where the mobile device includes an imaging device and a mobile-device light source, and the attachment includes a light detector and at least one attachment light source. First optical signals can be received at the light detector. Based on the first optical signals, at least one of: the at least one attachment light source can be activated for image acquisition and targeting; and at least one illumination parameter for the attachment can be configured. The at least one attachment light source can also be activated to provide second optical signals to the imaging device to transmit non-image information to the mobile device.

Some embodiments of the invention provide an attachment assembly for use with a mobile device and a case for the mobile device, with the mobile device including an imaging device and a mobile-device light source, and the case including a case optical opening that is optically aligned with one or more of the imaging device and the mobile-device light source when the case is secured to the mobile device. An attachment base can be configured to be secured to the case with a cut-out of the attachment base disposed at least partly around the case optical opening. An attachment body can be configured to be removably secured to the attachment base, in order to removably secure the attachment body to the case. The attachment body can include at least one optical device for use with the imaging device during one or more of image targeting and image acquisition, and a protrusion with at least one protrusion window. The protrusion of the attachment body can be configured to extend into the case optical opening, when the attachment body is removably secured to the attachment base and the attachment base is secured to the case, so that a first portion of the at least one protrusion window is in optical alignment with the imaging device and a second portion of the at least one protrusion window is in optical alignment with the mobile-device light source.

Some embodiments of the invention provide a system for communicating with a mobile device that is configured to acquire and analyze images of symbols, with the mobile device including an imaging device and a mobile-device light source. An attachment can include an optical sensor configured to receive optical signals from the mobile-device light source, and at least one attachment light source. A processor can be configured to, based upon the optical signals received at the optical sensor from mobile-device light source, at least one of: activate the at least one attachment light source to direct light onto an external target; and configure at least one illumination parameter for the attachment. The processor can be further configured to activate the at least one attachment light source to communicate with the mobile device via the imaging device.

Some embodiments of the invention provide a method of communicating information between a mobile device and an attachment, with the mobile device including an imaging device and a mobile-device light source, and with the attachment including an optical sensor and at least one attachment light source. First optical signals can be received at the optical sensor. Based on the first optical signals, one or more of the following can be implemented: activating the at least one attachment light source for one or more of image acquisition and image targeting; and configuring at least one illumination parameter for the attachment. The at least one attachment light source can be activated to provide second optical signals to the imaging device to transmit non-image information to the mobile device.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

The features and advantages of the invention are apparent from the following description taken in conjunction with the accompanying drawings in which:

FIG. 3A is a perspective diagram depicting an illustrative embodiment of an aimer accessory coupled to the mobile device of FIG. 1, and FIG. 3B is an exploded view of the aimer accessory of FIG. 3A;

FIG. 8 depicts an illustrative memory map of bar code symbologies used in the method of FIG. 6;

FIG. 21 are illustrative embodiments of light pipes or light-ray trace paths that are taught by this disclosure;

FIG. 44A is a schematic view of an optical device for projecting a pattern onto a target according to this disclosure;

FIG. 44B is a schematic view of a mask for the optical device of FIG. 44A;

FIG. 45 is a schematic view of another optical device for projecting a pattern onto a target according to this disclosure;

FIG. 46 is a schematic view of still another optical device for projecting a pattern onto a target according to this disclosure;

FIG. 48A is a schematic view of a further optical device for projecting a pattern onto a target according to this disclosure;

FIG. 48B is a schematic view of a reflecting surface for the optical device of FIG. 48A;

FIG. 49 is a schematic view of still a further optical device for projecting a pattern onto a target according to this disclosure;

FIGS. 63A and 63B are bottom and top exploded perspective views, respectively, of the attachment of FIG. 62;

FIG. 67A is a bottom, front perspective view of the cover of FIG. 66;

FIG. 67B is an enlarged perspective sectional view of area E-E of the cover of FIG. 66;

FIGS. 101A and 101B are schematic views of an optical system with an attachment assembly according to this disclosure.

DETAILED DESCRIPTION OF THE INVENTION

Figures 1A, 1B:
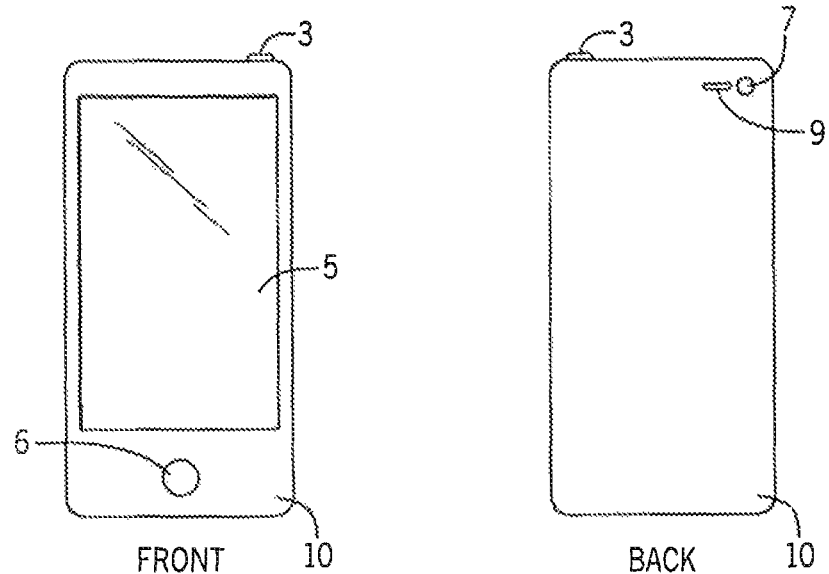
FIGS. 1A and 1B, collectively referred to herein as FIG. 1, show a diagram depicting aspects of a mobile device such as a smartphone.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein are methods and apparatus that permit users of mobile devices, such as a smartphone, to perform "blind and targeted scanning" of barcodes and other information bearing symbols. Generally, the methods and apparatus include an aimer module that collimates diffuse light from a lamp (LED or flash mechanism) on a mobile device for use in capturing a barcode image. The aimer module may also be integrated into a given mobile device or a protective case. Alternatively, the aimer module may be configured as an attachment for retrofit of a mobile device. Operation of the mobile device may be complemented with additional software to take advantage of the functionality of the aimer module. In order to provide some background for the teachings herein, some context is first provided.

Referring now to FIG. 1, there is shown aspects of an illustrative mobile device 10. In this example, the mobile device 10 is a "smartphone." Alternatively, the mobile device may be a tablet, an electronic pad, a laptop computer, or other mobile device. Salient aspects of the mobile device 10 include a home button 6, an on/off switch 3, a display 5, a camera 7, and a lamp 9. Generally, the foregoing components are conventional and provide functionality that is well known in the art. The mobile device 10 may be referred to herein as "smartphone 10" and by other similar terms. Illustrative smartphones include the IPHONE from Apple Corp. of Cupertino, Calif., devices operating on the ANDROID platform of Google Corp. of Mountain View, Calif., as well as devices operating in the WINDOWS environment provided by Microsoft Corp. of Redmond, Wash.

For purposes of convention and to aid in the discussion herein, terms of orientation are provided with regard to the figures. For example, FIG. 1A depicts the front of the mobile device 10. FIG. 1B depicts the back of the mobile device 10. The terms of orientation are with reference to orientation during operation of the mobile device 10. Generally, orientation of other components, such as the aimer module introduced herein, are with reference to orientation of the mobile device 10. For example, it is conceivable the aimer module mentioned herein could be adapted for usage on the front facing camera of the mobile device. However, again, this is not limiting of the teachings herein.

Figure 2:
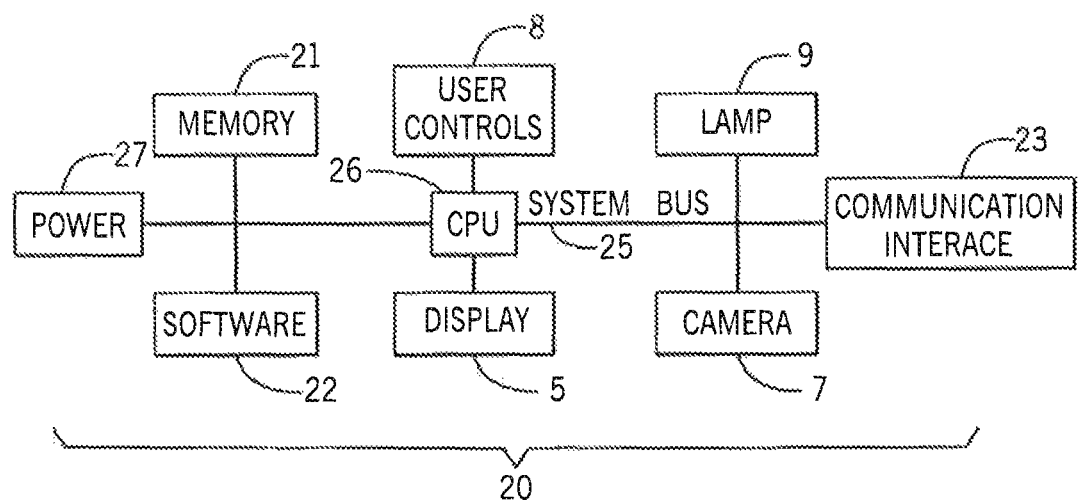
FIG. 2 is an illustrative topology for components of the mobile device of FIG. 1.

Referring now to FIG. 2, an illustrative topology 20 of the mobile device 10 is provided. The illustrative topology 20 depicts some of the components implemented in the mobile device 10. Included in the illustrative topology 20 is at least one central processing unit (CPU) 26. The central processing unit (CPU) 26 is connected to or in communication with other components through system bus 25. Illustrative other components include a power supply 27, memory 21, software 22, user controls 8, a display 5, a camera 7 (can be front or rear facing on mobile device 10), a lamp 9, and a communication interface 23.

The CPU 26 may be an ARM or other processor. The power supply 27 may be from a battery or a source of direct current (DC), such as a transformer coupled to a conventional alternating current (AC) outlet. User controls 8 may be a home button 6 and an on/off switch 3 shown in FIG. 1. Display 5 may include at least one of LCD, LED, OLED, AMOLED, IPS and other technologies. Lamp 9 may be a light emitting diode (LED).

The communication interface 23 may include a wired interface and/or a wireless interface. The wireless interface may include a wireless service processor. Illustrative wireless interfaces may make use of a protocol such as cellular, Bluetooth, Wi-Fi, near field technology (NFC), ZigBee, or other technology. Communication services provided over the wireless communication interface may include Wi-Fi, Bluetooth, Ethernet, DSL, LTE, PCS, 2G, 3G, 4G, LAN, CDMA, TDMA, GSM, WDM and WLAN. The communication interface 23 may include an auditory channel. That is, the communication interface 23 may include a microphone for receiving voice commands, and may further include a speaker. In some embodiments, the speaker may provide an auditory signal when a barcode has been read. The communication interface 23 may further include a status light or other such visual indicators.

The communication interface 23 provides for, among other things, voice communications as well as data communications. The data communications may be used to provide for communication of software and data (such as at least one image; results of analyses, and other such types of data). Communication through the communication interface 23 may be bi-directional or in a single direction.

The mobile device 10 may include additional components such as sensors. Illustrative sensors may include an accelerometer that provides for orientation information and a GPS sensor that provides for location information. The mobile device may also include peripheral interface and communication ports.

As discussed herein, the term "software" 22 generally refers to machine-executable instructions that provide for the implementation of the methods of this disclosure that are explained below. The machine-executable instructions may be stored on non-transitory machine-readable media such as memory 21. Illustrative methods that may be implemented to actuate the mobile device hardware may include instructions for operation of the camera 7, the lamp 9, communications through the communication interface 23, and other aspects of this disclosure as discussed further below. In some of the illustrative embodiments discussed herein, the software 22 provides for detecting and decoding barcodes within an image. However, it should be noted that the term "software" might describe sets of instructions to perform a great variety of functions.

The memory 21 may include multiple forms of memory. For example, the memory 21 may include non-volatile random access memory (NVRAM) and/or volatile random access memory (RAM). Generally, the non-volatile random access memory (NVRAM) is useful for storing software 22 as well as data generated by or needed for operation of the software 22 such as rules, configurations and similar data. The memory 21 may include read only memory (ROM). The read only memory (ROM) may be used to store firmware that provides instruction sets necessary for basic operation of the components within the topology 20.

The camera 7 may include any appropriate sensor and at least one optical element such as a lens. Generally, the camera 7 may include those components as needed to record (also referred to as "capture") images of items such as a barcode and further include photodetectors, amplifiers, transistors, and processing hardware and power management hardware. The lamp 9 may include any appropriate source of illumination. Illustrative components for the lamp 9 include at least one light emitting diode (LED).

Although the illustrative mobile device 10 disclosed is a smartphone, the mobile device 10 is not limited to this embodiment and may include other devices. Accordingly, it is not required that the mobile device 10 incorporate all of the components of FIG. 2, and other components may be included. In order to provide some further context for the teachings herein, some terms used herein are now introduced.

As discussed herein, the term "barcode" generally refers to an optical machine-readable symbology that contains a representation of data. Generally, any given barcode is a representation of data that is related to the object to which it is attached. A barcode as discussed herein may include data that is arranged in a one-dimensional (1D) array, a two-dimensional (2D) array; and/or a 3D physical tag. Information may be conveyed in a given barcode according to arrangements of symbology, and may further convey information in a plurality of wavelengths and/or colors (i.e., varying groups of visible wavelengths).

Illustrative forms of one-dimensional (1D) barcodes include: Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; and UPC., as well as others.

Illustrative forms of two-dimensional (2D) barcodes (also referred to as a "matrix code") include: Aztec Code; Code 1; ColorCode; Color Construct Code; CrontoSign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; SPARQCode; and others.

As discussed herein, a "light pipe" or "light tube" is a physical structure used for transporting of light for the purpose of illumination and is an example of an optical waveguide. A light pipe generally provides the transport of light to another location, minimizing the loss of light. A light pipe may include highly transmissive material, and may include reflective materials, collectors, reflectors, concentrators, at least one lens, and other components as deemed appropriate. An illustrative light pipe is an optical fiber. Light pipes, as discussed herein, may be formed of any suitable material. Illustrative materials include acrylic plastic, silicon glass, and other such materials. A light pipe may be hollow and open or closed to the external atmosphere. A light pipe can be configured to transmit only light of a particular color (or colors).

Generally, the following discussion provides an introduction to an aimer module, methods for use of the aimer module, aspects of some illustrative embodiments of the aimer module, and some detail on software that may be used in conjunction with the aimer module.

Broadly speaking, an aimer module for a mobile device and method of use is provided by this disclosure. The aimer module collimates diffuse light from a lamp on a mobile device for use in capturing a barcode image. The aimer module includes a means for receiving light from a lamp of the mobile device, and generating a light pattern on the surface containing a barcode. The receiving and generating means may include a grating or configuration of mirrors.

Registration of the light pattern and the barcode in a scan area enhances the ability of the specialized software on the mobile device to read the barcode.

As used herein, the term "registration" means that a barcode and a light pattern generated by the aimer module on the surface containing the barcode are in the viewing angle of the camera. This viewing angle can change depending on the lens and the smartphone. In one illustrative example, the camera may use a cone type lens. In this example, if the barcode and the light pattern on the surface containing the barcode are both in the cone of viewing, there would be a registration of the light pattern and the barcode according to this disclosure. As explained in this disclosure, once the barcode and the light pattern generated by the aimer module on the surface containing the barcode are in "registration," the smartphone may capture the barcode image and decode the barcode as explained below.

Broadly speaking, there are at least three types of registration contemplated by this disclosure. These three types of registration correspond to three modes of operation of the aimer module contemplated by this disclosure. These three modes of operation are blind mode scanning, targeted mode scanning, and smartphone display mode scanning, otherwise referred to as display mode scanning. In addition, both blind mode scanning and targeted mode scanning may be used with or without display mode of operation. Hence, this disclosure provides for at least five modes of operation. These modes of operation are depicted in the Table 1 and are explained in greater detail below.

TABLE 1

Modes of operation of Smartphone or Other Mobile Device with Aimer Module

| Configuration | Blind Mode Operation | Targeted Mode Operation | Display Mode Operation |
|---|---|---|---|
| Blind Mode Configuration ON- Display Not Used | Blind Mode Blind | | |
| Blind Mode Configuration ON- Display Used | Blind Mode Targeted | | |
| Targeted MODE Configuration ON- Display Not Used | | Targeted Mode Blind | |
| Targeted MODE Configuration ON- Display Used | | Targeted Mode Targeted | |
| Blind Mode AND Targeted Mode Configurations OFF- Display Used | | | Display Mode |

In blind mode of operation, the light pattern on the surface containing the barcode can be anywhere in the cone of viewing. The user uses the light pattern generated by the aimer module of this disclosure as a pointer and points the light pattern at the surface containing the barcode. There is no need for the user to look through the display of the smartphone when operating the scanning features of this disclosure in blind mode. So long as the user aims the light pattern at the surface containing the barcode, such that the light pattern and barcode are both within the cone of viewing, there is a registration of the light pattern and the barcode in blind mode according to this disclosure. As indicated in Table 1, the user may employ blind mode operation with or without the use of the display. The most efficient manner of blind mode operation involves a blind mode blind operation without the use of the display. In this case, the user would simply look at and direct the light pattern generated by this disclosure at or around the barcode image in order to "register" the light pattern with the barcode image as previously explained. After registration, the barcode image is captured by activation of a mechanical trigger on the smartphone, an activation button on the display of the smartphone, or by lapse of a predetermined period of time after registration of the light pattern with the barcode image as explained below. However, in some cases of blind mode operation, the user may look through the display of the smartphone to assist in the guiding of the pattern of light at or about the barcode image. This mode of operation is known as blind mode targeted mode of operation since the display of the smartphone is used to "target" the pattern of light at or about the barcode image to generate the registration required for blind mode operation as taught by this disclosure.

In targeted mode of operation, the light pattern on the surface containing the barcode must hover over the barcode. As in blind mode, the user uses the light pattern generated by the aimer module of this disclosure as a pointer and points the light pattern at the surface containing the barcode. In targeted mode, the light pattern must hover over the barcode to be in registration unlike blind mode where registration may occur when the light pattern is shining outside the barcode but still within the cone of viewing. As the user aims the light pattern at the surface containing the barcode such that the light pattern is hovering over the barcode and within the cone of viewing, there is a registration of the light pattern and the barcode in targeted mode according to this disclosure. As indicated in Table 1, the user may employ targeted mode operation with or without the use of the display. The most efficient manner of targeted mode operation involves a targeted mode blind operation without the use of the display. In this case, the user would simply look at and "hover" the light pattern generated by this disclosure over the barcode image in order to "register" the light pattern with the barcode image as previously explained. After registration, the barcode image is captured by activation of a mechanical trigger on the smartphone, an activation button on the display of the smartphone, or by lapse of a predetermined period of time after registration of the light pattern with the barcode image as explained below. However, in some cases of targeted mode of operation, the user may look through the display of the smartphone to assist in the guiding of the pattern of light to hover over the barcode image. This mode of operation is known as targeted mode targeted mode of operation since the display of the smartphone is used to "target" the pattern of light to "hover" over the barcode image to generate the registration required for targeted mode operation as taught by this disclosure.

In display mode of operation, the user uses the display of the smartphone to point the camera lens at the image. So long as the user points the camera lens at the image such that the light pattern and barcode are both within the cone of viewing, there is a registration of the light pattern and the barcode in smartphone display mode according to this disclosure. The aimer module is not used when the smartphone is operating in display mode of operation. Instead of using the light pattern generated by the aimer module of this disclosure, the lamp of the smartphone is used conventionally to provide direct diffuse lighting for illuminating the barcode image in order that the smartphone can capture the barcode image.

Referring now to FIG. 3, aspects of the illustrative mobile device 10 are shown. In this example, the mobile device 10 is outfitted with an aimer module that in FIG. 3 is depicted as aimer accessory 30. Generally, the aimer accessory 30 is tightly coupled to the mobile device 10 using conventional techniques. For example, the aimer accessory 30 may be configured as an attachment piece for use in retrofitting of a given mobile device 10. Alternatively, the aimer accessory 30 may be integrated into a given mobile device 10. In embodiments in which the aimer accessory 30 is attached to the mobile device, the aimer accessory 30 may be attached by snap-fit connection as illustratively shown in FIGS. 23-26 and as explained below. In other embodiments, the aimer accessory 30 may be an accessory that is integrated into a protective case in which the mobile device 10 is stored. In other embodiments, the aimer accessory 30 may be an accessory that is permanently affixed to the mobile device 10. For example, the aimer accessory 30 may be glued to the mobile device 10. In some other embodiments, the aimer accessory 30 may be temporarily affixed to the mobile device 10. For example, the aimer accessory 30 may include an embedded magnet that is magnetically attracted to the housing of the mobile device 10. Some designs of the aimer accessory 30 provide for mechanical retention of the aimer accessory 30 on the mobile device 10 (for example, refer to FIG. 18). The aimer accessory 30 may also be referred to herein simply as the "aimer 30."

Figure 3A:
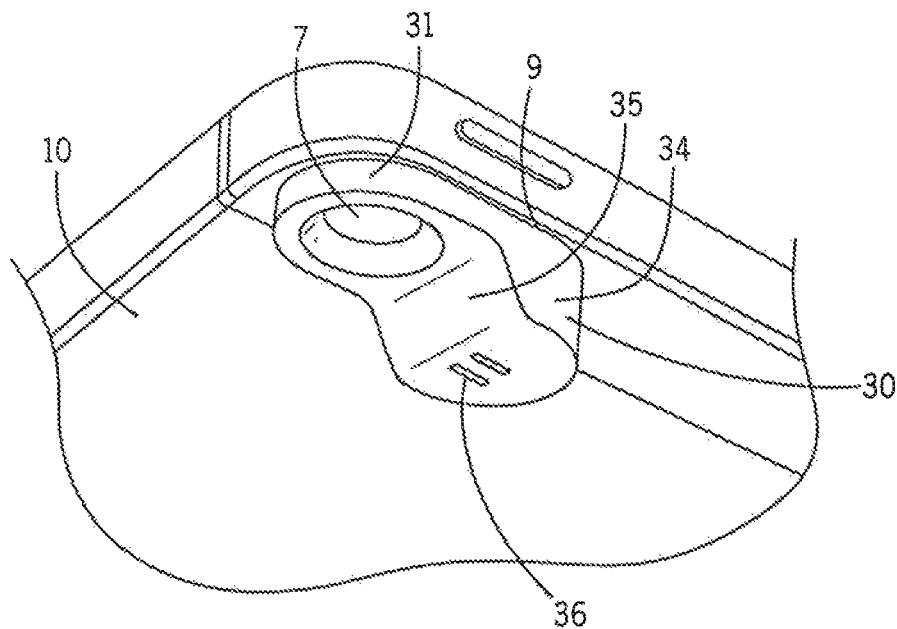
FIGS. 3A and 3B are collectively referred to herein as FIG. 3.
Figure 3B:
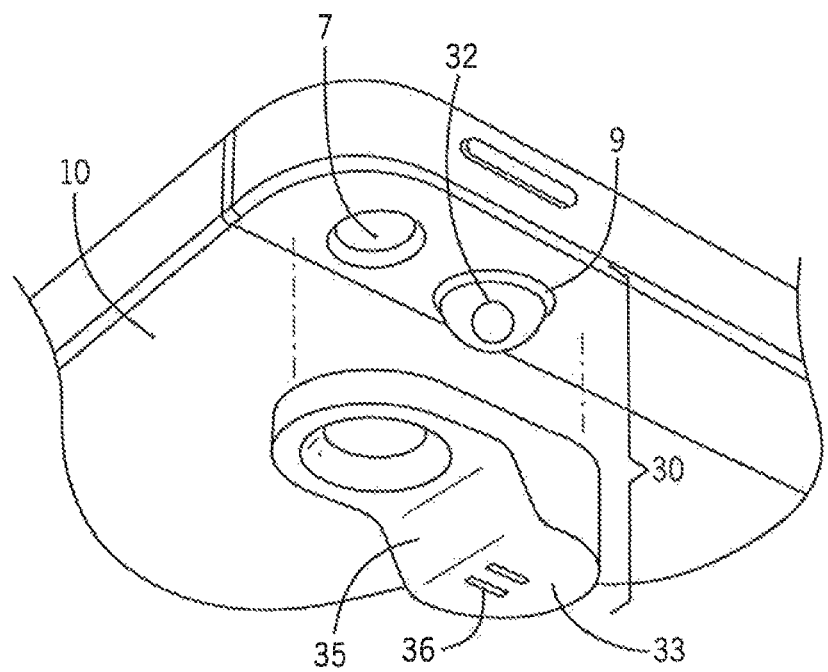
Figure 4A:
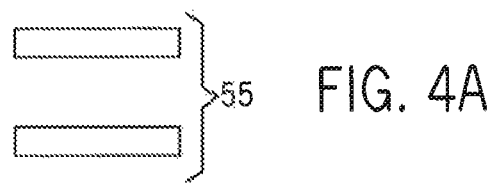
FIGS. 4A through 4E, collectively referred to herein as FIG. 4, are depictions of embodiments of possible light patterns produced by the mobile device and accessory depicted in FIG. 3.
Figure 4B:
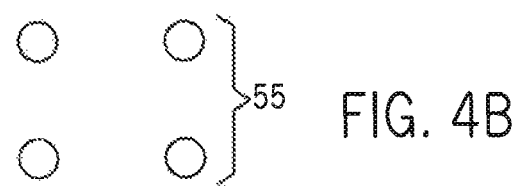
Figure 4C:
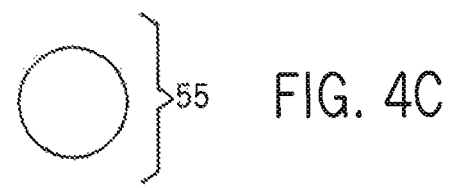
Figure 4D:
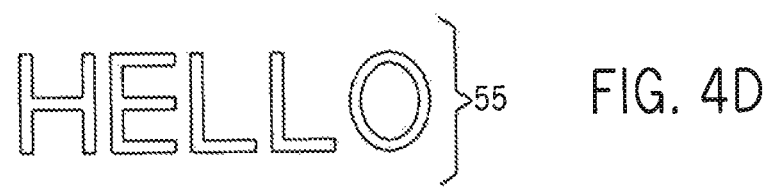
Figure 4E:
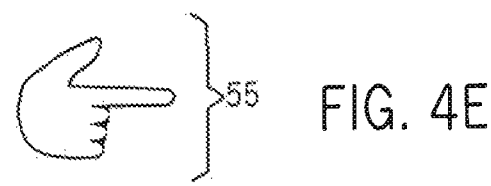
Figure 5A:
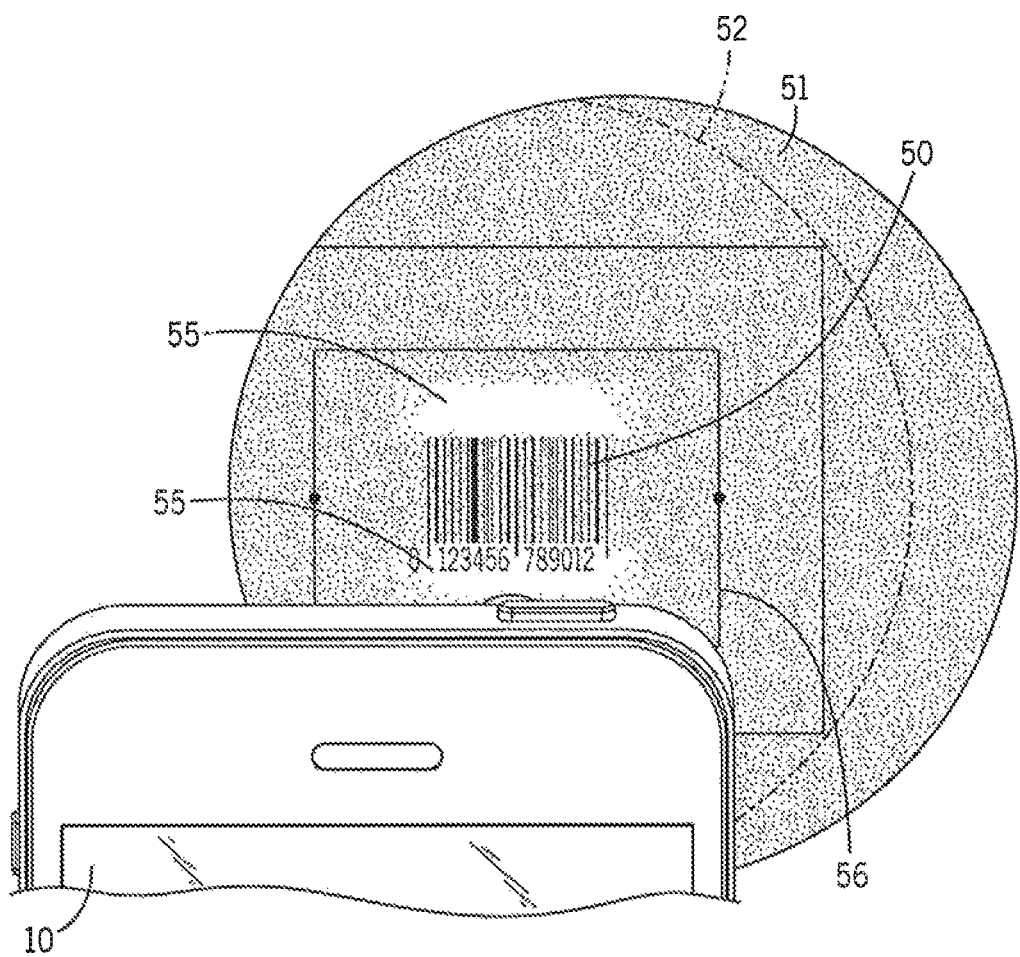
FIGS. 5A through 5D are illustrations depicting light patterns generated by the aimer accessory of FIG. 3 in relation to a barcode.
Figure 5B:
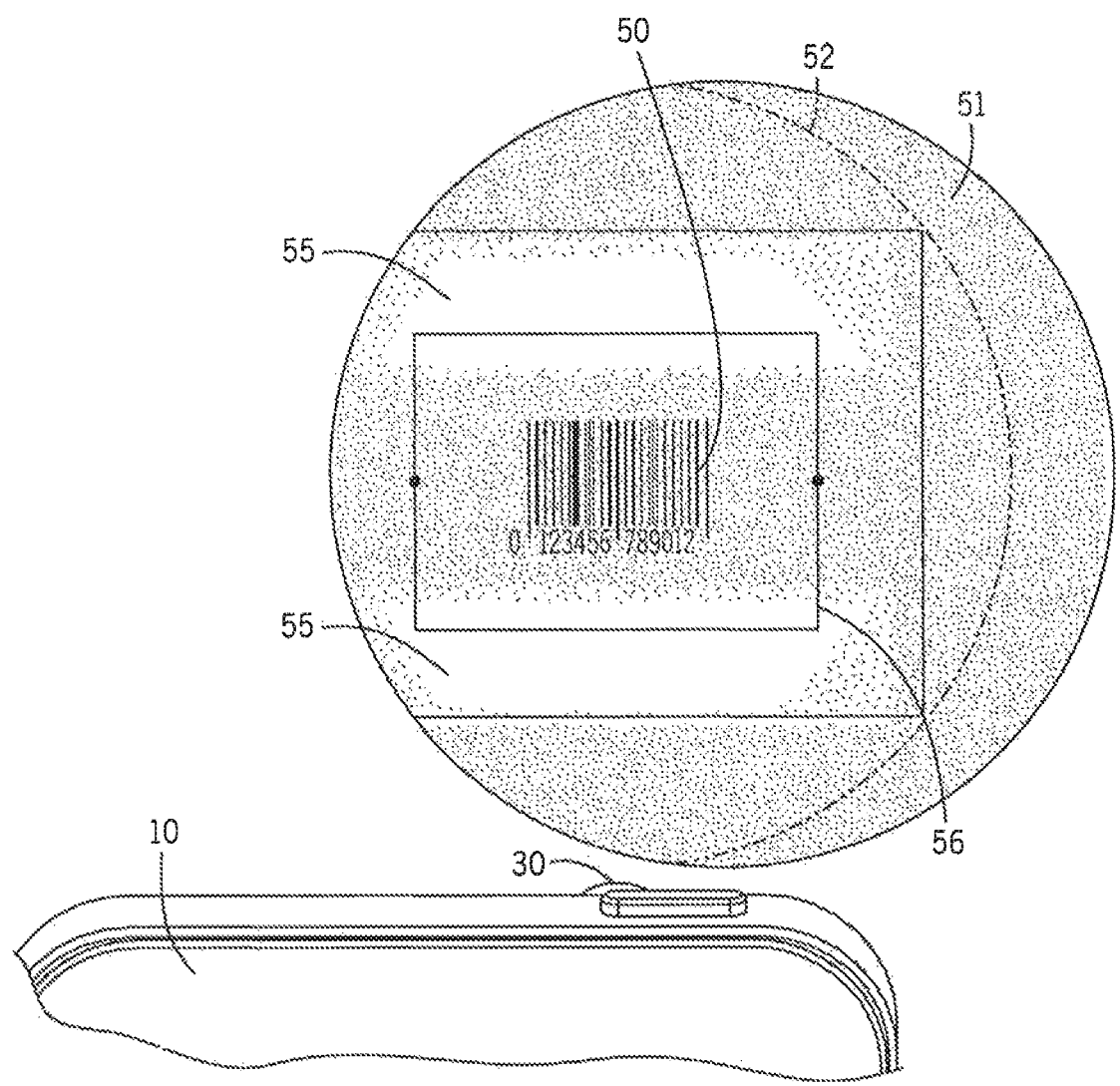
Figure 5C:
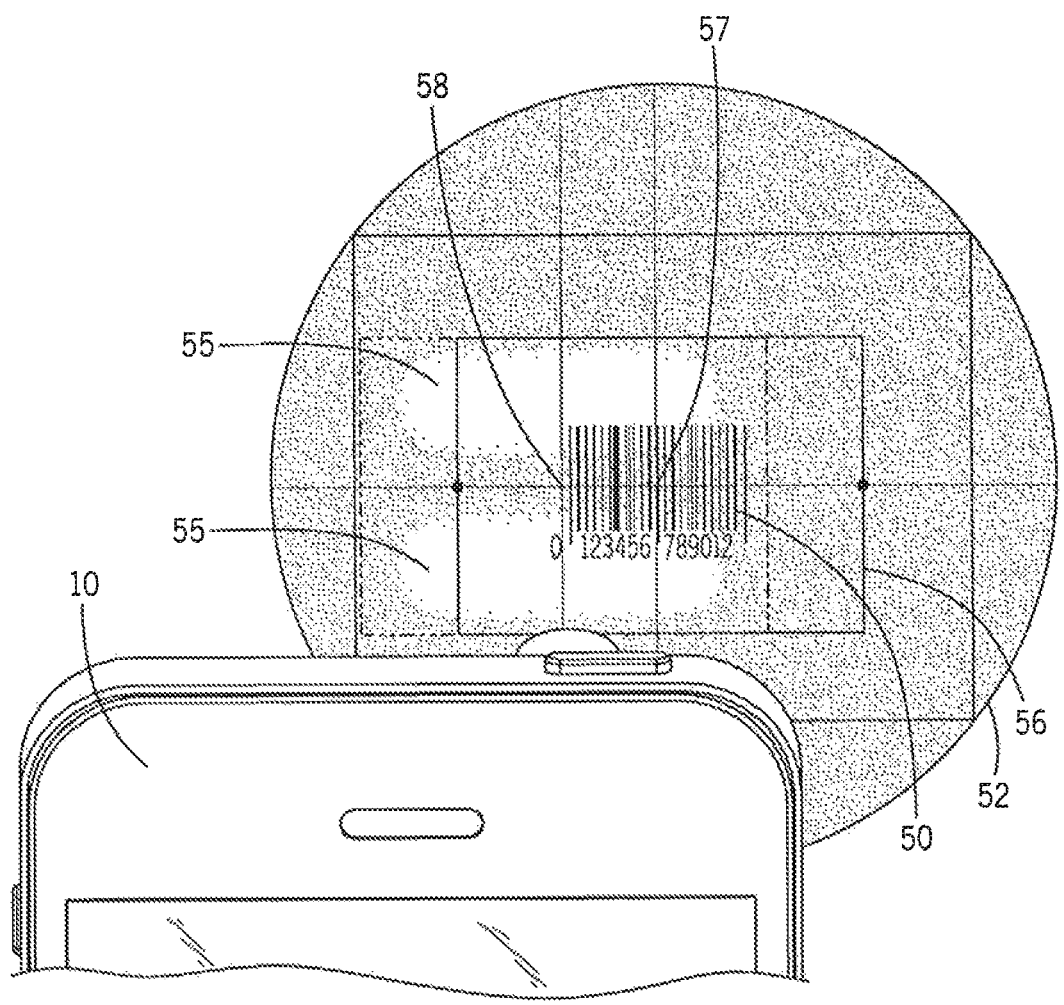
Figure 5D:
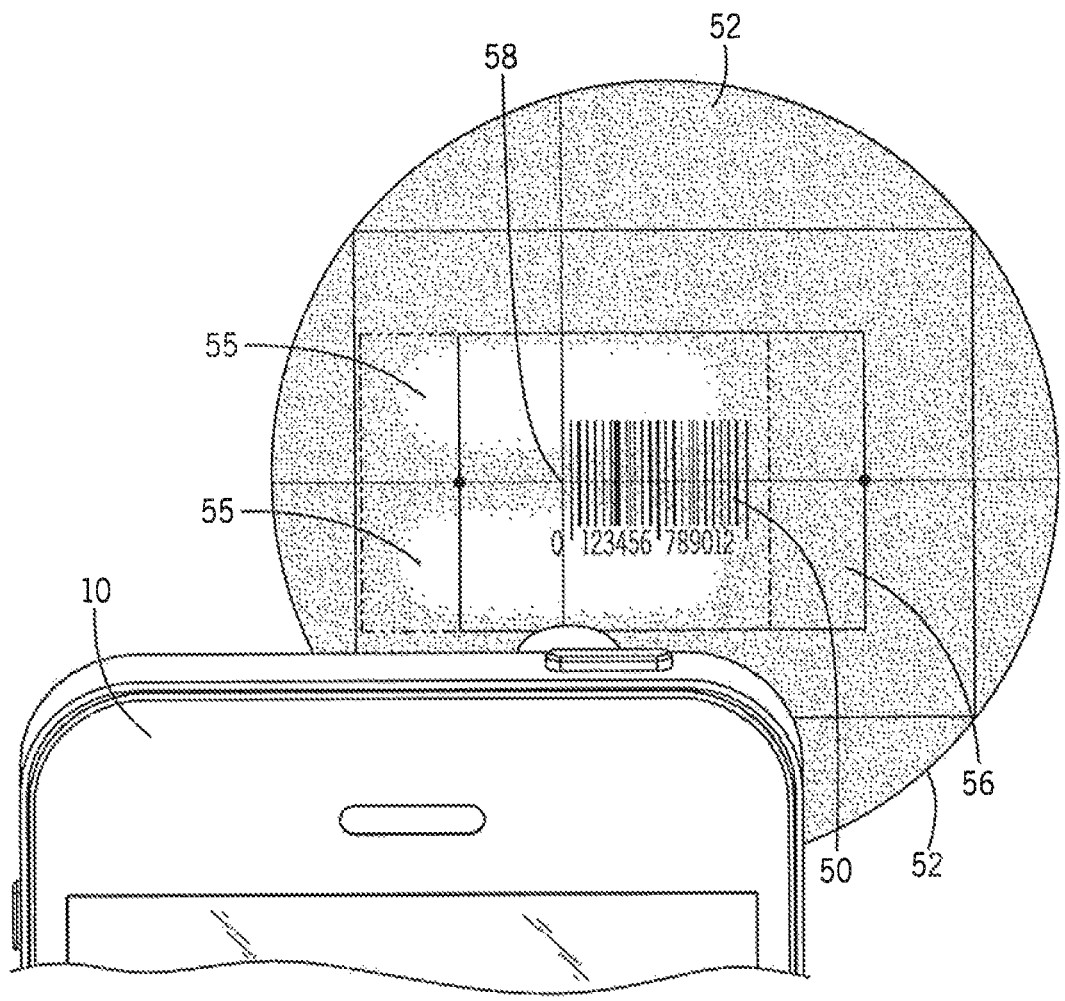
Figure 10:
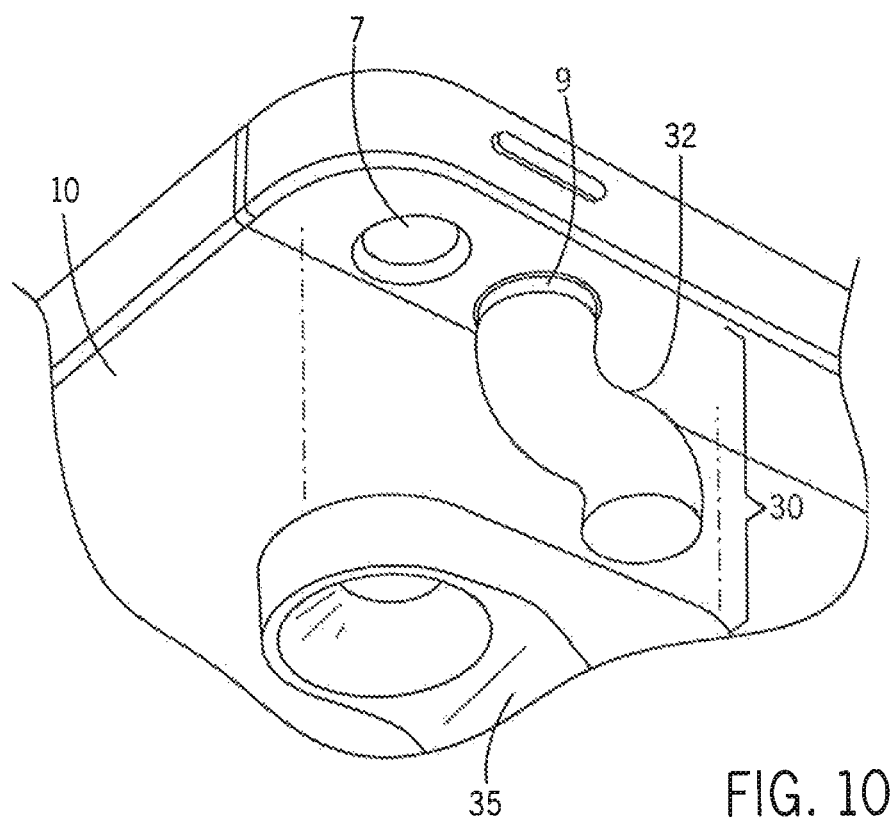
FIG. 10 is an exploded view of the aimer accessory of FIG. 9.

In the illustrative embodiment depicted in FIG. 3 (i.e., FIGS. 3A and 3B), the aimer accessory 30 includes a body 35. The body 35 includes a collector 31 that surrounds the lens and sensor associated with the camera 7. The body 35 further includes a collimator 34. The collimator 34 provides for collimation of light from the lamp 9. The distal portion 33 of the collimator 34 (see FIG. 3B) includes a grating 36. Generally, the grating 36 receives light from the lamp 9. The light may pass through at least one optical element 32. Then at least one optical element 32 may provide for focusing light from the lamp 9 and/or directing the light through the grating 36. In the example shown, at least one optical element 32 is disposed over the lamp 9. In some embodiments, at least one optical element 32 includes a light pipe. In the example shown in FIG. 3B, optical element 32 is shown as a hemispherical element. Illustrative embodiments with other configurations of the light pipe are shown in FIGS. 10 and 21. In the example shown in FIG. 3, the grating 36 illustratively includes two substantially parallel slits disposed in the distal portion 33 of the collimator 34. As explained below, some example patterns that may be disposed in the grating 36 include parallel slits, a substantially rectangular array of holes, a rectangular array of holes, and a pattern of an icon. Some resulting light patterns (also referred to as a "pattern of light") produced by the grating 36 are shown in FIG. 4. Generally, the grating 36 provides for casting a pattern of light 55 onto a sample for imaging. In the examples discussed herein, the sample includes various forms of barcodes.

In some embodiments, at least one mirror is used with or without the grating 36. In some other embodiments, at least one mirror is used with additional optical elements as deemed appropriate. This is explained further in connection with FIG. 20A-C.

Referring now to FIGS. 5 through 8, aspects of a process for imaging a barcode 50 with the aimer 30 are shown. In each of FIGS. 5 through 8, a user at some distance holds the mobile device 10 from the barcode 50. The software 22 (shown in FIG. 2) has been invoked and is causing the mobile device 10 to attempt imaging of the barcode 50.

In FIG. 5, an illustrative barcode 50 is shown. The illustrative barcode 50 is located within a field of view (FOV) 51. The field of view (FOV) 51 represents the entire area that is naturally visible to the camera 7 of the mobile device 10 (i.e., viewing angle of the camera). This is also what the user sees on the display of a camera when doing a display mode scan, as taught in the prior art. A shifted field of view (SFOV) 52 is also shown. The shifted field of view (SFOV) 52 is a subset of the field of view (FOV) 51 and is a result of processing by the specialized software 22. The shifted field of view (SFOV) 52 represents an area within the field of view (FOV) 51 that aligns with a light pattern 55 that is cast by the aimer accessory 30. This light pattern is what the user uses to do a blind scan or targeted scan according to this disclosure. A scan area 56 is maintained within the shifted field of view (SFOV) 52. Generally, the scan area 56 is a region of the shifted field of view (SFOV) 52 that is used by the software 22 to look for a barcode.

As shown in FIGS. 5A-D, the light pattern 55 correlates with the appearance of the grating 36 (see FIG. 3B). That is, referring back to FIGS. 3 and 4, it may be seen that the grating 36 illustratively includes two parallel slits from which light is emitted. In each of FIGS. 5 through 8, the light pattern 55 correlates with the two substantially parallel slits. Alternatively, the light pattern 55 may be any of the other patterns illustrated in FIG. 4, but also other shapes depending on the implementation of the grating 36.

Figure 6:
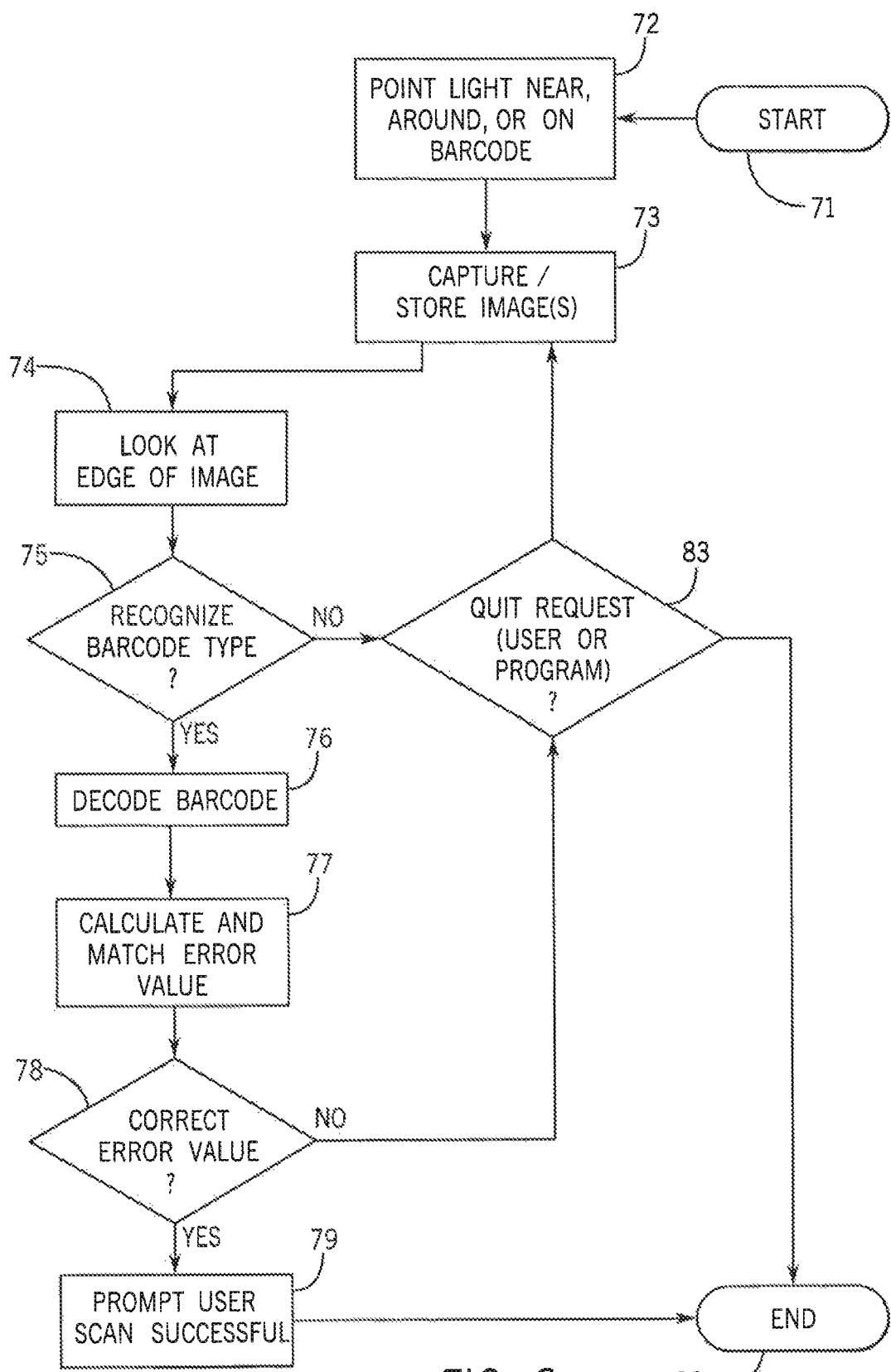
FIG. 6 depicts an illustrative method according to this disclosure for using the aimer module of this disclosure.

The software 22 makes use of the light pattern 55 cast by the aimer accessory 30. Generally, once the software 22 has received a command from the user to commence scanning, or a predetermined period of time has elapsed after registration of the light pattern and the barcode, the software 22 begins processing images collected from the camera 7 on a continuing basis. When the light pattern 55 is appropriately manifested within the scan area 56, the software 22 identifies a focal point 57 (shown in FIG. 5C). In this example, the focal point 57 is centered within the scan area 56. The software 22 recognizes the apparition of the barcode 50, and adjusts the focal point 57 to a start of the barcode 50. Once an adjusted focal point 58 has been determined, the software 22 will read the captured barcode 50. Once the captured barcode 50 has been read, the software 22 may store data in the memory 21 (shown in FIG. 2). In some implementations, the software 22 can be configured to turn the lamp 9 on or off, as appropriate, for the capturing of images with the camera 7, FIG. 6 depicts an illustrative method for using the aimer module of this disclosure. The process starts 71 by user selection of mode of operation—namely, blind mode blind mode operation, blind mode targeted mode operation, targeted mode blind mode operation, targeted mode targeted mode operation, or display mode operation. After selection of the operational mode, the user points 72 the light near, around, or on the barcode. In both blind mode blind mode operation and targeted mode blind mode operation, the user uses the light pattern generated by the aimer module of this disclosure as a pointer and points the light pattern at the surface containing the barcode. The light pattern generated by the aimer module guides the user on where to point the light pattern. In both blind mode targeted mode operation and targeted mode targeted mode operation, the user uses the display of the smartphone to point the light pattern generated by the aimer module of this disclosure at the surface containing the barcode. In display mode, the lamp of the smartphone is used conventionally to provide direct diffuse lighting for illuminating the barcode image in order that the smartphone can capture the barcode image.

The decoding software of this disclosure takes care of decoding the images of the barcode captured by the smartphone. In both blind mode blind mode operation and targeted mode blind mode operation, there is no need for the user to look through the display of the smartphone when operating the scanning features of this disclosure in blind or targeted mode. In blind mode targeted mode operation, targeted mode targeted mode operation, and display mode operation, the user will look through the display to point the light at the barcode.

Further, in blind mode blind mode operation and blind mode targeted mode, it is only necessary for the user to aim the light pattern generated by the aimer module at the surface containing the barcode such that the light pattern and barcode are both within the cone of viewing. This ensures registration of the light pattern and the barcode in blind mode according to this disclosure. In targeted mode blind mode operation and targeted mode targeted mode operation, it is necessary for the user to aim the light pattern at the surface containing the barcode such that the light pattern is hovering over the barcode and within the cone of viewing. This ensures registration of the light pattern and the barcode in targeted mode according to this disclosure. In display mode, the aimer module is not used when the smartphone is operating in display mode of operation. Instead of using the light pattern generated by the aimer module of this disclosure, the lamp of the smartphone is used conventionally to provide direct diffuse lighting for illuminating the barcode image in order that the smartphone can capture the barcode image.

A user may find the blind mode of operation most efficient when a surface contains only a single barcode. With a single barcode within the cone of vision, the specialized software of the mobile device, equipped with an aimer module of this disclosure, recognizes there is only one barcode to decode. The decoding software may invoke the scan any time during the process as previously explained. No further logic is needed. However, when a surface contains two or more barcodes, the software of the aimer module requires further logic to determine which barcode to decode. This disclosure provides this further logic within the targeted mode of operation by requiring the user to point the light pattern within the barcode desired for decoding and keep the light pattern over the barcode (i.e., hover over the barcode). The user then initiates a trigger to capture the image or the user hovers over the barcode for a predetermined period of time which may be set by the user. Illustratively, this period of time may be one-half second, but the exact time is a matter of design choice. It will be appreciated that a user may use the aimer module of this disclosure in targeted mode to also scan a surface containing a single barcode. However, because this mode of operation requires the user to hover the light pattern over the barcode, it may be a less efficient procedure for scanning a single barcode than scanning the barcode in blind mode of operation, but with multiple barcodes present in a given area on a page, it may be the desired method of reading the targeted barcode. With display mode, the software of the aimer module requires further logic to determine when the user has lined up the camera lens with the barcode through the display. This logic is illustratively provided by a trigger the user may initiate after the display indicates the camera lens is lined up with the barcode.

The smartphone captures 73 one or more images and typically stores them in memory 21 (FIG. 2) of the smartphone. The capture may be initiated by user activation of a mechanical trigger. Alternatively, the capture may be initiated by user activation of a button on the smartphone, such as an on-screen software button or a physical re-programmed button. In another example, the capture may be automatically initiated (e.g., software initiated) a predetermined period of time after registration of the light pattern and the barcode as explained in this disclosure. In either instance, software responsive to the initiation would begin the capture of a series of images. Typically, the camera may grab 25 or 30 frames of captured images a second. Some cameras may grab 60 frames a second. The number of frames of images captured by the camera is dependent on the camera. In either event, the captured images are stored in memory 21 (FIG. 2) of the smartphone.

Figure 7:
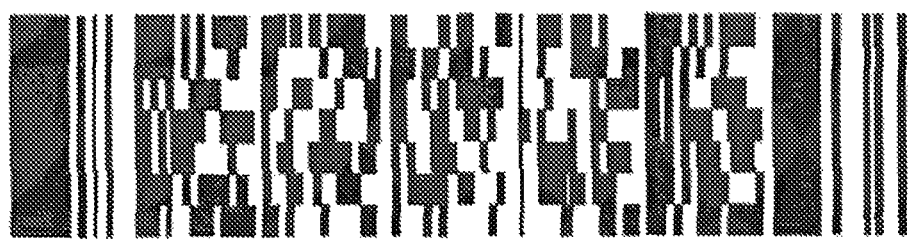
FIG. 7 depicts an example of a PDF417 barcode useful for understanding the method of FIG. 6.

Starting with one captured image, which may be the first image captured and stored in memory, the software of the aimer module will look 74 at an edge of the captured image. FIG. 7 depicts an example of a PDF417 barcode useful for understanding the method of FIG. 6. The beginning and the ending of the barcode, herein referred to as the edge of the barcode, contains a start character and a stop character. The start and stop characters are used by the software of the aimer module of this disclosure to identify the type of barcode (i.e., its symbology). Hence, and referring back to FIG. 6, aimer module software looks 74 at the edge of the captured image for the start and stop characters to identify the type of barcode.

The aimer module software then determines the symbology of the barcode. In this regard, the aimer module software will illustratively access a memory map of symbologies such as depicted in FIG. 8 to match the start and stop characters it has determined to the start and stop characters appearing in the table. If it finds a match, the aimer module software has identified the symbology of the barcode.

If the aimer module software does not recognize the barcode type whether because it has not identified a start and/or stop character or the start and/or stop characters it has identified do not match the start and stop characters in the memory map depicted in FIG. 8, the aimer module will determine 81 if it has another captured image of the barcode to further use in this process of decoding the captured barcode. If the aimer module software determines there are further images available for use in the process, the aimer module software will advance 80 to the next image and repeat steps 74 and 75. If the aimer module software determines there are no further images available for use in the process, the aimer module software prompts 84 the user that the scan failed and the process ends 86. This means that the user will need to begin the process over if the scan of the barcode remains of interest.

If the aimer module software recognizes the barcode type, the aimer module software decodes 76 the barcode and then calculates and matches 77 the check sum it has calculated with the check sum found in the pattern of the barcode. The aimer module software then determines 78 if the calculated error is correct (i.e., that the calculated check sum matches the check sum in the pattern of the barcode). If the calculated error value is not correct, the aimer module software will determine 83 if it has another captured image of the barcode to further use in this process of decoding the captured barcode. If the aimer module software determines there are further images available for use in the process, the aimer module software will advance 82 to the next image and repeat steps 76, 77, and 78. If the aimer module software determines there are no further images available for use in the process, the aimer module software prompts 84 the user that the scan failed and the process ends 86. This means that the user will need to begin the process over if the scan of the barcode remains of interest. If the aimer module software determines 78 that the calculated error is correct (i.e., that the calculated check sum matches the check sum in the pattern of the barcode), the aimer module software continues 79 the software program which can prompt the user that the scan was successful and the process ends 86. The notification can be an audible, a vibration, a display LED coloring or blinking, or any combination of these or other physical notifications.

Figure 9:
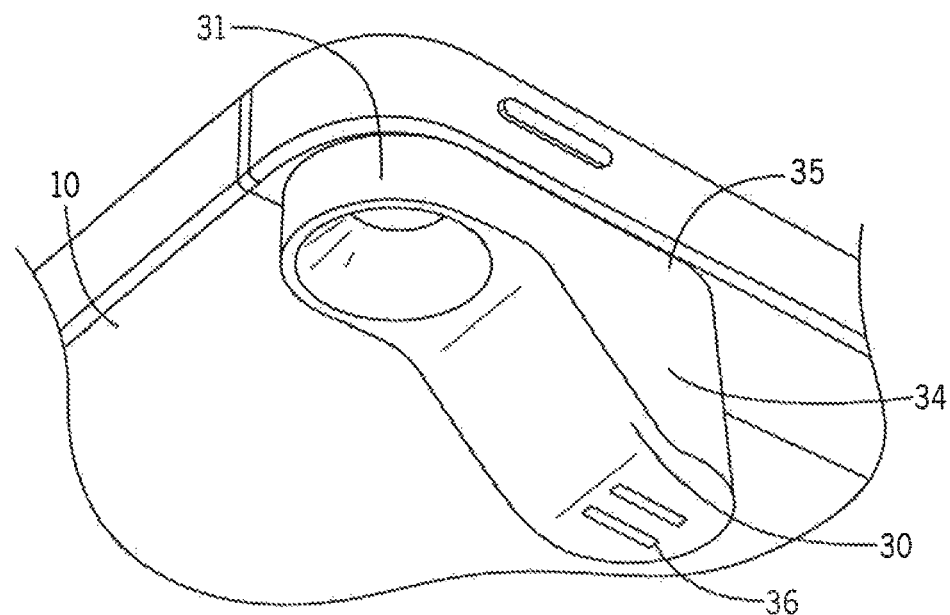
FIG. 9 depicts an alternative embodiment of an aimer accessory.

FIGS. 9 and 10 depict another embodiment of the aimer accessory 30. In this example, the aimer accessory 30 is configured to offset the optical path taken by the light that is emitted by the lamp 9. The offset provides for effectively redirecting light from the lamp 9 some distance from the camera 7. In this example, this is accomplished by using an optical element 32 that includes a light pipe (shown in FIG. 10). Generally, the light pipe includes substantially transmissive material. In this example, the light pipe also includes reflective surfaces that provide for internal reflection within the light pipe.

Figure 11:
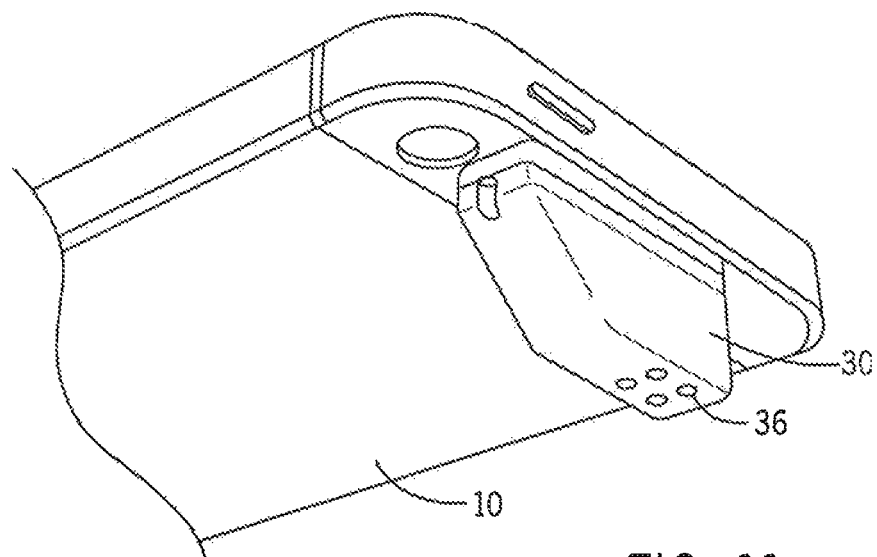
FIG. 11 depicts yet another embodiment of an aimer accessory of this disclosure.
Figure 12:
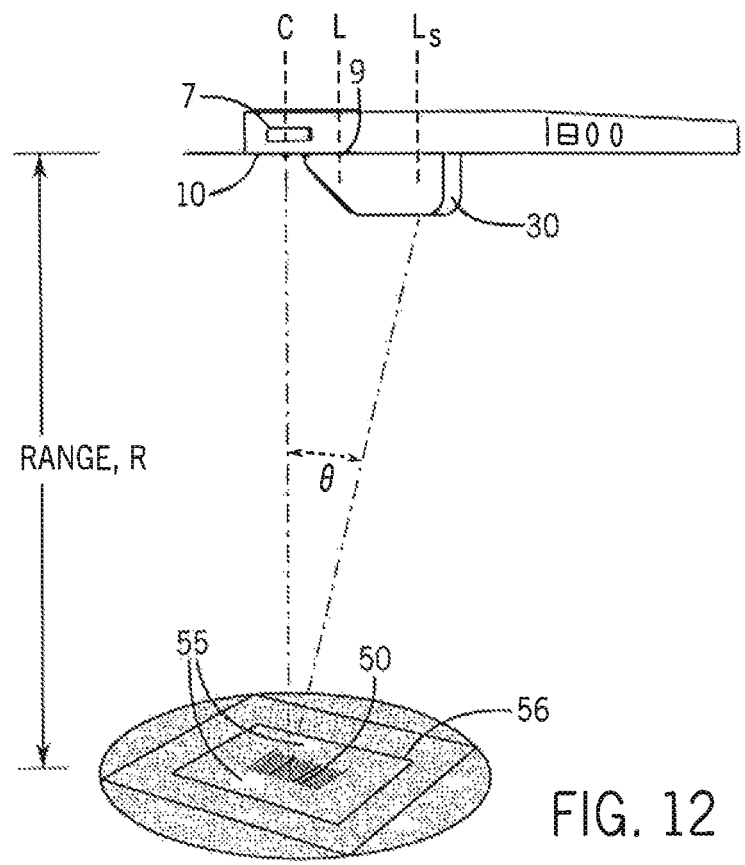
FIG. 12 depicts aspects of light patterns and relationships of the mobile device and aimer accessory of FIG. 11 with a barcode.

FIGS. 11 and 12 provide yet another embodiment of the aimer accessory 30. In this example, the aimer accessory 30 does not include a collector 31. However, this embodiment of the aimer accessory 30 does include an offset of the optical path taken by the light that is emitted by the lamp 9 (FIG. 1). Additionally, this embodiment of the aimer accessory 30 includes a grating 36 having an array of holes arranged in a substantially rectangular pattern.

Referring in particular to FIG. 12, aspects of the offset and the consequence are shown in greater detail. In the mobile device, the camera 7 is aligned with a camera axis, C. The lamp 9 is aligned with a light axis, L. By incorporation of an offset within the aimer accessory 30 as taught by this disclosure, light emitted from the aimer accessory 30 is redirected to a light shifted axis, LS. The resulting offset may be measured as the distance between the light shifted axis, LS, and the light axis, L. Accordingly, the offset angle, Θ, between the camera axis, C and the effective light axis (which is now shifted light axis, LS, instead of the light axis, L) is increased. That is, the effective range, R, is increased. More specifically, a greater distance between the mobile device 10 and the plane where the scan area 56 and the light pattern 55 converge is realized.

Without the teachings of this disclosure, lamp 9 diffuses and emits light across a wide range of angles with respect to light axis, L. With this disclosure, the light from lamp 9 is collimated and redirected to the light shifted axis, LS, to improve the ability of the user to point the smartphone or mobile device's built-in camera at a barcode in order to capture and decode the barcode. Because the light is shifted, there is also less interference between the shifted light and the reflected image that is captured by the camera. This may in some circumstances allow the camera to capture a better quality image than with ambient light. While the effect of the offset is to increase the effective range, R, this increase was found to be negligible and to not significantly alter the advantages obtained by collimating the light and redirecting the collimated light to the light shifted axis, LS. The transformation of diffuse light from lamp 9 into a collimated beam of light according to this disclosure effectively serves to modify the lighting from lamp 9 into a flashlight. Advantageously, this "flashlight" allows for blind and targeted aiming of the mobile device at, and efficient scanning of, a barcode according to the teachings of this disclosure.

Moreover, ambient light may oftentimes be sufficient to allow for the capture of barcode images of a quality sufficient for decoding. An additional feature of this disclosure is that it provides additional lighting to the barcode surface which may improve the contrast of the dark and light barcodes and hence provide for capture of better quality barcode images.

Figure 13A:
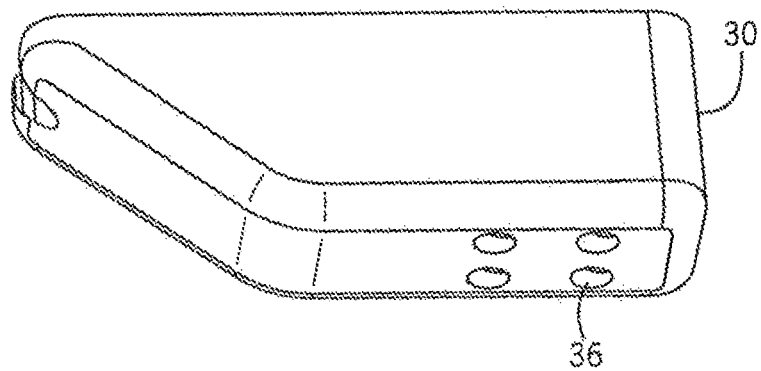
FIGS. 13A through 13C, collectively referred to herein as FIG. 13, are perspective diagrams depicting aspects of the aimer accessory depicted in FIG. 11.
Figure 13B:
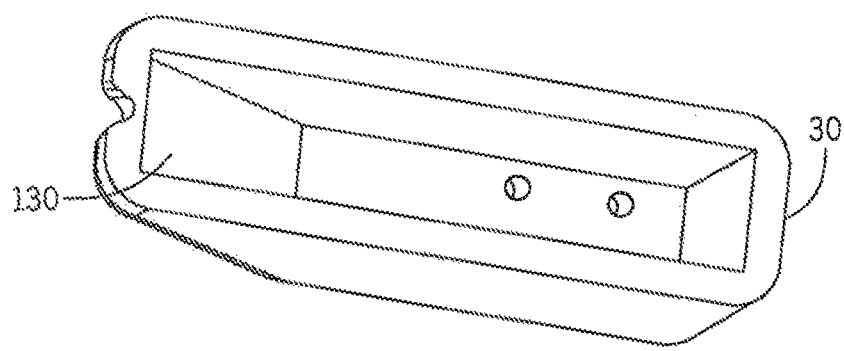
Figure 13C:
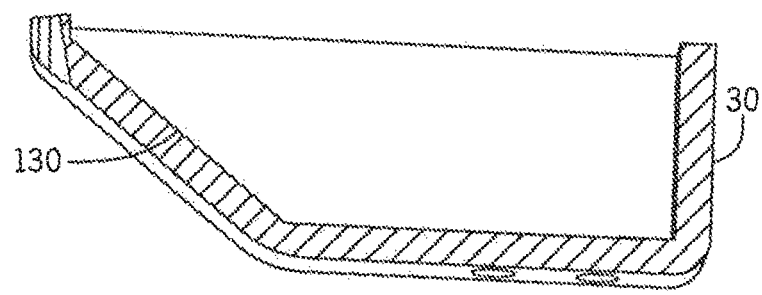

FIG. 13 depicts an embodiment of the aimer accessory 30 that does not include a collector 31 but provides an offset. FIG. 13A is a perspective view. FIG. 13B is a top down view, and shows an interior of the aimer accessory 30; it further shows a reflective surface 130 incorporated therein. At least another reflective surface (not shown) may be included to direct light through the grating 36. FIG. 13C is a cutaway view of the aimer accessory 30. This embodiment of the aimer accessory 30 is referred to as a "simple offset aimer."

Figure 14A:
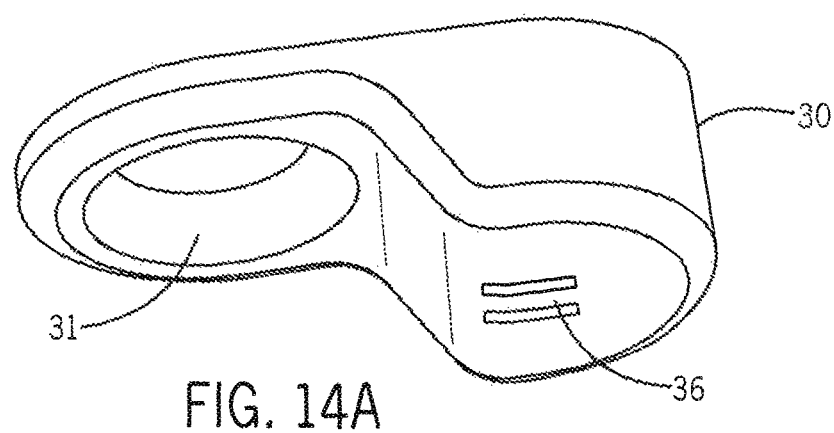
FIGS. 14A through 14C, collectively referred to herein as FIG. 14, are perspective diagrams depicting aspects of the aimer accessory depicted in FIG. 3.
Figure 14B:
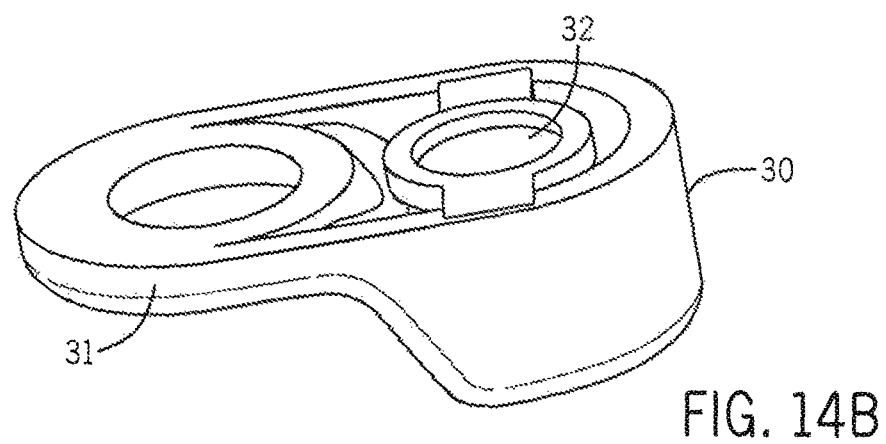
Figure 14C:
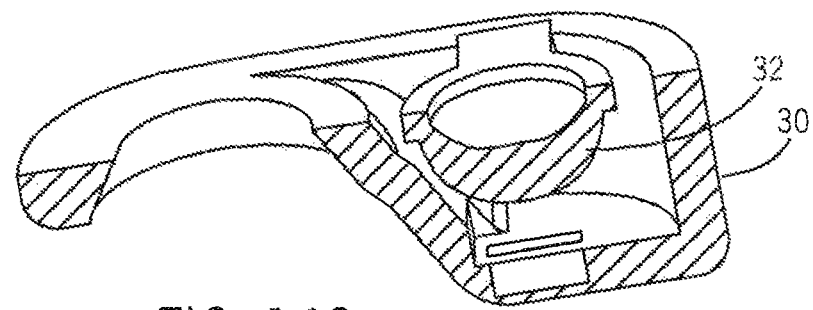

FIG. 14 depicts an embodiment of the aimer accessory 30 that includes the collector 31 and does not have an offset. FIG. 14A is a perspective view; FIG. 14B is a top down view. FIG. 14C is a cutaway view of the aimer accessory 30, and better shows the optical element 32. In this example, the optical element 32 is a lens. This embodiment of the aimer accessory 30 is referred to as a "basic aimer."

Figure 15A:
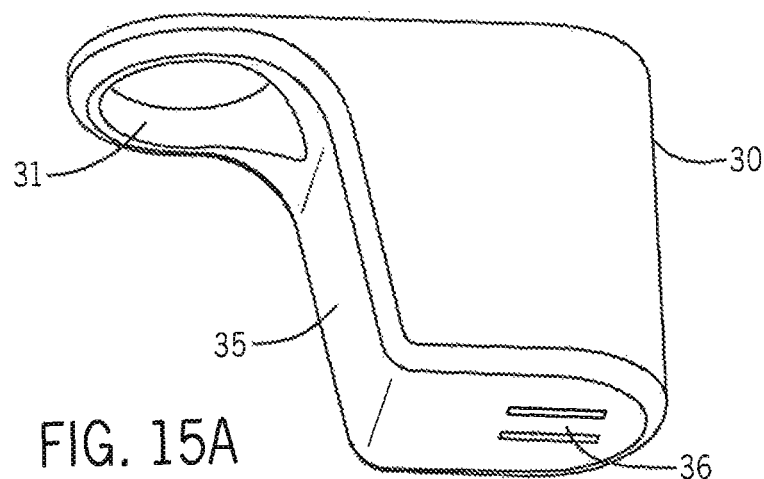
FIGS. 15A through 15C, collectively referred to herein as FIG. 15, are perspective diagrams depicting aspects of another embodiment of the aimer accessory.
Figure 15B:
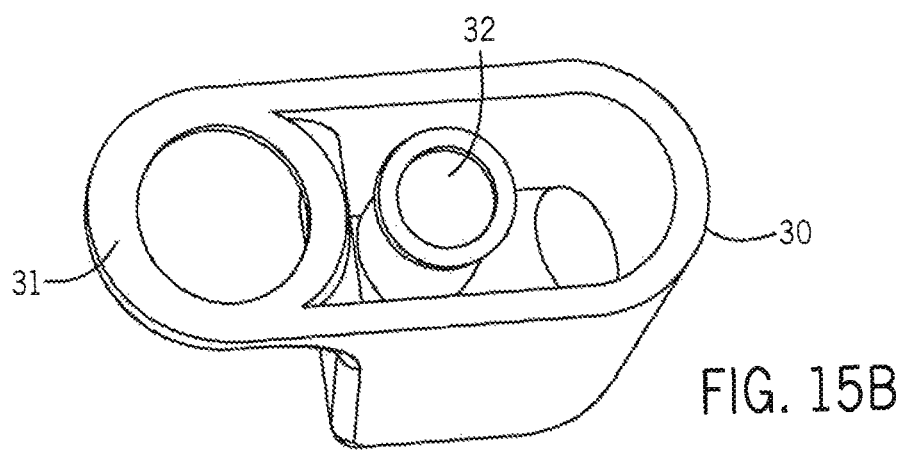
Figure 15C:
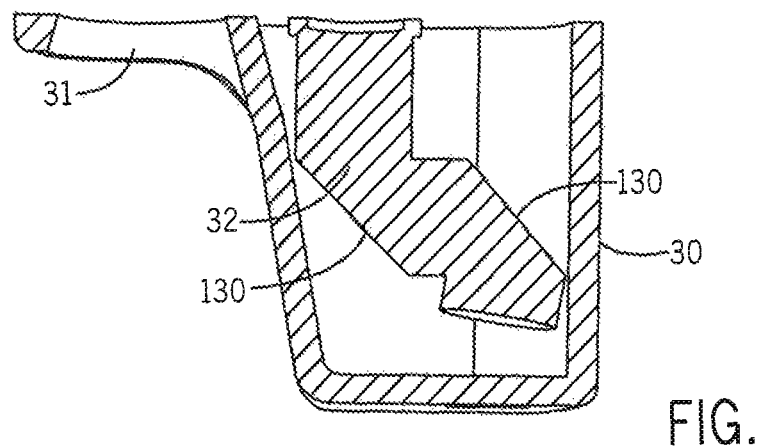

FIG. 15 depicts an embodiment of the aimer accessory 30 that includes the collector 31 and an offset. FIG. 15A is a perspective view; FIG. 15B is a top down view. FIG. 15C is a cutaway view of the aimer accessory 30, and better shows the optical element 32. In this example, the optical element 32 includes a lens disposed within a light pipe. The light pipe is comparatively elongated (with reference to FIG. 16). However, it is not necessary that the light pipe extend completely to the grating 36 in the distal portion 33. This embodiment of the aimer accessory 30 is referred to as an "elongated offset aimer."

Figure 16A:
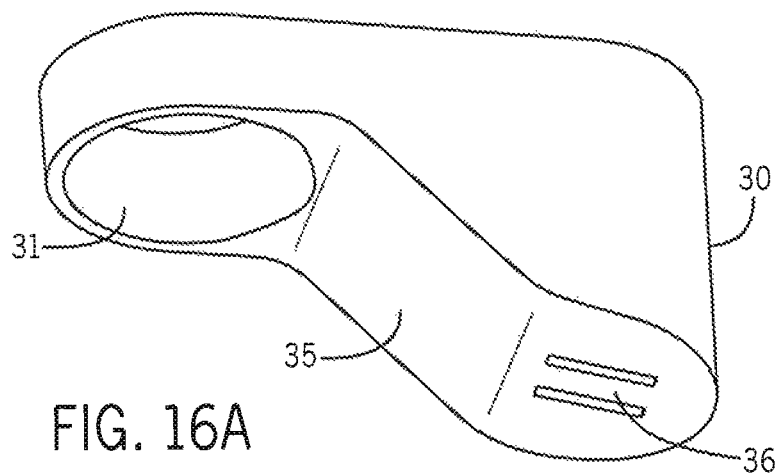
FIGS. 16A through 16C, collectively referred to herein as FIG. 16, are perspective diagrams depicting aspects of the aimer accessory depicted in FIG. 9.
Figure 16B:
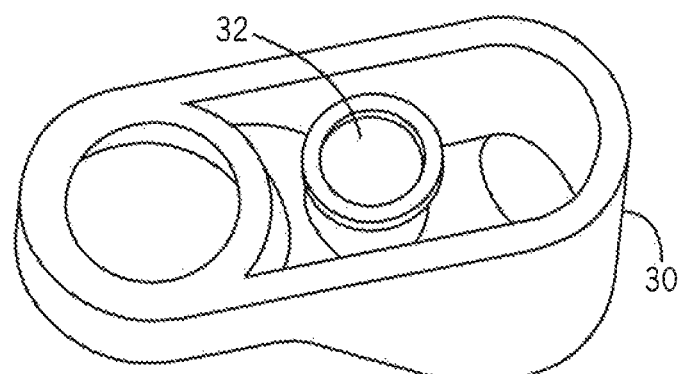
Figure 16C:
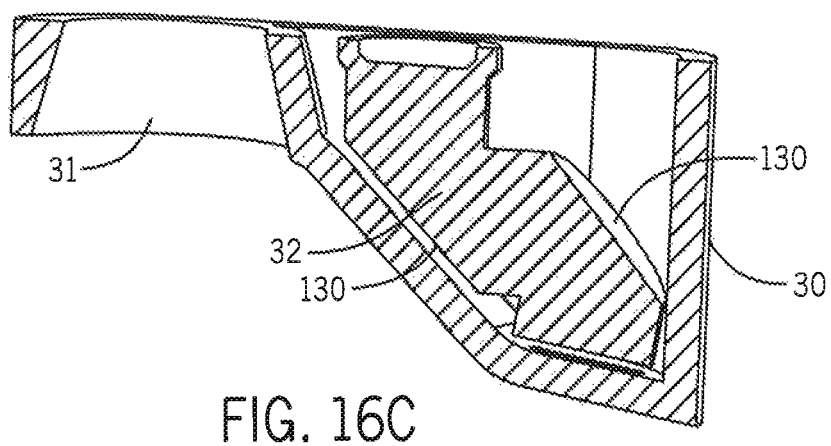

FIG. 16 depicts an embodiment of the aimer accessory 30 that includes the collector 31 and an offset. FIG. 16A is a perspective view; FIG. 16B is a top down view. FIG. 16C is a cutaway view of the aimer accessory 30, and better shows the optical element 32. In this example, the optical element 32 includes a lens disposed within a light pipe. The light pipe is comparatively shortened (with reference to FIG. 15). Accordingly, this embodiment of the aimer accessory 30 is referred to as a "standard offset aimer."

Figure 17A:
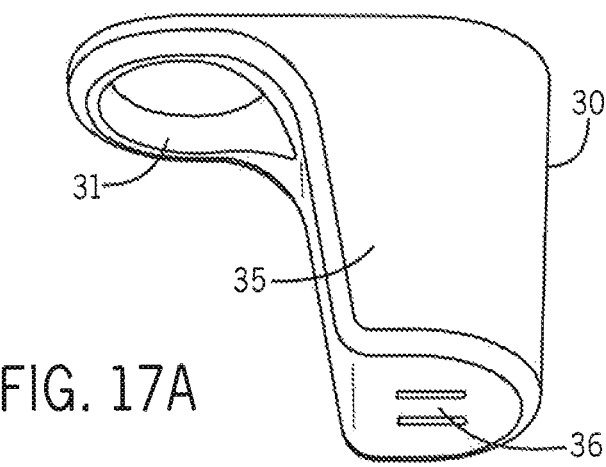
FIGS. 17A through 17C, collectively referred to herein as FIG. 17, are perspective diagrams depicting aspects of another embodiment of the aimer accessory.
Figure 17B:
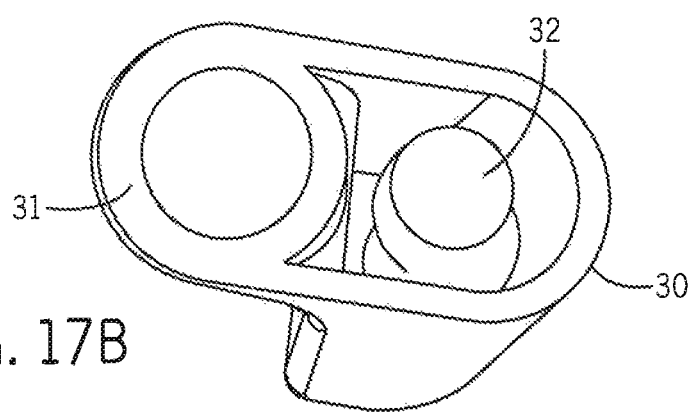
Figure 17C:
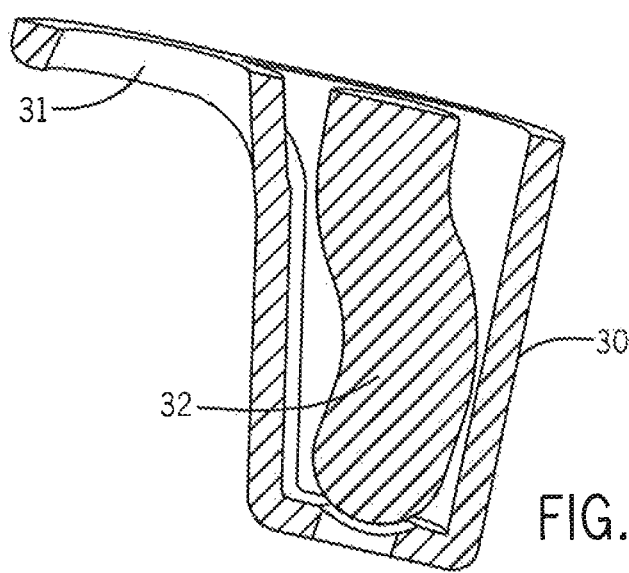

FIG. 17 depicts an embodiment of the aimer accessory 30 that includes the collector 31 and an offset. FIG. 17A is a perspective view; FIG. 17B is a top down view. FIG. 17C is a cutaway view of the aimer accessory 30, and better shows the optical element 32. In this example, the optical element 32 includes a lens disposed within a light pipe. The light pipe is of a continuous tube shape and includes a lens disposed at the distal end. Accordingly, this embodiment of the aimer accessory 30 is referred to as a "tube offset aimer."

Figure 18A:
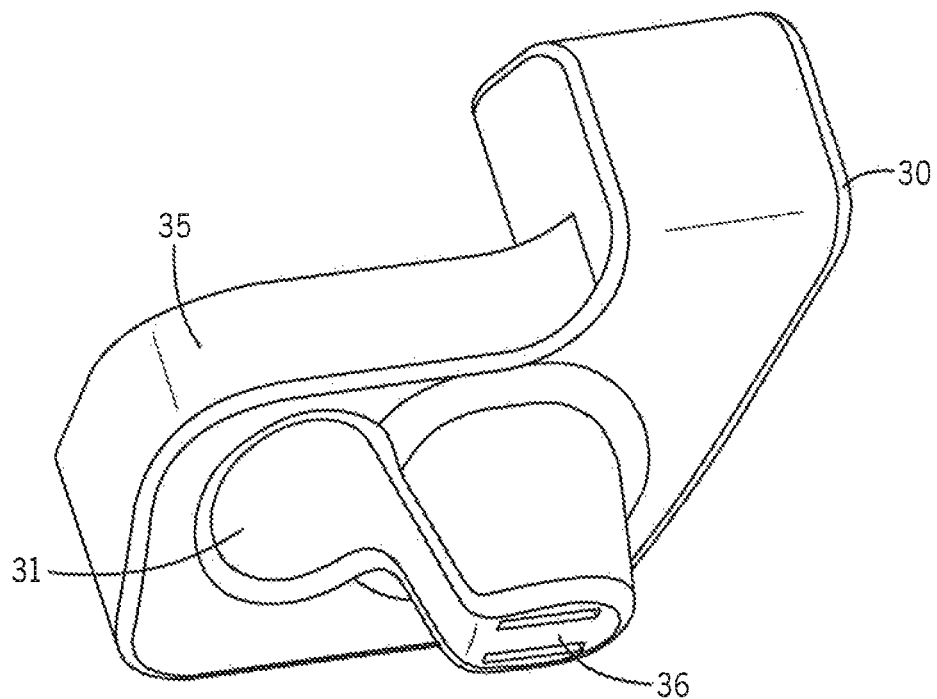
FIGS. 18A through 18B, collectively referred to herein as FIG. 18, are perspective diagrams depicting aspects of another embodiment of the aimer accessory.
Figure 18B:
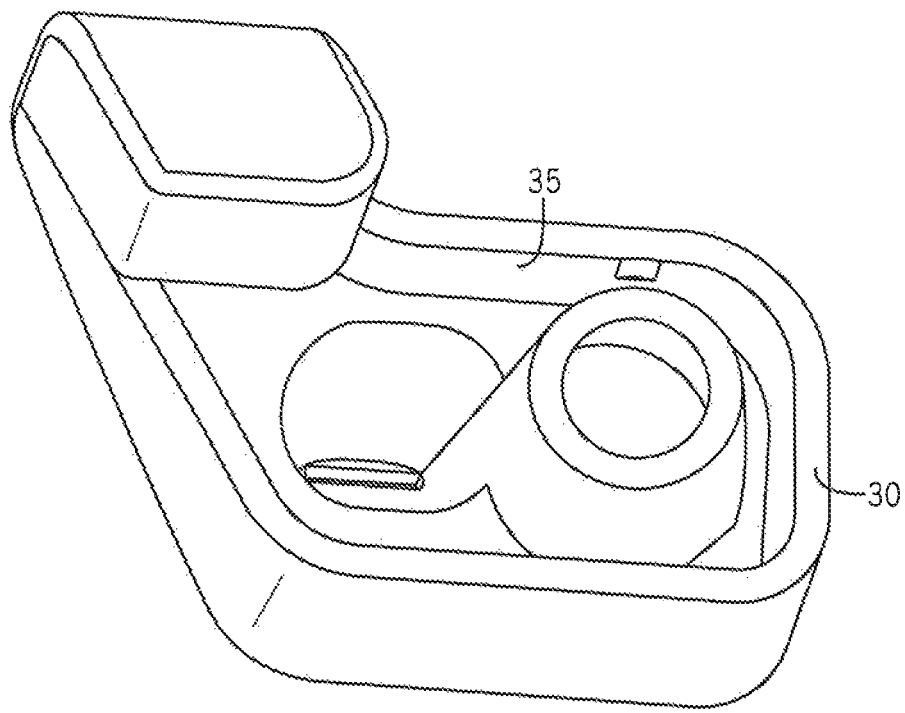

FIG. 18 depicts an embodiment of the aimer accessory 30 that includes the collector 31, with no offset and a substantial body 35. FIG. 18A is a perspective view; FIG. 18B is a top down view. In this example, the body 35 proves form fitting onto the mobile device 10. That is, in this embodiment of the aimer accessory 30, the body 35 has been configured to closely follow a particular configuration of the mobile device 10. Accordingly, this embodiment of the aimer accessory 30 is referred to as a "fitted aimer."

Figure 19:
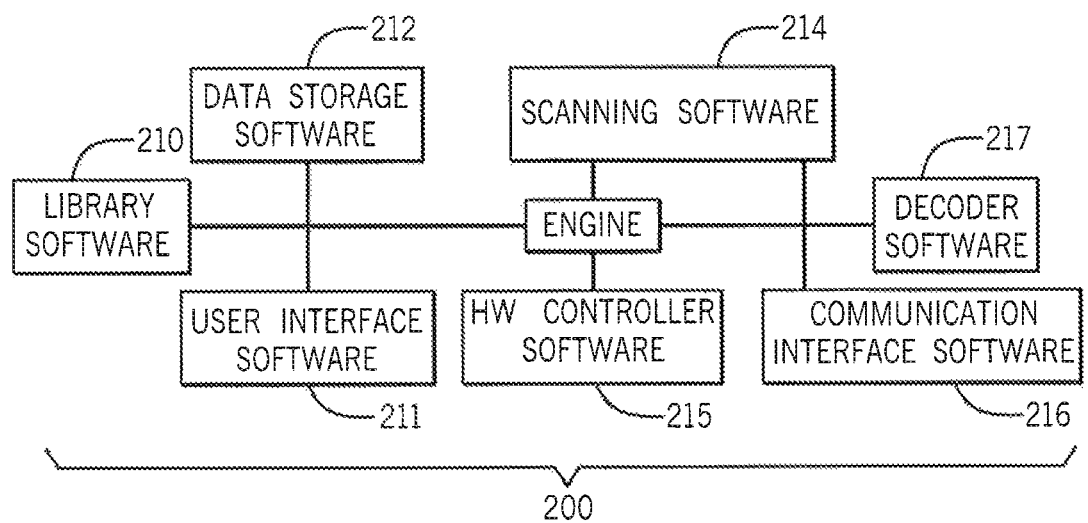
FIG. 19 depicts illustrative components of software useful for reading barcodes with the aimer accessory.

FIG. 19 shows an instance of a barcode reader software 200 for providing some of the functionality herein described. The instance includes an engine 201, a scanning software 214, a decoder software 217, a data storage software 212, a library software 210, a user interface software, a hardware controller software 215, and a communication interface software 216.

The scanning software 214 includes the executable instructions for performing the scanning functions of registration and capturing a barcode image as described in FIG.

6. The scanning software 214 will receive data from the camera 7 and evaluate the received data for presence of a barcode. The evaluation may include identification of the shifted field of view (SFOV) 52, the scan area 56, and searching for presence of the barcode 50 that is in registration with the light pattern 55. When the scanning software 214 has identified the appropriate requirements for data collection, the scanning software 214 will capture the barcode 50.

The decoder software includes the executable instructions for transforming the barcode image data represented by the electrical signals into an encoded ASCII character data string.

The data storage software 212 includes the executable instructions for storing and retrieving captured barcode images and other data in a memory. The library software 210 includes the executable instructions for storing and retrieving information such as symbology type from a library registry within the memory. Additionally, the library registry may also include information regarding a variety of aimer accessories 30. For example, a user may wish to exchange aimer accessories 30 while in the field, like to exchange a tube offset aimer of FIG. 17 for the basic aimer of FIG. 14. Accordingly, the user may remove a first aimer accessory 30 (e.g., the tube offset aimer) from a mobile device 10 and place a second aimer accessory 30 (e.g., the basic aimer) onto the mobile device. When this occurs, the user may communicate the second aimer accessory type to the engine software 201 using the graphical user interface rendered by the user interface software 211. The engine software 201 may then employ the library software 210 to reference data stored in the library registry regarding the second aimer accessory 30 for use in configuring the smartphone and software accordingly. Alternatively, the hardware controller software 215 may detect the attachment of the second aimer accessory 30 and prompt the engine software 201 to cause the user interface software 211 to render on the display a selection of settings for aimer accessories useable with the smartphone. In the specific example, the settings would include the settings for the tube offset aimer and the settings for the basic aimer. On user selection of the setting for the basic aimer, the scanning software 214 will then adjust scanning functions accordingly.

In another embodiment, the instance of a barcode reader software 200 may recognize a specific aimer module shape and if recognized for a specific timeframe while hovering over a specific barcode for a programmed amount of time (~500 msec or 1 sec), then this triggers a barcode scan and initiates a decode of the barcode data.

The user interface software includes the executable instructions for displaying a graphical user interface on the display for configuring the instance of the barcode reader software 200 and for rendering images, such as an image of the barcode on the display of the smartphone. For example, user interface software 211 may generate text, alert information, auditory signals, alarms, warnings, pictures, graphics, or other types of output. In some embodiments, output of the interface software 211 may be used to invoke other functions. For example, output of the interface software 211 may be sent via communication interface software 216 to a printer, or it may be sent to a smartphone to initiate a phone call, or sent to any computing device to perform some other function.

The hardware controller software 215 includes the executable instructions for controlling the hardware of the smartphone such as controlling the camera lens to bring a barcode image into focus, energizing the lamp, controlling the display to render images, controlling the speaker of the smart phone to prompt a user, and so on.

The communication interface function 216 includes the executable instructions for communicating data to or from a remote device. The communicating to a remote device may include conducting a query of a remote source, such as a database, for more comprehensive information. The query may be received by the communication interface function 216 from the user through the user interface software 211. Similarly, a remote user may communicate information over the communication interface 216 to the smartphone. Thus, for example, a smartphone may be remotely programmed with software updates and updates to the database, such as the table of symbologies. Programming may occur over-the-air. Alternatively, the smart phone may be tethered to a remote device via a communication cable to provide such remote programming or bi-directional communication between the smart phone and the remote device. The remote device may be a computing device, for example, another smart phone, a desktop computer, or server, including a cloud server, capable of communicating with the smart phone that is operating according this disclosure.

The engine 201 includes the executable instructions that coordinate the operation of the foregoing and other programs on the smartphone.

The software 200 described in connection with FIG. 19 may be provided to a mobile device by a specialized application. For example, a mobile application including the foregoing functionalities for performing this disclosure is typically downloaded to a smartphone, but also may be preloaded. Alternatively, the software may be functionality embedded inside the operating system.

By virtue of the registration process of the light pattern 55 of this disclosure with a barcode 50 on a target as explained in this disclosure, an appropriately equipped mobile device 10 is capable of automatic scanning and reading of barcodes. That is, the mobile device 10 that is so equipped does not require human intervention to carefully focus the camera through the display 5. The user need not look through the view finder projected on the display to focus the image to be captured by the mobile device. Instead, in blind mode blind mode operation and target mode blind mode operation, the user need only point the collimated light that is generated according to this disclosure at the barcode. Accordingly, the teachings herein provide for enablement of "blind" and "targeted" blind mode scanning. That is, the blind or targeted scanning according to this disclosure permits a user to read a barcode without viewing and focusing of the device camera through use of the display 5 (shown in FIG. 1). More specifically, the user only needs to "aim" or "point" the mobile device using the aimer module at the barcode and the mobile device will read the barcode. Of course, this disclosure also provides for blind mode targeted mode and targeted mode targeted mode where the display of the smartphone is used by the user to assist in lining up the pattern of light with the barcode image as taught by this disclosure. In addition, this disclosure also provides for a scanning operation performed in display mode where the aimer module of this disclosure is not used in the scanning operation; rather, diffuse lighting from the conventional smartphone is used to illuminate a barcode in order to capture the barcode image using conventional scanning techniques.

In some embodiments, the software 22 of the code reader 200 depicted in FIG. 19 may be developed on a remote computer, such as a personal computer. The software 22 may then be downloaded to the mobile device.

Figure 20A:
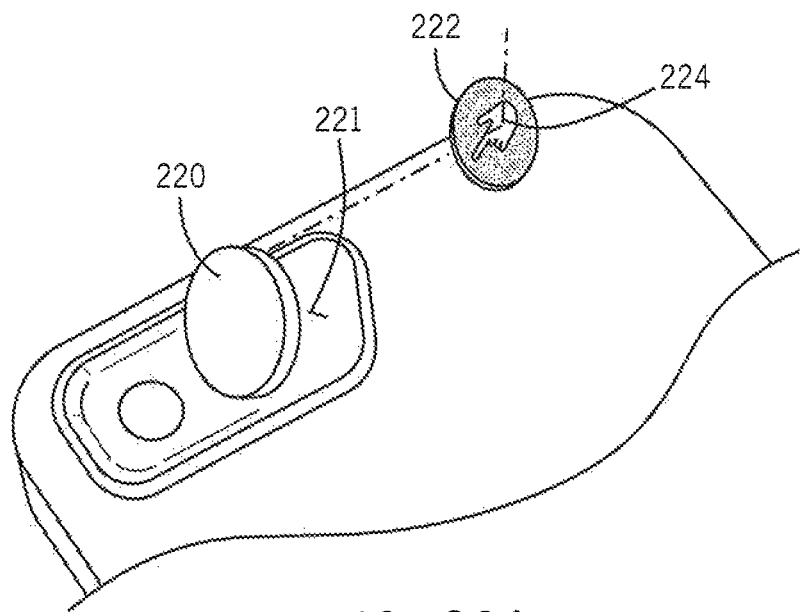
FIGS. 20A, 20B, and 20C, collectively referred to herein as FIG. 20, are perspective drawings of alternative embodiments of this disclosure indicating possible shapes for the light source.
Figure 20B:
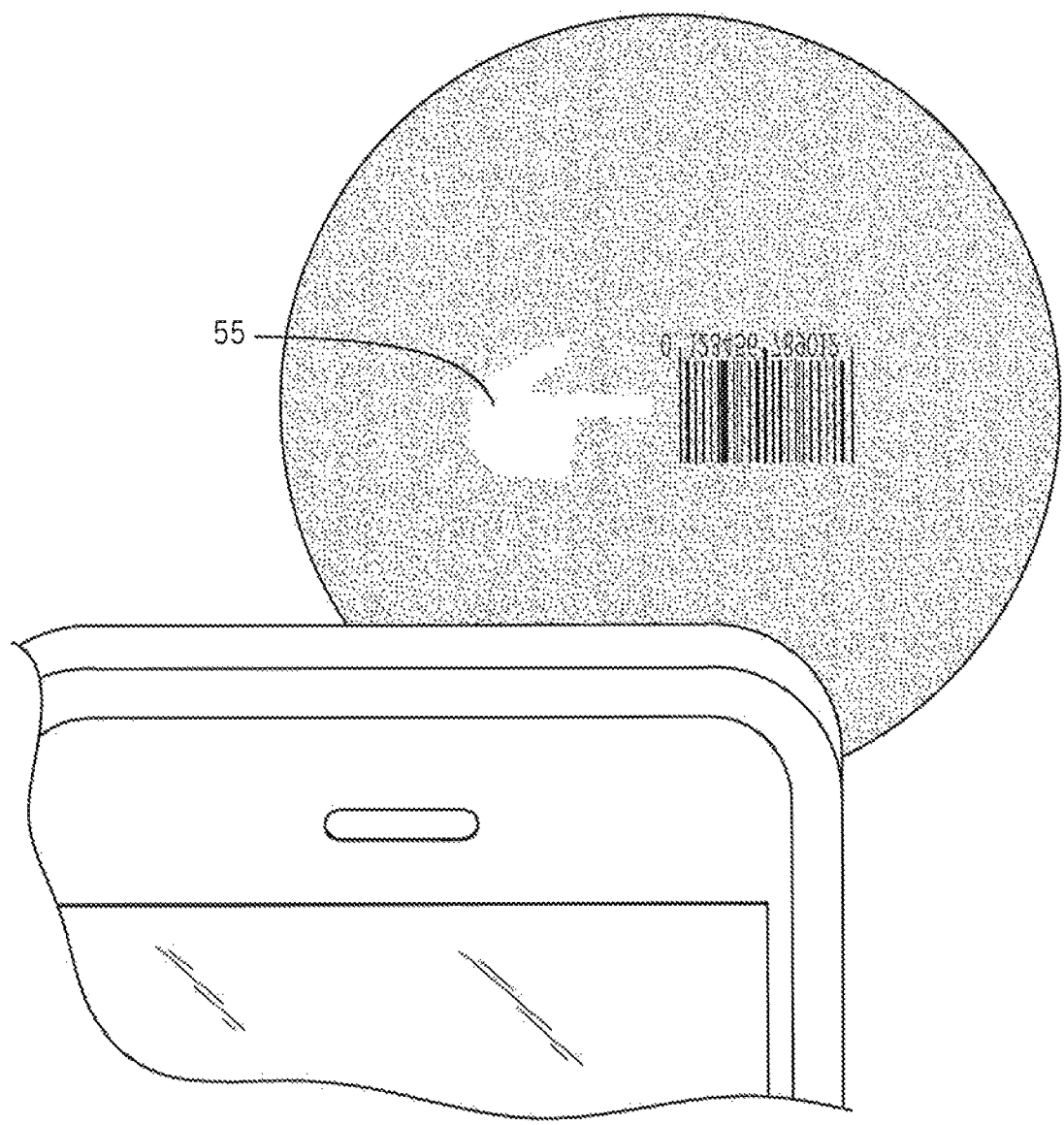
Figure 20C:
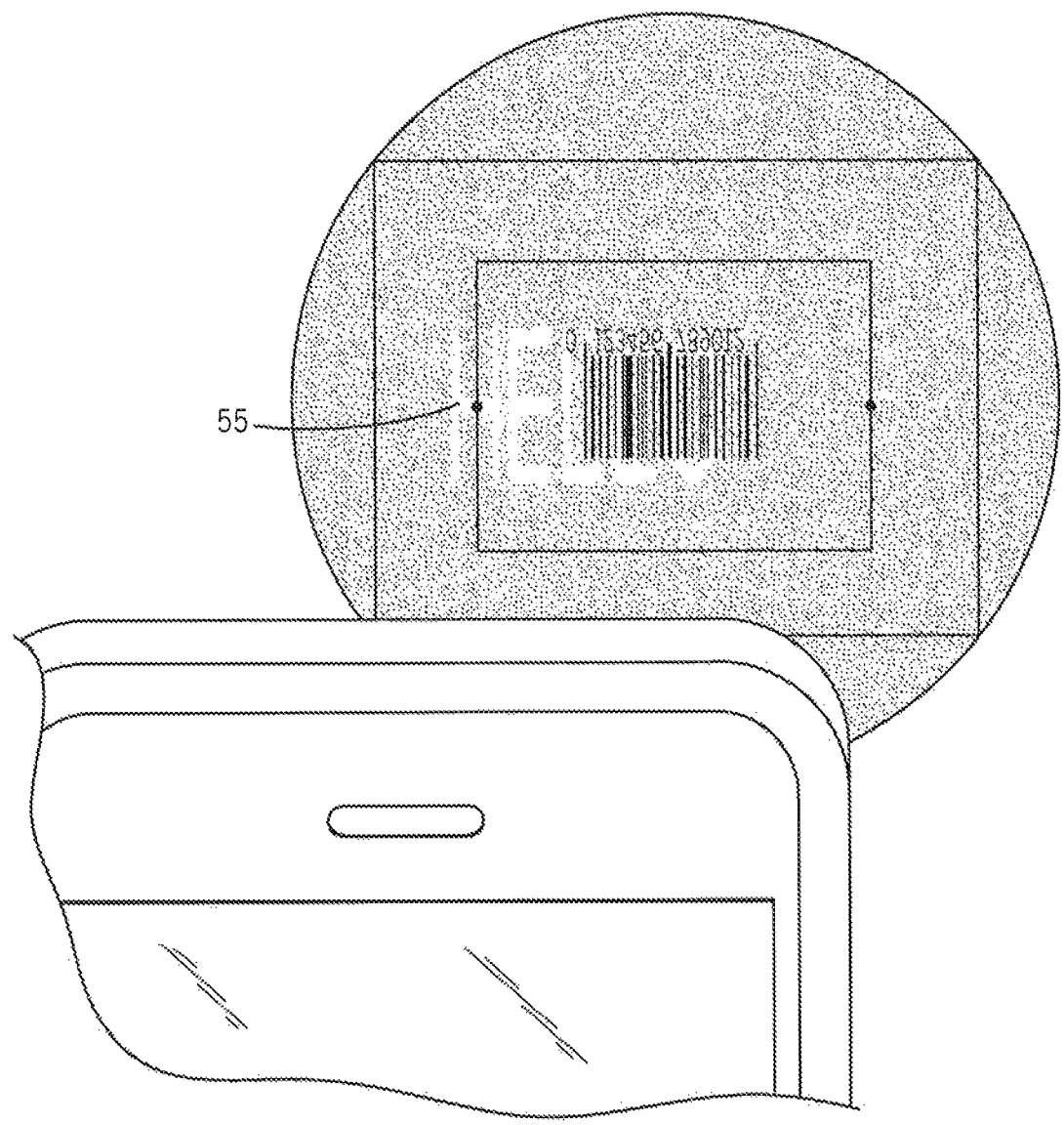

FIG. 20A is a perspective drawing of yet another alternative embodiment of this disclosure. In this embodiment, a pair of mirrors 220, 222 are used to redirect light away from the axis of the optical path of light emitted from lamp 221 and to a target. In particular, mirror 220 changes the direction of the optical path of light emitted from lamp 221 from light axis, L to a first light shifted axis, LS and directed to mirror 222. Mirror 222 redirects the reflected beam of light to a second light shifted axis, LS to the target. In this example, the reflective surface of mirror 222 is in the shape of a hand pointing a finger so that the beam of light reflected from mirror 222 to the target includes this image. FIG. 20B depicts the illumination of the barcode target with the image contained in the pattern of light 55, namely collimated light in the shape of a hand pointing a finger. A user may line up the finger of collimated light to an edge of the barcode whereupon the barcode may be captured and processed as explained above. FIG. 20C shows an alternative embodiment of FIG. 20A wherein the reflective surface of mirror 222 is in the shape of the reversed spelling of the word "HELLO" (spelled "OLLEH").

FIG. 21 depicts illustrative embodiments of light pipes that may be used with the aimer accessory 30. Each light pipe redirects the optical path of light from light axis, L to a light shifted axis, LS as shown wherein the barcode is easily captured and processed.

Figure 22:
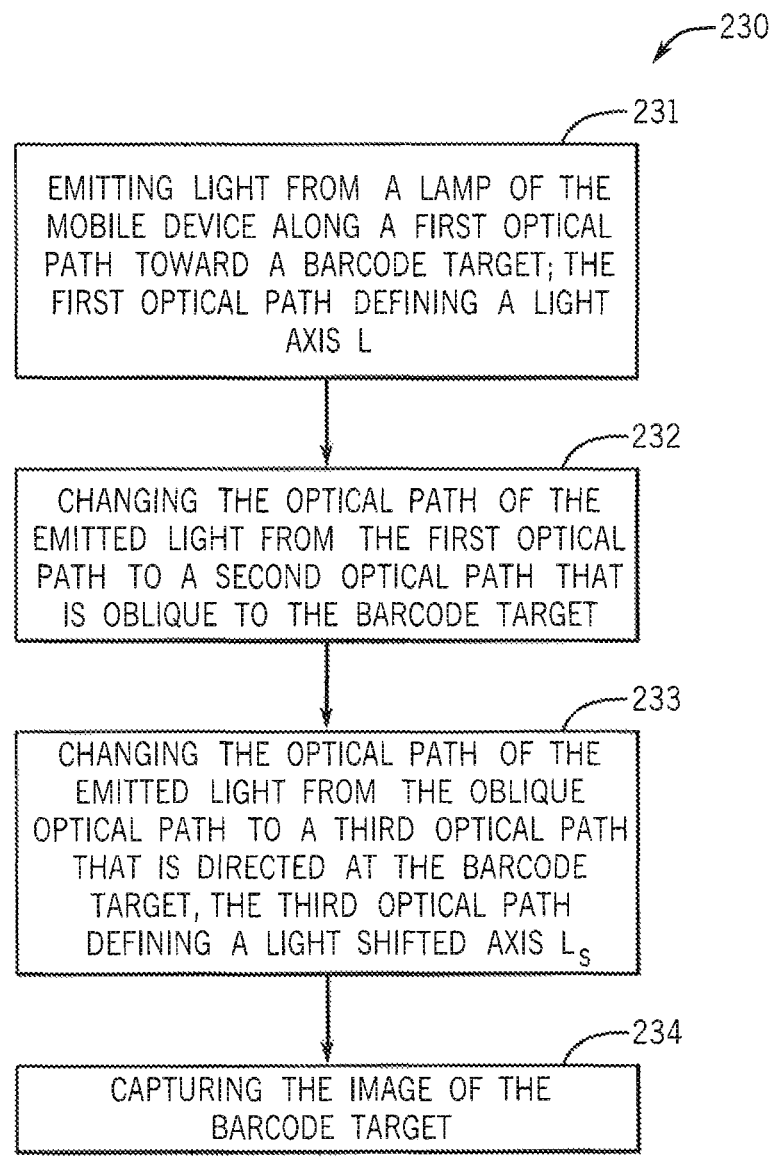
FIG. 22 depicts an illustrative method according to this disclosure for adjusting the decoding position of the software decoder to align with the shape and usage of the light pattern.
Figure 23:
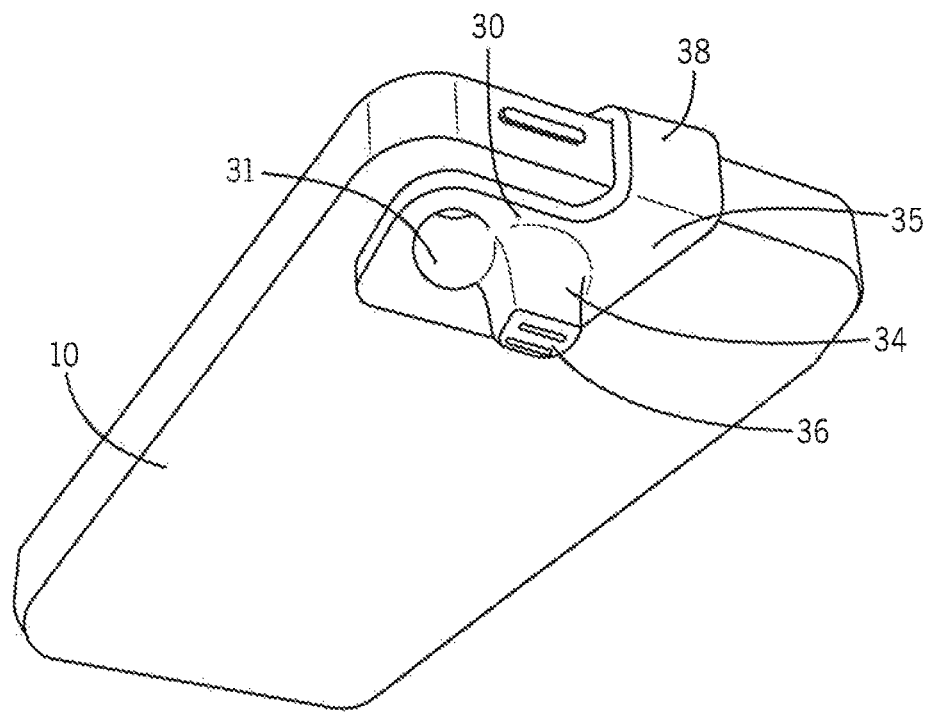
FIGS. 23 through 26 depict perspective drawings of an illustrative aimer accessory according to this disclosure.
Figure 24:
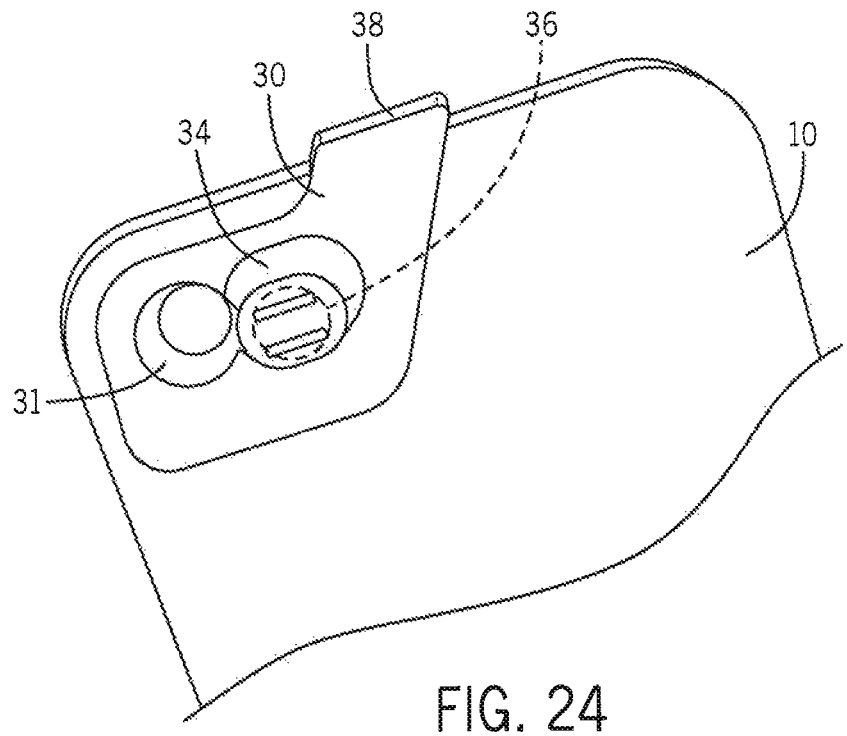
Figure 25:
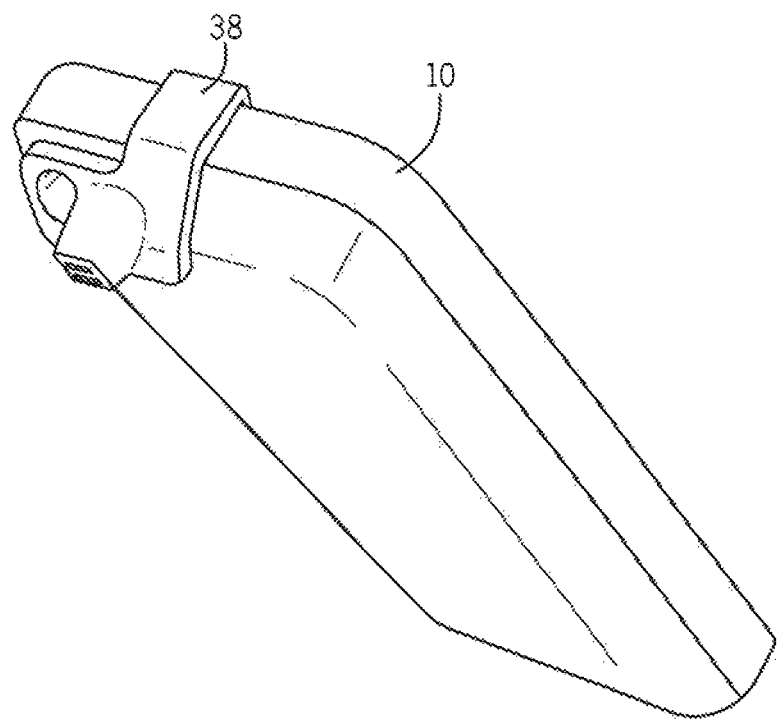
Figure 26:
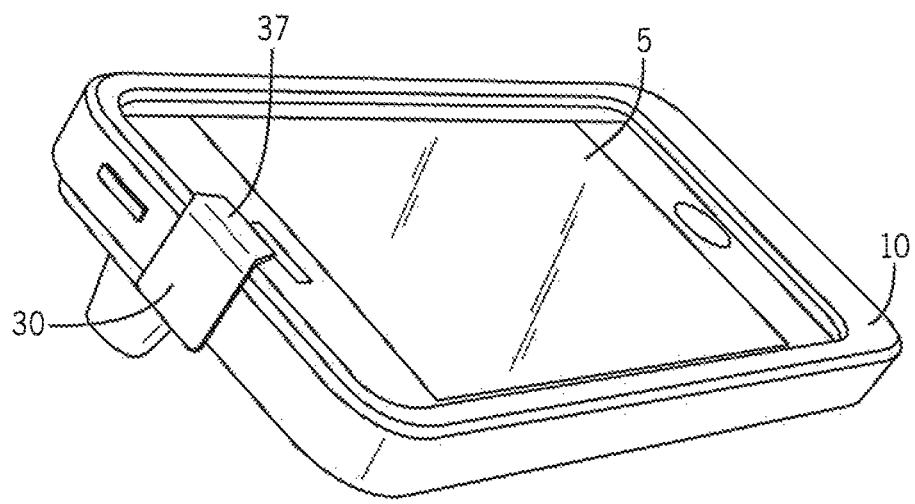

FIG. 22 depicts an illustrative method for aimer scanning 230 (e.g., blind mode blind mode operation, blind mode targeted mode operation, targeted mode blind mode operation, and targeted mode targeted mode operation). According to the method, light is emitted 231 from a lamp of the mobile device along a first optical path toward a barcode target. The first optical path defines a light axis, L. The optical path of the emitted light is then changed 232 from the light axis, L, to a second optical path that is oblique to the barcode target. The optical path of the emitted light is then changed again 233 from the oblique optical path to a third optical path that is directed at the barcode target. The third optical path defines a light shifted axis, LS. Finally, the image of the barcode target is captured 234 by the mobile device.

Referring now to FIGS. 23 through 26, aspects of an additional embodiment of the aimer accessory 30 are shown. In the example shown, the aimer accessory 30 includes a retainer 38. Generally, the retainer 38 provides for coupling of the aimer module body onto the mobile device 10 or to an external protective case surrounding mobile device 10. In the example shown, the retainer 38 includes an arm that extends upward and over the top of the mobile device 10 and terminates with a clip 37 (see FIG. 26) on the front of the mobile device 10. Accordingly, by cooperation of the retainer 38 with the clip 37 and the opposing body 35, this embodiment of the aimer accessory 30 may be effectively clipped onto the mobile device 10. Accordingly, this embodiment of the aimer 30 is referred to as a "clip-on aimer."

In various embodiments, the retainer 38 provides a clamping force to the mobile device 10 or to an external protective case surrounding mobile device 10. In some embodiments, the clamping force is realized by having opposing retainers 38. Opposing retainers 38 may be realized by having one retainer configured for retention on a left side of the mobile device 10 or protective case with the opposing retainer 38 configured for retention on a right side of the mobile device 10 or protective case (not shown). In some embodiments, the retainer 38 includes the detents, nipples, ridges or other features as may be known in the art to assist with retention and registration or alignment with mobile device 10.

In some embodiments, such as the one shown in FIGS. 23 through 26, the clip-on aimer is further stabilized by having portions that conform to the shape of the mobile device 10 or protective case for mobile device 10. For example, the clip-on aimer includes a deep-well collector 31 that conforms to the shape of the mobile device 10 or to the protective case surrounding mobile device 10. Additionally in this embodiment, the clip-on aimer includes a body 35 to conform to curved surfaces of the mobile device 10.

Figure 27:
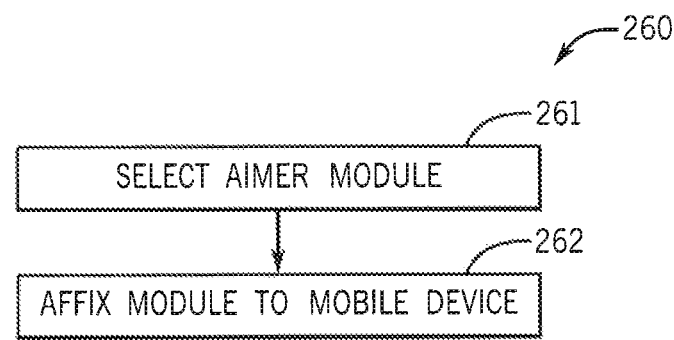
FIG. 27 depicts an illustrative method for retrofit of a mobile device with the aimer accessory of this disclosure.
Figure 28:
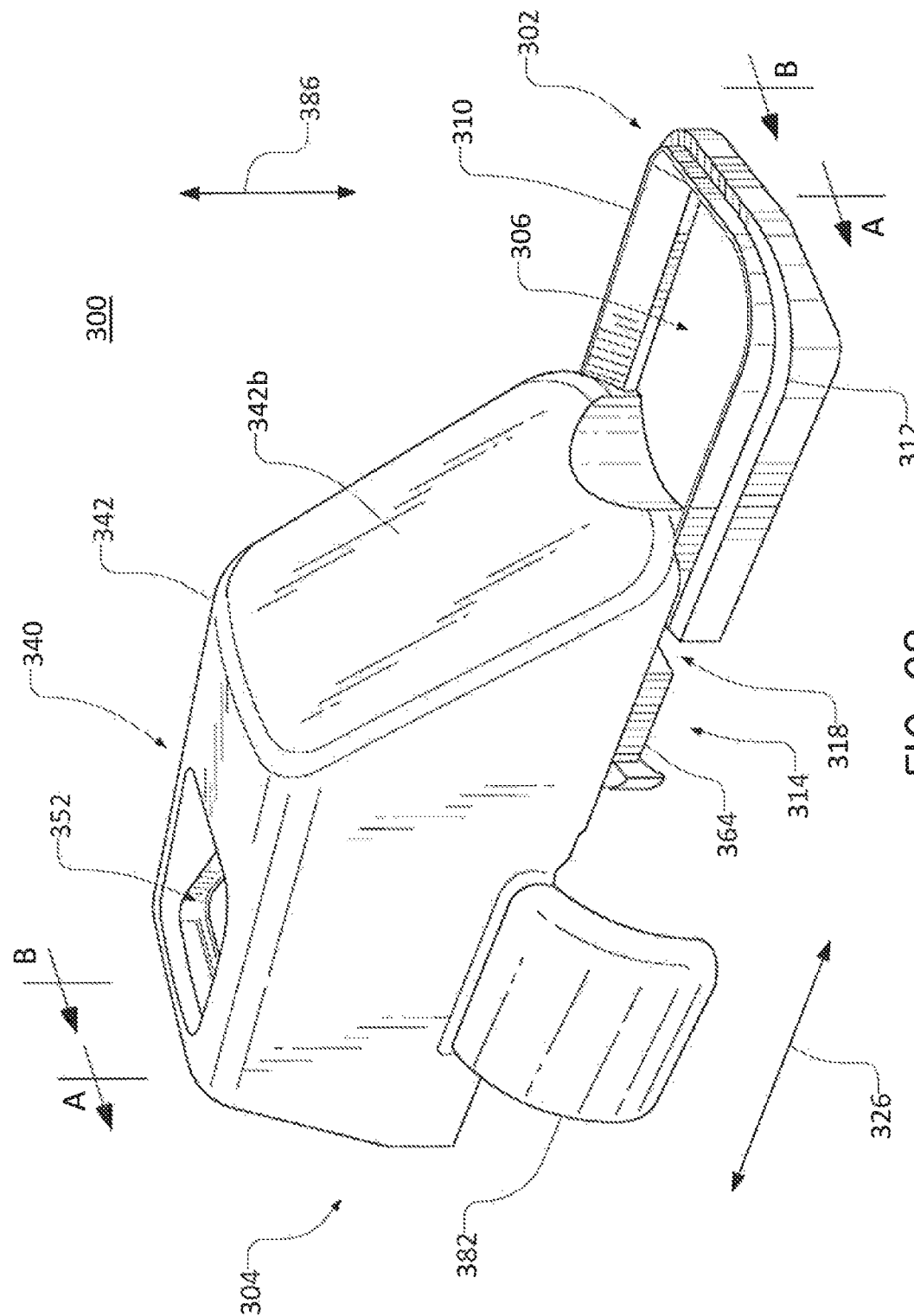
FIG. 28 is a top, left, rear perspective view of an attachment assembly for an aimer accessory according to this disclosure.

FIG. 27 depicts an illustrative method for retrofit of a mobile device with the aimer accessory of this disclosure. The method for modification of the mobile device 260 includes selecting an aimer accessory 261. The aimer accessory selected may include any one of the aimer accessories as discussed herein, a combination thereof, or an aimer accessory that includes other features than those disclosed herein. After completing the selection of the aimer accessory 261, the user performs affixing of the aimer accessory 262. Affixing of the aimer accessory 262 generally calls for one of temporarily affixing or permanently affixing the aimer accessory to the mobile device 10 or to the protective case surrounding mobile device 10.

An aimer accessory according to this disclosure can be secured to a mobile device, or a case for a mobile device, in various ways. In some embodiments, an aimer accessory (e.g., the aimer accessory 30) can be secured directly to a mobile device or to a case using adhesives, adhesive strips (e.g., double-sided tapes), magnetic devices, fasteners (e.g., screws), and so on. In some embodiments, a clip-like tab such as the retainer 38 (see, e.g., FIGS. 25 and 26) can be used to physically engage a mobile device or case in order to secure the aimer accessory in place.

In some embodiments, an aimer accessory can be formed from an attachment base and an attachment body that are configured to be removably secured together. With this type of arrangement, the attachment base can be secured to a mobile device or case (e.g., using adhesives, adhesive strips, magnetic devices, fasteners, and so on) independently of the attachment body. The attachment body, which can be configured to include an optical device such as a light pipe or arrangement of mirrors, can then be secured to the attachment base for use with the mobile device. This can be useful, for example, in order to allow for reliable and repeatable orientation of the attachment body—and the included optical device—relative to a camera or light source of the mobile device, without necessarily requiring a permanent engagement between the attachment body and the mobile device or case.

Specific examples of this type of arrangement are discussed below in the context of direct attachment to a mobile device and in the context of attachment to a mobile device via attachment to a case for the mobile device. It will be understood, however, that other arrangements are possible and that the principles discussed below (e.g., securing an attachment body with an optical element to a mobile device or case via attachment of the attachment body to an attachment base) can be applied to other embodiments, including various embodiments discussed above (e.g., the various arrangements of the aimer accessory 30 illustrated in FIGS. 3A, 3B, 9-18B, and 23-26). Likewise, aspects of the example arrangements of the aimer accessory 30 discussed above can be implemented with the aimer accessories discussed below, including as substitutes for aspects of the aimer accessories discussed below (e.g., substitution of a light pipe as discussed above for a mirror arrangement as discussed below), or as supplementary aspects of the aimer accessories below.

An aimer accessory 300 for a mobile device is illustrated in FIGS. 28-33. Generally, the aimer accessory 300 includes an attachment base 302 configured for attachment to a mobile device or to a case for the mobile device (not shown in FIGS. 28-33). The aimer accessory 300 also generally includes an attachment body 304 that is configured to be removably secured to the attachment base 302 and can include one or more optical devices (e.g., mirror arrangements or light pipes). In this way, for example, when the attachment base 302 is secured to a mobile device or a case, the attachment body 304 can be temporarily disposed for use with a camera of the mobile device by securing the attachment body 304 to the attachment base 302.

Figure 29:
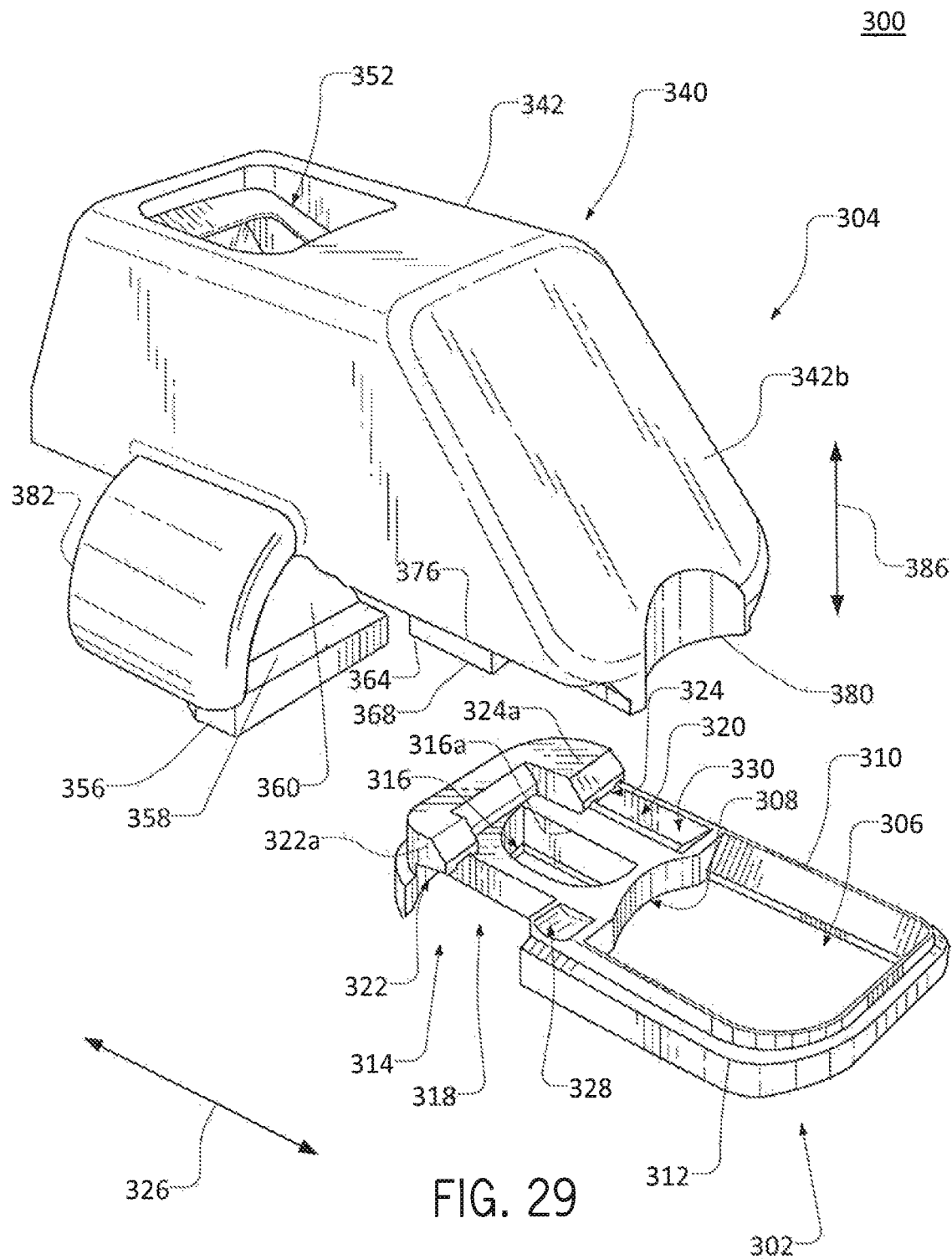
FIG. 29 is an exploded, top, left, rear perspective view of the attachment assembly of FIG. 28.
Figure 30:
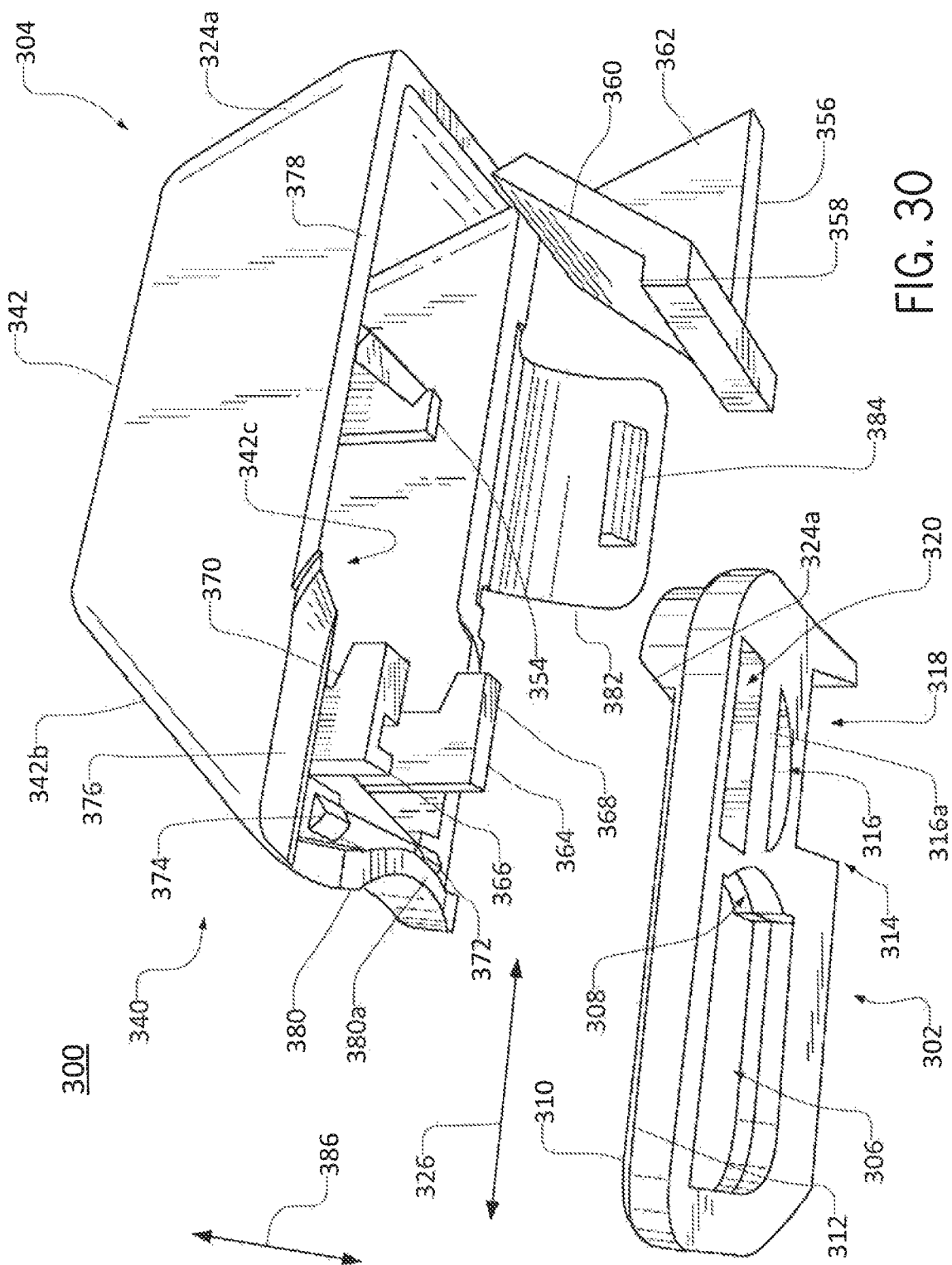
FIG. 30 is an exploded, bottom, left, front perspective view of the attachment assembly of FIG. 28.

In the embodiment illustrated, the attachment base 302 is formed as a single-piece body that includes a relatively large camera opening 306 configured for alignment with a camera of a mobile device (not shown in FIGS. 28-33). The camera opening 306 is generally rectangular, but also includes a rounded indent 308 at one end. A raised lip 310 partly surrounds the camera opening 306 and is in turn partly surrounded by a shoulder 312. As illustrated in FIGS. 29 and 30 in particular, the shoulder 312 further extends around most of the perimeter of the attachment base 302, interrupted by a side opening 314 on the attachment base 302.

The attachment base 302 also includes a light-source opening 316. Generally, the light-source opening 316 is disposed relative to the camera opening 306 so that when the camera opening 306 is aligned with a camera or camera lens of a mobile device, the light-source opening 316 is also appropriately aligned with a light source of the mobile device (e.g., a light source such as the optical element 32 illustrated in FIG. 3B). In the embodiment illustrated, the light-source opening 316 is generally adjacent to the camera opening 306, although other configurations are possible.

In some embodiments, a light-source opening on an attachment base can be shaped to partly mask a light source on a mobile device. This can be useful, for example, if a light source on a mobile device is expected to be overly bright, or if a light source on a mobile device includes multiple light-emitting elements (e.g., LEDs), some of which it may be desirable to mask. In the embodiment illustrated, the light-source opening 316 is configured as a generally semi-circular or semi-ovular opening with one wall 316a of the light-source opening 316 configured as a solid blocking feature. This can be useful, for example, for use with light sources that include a white-light LED and a yellow-light LED, in order to block light from the yellow-light LED while allowing light from the white-light LED to pass through the attachment base 302 into the attachment body 304.

The attachment base 302 can also generally include structures to assist in removably securing the attachment body 304 to the attachment base 302. In the embodiment illustrated, for example, the attachment base 302 includes a set of attachment openings 318 and 320, each of which includes a respective overhang 322 and 324 formed by partially angled features 322a and 324a on an upper portion the attachment base 302. In the embodiment illustrated, the ends of the attachment openings 318 and 320 are offset from each other along a length direction 326, as are the ends of the overhangs 322 and 324 and the features 322a and 324a. In other embodiments, however, other configurations are possible.

Each of the attachment openings 318 and 320 is also generally adjacent to a respective indent 328 and 330, which are disposed on an opposite side of the respective attachment openings 318 and 320 from the respective overhangs 322 and 324. In the embodiment illustrated, the indent 328 is configured as a rounded indent spaced apart from the attachment opening 318 and the indent 330 is configured as a rounded indent extending into an edge of the attachment opening 320. In other embodiments, however, other configurations are possible.

Still referring to FIGS. 28-33, the attachment body 304, which is generally configured for removable attachment to the attachment base 302, includes a housing portion 340 generally formed as a single-piece shell 342 that is configured to enclose and support part or all of an optical device. For example, the shell 342 can be configured to enclose and support a mirror assembly or a light pipe for use with a light source on a relevant mobile device.

Figure 31:
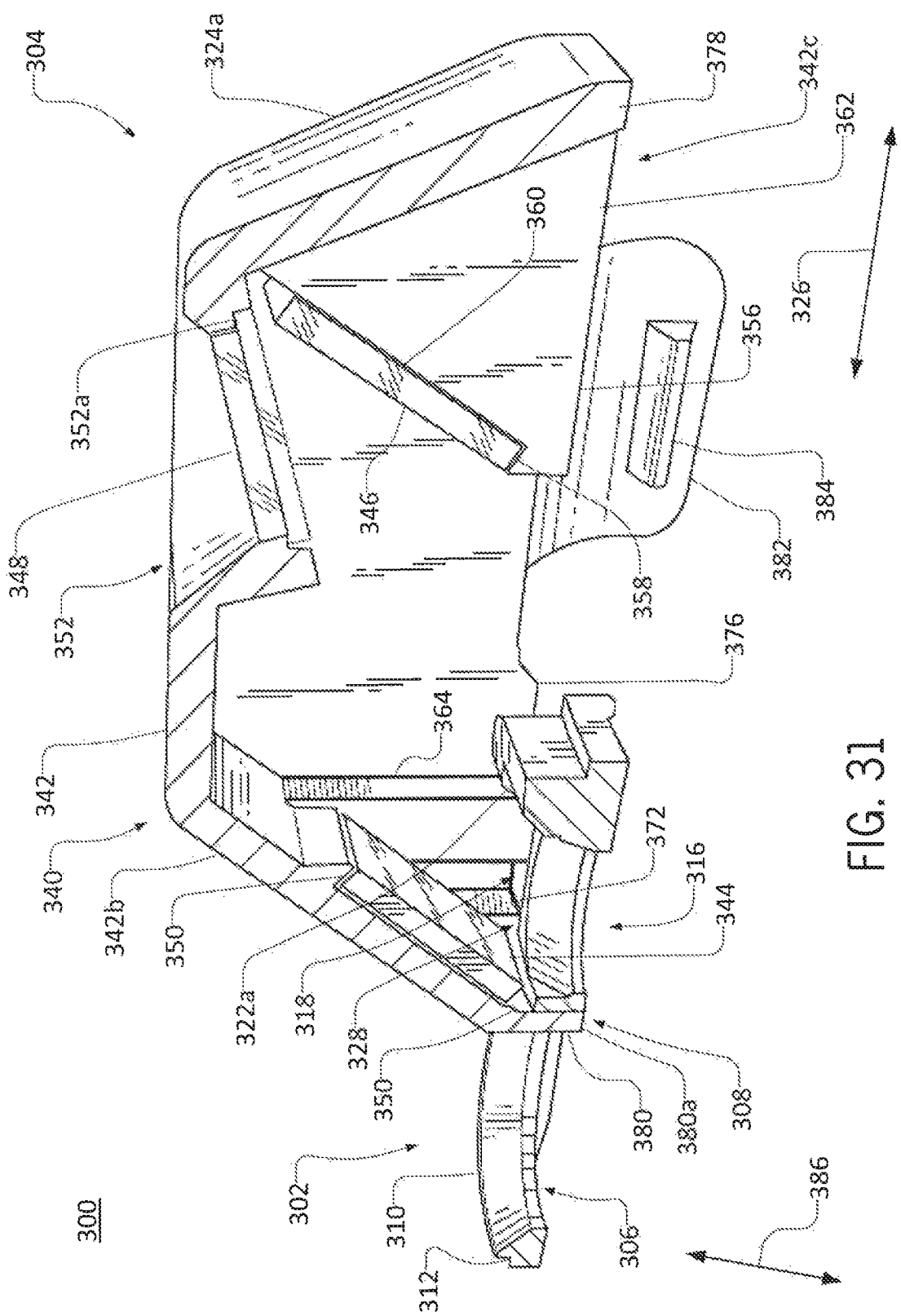
FIG. 31 is a perspective sectional view of the attachment assembly of FIG. 28, taken along plane A-A of FIG. 28.
Figure 32:
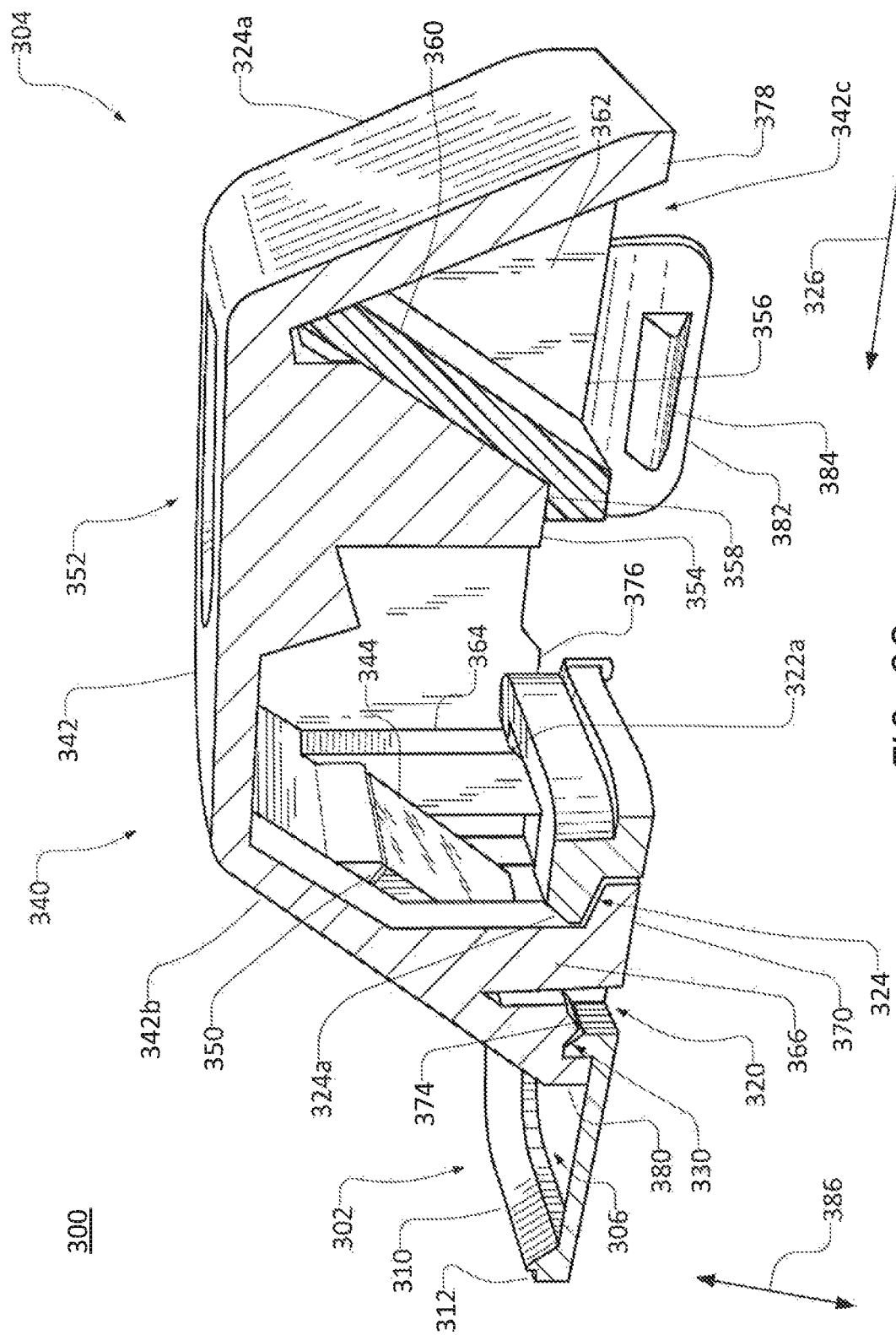
FIG. 32 is a perspective sectional view of the attachment assembly of FIG. 28, taken along plane B-B of FIG. 28.
Figure 33:
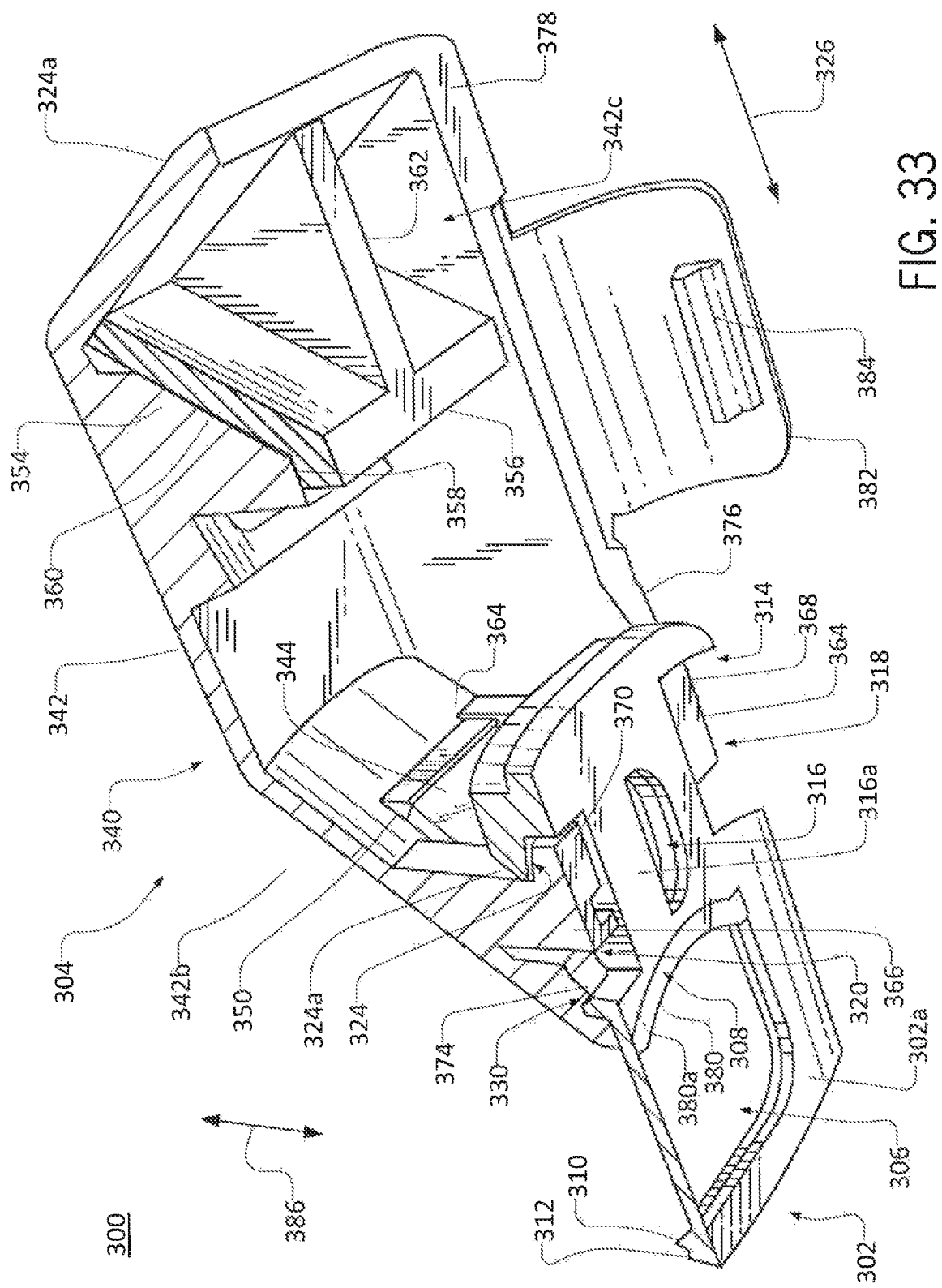
FIG. 33 is another perspective sectional view of the attachment assembly of FIG. 28, taken along plan B-B of FIG. 28.

In the embodiment illustrated, the shell 342 is configured to enclose an optical device configured as a mirror assembly including mirrors 344 and 346 and lens 348 (see FIGS. 31-33). To this end, the shell 342 includes internal shelves 350 and a lens opening 352 surrounded by an internal shoulder 352a, which can generally support and align the mirror 344 and the lens 348, respectively. Further, the shell 342 includes internal struts 354 configured to support and align an insert 356. The insert 356 includes a shelf 358 and support surface 360 for the mirror 346, as well as an angled support rib 362 extending away from the support surface 360.

As illustrated in FIGS. 32 and 33 in particular, the insert 356 can be inserted into the shell 342 until the shelf 358 engages respective ends of the struts 354 and the support rib 362 engages an interior surface of an end wall 342a of the shell 342. The insert 356 can then be secured in place in various ways, including with adhesives, with a press-fit engagement, with detents or similar other features (not shown) and so on. In this way, for example, the mirror 346 can be appropriately aligned with the mirror 344 and the lens 348 (or other optical elements) without requiring excessively complex internal geometry or assembly procedures for the shell 342.

Generally, the shell 342 can be configured for relatively low-profile attachment to a mobile device or case, and can include various features to facilitate use of the attachment body 304 with a camera of a mobile device. For example, a wall 342b of the shell 342 that is to be disposed generally adjacent to a field of view of a camera can be configured with an angled geometry so that interference with camera operation by the shell 342 can be minimized. The angled geometry of the wall 342b can also, for example, help to appropriately support one or more components of an optical device within the shell 342, such as the mirror 344 (e.g., as discussed above).

The attachment body 304 can also generally include features for removably securing the attachment body 304 to the attachment base 302. In the embodiment illustrated, for example, the attachment body 304 includes a set of attachment arms 364 and 366 extending out of a main opening 342c of the shell 342. The free end of each of the attachment arms 364 and 366 includes a respective protrusion 368 and 370, each of which can generally be configured with a complimentary (e.g., complimentarily angled) geometry to a corresponding one of the overhangs 322 and 324 on the attachment base 302.

In the embodiment illustrated, the ends of the protrusions 368 and 370 are offset from each other along the length direction 326, as are the ends of the attachment arms 364 and 366 generally. This arrangement can be similar to the offset arrangement for the attachment openings 318 and 320 and the overhangs 322 and 324, as discussed above. In other embodiments, however, other configurations are possible.

The attachment body 304 can also include features for engaging the indents 328 and 330 of the attachment base 302. In the embodiment illustrated, for example, each of the attachment arms 364 and 366 is disposed near, but spaced apart from, respective detents 372 and 374 (see FIG. 30, in particular). Generally, each of the detents 372 and 374 can exhibit a complimentary geometry to a corresponding one of the indents 328 and 330, so that the detents 372 and 374 can be seated appropriately within the indents 328 and 330 when the attachment body 304 is secured to the attachment base 302.

The attachment body 304 can also include various other features. In the embodiment illustrated, for example, the shell 342 includes an extended lower portion 376 that extends generally below a remainder of the shell 342 (e.g., a peripheral lower surface 378 of the shell 342), as well as an attachment lip 380 extending generally below the remainder of the extended lower portion 376. Generally, the attachment lip 380 can include a complimentary (e.g., complimentarily curved) geometry as the indent 308 in the camera opening 306 of the attachment base 302. In other embodiments, however, other configurations are possible.

In the embodiment illustrated, the attachment body 304 also includes an attachment tab 382, which can help to secure the attachment body 304 directly to a mobile device or case. In the embodiment illustrated, the attachment tab 382 exhibits a generally curved profile extending away from and below the shell 342, with an elongated detent 384 near a free end of the attachment tab 382 to engage a corresponding groove on a case or other object.

As illustrated in particular in FIGS. 31-33, the features described above can facilitate a user removably securing the attachment body 304 to the attachment base 302 with relative ease and rapidity. Generally, to attach the attachment body 304 to the attachment base, the attachment arms 364 and 366 can be aligned with and inserted into the attachment openings 318 and 320, and the attachment lip 380 can be aligned with and inserted into the camera opening 306. The attachment body 304 can then be slid along the length direction 326 until the protrusions 368 and 370 are seated in the overhangs 322 and 324 (and against the underside angled features 322a and 324a), the detents 372 and 374 are seated in the indents 328 and 330, and the attachment lip 380 is seated in the indent 308 of the camera opening 306.

As also noted above, the attachment openings 318 and 320 are offset from each other along the length direction 326, as are the protrusions 368 and 370 and the attachment arms 364 and 366. This arrangement can result in a relatively stable connection between the attachment body 304 and the attachment base 302, due to contact points between the protrusion 368 and the angled feature 322a being offset from contact points between the protrusion 370 and the angled feature 324a along both the length and the width of the assembly.

Other relative offsets of various features can also be useful. For example, as illustrated in FIG. 33 in particular, when the attachment body 304 and the attachment base 302 are firmly (and removably) secured together, bottom surfaces 364a and 366a of the attachment arms 364 and 366 are offset along a height direction 386 from a bottom surface 302a of the attachment base 302. This can be useful, for example, in order to prevent the attachment arms 364 and 366 from sliding along, and potentially scratching, a surface against which the bottom surface 302a of the attachment base 302 is seated (e.g., a surface of a mobile device (not shown in FIG. 33)).

In some aspects, a lack of offsets between different parts of the aimer accessory 300 can also provide useful stability. For example, as illustrated in FIGS. 31 and 33 in particular, when the attachment body 304 and the attachment base 302 are firmly secured together, a bottom surface 380a of the attachment lip 380 of the shell 342 can be generally flush with the bottom surface 302a of the attachment base 302. Accordingly, the attachment lip 380 can engage with a surface against which the bottom surface 302a of the attachment base 302 is seated (e.g., a surface of a mobile device (not shown in FIG. 31)) in order to further stabilize the attachment body 304 and the aimer accessory 300 generally.

With the attachment body 304 and the attachment base 302 assembled as illustrated, the camera opening 306 of the attachment base 302 is left generally open, while the light-source opening 316 of the attachment base 302 is fully enclosed (at least on one side of the attachment base 302) by the shell 342 of the attachment body 304. Further, the light-source opening 316 is generally aligned with one or more components of the optical device of the attachment body 304 (e.g., with the first mirror 344 within the shell 342). Accordingly, the assembled aimer accessory 300 can be used with a camera of a mobile device to capture images via the camera opening 306. Further, due to the enclosure of the light-source opening 316 by the shell 342, the assembled aimer accessory 300 can be used both to route light from a light source of the mobile device through the optical device of the attachment body 304, and to otherwise generally occlude the light source to prevent unwanted illumination of external objects.

In order to use the aimer accessory 300 with a mobile device having a camera and a light source, the aimer accessory 300 can be secured in place relative to the mobile device with the camera opening 306 aligned with the camera, and with the light-source opening 316 aligned with the light source. In some embodiments, this alignment can be obtained through the use of a case configured to engage the attachment base 302.

Figure 35:
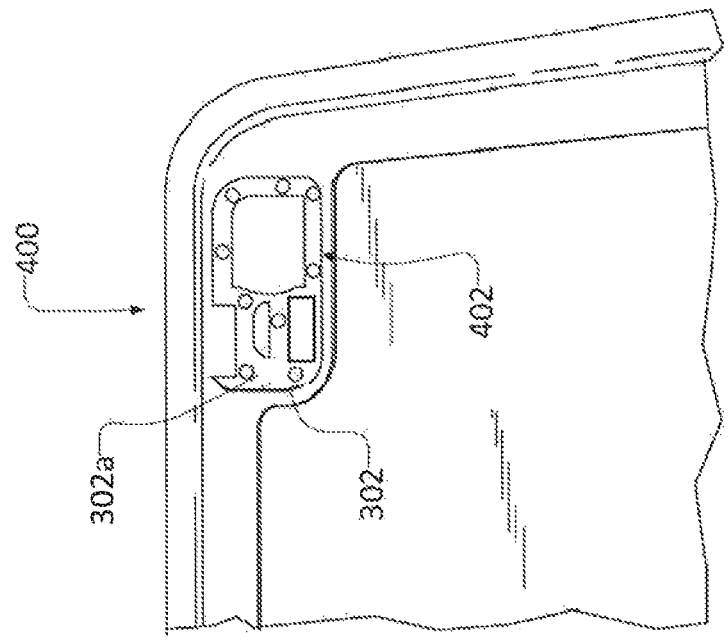
FIG. 35 is a front elevation view of the insert of FIG. 34 engaged with the case of FIG. 34.
Figure 34:
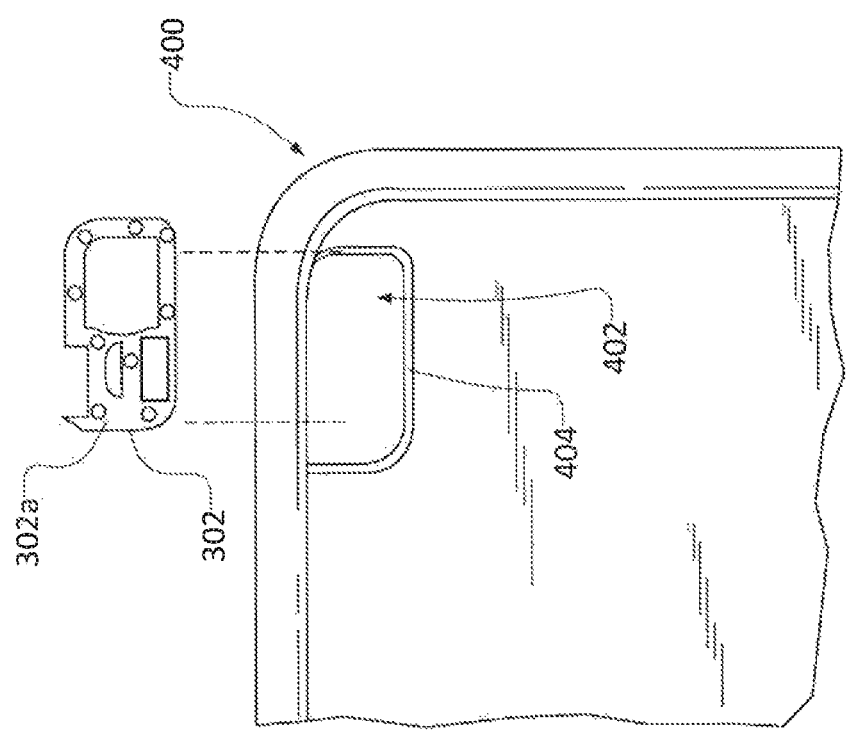
FIG. 34 is a front elevation view of an insert for the attachment assembly of FIG. 28 and part of a case for a mobile device.

As illustrated in FIG. 34, for example, a case 400 for use with the aimer accessory 300 and a mobile device (not shown in FIG. 34) can include a camera opening 402 that is generally configured to align with a camera and a light-source of the mobile device when the mobile device is inserted into the case 400. The camera opening 402 exhibits a generally complimentary peripheral profile as the attachment base 302, with an internal shoulder 404 that is generally complimentary to the shoulder 312 of the attachment base 302 (see, e.g., FIG. 29). Accordingly, as illustrated in FIG. 35, the attachment base 302 can be inserted into the inside of the case 400, in alignment with the camera opening 402, so that engagement of the shoulder 312 with the shoulder 404 prevents the attachment base 302 from being removed from the case 400 via the camera opening 402.

Figure 36:
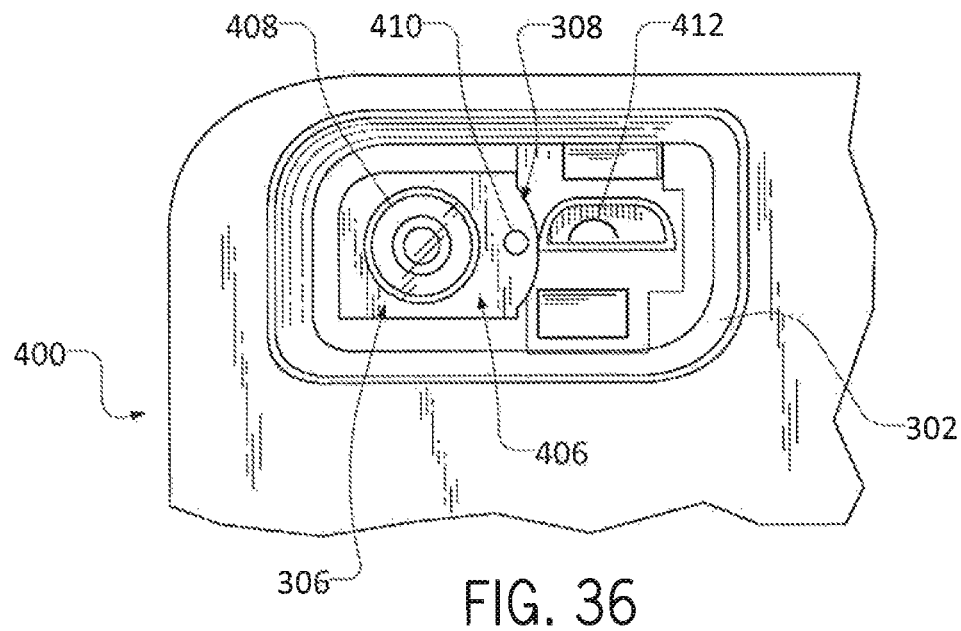
FIG. 36 is a rear elevation view of the insert of FIG. 34 engaged with the case of FIG. 34, with a mobile device inserted into the case.

As illustrated in FIG. 36, when a mobile device 406 is then inserted into the case 400, the mobile device 406 can seat against the bottom surface 302a of the attachment base 302 (see also FIGS. 29 and 35), thereby cooperating with the shoulder 404 to secure the attachment base 302 within the case 400 and in alignment with the camera opening 402. As also illustrated in FIG. 36, with the attachment base 302 and the mobile device 406 thus inserted into the case 400, a camera lens 408 of the mobile device 406 can be aligned with the camera opening 306 in the attachment base 302 so that the attachment base 302 generally does not obstruct image capture with the camera lens 408.

Further, in the embodiment illustrated, the indent 308 in the camera opening 306 is aligned with a microphone 410 (or other similarly located feature) on the mobile device 406, so that the microphone (or other feature) can still be used (e.g., for noise-cancellation purposes) even with the attachment base 302 in place. Also in the embodiment illustrated, the light-source opening 316 is generally aligned with a light source 412 of the mobile device 406, but with the blocking feature formed by the wall 316a of the light-source opening 316 partially occluding the light source 412 (e.g., a yellow-colored portion thereof). Accordingly, when the attachment body 304 is secured to the attachment base 302, some but not all of the light from the light source 412 can pass into the shell 342 for manipulation by the optical device therein (e.g., the assembly of the lens 348 and the mirrors 344 and 346).

Figure 37:
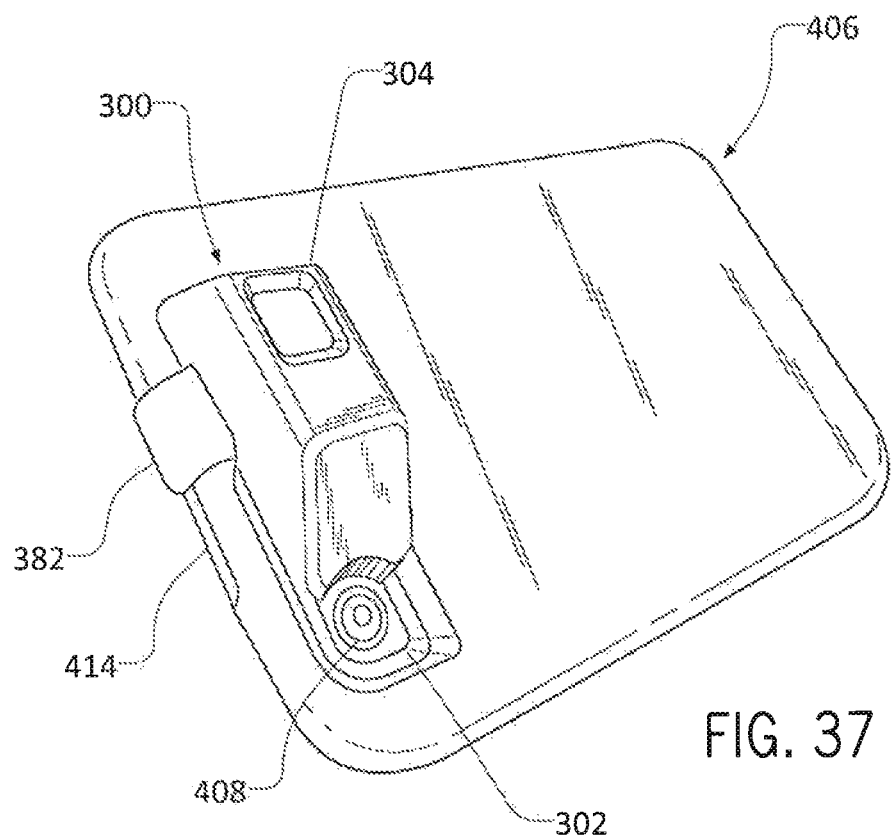
FIG. 37 is a top, left, rear perspective view of the attachment assembly of FIG. 28 secured to the case of FIG. 34 for use with the mobile device of FIG. 36.

As illustrated in FIG. 37, once the mobile device 406 and the attachment base 302 have been secured in the case 400, the attachment body 304 can be removably secured to the attachment base 302 (e.g., as described above) for use with the camera lens 408 and the light source 412 of the mobile device 406. As also illustrated in FIG. 37, to further secure the attachment body 304 relative to the mobile device 406, the attachment tab 382 of the attachment body 304 can be disposed to wrap onto a side (e.g., the top side) of the case 400, with the detent 384 (see, e.g., FIG. 33) engaging a groove 414 on the case 400.

In other embodiments, other configurations are possible, including variations on the features discussed above. For example, in some embodiments, one or more attachment arms can be provided on an attachment base rather than on an attachment body, and one or more corresponding attachment openings can be provided on the attachment body rather than on the attachment base. Similarly, for example, one or more features similar to the detents 372 and 374 can be provided on an attachment base rather than on an attachment body, and one or more corresponding indents can be provided on the attachment body rather than on the attachment base. In some embodiments, an attachment base can be configured to entirely occlude a light source of a mobile device.

In other embodiments, an attachment base can also (or alternatively) be configured to attach in different ways to a case (or mobile device). For example, an attachment base can be configured to attach to the exterior of a case rather than through engagement with an internal shoulder of the case.

Figure 38:
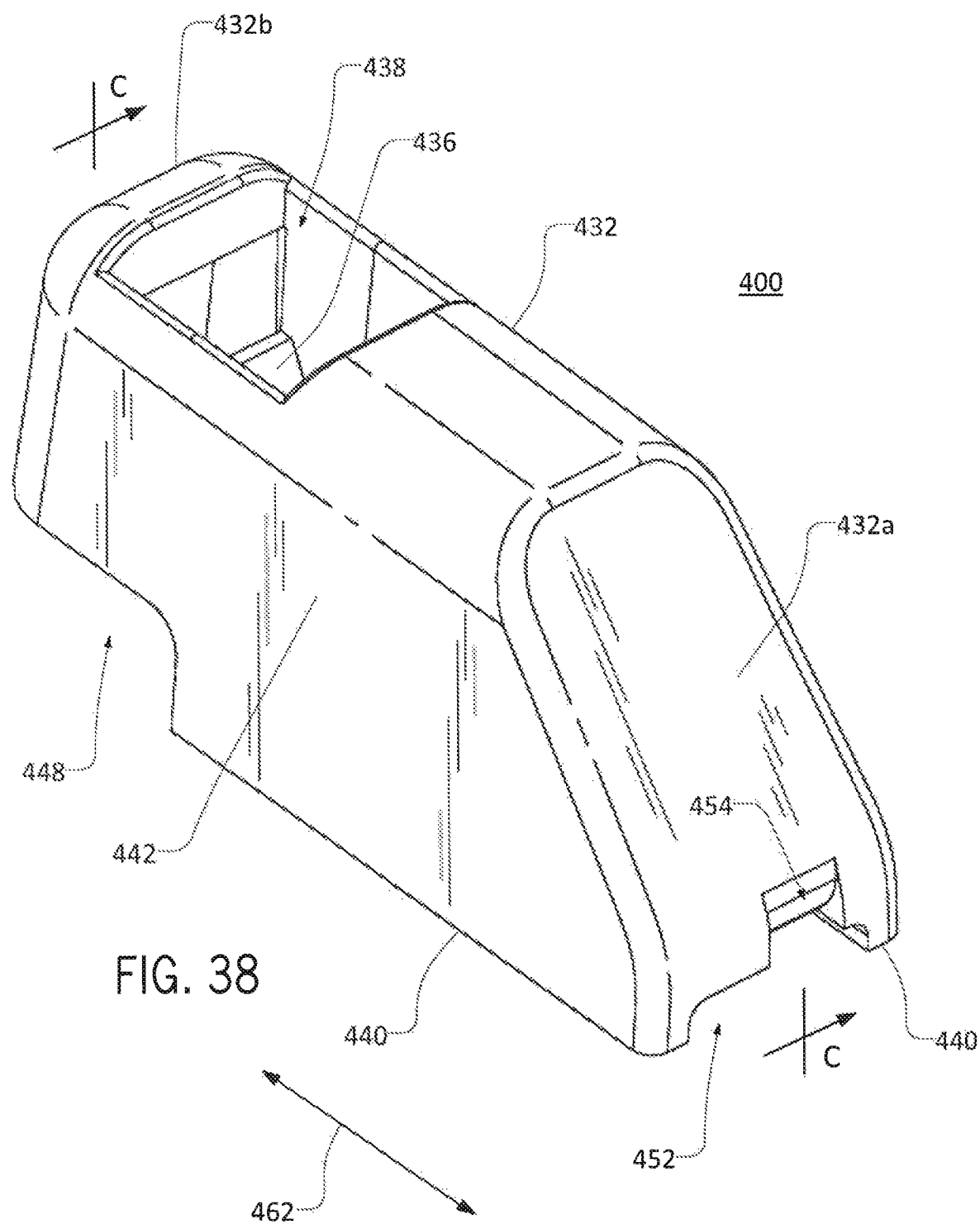
FIG. 38 is a top, left, rear perspective view of an attachment body according to this disclosure.
Figure 39:
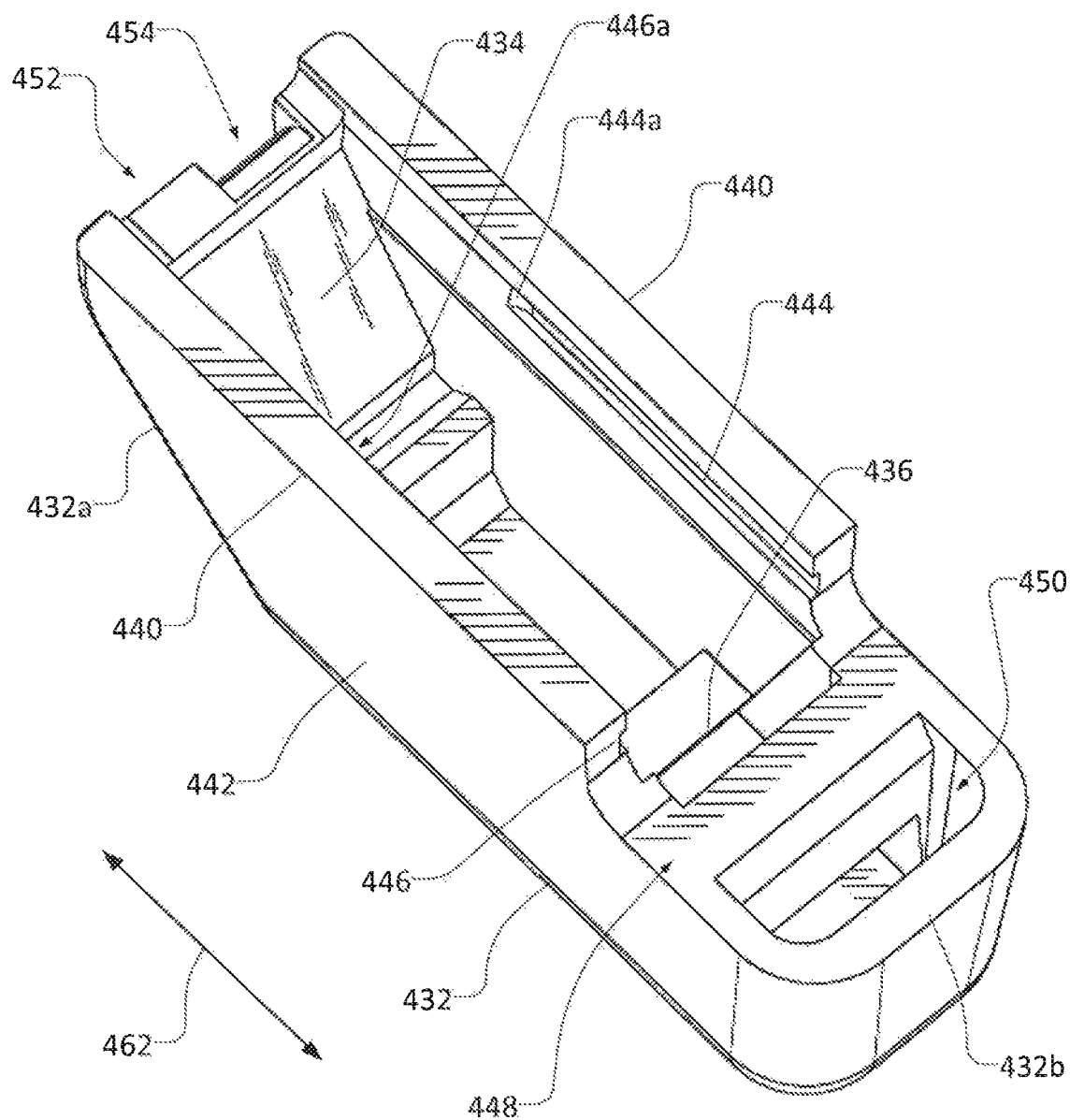
FIG. 39 is a top, right, front perspective view of the attachment body of FIG. 38.

An attachment body 430 for another aimer accessory is illustrated in FIGS. 38 and 39. Similarly to the attachment body 304, the attachment body 430 can generally include one or more optical devices (e.g., mirror arrangements) and is configured to be removably secured to an attachment base (as discussed below) that can in turn be secured to a mobile device with a camera (not shown in FIGS. 38 and 39).

In the embodiment illustrated, the attachment body 430 includes a housing portion generally formed as a single-piece shell 432 that is configured to enclose and support part or all of one or more optical devices. For example, the shell 432 can be configured to enclose and support a mirror assembly or a light pipe for use with a light source on a relevant mobile device.

Also in the embodiment illustrated, the shell 432 is configured to enclose an optical device configured as a mirror assembly with various mirrors (not shown) and a lens (not shown). Accordingly, the shell 432 includes internal support surfaces 434 and 436 to support various mirrors (not shown), as well as a lens opening 438 configured to receive a lens (not shown). The lens and mirrors (not shown) can be secured within the shell 432 in various ways, including through the use of adhesives, press-fit engagement, and so on.

Generally, the shell 432 can be configured for relatively low-profile attachment to a mobile device or case, and can include various features to facilitate use of the attachment body 304 with a camera of a mobile device. For example, a wall 432a of the shell 432 that is to be disposed generally adjacent to a field of view of a camera can be configured with an angled geometry so that interference with camera operation by the shell 432 can be minimized. The angled geometry of the wall 432a can also, for example, help to appropriately support one or more components of an optical device, such as a mirror, within the shell 432.

The attachment body 430 can also generally include features for removably securing the attachment body 430 to an attachment base (e.g., an attachment base as discussed below). For example, the shell 432 can include a pair of support legs 440 extending downwardly from a main body 442 of the shell 432, with a set of internal grooves 444 and 446. In the embodiment illustrated, the grooves 444 and 446 extend partly along the length of the support legs 440 from an area below an overhang 448 at one end of the support legs 440 to tapered ends 444a and 446a of the respective grooves 444 and 446.

The attachment body 430 can also include various other features. In the embodiment illustrated, for example, the shell 432 includes a rounded opening 452 at a bottom end of the wall 432a, and an inwardly curving channel 454 extending along part of the wall 432a to the opening 452. The shell 432 also includes an internal recess 450 extending into the interior of the shell 432 from within the overhang 448.

Figure 40:
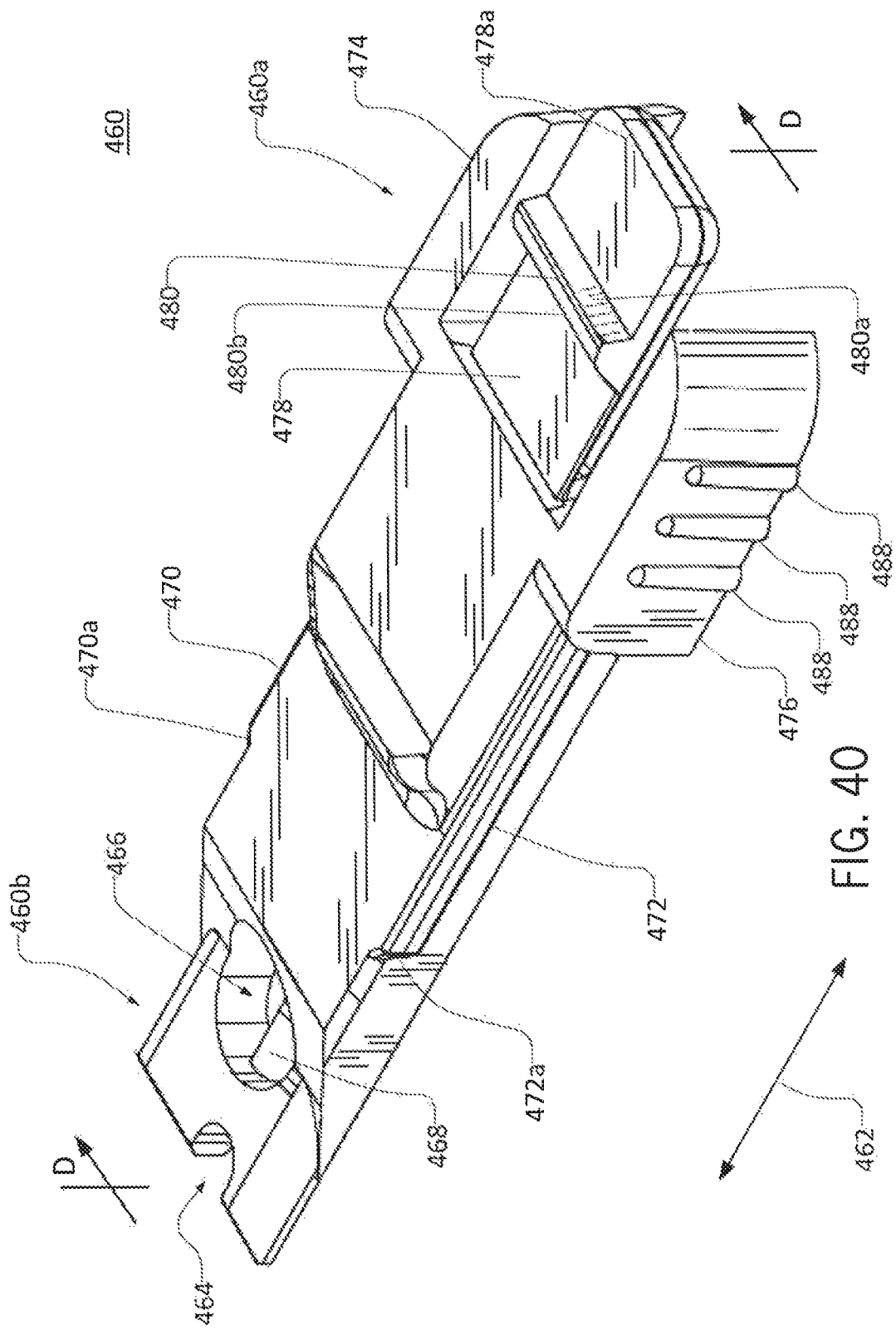
FIG. 40 is a bottom, right, rear perspective view of an attachment base according to this disclosure.
Figure 41:
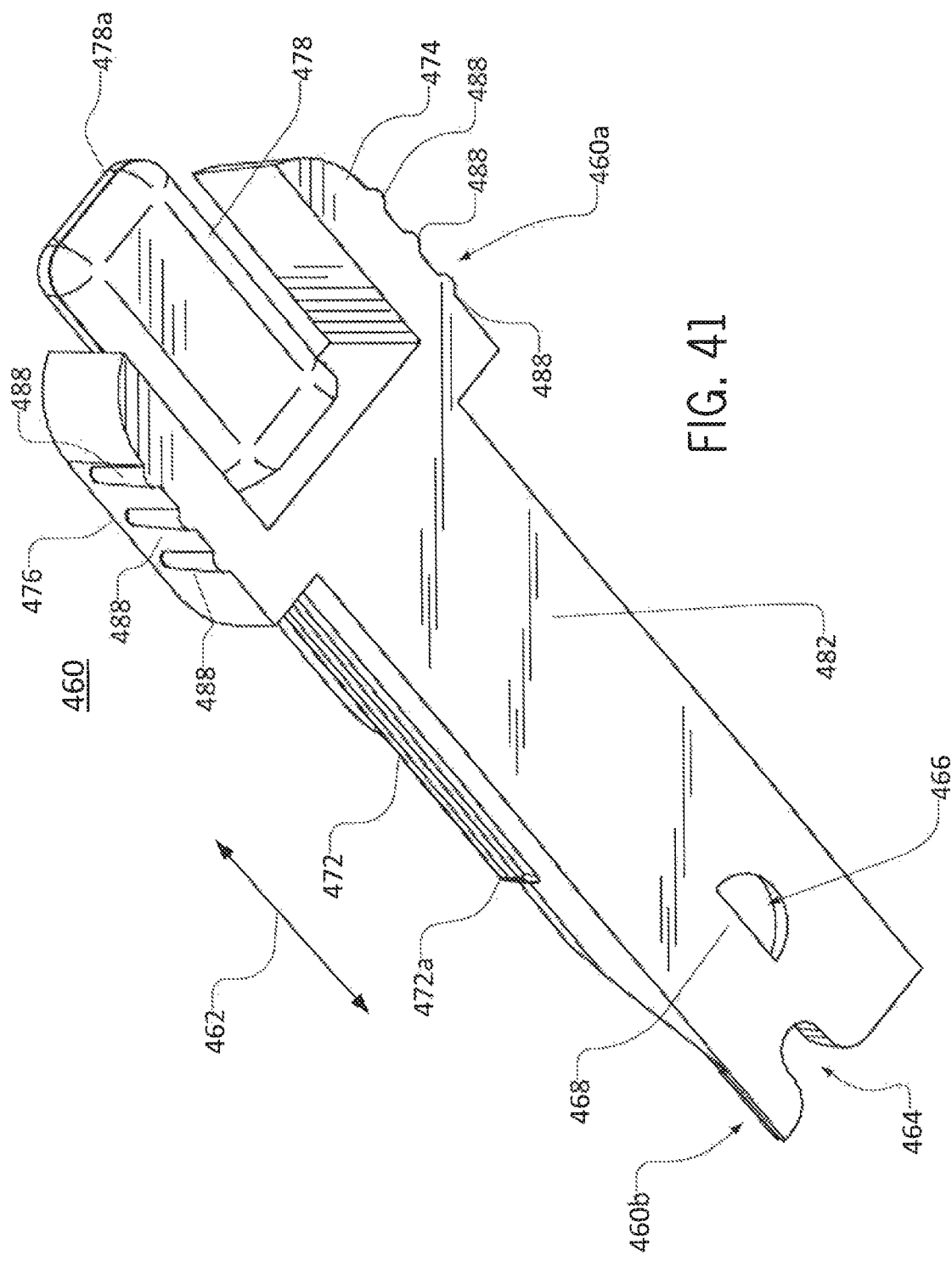
FIG. 41 is a bottom, right, front perspective view of the attachment base of FIG. 40.

An attachment base 460 for use with the attachment body 430 is illustrated in FIGS. 40 and 41. In the embodiment illustrated, the attachment base 460 is formed as a single-piece body that generally tapers in height along a length direction 462 from a raised end 460a to a lower-profile end 460b. A generally rounded opening 464 is provided at the lower-profile end 460b, as is a light-source opening 466. In the embodiment illustrated, the light-source opening 466 is configured as a generally circular or ovular opening with a generally semi-circular or semi-ovular blocking feature 468 occluding approximately half of the light-source opening 466. As such, as illustrated in FIG. 41, the light-source opening 466 present a generally semi-circular or semi-ovular aperture for admission of light (e.g., from a light source of a mobile device).

The attachment base 460 can also generally include structures to assist in removably securing the attachment body 430 to the attachment base 460. In the embodiment illustrated, for example, the attachment base 460 includes a set of attachment rails 470 and 472, a pair of grip arms 474 and 476, and a cantilevered locking tab 478. The attachment rails 470 and 472 generally extend along part of the length of the attachment base 460 between respective end walls of the grip arms 474 and 476 and respective tapered ends 470a and 472a of the attachment rails 470 and 472. The grip arms 474 and 476 are configured to be generally rigid and include respective sets of raised grip features 488, which can assist a user in manually positioning or otherwise holding the attachment base 460. The locking tab 478 extends generally between the grip arms 474 and 476 and is configured to be elastically deformable relative to the remainder of the attachment base 460 (e.g., relative to the grip arms 474 and 476) when the locking tab 478 is manually subjected to force at or near a free end 478a. An upper surface of the locking tab 478 includes a detent 480, with a flattened locking wall 480a and a sloped and rounded entrance wall 480b.

As illustrated in FIG. 41 in particular, the attachment base 460 includes a generally flat bottom surface 482. As such, for example, the attachment base 460 can be secured directly to a flat surface of a mobile device (or case) using adhesives or adhesive strips (e.g., double-sided tape) or other attachment mechanisms (e.g., magnets). In other embodiments, other configurations are possible. For example, the attachment base 460 can be provided with a shoulder similar to the shoulder 312 of the attachment base 302 (see, e.g., FIG. 29) so that the attachment base 460 can engage a case for a mobile device.

Figure 42:
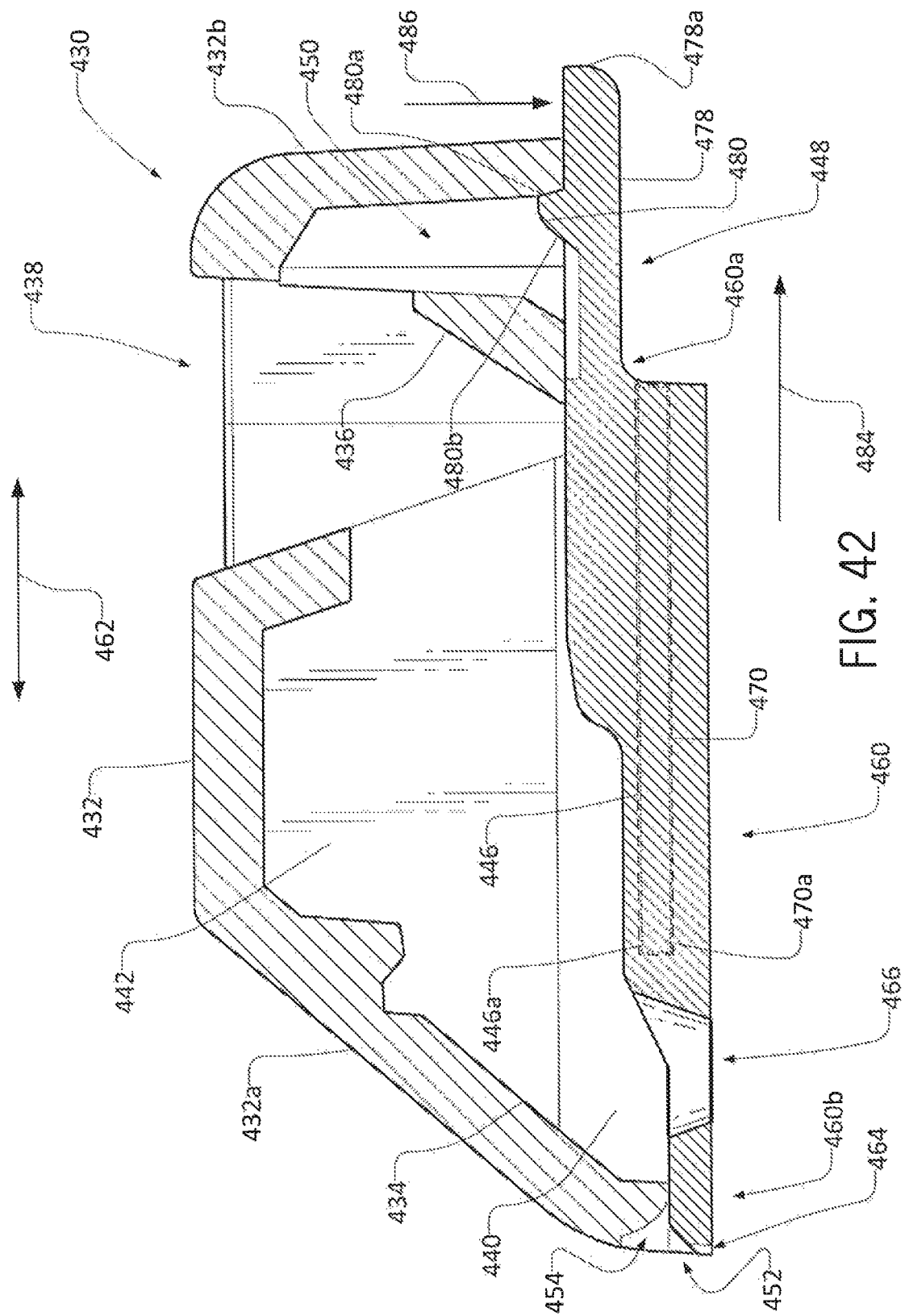
FIG. 42 is a side sectional view of the attachment body of FIG. 38 removably secured to the attachment base of FIG. 40, taken along plane C-C of FIG. 38 and plane D-D of FIG. 39, respectively.

Referring in particular to FIG. 42, in preparation for securing the attachment body 430 to the attachment base 460, the lower-profile end 460b of the attachment base 460 can be aligned with the overhang 448 on the attachment body 430 (or vice versa), with the attachment rails 470 and 472 (only the attachment rail 470 is shown, in dotted relief, in FIG. 42) generally aligned with the grooves 444 and 446 (only the groove 446 is shown, in dotted relief, in FIG. 42). The attachment body 430 can then be moved relative to the attachment base 460, as indicated by arrow 484, in order to move the attachment rails 470 and 472 into the respective grooves 444 and 446.

As the attachment rails 470 and 472 are moved farther into the grooves 444 and 446, the detent 480 on the locking tab 478 can come into contact with a rear wall 432b of the shell 432. With continued movement of the attachment body 430 in the direction of the arrow 484, the angled profile of the entrance wall 480b of the detent and the movement of the attachment body 430 relative to the attachment base 460 can then deflect the locking tab 478 downward (e.g., as indicated by arrow 486). With further relative movement of the attachment body 430 and the attachment base 460, the detent 480 can clear the wall 432b, such that the locking tab 478 is released from the noted deflection and the detent 480 can move into the recess 450 in the shell 432. The locking wall 480a of the lock can then seat against an interior surface of the wall 432b to generally prevent disconnection of the attachment body 430 from the attachment base 460 by movement of the attachment body 430 opposite the direction of arrow 484.

In some embodiments, the attachment rails 470 and 472 and the grooves 444 and 446 can be dimensioned so that the detent 480 clears the wall 432b substantially simultaneously with the tapered ends 470a and 472a of the attachment rails 470 and 472 reaching the tapered ends 444a and 446a of the grooves 444 and 446. Accordingly, the detent 480, the wall 432b, the grooves 444 and 446, and the attachment rails 470 and 472 can collectively and snugly secure the attachment body 430 to the attachment base 460.

To remove the attachment body 430 from the attachment base 460, the locking tab 478 can be deformed downward (e.g., with manual force applied at the free end 478a) until the detent 480 clears the wall 432b. The attachment rails 470 and 472 can then be slid free of the grooves 444 and 446 and the attachment body 430 generally separated from the attachment base 460.

As also illustrated in FIG. 42, when the attachment body 430 is fully secured to the attachment base 460, the light-source opening 466 of the attachment base 460 is generally aligned with the internal support surface 434 of the attachment body 430. Accordingly, light passing into the attachment body 430 via the light-source opening 466 can generally fall on a mirror (not shown) or other optical device disposed on the support surface 434. Further, the lower-profile end 460b of the attachment base 430 generally extends into the opening 452 in the shell 432, with the rounded opening 464 of the attachment base 460 being generally aligned with the channel 454 in the shell 432.

Figure 43:
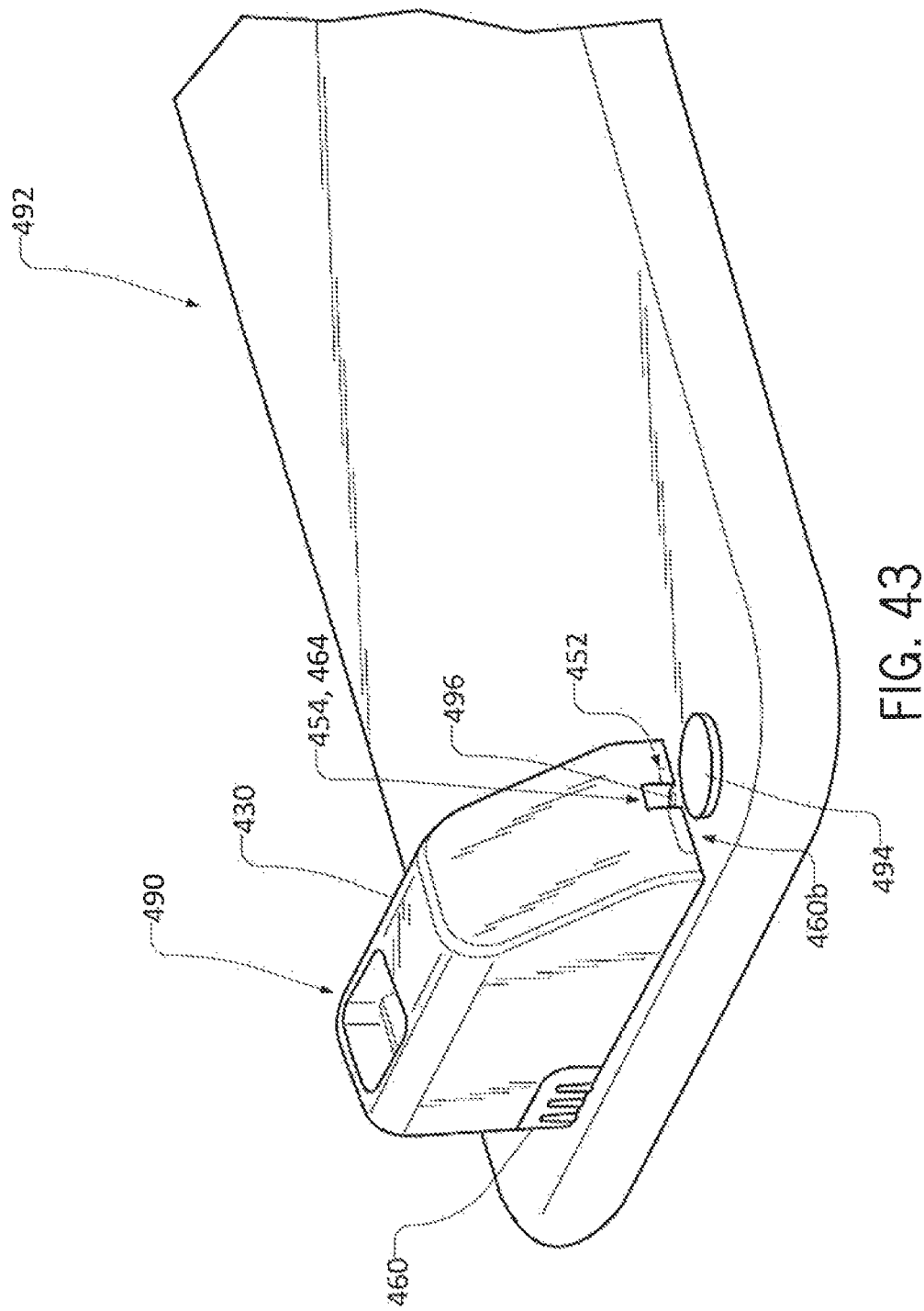
FIG. 43 is a top, left, rear perspective view of the attachment body of FIG. 38 engaged with the attachment base of FIG. 40, with the attachment base engaged for use with a mobile device.

FIG. 43 illustrates an aimer accessory 490 formed from the attachment body 430 and the attachment base 460, as installed for use with a mobile device 492 that includes a camera lens 494 and a microphone 496 (e.g., for noise-cancellation functionality). Generally, the attachment base 460 can be installed on the mobile device 492 (e.g., using an adhesive strip (not shown)) so that the lower-profile end 460b of the attachment base 460 is adjacent to, but does not overlap, the camera lens 494 and so that the opening 464 is generally aligned with the microphone 496. The attachment body 430 can then be secured to the attachment base 460 (e.g., as described above), with the opening 452 providing clearance for the camera lens 494 as the attachment body 430 is slid onto the attachment base. With the attachment body 430 thus secured, the aimer accessory 490 generally encloses completely a light source (not shown) of the mobile device 492, so that light from the light source is prevented from illuminating surrounding objects except by passing through the attachment body 430. Further, despite this generally complete enclosure with regard to the light source, the alignment of the channel 454 with the opening 464 still allows for the microphone 496 to remain exposed for operation.

As also noted above, different arrangements are possible for an optical device included in an aimer accessory according to this disclosure. In some embodiments, an optical device can include one or more mirrors (or other features, such as other reflecting surfaces, for changing the path of light rays) as well as a mask (or other feature) to help create a particular pattern of light on a relevant target. As illustrated in FIG. 44A, for example, an optical device 500 according to some embodiments of the invention includes a pair of mirrors 502 and 504 arranged to direct light from a light source 506 generally along an offset optical axis 508. In order to provide a pattern on a relevant target, a mask can be provided, such as a generally non-reflective mask 510 disposed on the mirror 504. In the embodiment illustrated in FIG. 44B, the mask 510 includes four oval (e.g. elliptical or circular) openings 512, such that only light from the light source 506 that is incident on the openings 512 can pass through the mask 510 to be reflected from the mirror 504. Correspondingly, when light from the optical device 500 reaches a target 514 it will form a pattern of ovals (e.g., including the ovals 516 and 518), as may be useful to help a user align a camera with a barcode.

In the embodiment illustrated in FIG. 44A, the mirrors 502 and 504 are generally planar mirrors. In some embodiments, non-planar mirrors can be used. As illustrated in FIG. 45, for example, an optical device 530 is configured similarly to the optical device 500, with a pair of mirrors 532 and 534 arranged to direct light from a light source 536, through the optical device 530, to a target 538. Similarly to the mask 510 (see FIG. 44A), a mask 540 is provided on the mirror 534 in order to help project a pattern of ovals (e.g., as represented by the ovals 542 and 544) onto the target 538. In contrast to the optical device 500, however, the mirror 532 of the optical device 530 is configured as parabolic mirror. As illustrated by relatively light paths 546, for example, this parabolic configuration of the mirror 532 can help to collimate light from the light source 536 and thereby produce a pattern of smaller and more intensely lit ovals (e.g., including the ovals 542 and 544) arranged around an optical axis 548.

In the embodiments illustrated in FIGS. 44A and 45, the masks 510 and 540 are disposed on the respective mirrors 504 and 534. In some embodiments, a mask (or other similar feature) can be disposed at other locations within an optical device. In the embodiment illustrated in FIG. 46, for example, an optical device 550 is configured similarly to the optical device 530 (see FIG. 45), with a parabolic mirror 552 and a planar mirror 554 arranged to direct light from a light source 556, through the optical device 550, to a target 558. In contrast to the optical device 530, however, the optical device 550 includes a mask 560 that is disposed between the mirrors 552 and 554, but is not disposed directly on either of the mirrors 552 and 554. As illustrated by the light paths 562 and by the ovals 564 and 566, this configuration can result in a similar illumination of the target 558 as can be provided by the optical device 530 for the target 538 (see FIG. 45).

Figure 47:
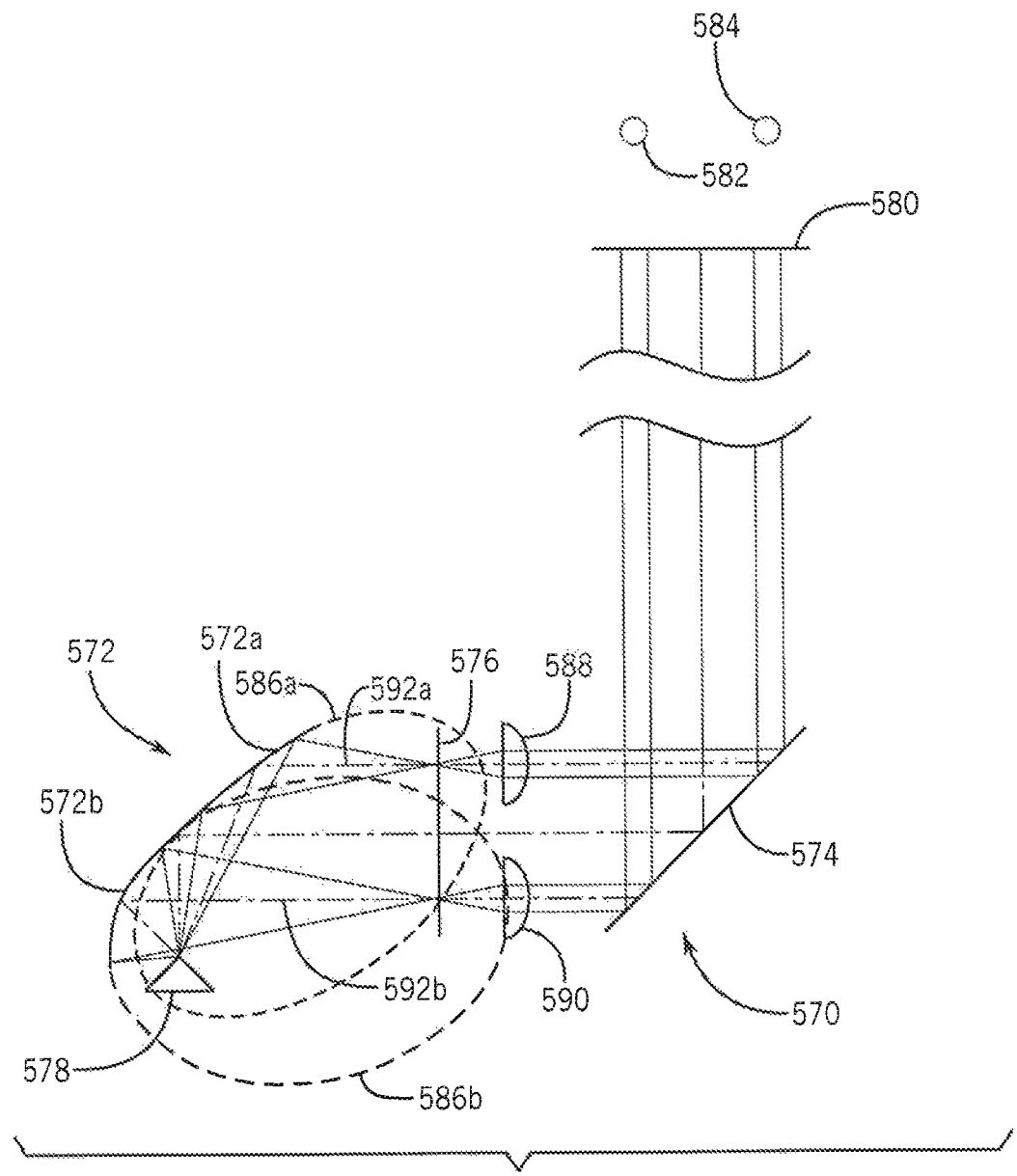
FIG. 47 is a schematic view of yet another optical device for projecting a pattern onto a target according to this disclosure.

In some embodiments, other configurations of mirrors (or other reflecting surfaces) can be used. As illustrated in FIG. 47, for example, an optical device 570 includes a pair of mirrors 572 and 574, and a mask 576 disposed between the mirrors 572 and 574. The mirror 572 is configured with a plurality of (e.g., four) elliptical segments, such as elliptical segments 572a and 572b, which can result in light from a light source 578 being divided for travel through a mask 576 along multiple optical axes (e.g., optical axes 592a and 592b). In the embodiment illustrated, each of the elliptical segments of the mirror 572 (e.g., including the elliptical segments 572a and 572b) is configured and arranged such the respective focal points of ellipses defined by the elliptical segments (e.g., ellipses 586a and 586b defined by the segments 572a and 572b) are generally coincident with the light source 578 and with at least one respective opening in the mask 576. In the embodiment illustrated, the optical device 570 further includes a set of lenses (e.g., including the lenses 588 and 590) disposed between the mask 576 and the mirror 574, to collimate the light that passes through the mask 576. With this configuration, for example, light from the light source 578 can be projected onto a target 580 with a relatively bright and focused pattern (e.g., as represented by the ovals 582 and 584).

In some embodiments, an optical device can use features or components other than mirrors to direct light. As illustrated in FIG. 48A, for example, an optical device 600 is configured similarly to the optical device 530 (see FIG. 45), in order to project a pattern (e.g., a pattern including ovals 602 and 604) on a target 606. In contrast to the optical device 530, however, the optical device 600 includes a transparent body 608 with reflecting surfaces 610 and 612 that serve to redirect light from a light source 614, along an optical axis 616, to the target 606. In the embodiment illustrated, the reflective surface 610 is generally planar, and the reflecting surface 612 is generally parabolic in order to collimate light from the light source 614. Further, rather than (or in addition to) the optical device 600 including a mask, the reflecting surface 612 is configured with four ovular reflective spots 618 (see FIG. 48B) surrounded by non- (or less) reflective material, in order to reflect light onto the target 606 with a particular pattern (e.g., as represented by the ovals 602 and 604).

In other embodiments, other configurations are possible. As illustrated in FIG. 49, for example, an optical device 620 is generally configured similarly to the optical device 600, with a transparent body 622 with reflecting surfaces 624 and 626 to direct light from a light source 628 onto a target 630 with a particular pattern (e.g., as represented by the ovals 632 and 634) onto the target 630. In the optical device 620, however, the reflecting surface 624 nearest to the light source 628 is configured as a generally planar reflecting surface (e.g., rather than a parabolic reflecting surface). Correspondingly, the optical device 620 includes a lens 636 disposed between the light source 628 and the reflecting surface 624, in order to collimate light from the light source 628 for passage through the transparent body 622 and projection onto the target 630.

In some embodiments, an attachment for a mobile device can include electronic components, such as light sources, processor assemblies (e.g., flexible printed circuit board "PCB" assemblies), sensors, and so on. For example, an optical attachment can include a power source, a controller such as a PCB assembly with one or more processors, and an LED (or LEDs) that is powered via the power source and controlled by the controller. With the assistance of appropriate optical devices of the attachment (e.g., lens assemblies, mirrors, and so on), the LED can provide light to project an illuminated targeting (or other) pattern onto a target for image acquisition. Accordingly, lighting of a target with the optical attachment (e.g., for image targeting) can be freed from any limitations imposed by a light source on a particular mobile device (e.g., limitations regarding pattern color or brightness). Further, with a self-contained power source such as a battery, the optical attachment can operate at a relatively high power level without draining the battery of the mobile device.

In one embodiment, an attachment can include an attachment body that is removably securable to a mobile device. The attachment body can generally provide a relatively light-proof cover for a camera of the mobile device, aside from one or more imaging openings in the attachment body, through which the camera can image external targets. Further, the attachment body can house a battery pack and a relatively high-power LED that can be operated by an onboard (or remote) processor. An optical device (e.g., a lens arrangement) included in the attachment body can be configured to project light from the LED towards external targets, as can be useful, for example, for targeting operations. In some cases, the optical device can include a dichroic mirror assembly, which can allow the LED light to be projected onto the target along the optical axis of the camera without requiring the LED to be disposed along the optical axis of the camera. For example, in some embodiments, a dichroic mirror can be disposed in optical alignment with the camera and with the LED, between two imaging openings in the attachment body. Light for imaging can accordingly pass from external targets through the imaging openings and the mirror to reach the camera, while light from the LED can be reflected from the mirror onto the external targets for illumination and targeting.

In some embodiments, an attachment can be configured to optically (or otherwise) communicate with a mobile device when secured to the mobile device for operation. This can be useful, for example, where the operation of a light source included in an attachment needs to be coordinated with one or more operations on an associated mobile device (e.g., image acquisitions). For example, an attachment can include a light detector (i.e., a photon detector of various kinds) that can be disposed in optical alignment with a light source on a mobile device when the attachment is secured to the mobile device. With this arrangement, data can be transmitted from the mobile device to the attachment by projecting light from the mobile-device light source onto the light detector of the attachment. The attachment can then interpret signals from light detector to extract the data (e.g., via firmware applications, hardware, and so on). As such, for example, software operating on the mobile device can control operation of an attachment light source (or other attachment component) in order to project targeting patterns for image acquisition (or provide other functionality). Further, in some implementations, software operating on the mobile device can optically transmit firmware (and other) updates to an attachment so that operation of the attachment can be easily improved when appropriate.

Similarly, in some embodiments, data can be optically (or otherwise) transmitted from an attachment to a mobile device. For example, an attachment can include a light source that can be placed into optical alignment with a camera of a mobile device, when the attachment is secured to the mobile device. With this configuration, light from the attachment light source can be projected onto the camera in order to transmit data from the attachment to the mobile device (e.g., via interpretation of the optical signals via software on the mobile device). As such, for example, the attachment can optically communicate identification information, firmware information, and other data to the mobile device.

In some implementations, an attachment can communicate certain information upon being secured to, or paired with, a mobile device. For example, an attachment can be configured to communicate a part number, a serial number, and a firmware version upon first receiving a pairing or control signal from a mobile device, or upon being physically connected to the mobile device. This can trigger further communication, as appropriate, to complete a connection or pairing of the attachment and the mobile device, and can thereby enable control of an attachment light source by the mobile device.

In some implementations, other data can also be communicated. For example, a battery monitor on an attachment can monitor an attachment battery (or other power source), so that an attached mobile device can be provided with status information for the battery (or other power source). For example, a battery monitor can monitor power status of an on-board battery, then use optical communication to alert a user, via the mobile device, when the battery is in need of replacement or recharging.

In some embodiments, an attachment light source for optical communication with a mobile device can also be used to project patterns for image targeting. For example, the light source can be controlled to communicate data via modulation (e.g., controlled ON-OFF flickering) of a targeting pattern projected onto an external target. By imaging the external target, a camera of the mobile device can accordingly record the optical data transmission. In contrast, in some arrangements, an attachment light source can be disposed to directly project light onto the camera (i.e., project light onto the camera without the light being first projected onto an external imaging target). For example, an attachment can include a dedicated (or shared) communication opening that is optically aligned with the attachment light source and with the camera, so that light from the LED can be projected onto the camera via the opening rather than (or in addition to) being projected onto an external target.

In some embodiments, an attachment can include a dedicated light source for optical communication as well as one or more additional light sources. For example, an attachment body can include a first LED for projecting patterns for image targeting, and a second LED for transmitting information directly to a camera of an attached mobile device.

Although beneficial results can be obtained with non-optical communication, optical communication of data between an attachment and a mobile device can have particular advantages. For example, in some embodiments, optical signaling by an attachment can be implemented using components that are also useful for other purposes (e.g., light sources for projecting targeting patterns onto external targets). Accordingly, communication between an attachment and an associated mobile device can be obtained without adding expensive and/or sizable electronic components such as Bluetooth equipment, radio antennas, and so on. Similarly, in some embodiments, optical signaling can be implemented without necessarily requiring a user to secure and maintain external data connections. For example, communication architectures relying on head-phone or other data-port connections can require plugs or cords that extend well outside of an attachment, and are thus potentially subject to accidental disconnect or damage, as well as other issues.

Other advantages may also be obtained with regard to the use of optical communication as disclosed herein, including when such communication is implemented in place of non-optical communication using devices such as Bluetooth equipment, radio antennas, and other non-optical wireless communication devices.

As one example, use of optical communication as disclosed herein can shorten configuration time or otherwise generally decrease costs of deployment of relevant devices. For example, for accessories that are configured to communicate with mobile devices over WiFi or other networks, with Bluetooth devices, or in other ways, operators may be required to manually (or otherwise) configure the accessories for use with a particular network, a particular mobile device (or set of mobile devices), and so on. Such configuration can include, for example, Bluetooth pairing, manual (or other) entry of IP addresses or completion of other IP configuration steps, and so on. Further, upon changes to aspects of the relevant system (e.g., upgrades of, or other changes to, network hardware or configurations, or mobile devices), certain configuration steps may need to be repeated. In this light, for example, the time cost of configuration can be sizable, particularly for systems that may employ large numbers of accessories, communication networks, and/or mobile devices.

In contrast, for devices that employ optical communication, initial (and subsequent) configuration may be relatively minimal. For example, an accessory configured for optical communication can be attached to a relevant mobile device and then can automatically (or otherwise) exchange relevant information via an optical communication channel in order to enable interoperation of the accessory and the mobile device in relatively short order and with relatively little manual intervention.

As another example, use of optical communication as disclosed herein can generally result in improved system security. For example, accessories configured to communicate via non-optical channels may need to store in onboard memory relatively sensitive information, such as network identifications and passwords, identification information for mobile devices (e.g., IMEI or other identifier), IP addresses, and so on. Accordingly, the loss of these accessories can potentially raise security concerns. In contrast, an accessory configured for optical rather than wireless communication with a mobile device may be able to avoid storing some or all of this information.

Figure 50:
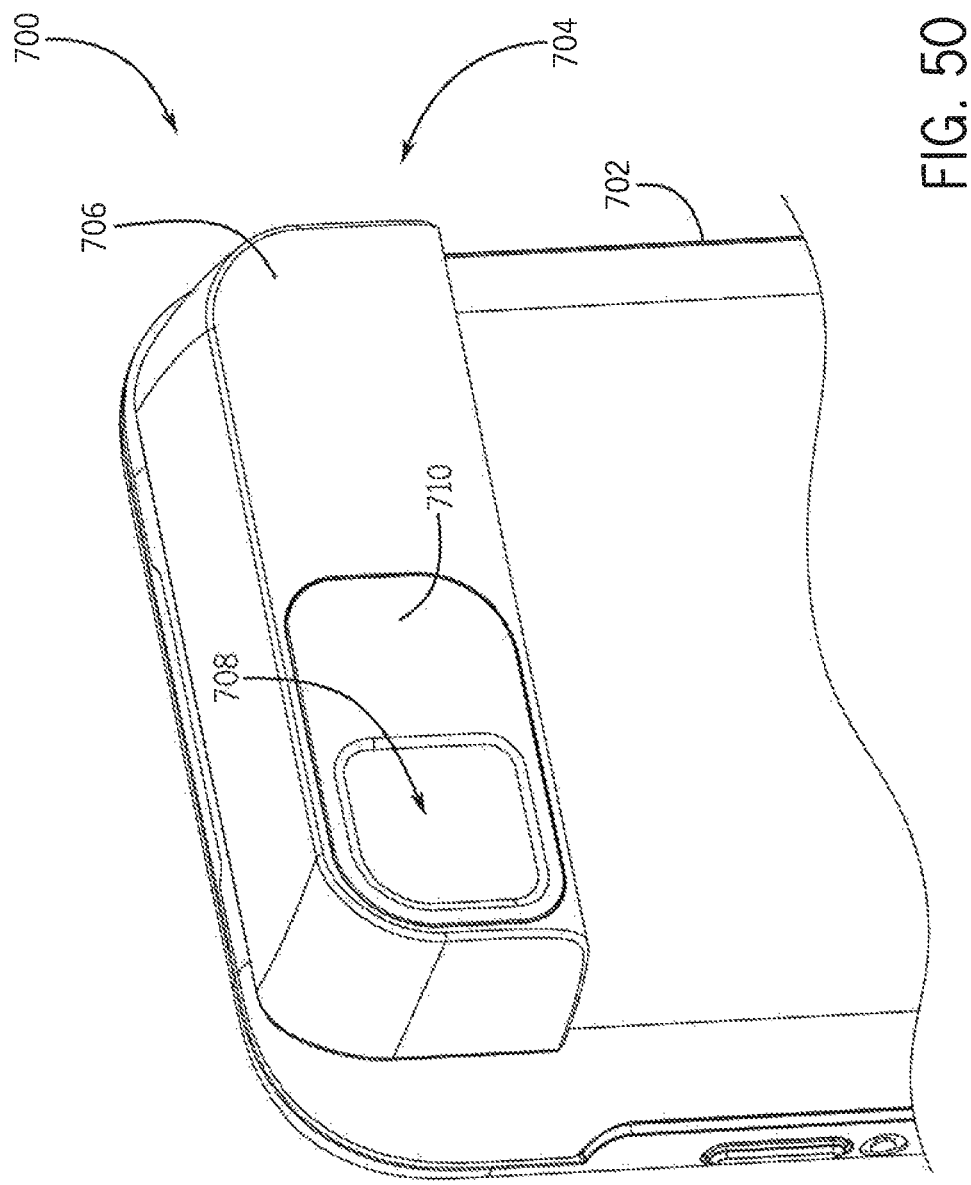
FIG. 50 is a top, rear perspective view of an attachment according to this disclosure, as secured to a case for a mobile device.

An example aimer accessory 700, which includes some of the features and capabilities discussed above, is illustrated in FIG. 50 as secured to a mobile device case 702. Generally, the aimer accessory 700 includes an attachment body 704 and an attachment base (not shown in FIG. 50) that is configured to removably secure the attachment body 704 to the case 702. The attachment body 704 includes a shell 706, which is generally contoured to compliment the geometry of the case 702 and which includes a main optical opening 708 with a cover lens 710. When the aimer accessory 700 is attached to the case 702, and a mobile device (not shown in FIG. 50) is placed within the case, a camera of the mobile device can be aligned to acquire images through the optical opening 708. In some embodiments, as also discussed below, light from an internal light source (not shown in FIG. 50) can also pass through the optical opening 708, in order to project a targeting pattern for image acquisition with the camera.

In some embodiments, the aimer accessory 700 can be removably secured to the case 702 (e.g., for targeting and image acquisition operations) using an attachment base configured to removably engage the attachment body 704. An example attachment base 716, formed as a single integral body, is illustrated in FIGS. 51A and 51B.

Figure 51A:
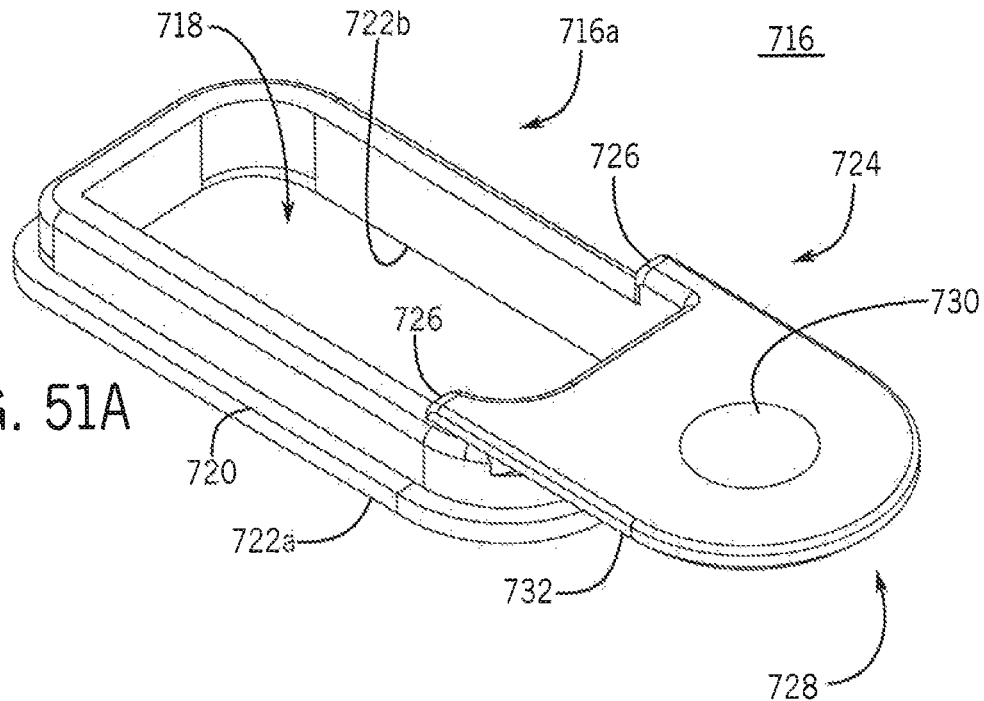
FIGS. 51A and 51B are top and bottom perspective views of an attachment base for the attachment of FIG. 50.
Figure 51B:
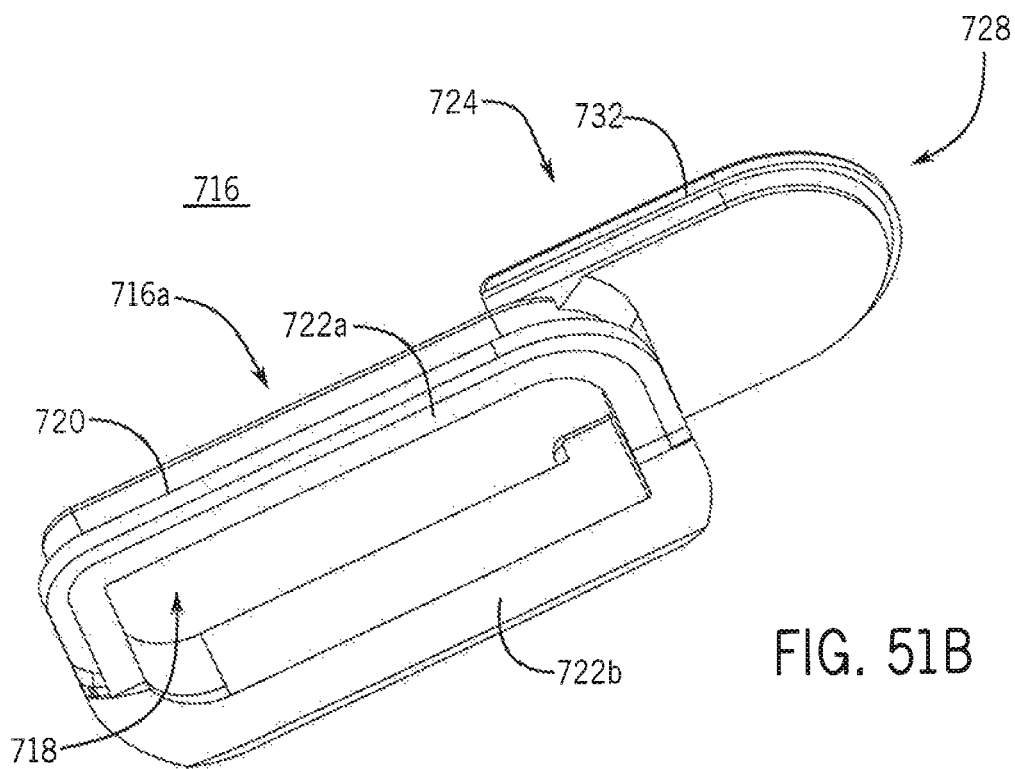

The attachment base 716 is generally configured to engage with the case 702 at an imaging opening in the case 702 (not shown in FIGS. 51A and 51B). To that end, for example, the attachment base 716 includes an anchor portion 716a with a relatively large optical (e.g., imaging or camera) opening 718. The optical opening 718 is generally configured so that a camera of a mobile device within the case 702 can acquire images through the image opening when the attachment base is secured to the case 702. Surrounding the optical opening 718, the anchor portion 716a includes a sidewall with an exterior shoulder 720.

In some embodiments, when the attachment base 716 is installed in the case 702 with a mobile device, the underside of an attachment base can rest against parts of the mobile device. Accordingly, in some embodiments, the attachment base 716 can be contoured to match the geometry of a particular mobile device type. For example, the underside of the anchor portion 716a (see FIG. 51B) of the attachment base 716 includes a generally flat portion 722a and a curved portion 722b, which are generally contoured to match the geometry of a phone for use with the case 702. In other embodiments, other configurations are possible.

The attachment base 716 also includes a generally plate-like tongue 724, attached to and extending away from one end of the anchor portion 716a. The tongue 724 attaches to the anchor portion 716a at a pair of raised shoulders 726 and extends from the shoulders 726 to a rounded end 728. The tongue 724 is generally resiliently deformable, with a central, partially spherical recess 730 at the rounded end 728. An exterior shoulder 732 extends around the outer perimeter of the tongue 724, facing generally oppositely from the shoulder 720 to form a pair of parallel attachment rails between the shoulders 726 and the rounded end 728.

Figure 52A:
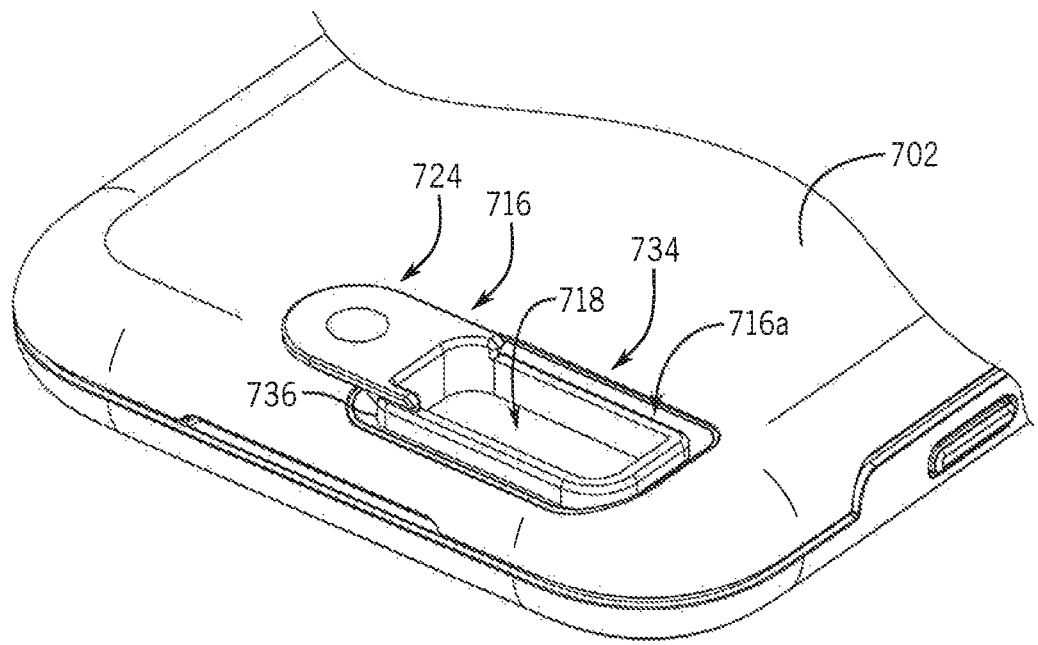
FIGS. 52A and 52B are top, rear perspective and rear elevation views, respectively, of the attachment base of FIGS. 51A and 51B installed with the case of FIG. 50.

As illustrated in FIG. 52A, to secure an attachment body (e.g., the attachment body 704) to the case 702, the attachment base 716 is generally disposed in an optical opening 734 in the case 702. In particular, the shoulder 720 (see FIGS. 51A and 51B) can be disposed to the inside of a shoulder 736 surrounding the optical opening 734 in the case 702. With the shoulder 720 thus disposed, the attachment base 716 (e.g., at the portions 722a and 722b illustrated in FIG. 51B) sits relatively flushly with the interior of the case 702. Further, the attachment base 716 extends partly through the optical opening 734 of the case 702 so that the tongue 724 extends partly along the exterior of the case 702, adjacent to the optical opening 734. With a mobile device (e.g., a mobile phone) disposed within the case 702, the mobile device and the shoulders 720, 736 can accordingly hold the attachment base 716 firmly in place and in optical alignment with the optical opening 734. In this way, for example, the attachment base 716 can be disposed to secure an attachment body to the case 702, while still allowing useful operation of a camera 738 and a light source 740 of a mobile device 742 via the optical opening 718.

Generally, the use of a separate attachment base (e.g., the attachment base 716) can allow for relatively easy addition or removal of an aimer accessory for a particular mobile device. This can be particularly useful, for example, in self-powered versions of aimer accessories, for which it may be useful to rapidly swap a fully-charged accessory for an accessory with a depleted internal power source. Similarly, the use of a separate attachment base can also allow for a relatively modular range of different aimer accessories. For example, multiple attachment bodies, each with different optical arrangements (or other components), can be configured to universally attach to a particular attachment base, thereby allowing one of several attachment bodies to be selected for a particular task with a particular mobile device.

Figure 53A:
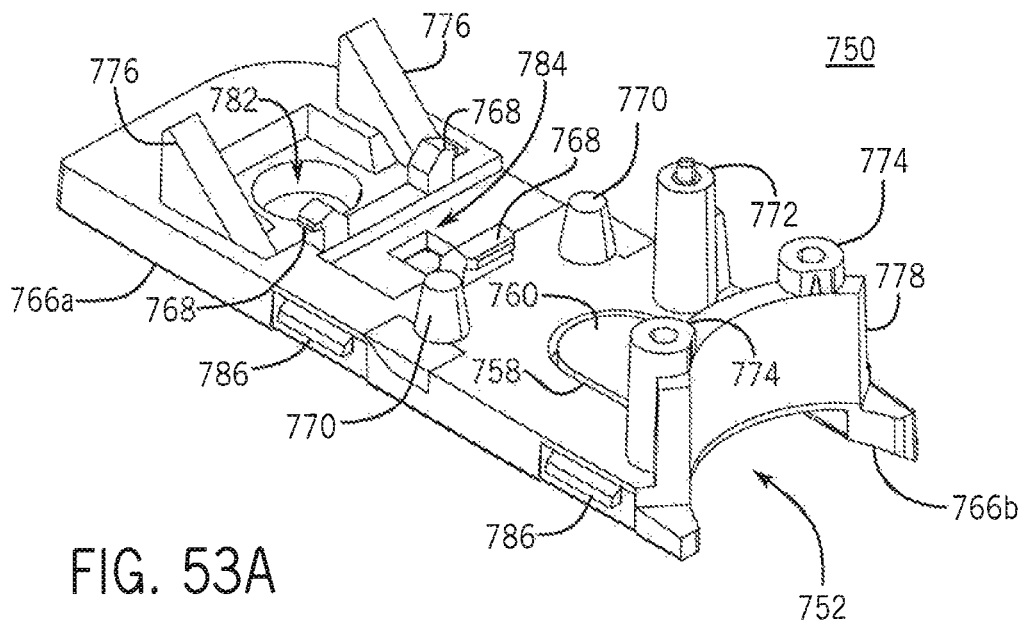
FIGS. 53A and 53B are top and bottom perspective views, respectively, of a base plate for the attachment of FIG. 50.
Figure 53B:
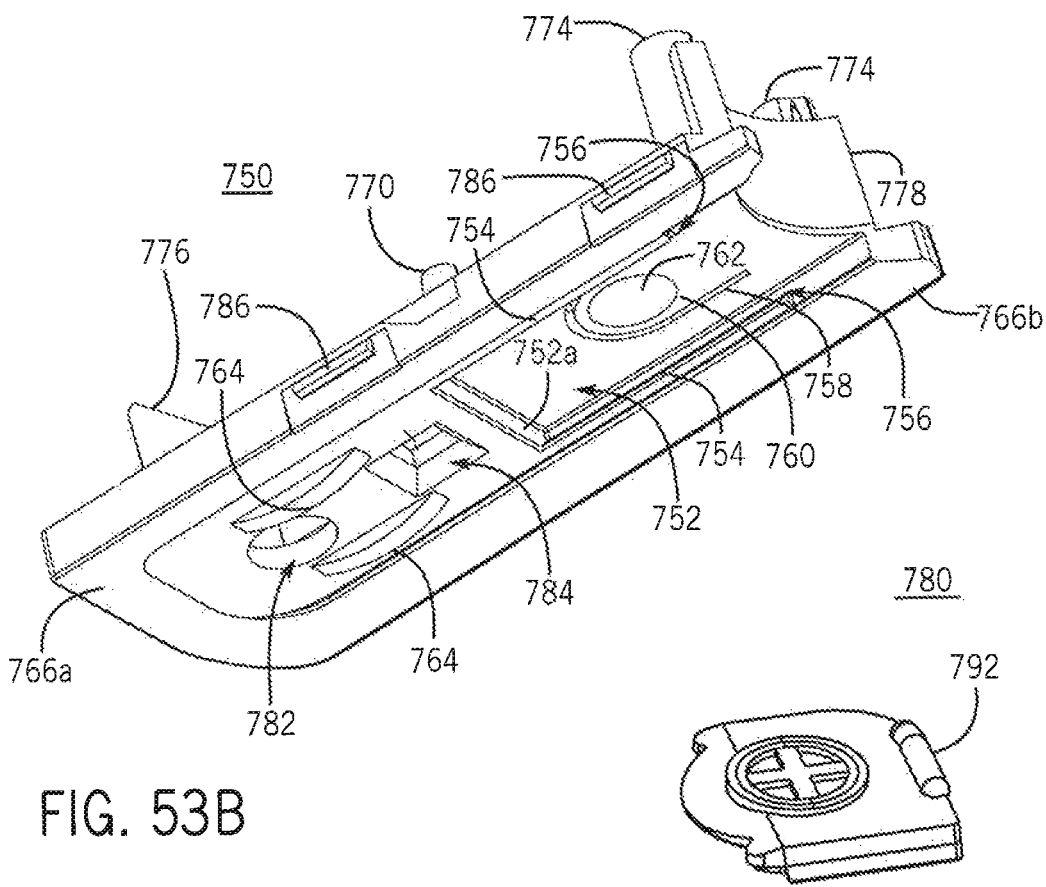

FIGS. 53A and 53B illustrate an example base plate 750, formed as an integral molding, for use to attach an attachment body (e.g., the attachment body 704) to an attachment base (e.g., the attachment base 716). As illustrated in FIG. 53B in particular, the base plate 750 includes a recess 752 extending into the attachment base 716 to an end wall 752a. A set of rails 754 on opposite sides of the recess 752 generally define parallel grooves 756, and a cut-out 758 defines a locking finger 760 with a central boss 762 having generally complimentary geometry to the recess 730 on the tongue 724 of the attachment base 716 (see, e.g., FIG. 51A). Accordingly, as also discussed below, the recess 752 can generally receive the tongue 724 to secure the attachment base 716 to the base plate 750, with the rails formed by the shoulder 732 of the tongue 724 (see, e.g., FIG. 51A) being slidingly received within the grooves 756. Further, with the shoulder 732 fully received within the grooves 756 and with the shoulders 726 on the attachment base 716 urged against the end wall 752a of the recess 752 (see, e.g., FIG. 56), the boss 762 can snap into the recess 730 (see, e.g., FIG. 51A) to lock the base plate 750 in place relative to the attachment base 716.

Also illustrated in FIG. 53B, the base plate 750 can include other features to help align and secure the base plate 750 for attachment to the attachment base 716 and the case 702. For example, in the embodiment illustrated, a pair of rounded guides 764 extends outward from the bottom side of the base plate 750, as may be useful for aligning and engaging the base plate 750 with the attachment base 716. Similarly, the bottom side of base plate 750 includes a generally planar flat border portion 766a and a curved border portion 766b. In some embodiments, the flat and curved border portions 766a, 766b (or other portions of the bottom of a base plate) can be configured to be generally complimentary to the geometry of a particular case (e.g., the case 702).

To support and secure different components of the aimer accessory 700 (e.g., one or more optical devices) relative to the base plate 750, the top side of the base plate 750 includes a number of support and engagement features. As illustrated in particular in FIG. 53A, for example, a set of hooks 768, a number of posts 770, 772, 774, and a pair of support wedges 776 can be integrally formed with (or otherwise connected to) the base plate 750. In some embodiments, features such as a curved containment wall 778 can serve to wholly or partly subdivide the interior of the attachment body 704 into different compartments. For example, in combination with the shell 706 (see FIG. 1) and a battery door 780 (see FIG. 54), the containment wall 778 can form an on-board battery compartment for the aimer accessory 700.

Other portions of a base plate for an attachment body can also include useful features. For example, each of the lateral sides of the base plate 750 includes a set of wedged protrusions 786 that can help to secure the shell 706 (see, e.g., FIG. 1) to the base plate 750. In some embodiments, the protrusions 786 can be configured for relatively secure snap-engagement with corresponding features on the interior of the shell 706.

As also discussed above, it may be useful to capture images through optical openings in an aimer accessory, as well as to exchange optical communication signals with an attached mobile device. To this end, for example, the base plate 750 includes a pair of optical openings 782, 784. In the example configuration discussed below, the opening 782 is configured as an imaging opening and the opening 784 is configured as a communication opening for transmission of optical communications. Communication and imaging via the openings 782, 784 is also discussed below.

In other embodiments, other configurations are possible. In some embodiments, a base plate can include a different number or arrangement of optical openings. For example, a base plate for use with the aimer accessory 700 can include multiple optical openings for transmission of optical communication (i.e., multiple communication openings), or can include only a single optical opening for both communication transmissions and imaging.

In some embodiments, a bottom portion of a base plate can be configured to engage with any variety of attachment bases, or to match the geometry of any variety of mobile-device cases. In some embodiments, alternative (or additional) locking devices can be used. For example, the boss 762 of the base plate 750 can be instead configured as a recess sized to engage a corresponding protrusion on an associated attachment base.

Figure 52B:
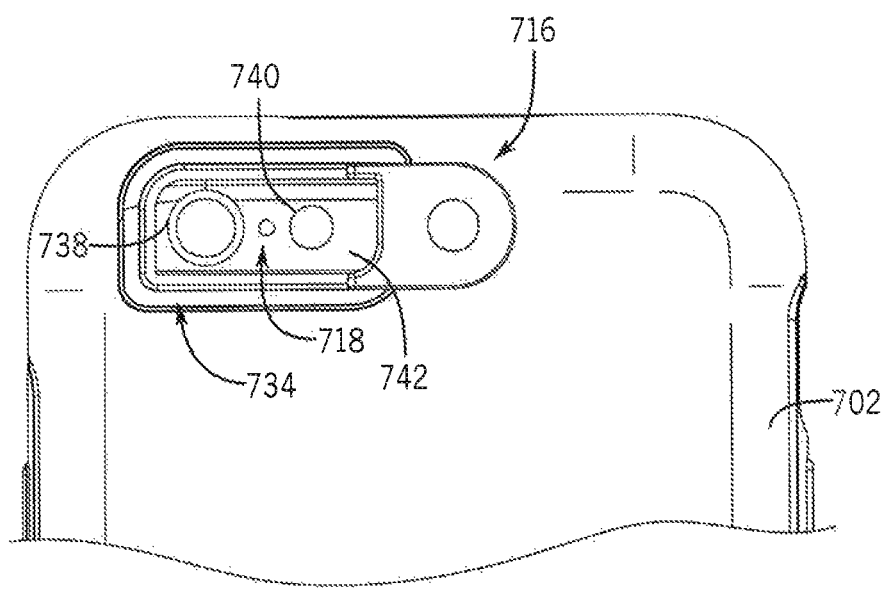
Figure 55:
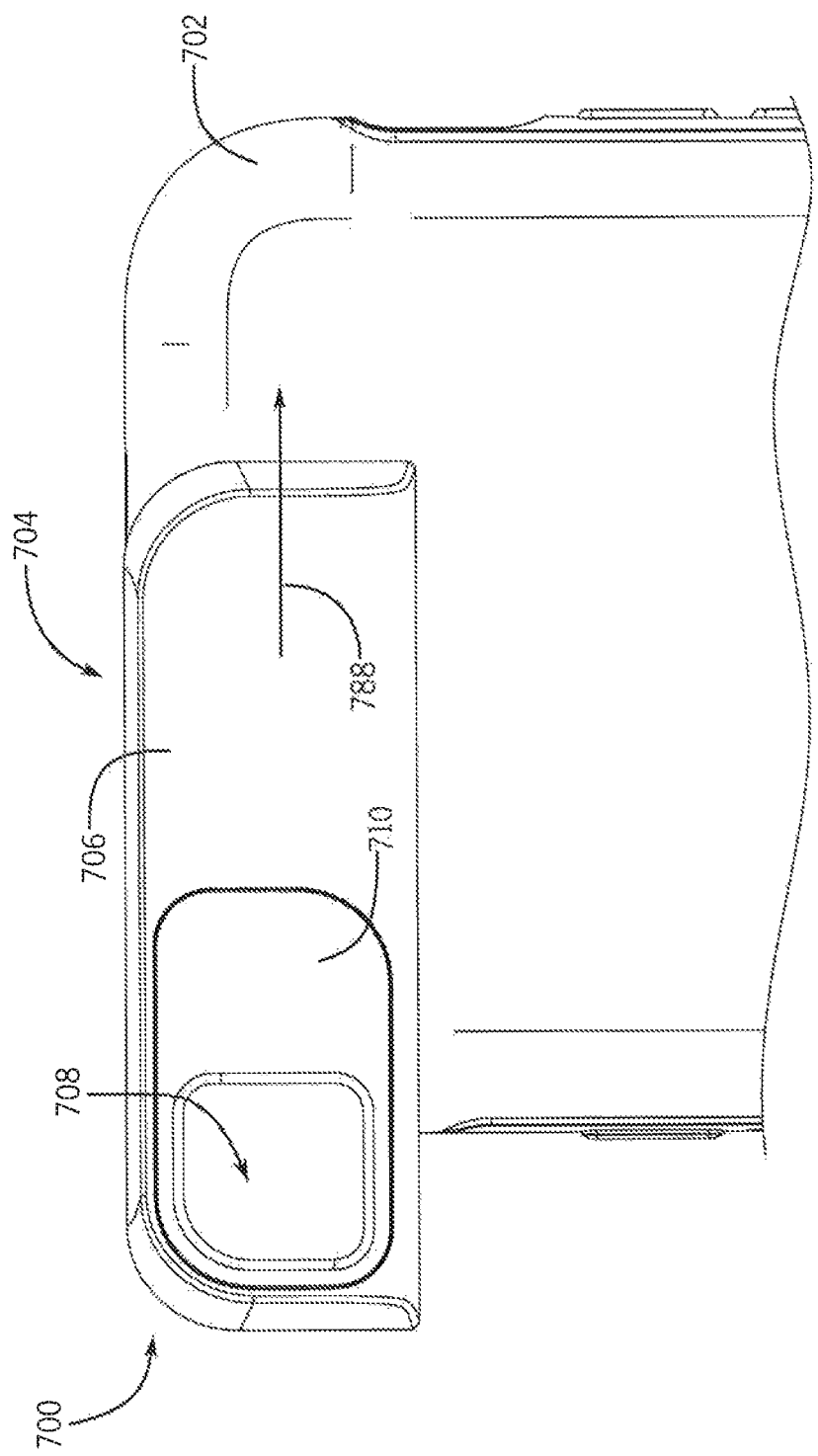
FIG. 55 is a rear elevation view of a method of attaching the attachment of FIG. 50 to the case of FIG. 50.

As illustrated in FIG. 55, with the shell 706 attached to the base plate 750, the attachment body 704 can be positioned next to the case 702, in lateral alignment with the attachment base 716 (see, e.g., FIG. 52B). The attachment body 704 can then be slid, as indicated by arrow 788, into the attached configuration of FIGS. 56 and 57. The case 702 and the mobile device 742 are not illustrated in FIG. 56 to better show certain features of the assembled attachment body 704 and attachment base 716.

Figure 56:
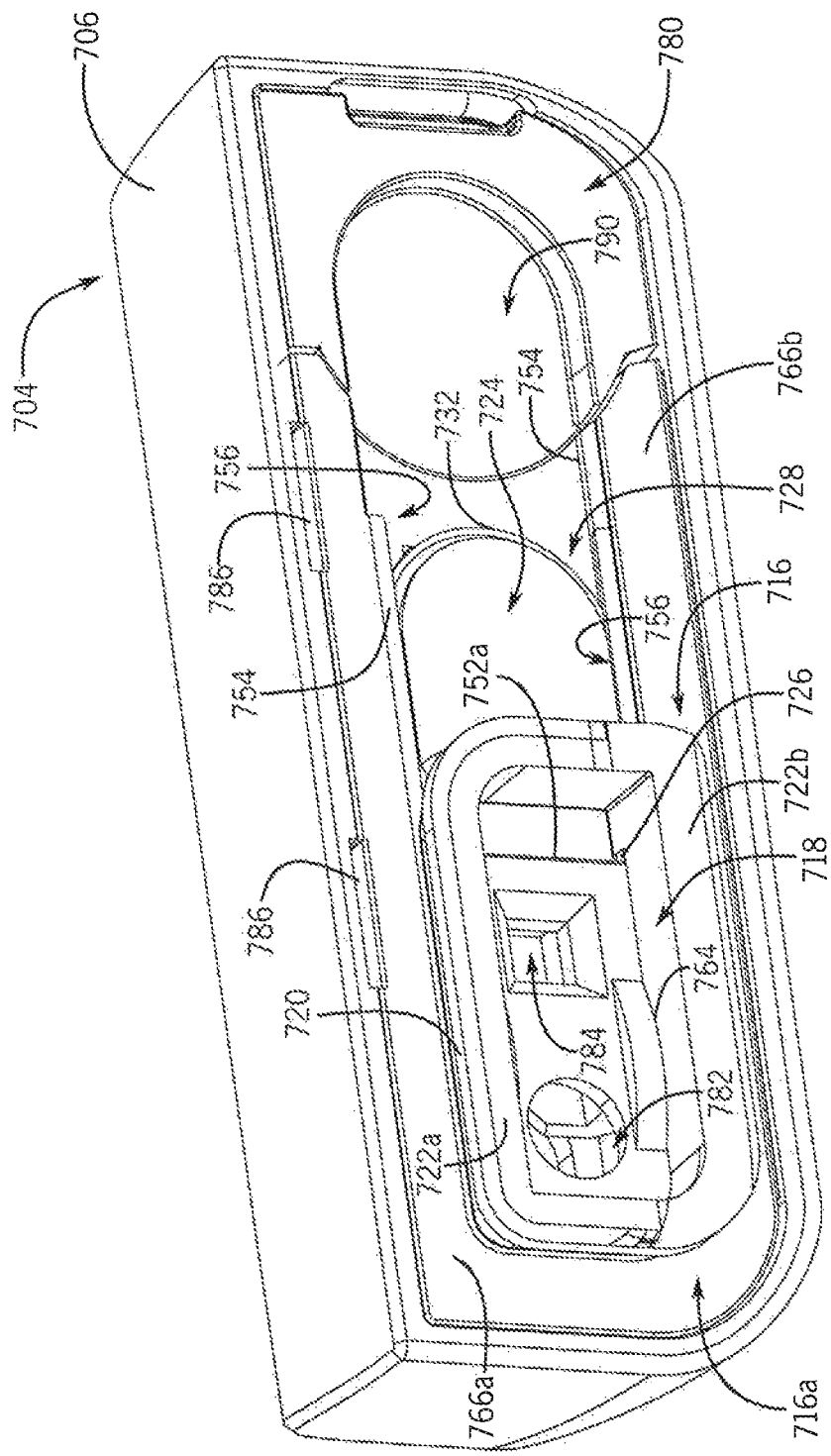
FIGS. 56 and 57 are perspective and cross-sectional views, respectively, of the base plate and battery door of FIGS. 53A through 54 secured to a shell of the attachment of FIG. 50.

As illustrated in particular in FIG. 56, the battery door 780 includes a recess 790 that is generally complimentary to the rounded end 728 of the tongue 724 of the attachment base 716. Further, with the battery door 780 snap-engaged (or otherwise secured) to the base plate 750, the recess 790 on the battery door 780 is generally aligned with the recess 752 in the base plate 750. Accordingly, during installation of the attachment body 704 onto the case 702, the tongue 724 can be aligned with and seated within the recess 790 in order to dispose the shoulder 732 of the tongue 724 for sliding engagement with the grooves 756 of the base plate 750.

As also illustrated in FIG. 56, with the base plate 750 secured to the attachment base 716, the guides 764 on the base plate 750 are disposed against opposite internal walls of the optical opening 718 in the attachment base 716. This can assist in proper alignment of the attachment base 716 during installation, as well as provide additional stability for the attachment base 716 once it is secured in place.

Further, with the base plate 750 secured to the attachment base 716, the imaging opening 782 and the communication opening 784 of the base plate 750 are disposed generally within the optical opening 718 of the attachment base 716. Accordingly, for example, light source 740 of the mobile device 742 (see, e.g., FIG. 52B) can provide optical signals through the communication opening 784, and the camera 738 of the mobile device 742 both can capture images through the imaging opening 782 and receive optical signals through the communication opening 784. In other embodiments, optical openings on an attachment base (e.g., the imaging opening 782 and the communication opening 784) can be otherwise optically aligned with an optical opening of an attachment base (e.g., disposed along a shared optical axis with, but not within, the attachment-base optical opening).

Figure 54:
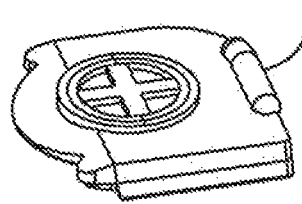
FIG. 54 is a perspective view of a battery door configured to be secured to the base plate of FIGS. 53A and 53B.
Figure 57:
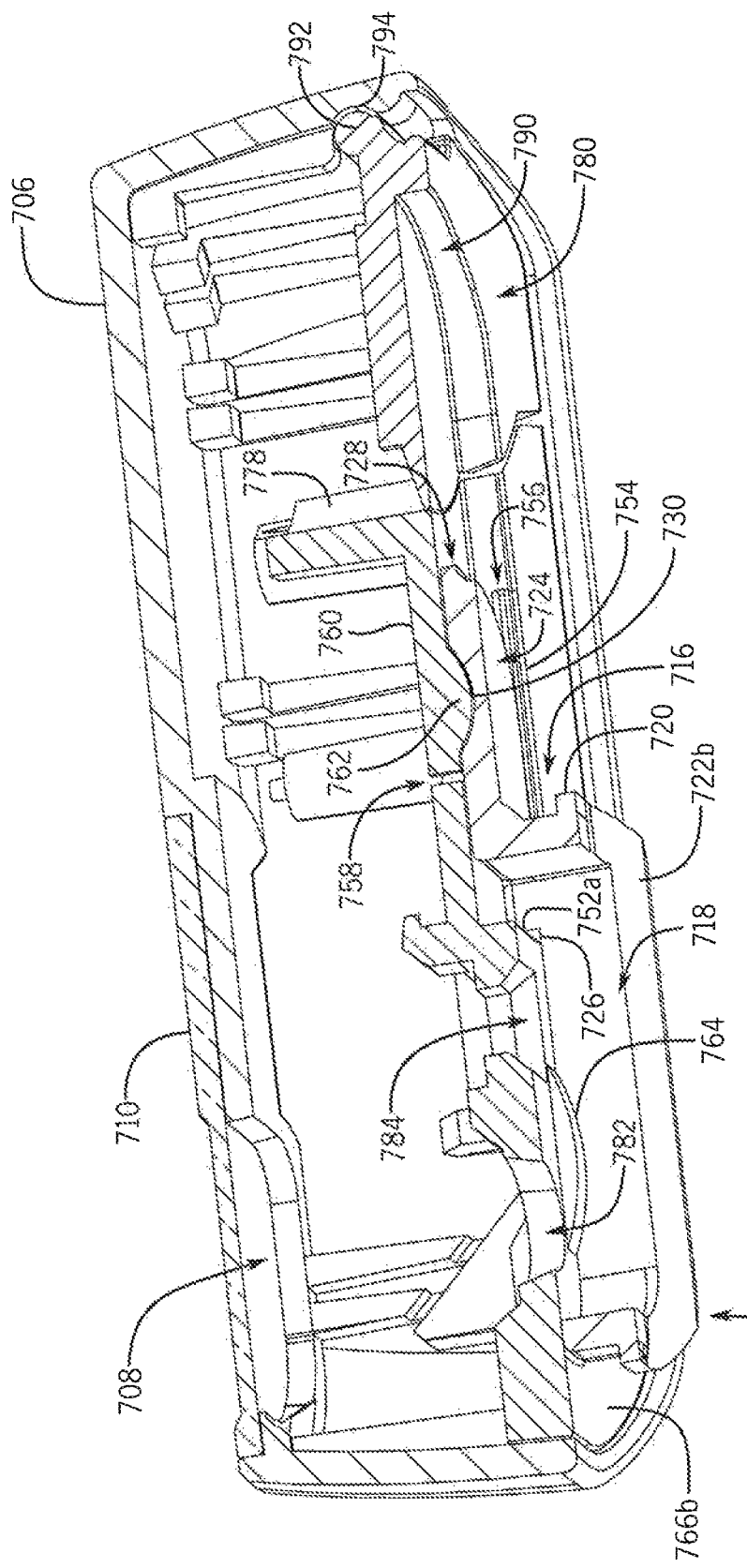

As illustrated in particular in FIGS. 54 and 57, the battery door 780 includes a rounded ridge 792 at one end. The ridge 792 can be configured to engage (e.g., snap-engage) with a corresponding recess 794 on the interior of the shell 706, in order to further secure the case 702 to the base plate 750.

FIGS. 56 and 57 illustrate certain structural aspects of the assembly of the shell 706, the base plate 750, and the attachment base 716, but do not illustrate a particular set of components that can be housed by the shell 706 and the attachment body 704 generally. Depending on the desired use of the aimer accessory 700, different optical devices and other components, and different arrangements thereof, can be disposed within the attachment body 704. In some embodiments, the aimer accessory 700 may include components that do not necessarily relate to aiming (or targeting) operations.

Figure 58:
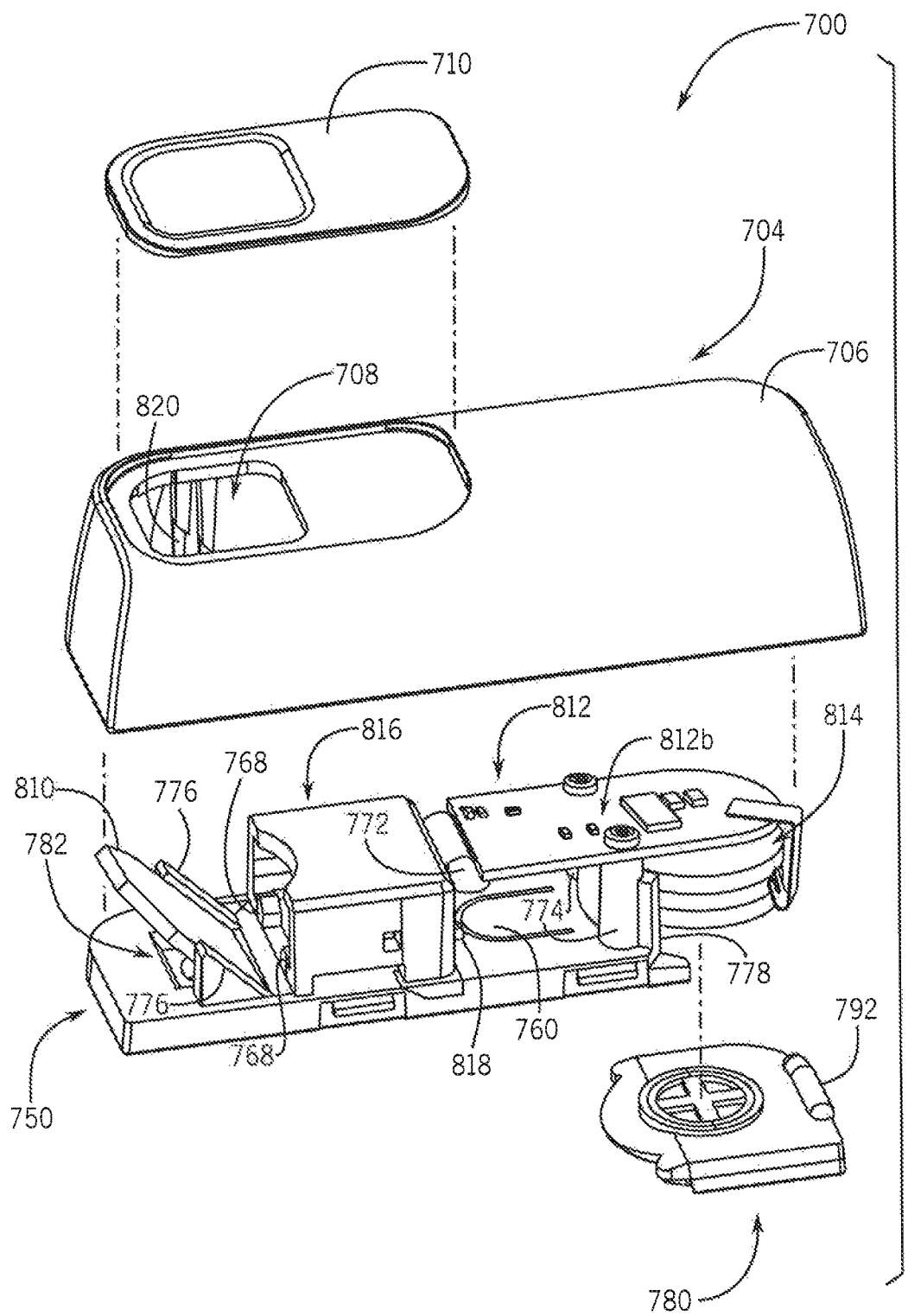
FIG. 58 is an exploded perspective view illustrating certain internal components of the attachment of FIG. 50.
Figure 59:
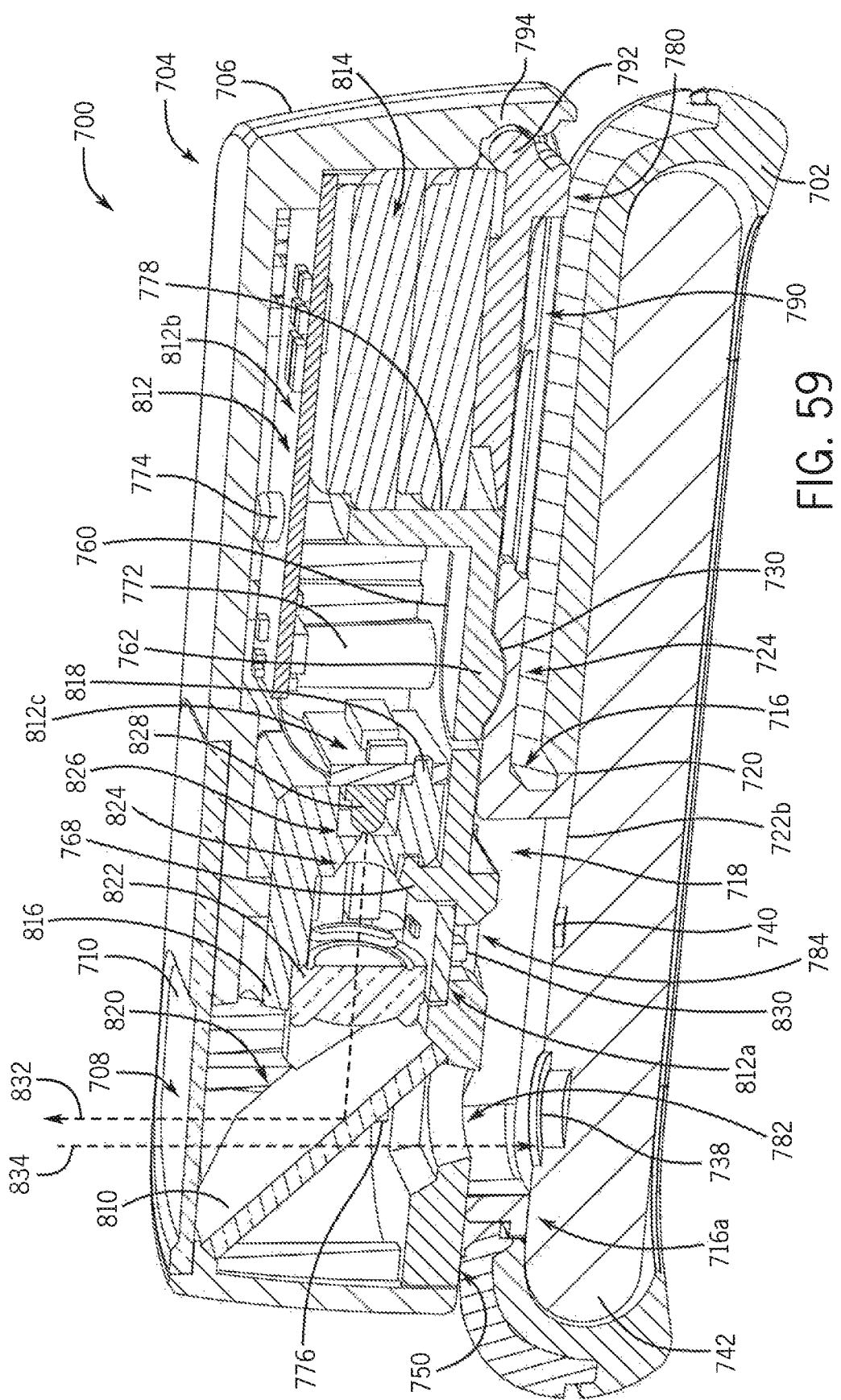
FIG. 59 is a cross-sectional perspective view of the attachment, the case, and the mobile device of FIG. 50.
Figure 60A:
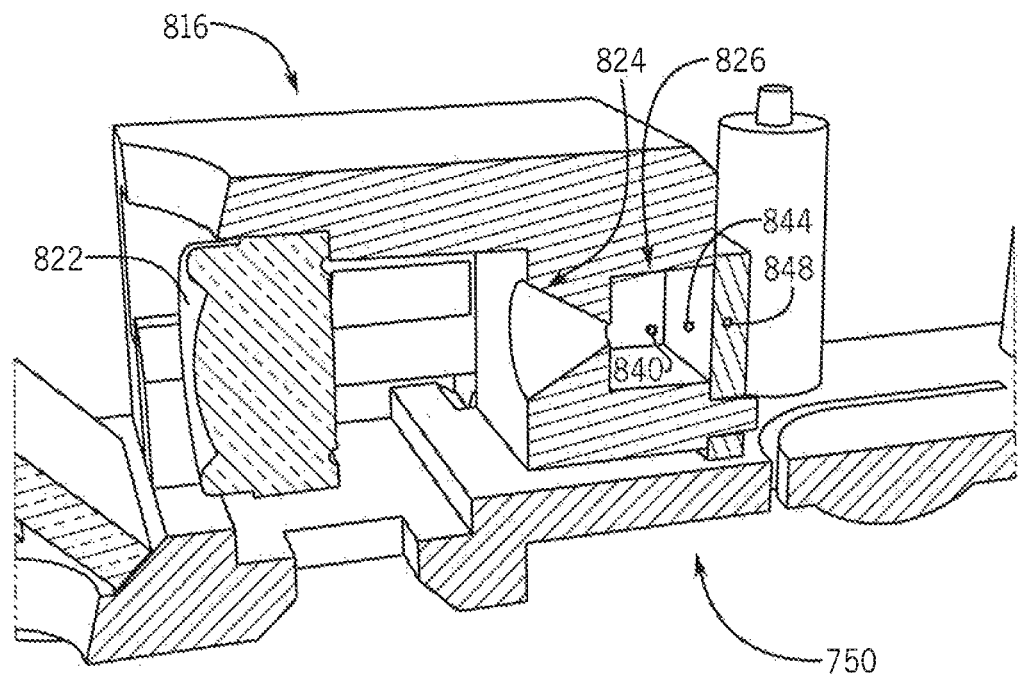
FIG. 60A is a cross-sectional perspective view of part of the attachment of FIG. 50, illustrating configuration options for a light source of the attachment.
Figures 60B, 60C, 60D:
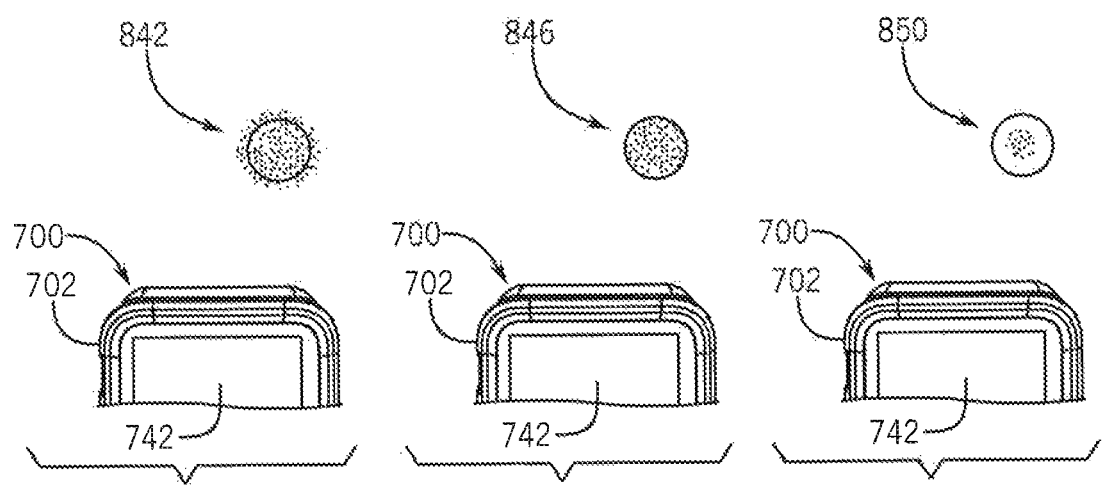
FIGS. 60B through 60D are front perspective views illustrating illumination patterns resulting from the configuration options of FIG. 60A.

An example set of components for the aimer accessory 700 is illustrated in FIGS. 58 and 59. Generally, in the embodiment illustrated, the attachment body 704 is configured to include a dichroic mirror 810, a PCB assembly 812 (e.g., multiple PCBs 812*a*, 812*b*, 812*c*, connected by ribbon cables), a battery pack 814 to power the PCB assembly 812, and an optical assembly supported by an optics block 816. The PCB assembly 812 can be mounted to the posts 772, 774, at the PCB 812*b*, as well as to mounting posts 818 on the optics block 816, at the PCB 812*c* (see FIG. 59, only one of the posts 818 shown). In turn, the optics block 816 can be secured to the base plate 750 using the posts 770 (see FIG. 53A) and the hooks 768. The battery pack 814 can be contained by the containment wall 778 and the battery door 780. The dichroic mirror 810 can be secured in place in optical alignment with the imaging opening 782 by both the support wedge 776 of the base plate 750 and a set of grooves 820 within the shell 706.

As illustrated in FIG. 59 in particular, the optics block 816 is configured to support a lens 822 so that a primary optical axis of the lens 822 is aligned at an angle (e.g., 45 degrees) relative to the dichroic mirror 810. Further, the optics block 816 includes a fixed conical aperture 824 and a light-source recess 826. In the embodiment illustrated, the PCB 812*c* of the PCB assembly 812, which supports an LED 828 (e.g., a green LED), is supported by the mounting posts 818 so that the LED 828 is disposed within the light-source recess 826 in general alignment with the conical aperture 824. Accordingly, when the LED 828 is activated (e.g., as powered by the battery pack 814 and controlled by the PCB assembly 812), light from the LED 828 can be projected through the conical aperture 824 and the lens 822 onto the dichroic mirror 810, to be reflected out the optical opening 708 of the shell 706 and onto a target (not shown). This is illustrated in FIG. 59 with an example optical path 832, and can be generally useful for general target illumination as well as for projecting targeting patterns.

Because of the optical properties of the dichroic mirror 810, light from the target that reflects back to the aimer accessory 700 and passes through the optical opening 708 can be received by the camera 738 for imaging via the dichroic mirror 810, the optical opening 734, and the imaging opening 782. This is illustrated in FIG. 59 with an example optical path 834. Of note, light from the LED 828 that travels along the outbound optical path 832 can be reflected from the target into the inbound optical path 834 for imaging by the camera 738.

As also illustrated in FIG. 59 in particular, a part 812a of the PCB assembly 812 is disposed over the communication opening 784 of the base plate 750. Accordingly, a light detector 830 supported by the part 812a of the PCB assembly 812 is disposed to directly receive optical signals from the light sources 740 of the camera. In the embodiment illustrated, the part 812a of the PCB assembly 812 fully occludes the communication opening 784, so that light from the LED 828 generally cannot pass directly from the aimer accessory 700, through the communication opening 784, to the camera 738. In other embodiments, other configurations are possible, including configurations in which light from the LED 828 is permitted to pass through the communication opening 784.

In some embodiments, an optical arrangement for an aimer accessory can include other types of reflectors or filters in place of (or in addition to) a dichroic mirror such as the dichroic mirror 810. Likewise, in some embodiments, the part 812a of the PCB assembly 812 (or another feature) can support a light source distinct from the LED 828 for direct communication with the mobile device 742 via the communication opening 784 and the camera 738. In some embodiments, as also noted above, optical devices (or general structural arrangements) can be included to direct light from the LED 828 through the communication opening 784 for direct communication with the mobile device 742.

In some embodiments, one or more filters or masks (not shown) can be included. For example, filters or masks can be included to allow the LED 828 to provide an aiming pattern generally similar to those discussed above, or various other aiming patterns.

In some embodiments, other power sources can be provided. For example, a larger battery compartment and battery pack can be included, or an aimer accessory can draw power from an external (e.g., separate but attached) battery pack.

In some embodiments, the configuration of the optics block 816 and the relative arrangement of the optics block 816 and the LED 828 (or other light source) can be used to obtain a particular type of illumination pattern with the LED 828. As illustrated in FIGS. 60A through 60D, for example, placement of the LED 828 in a first location 840 can provide a somewhat large and relatively diffuse illumination pattern 842 on a target. If the LED 828 is moved away from the conical aperture 824 to a second location 844, a somewhat smaller and relatively more focused illumination pattern 846 can be provided on the target. If the LED 828 is moved still farther away from the conical aperture 824 to a third location 848, a still smaller and more intense illumination pattern 850 can be provided on the target. Accordingly, a particular location for the LED 828 relative to the optics block 816 can be chosen depending on the desired characteristics of an illumination pattern.

Figure 61:
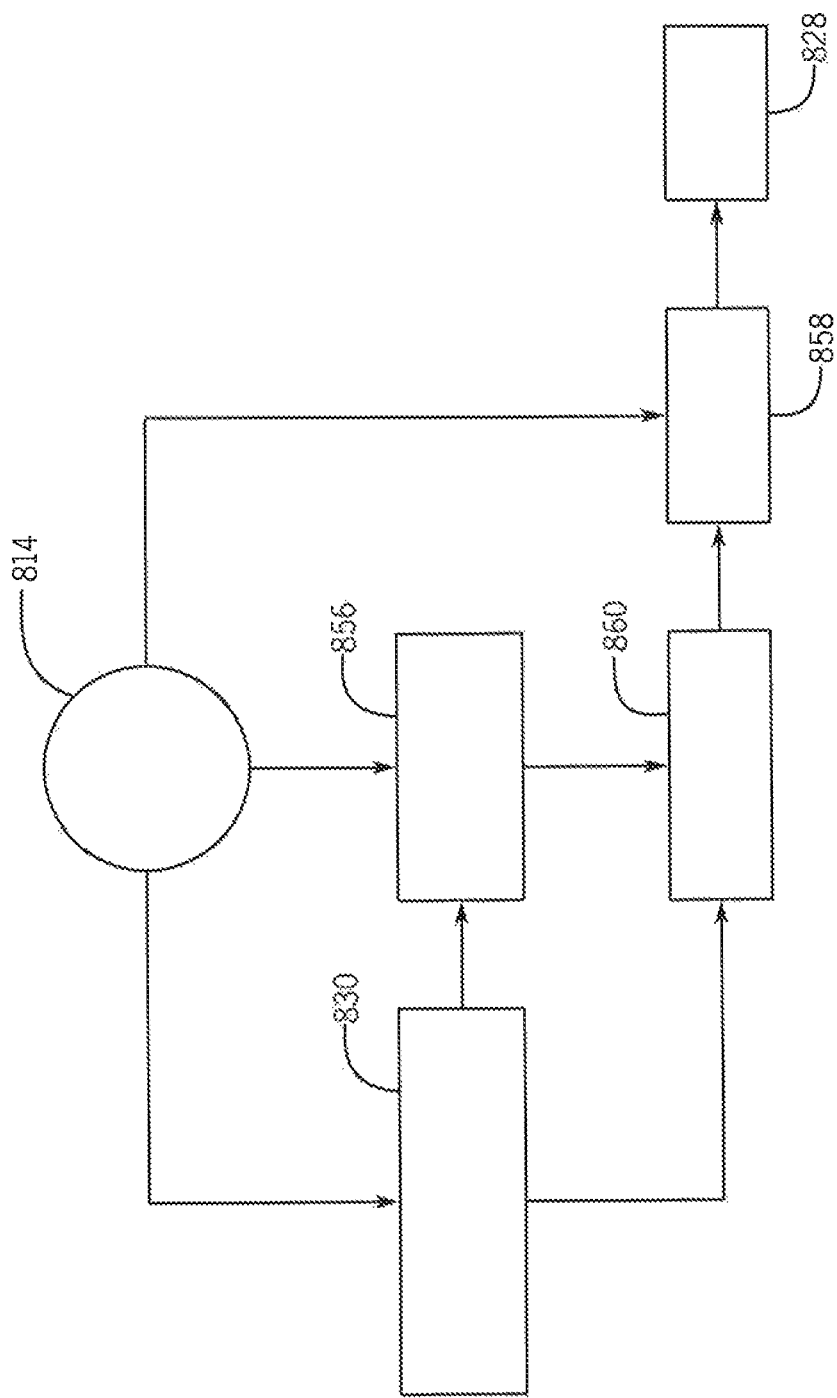
FIG. 61 is a schematic view of a control architecture for the attachment of FIG. 50.

An example control architecture for the PCB assembly 812 is illustrated in FIG. 61. In the embodiment illustrated, the battery pack 814 is arranged to power a low-dropout ("LDO") regulator 856, the light detector 830 (e.g. configured as a photo transistor), and a dedicated controller 858 for the LED 828. A microcontroller 860 powered by the LDO regulator 856 is configured to exchange data, including commands, with the light detector 830 and the LED controller 858. Accordingly, the microcontroller 860 can generally control characteristics (e.g., timing, duration, and intensity) of lighting from the LED 828, including based upon optical signals received at the light detector 830.

In other embodiments, other configurations are possible. For example, an additional LED and an additional LED controller (not shown) can be disposed in communication with the microcontroller 860, or with another processing device. This can be useful, for example, in order to provide a dedicated light source for optical communication with an associated mobile device. Likewise, in some embodiments, other electronic devices can additionally (or alternatively) be included.

Figure 62:
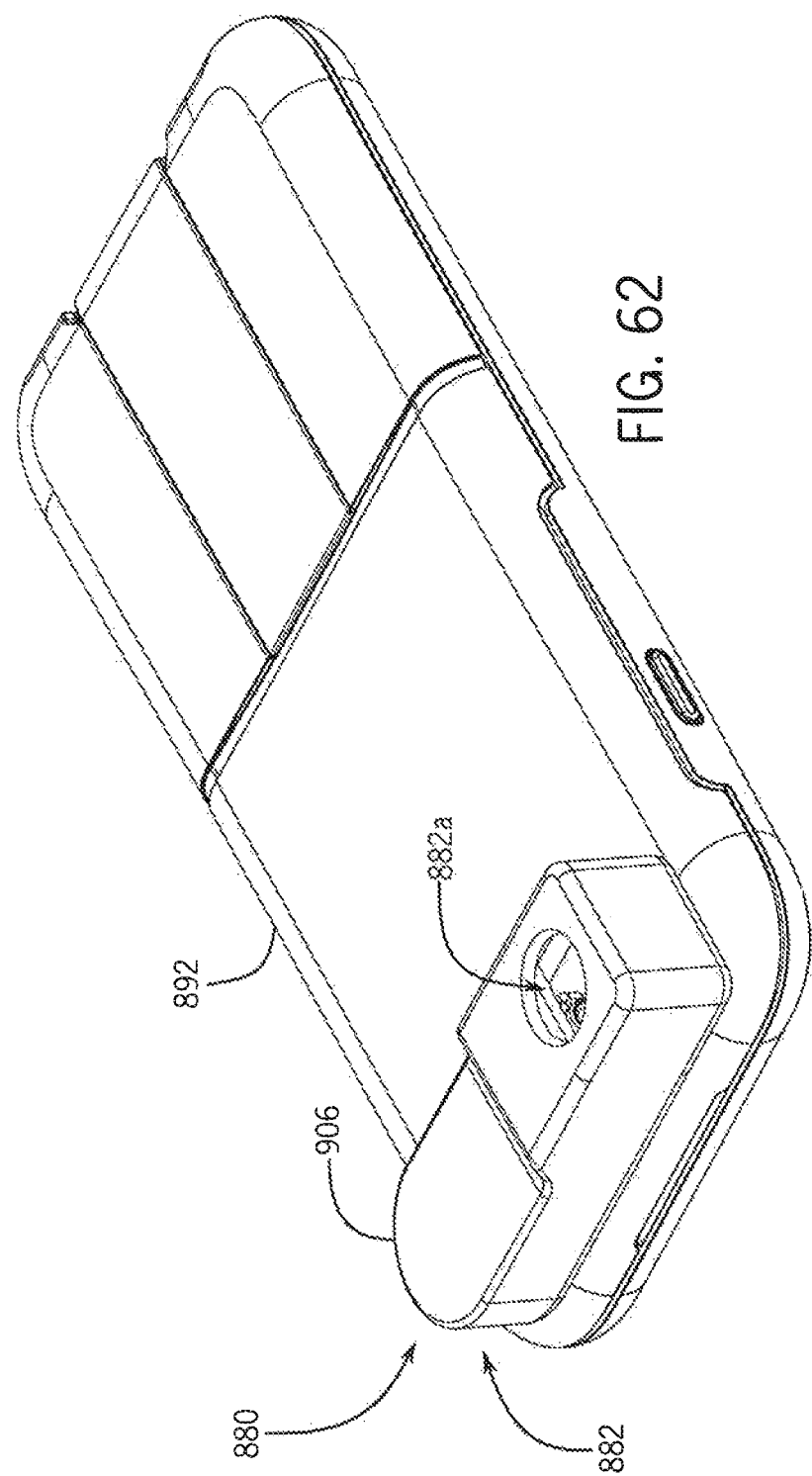
FIG. 62 is a top, rear perspective view of another attachment according to this disclosure, as secured to another case for another mobile device.
Figure 63B:
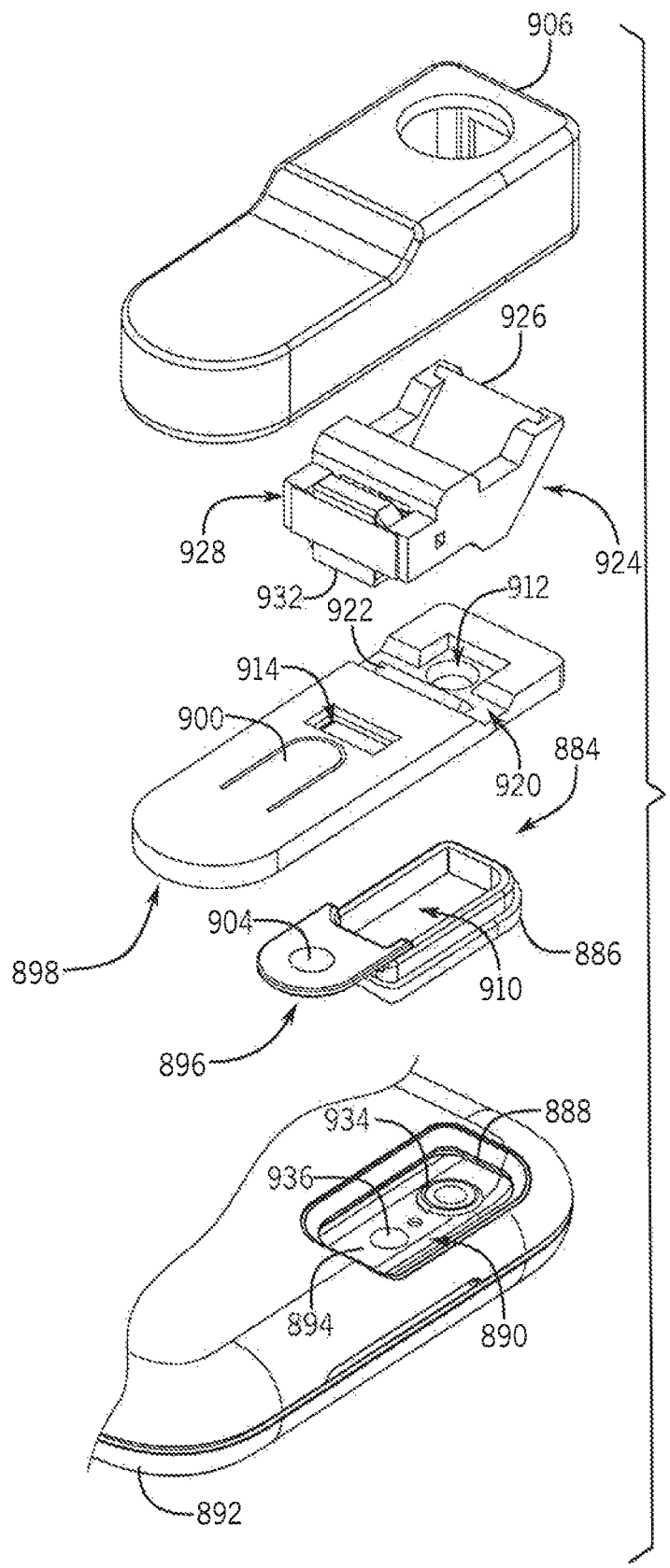
Figure 64:
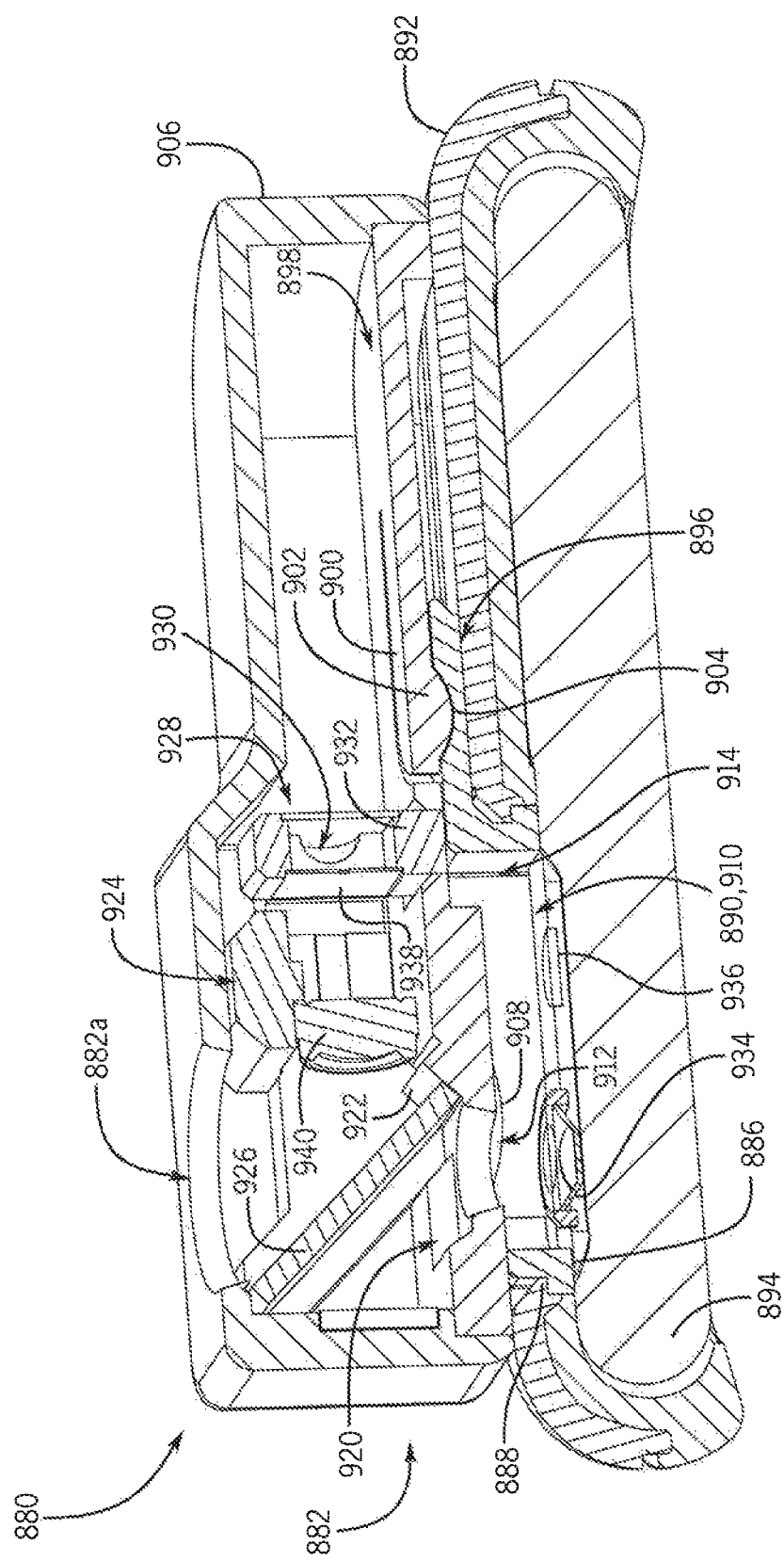
FIG. 64 is a cross-sectional perspective view of the attachment, the case, and the mobile device of FIG. 62.

Another example aimer accessory 880 is illustrated in FIGS. 62 through 64. In various aspects the aimer accessory 880 is similar to the aimer accessory 700. In other aspects, however, some of which are detailed below, the aimer accessory 880 differs from the aimer accessory 700.

Similarly to the aimer accessory 700, the aimer accessory 880 includes an attachment body 882 with an optical opening 882a, and an attachment base 884 (see, e.g., FIGS. 63A and 63B). As illustrated in FIGS. 63A through 64, the attachment base 884 includes an exterior shoulder 886 to engage a corresponding interior shoulder 888 in an optical opening 890 of a case 892 for a mobile device 894. The attachment base 884 also includes a tongue 896 that is disposed outside of the case 892, to engage the attachment body 882, when the attachment base 884 is installed for use (see, e.g., FIG. 64).

The attachment body 882 includes a base plate 898 configured to engage a shell 906, to generally support optical devices and other components, and to slidingly engage the attachment base 884 to secure the attachment body 882 to the mobile-device case 892. Similarly to the base plate 750, the base plate 898 includes a locking finger 900 with a boss 902 configured to engage a corresponding recess 904 on the tongue 896 of the attachment base 884. The base plate 898 also includes a pair of curved guides 908 disposed to engage the interior sides of an optical opening 910 in the attachment base 884.

The base plate 898 further includes an imaging opening 912 and a communication opening 914, which are optically aligned with the optical openings 890, 910, when the base plate 898 is installed for use (see, e.g., FIG. 64). In contrast to the base plate 750, the communication opening 914 is somewhat larger than the communication opening 784. This can be useful, for example, if a light detector and a light source (or other devices) are each to be disposed for optical communication through the communication opening 914.

Support structures on the top of the base plate 898, as well as the optical devices housed by the shell 906, also vary from those of the base plate 750 and the shell 706. For example, as illustrated in FIG. 63B in particular, the base plate 898 includes an angled recess 920 with an elongate support ramp 922. The recess 920 and the support ramp 922 receive and support an optics block configured as an open chassis 924, which in turn supports a dichroic mirror 926, and a PCB assembly 928. Generally, the PCB assembly 928 includes an LED (not shown) that can be disposed in a light-source recess 930 of the chassis 924. In some embodiments, a communication block 932 can also be included.

With the chassis 924 installed on the base plate 898 and the base plate 898 secured to the attachment base 884, the dichroic mirror 926 is optically aligned with the imaging opening 912 on the base plate 898. Accordingly, the aimer accessory 880 can be used similarly to the aimer accessory 700, in order to project an aimer pattern onto an external target (not shown), while also providing an optical path for a camera 934 of the mobile device 894 to image the target. Further, with the aimer accessory 880 appropriately installed, the communication opening 914 and the communications block 932 are optically aligned with the optical opening 910 on the attachment base 884. Accordingly, via the communications block 932, the camera 934 and a mobile-device light source 936, the aimer accessory 880 can directly optically communicate with the mobile device 894.

In other embodiments, other configurations are possible. In some embodiments, for example, the communications block 932 can be a structural block or other member, rather than part of a PCB assembly. As such, for example, with the various components of the aimer accessory 880 arranged as illustrated in FIG. 64, the communications block 932 can fully occlude the communication opening 914 so that optical communication through the communication opening 914 is prevented. The aimer accessory 880 can accordingly, for example, optically communicate with the mobile device 894 by projecting a modulated illumination pattern onto an external target (i.e., via the optical opening 882a) for imaging by the camera 934.

In some embodiments, masks, filters, or other similar devices can be included. In the embodiment illustrated, for example, a pinhole mask 938 is disposed between the light-source recess 930 and a lens 940, in order to provide for projection of an appropriate pattern of light from the LED (not shown) onto an external target.

In the embodiment of FIGS. 62 through 64, the PCB assembly 928 is not fully illustrated, in order to better show certain other aspects of the aimer accessory 880. A variety of PCB configurations, including those similar to the PCB assembly 812, can be used in order to provide the aimer accessory 880 with appropriate capabilities. Likewise, although a battery pack or other power source is not directly illustrated in FIGS. 62 through 64, the aimer accessory 880 can be configured to draw power from a variety of power sources, such as onboard or external battery packs (not shown).

Optical communication between an aimer accessory and a mobile device can be effected in various ways. Generally, for example, it may be useful to transmit data via binary signaling, with modulation of mobile-device and attachment light sources providing bit information, and with one or more controllers implementing appropriate packet architecture, forward error correction, signal decoding, and so on.

In some embodiments, a mobile device can be configured to capture video, or a series of still-frame images, then analyze the resulting image data to identify optical signals. For example, a camera of a mobile device can capture video of a target on which a projected targeting pattern is being modulated, and can then analyze the video to identify a binary-encoded signal from the modulation. In some implementations, the video (or a similar series of still images) can be converted to grayscale and then adjusted to a relatively high level of contrast. The resulting high contrast images can then be compared to a reference image (e.g., a previously-acquired reference image of an illuminated, or non-illuminated, target) to determine the nature of the imaged data (e.g., an illuminated "1", or a non-illuminated "0"). As appropriate, once a certain amount of information has been thus received and/or decoded, a check (e.g., cyclic redundancy check ("CDC") error detecting) can be executed to determine whether the information represents a valid communication signal.

In some embodiments, a light source of a mobile device can be used to establish a timing for optical transmission of data from an aimer accessory to the mobile device. For example, the light source of the mobile device can be cycled on and off rapidly, with a predetermined (e.g., hardware-limited minimum) interval between successive "on" states. Over the interval between the "on" states, the mobile device can capture images of a relevant illumination target (e.g., an imaging target being illuminated by a light source of the aimer accessory). Depending on whether an image that is captured during the interval indicates an "on" state for the light source of the aimer accessory, the mobile device can then register a bit of one type (e.g., a "1") or another (e.g., a "0"). In this way, for example, with appropriate message validation and error correction, relatively reliable optical communication from the aimer accessory to the mobile device can be obtained. The approach noted above, and others like it, may be useful, for example, in embodiments in which the mobile device and the aimer accessory lack a common clock or other timing synchronization.

In some embodiments, a somewhat reversed implementation may alternatively (or additionally) be possible. For example, an aimer accessory can be configured to transmit an "intro" or "prefix" message, a timing message, or other optical message to a mobile device in order to initiate and/or regulate timing for a transmission of optical data from the aimer accessory to the mobile device.

In some implementations, a mobile device can be configured to communicate with an aimer accessory in a relatively direct fashion. For example, when the aimer accessory is set to receive data (e.g., as a default configuration of the aimer accessory) the light source of the mobile device can be modulated (e.g., switched controllably on and off) in order to selectively trigger a light detector of the aimer accessory. An associated controller can receive the trigger signals from the light detector, and can then decode, verify, and act on the signals as appropriate (e.g., to command illumination of a targeting pattern in response to a request from the mobile device).

As also noted above, optical communication between a mobile device and an aimer accessory can be useful in implementing a variety of functions. For example, a mobile device can optically communicate with an aimer accessory to trigger illumination of a target with a targeting pattern. In some implementations, the mobile device can further provide, or otherwise cause an aimer accessory to select and implement, one or more parameters for the illumination, such as light color, timing, intensity, duration, pattern, modulation type (e.g., steady illumination or flashing illumination) and so on. As another example, a mobile device can communicate firmware updates or other useful information to an aimer accessory (e.g., identification information for the mobile device), so that the aimer accessory can be operated with appropriate efficiency and functionality.

In some implementations, an aimer accessory can optically communicate with a mobile device in order to provide information regarding the aimer accessory. For example, when first attached to or paired with a mobile device, or at other times, an aimer accessory can optically communicate identifying information, such as part and serial numbers, and firmware version. Software on the mobile device can then respond appropriately, including by registering the aimer accessory (e.g. locally with the mobile device, or remotely with a registration server), enabling or disabling particular options for controlling the aimer accessory, automatically opening menus or other interfaces, automatically providing a firmware update or reminder to update firmware, and so on. Similarly, an aimer accessory can communicate other information, including alerts with regard to battery life or other factors pertinent to accessory performance.

Battery monitoring to inform alerts relating to battery life can be implemented in various ways. In some implementations, for example, the aimer accessory (or a mobile device) can track how often an LED of the aimer accessory is on. Because operation of an LED can represent a significant portion of power expenditure, total operation time for an LED can serve as (or help to determine) a relatively accurate indicator of battery life for an aimer accessory. In some implementations, a battery monitor can simply detect brown-outs or delays at a relevant controller and can infer a particular battery state from a particular frequency or severity of these events. In some implementations, rather than (or in addition to) communicating battery information to a mobile device, an aimer accessory can include an external battery-life indicator (e.g., an external LED). In some implementations, information relating to battery life can be stored in memory within an aimer accessory, so that appropriately accurate battery-life information can be determined despite changes between different mobile devices or relatively long delays between uses of the aimer accessory.

Figure 65:
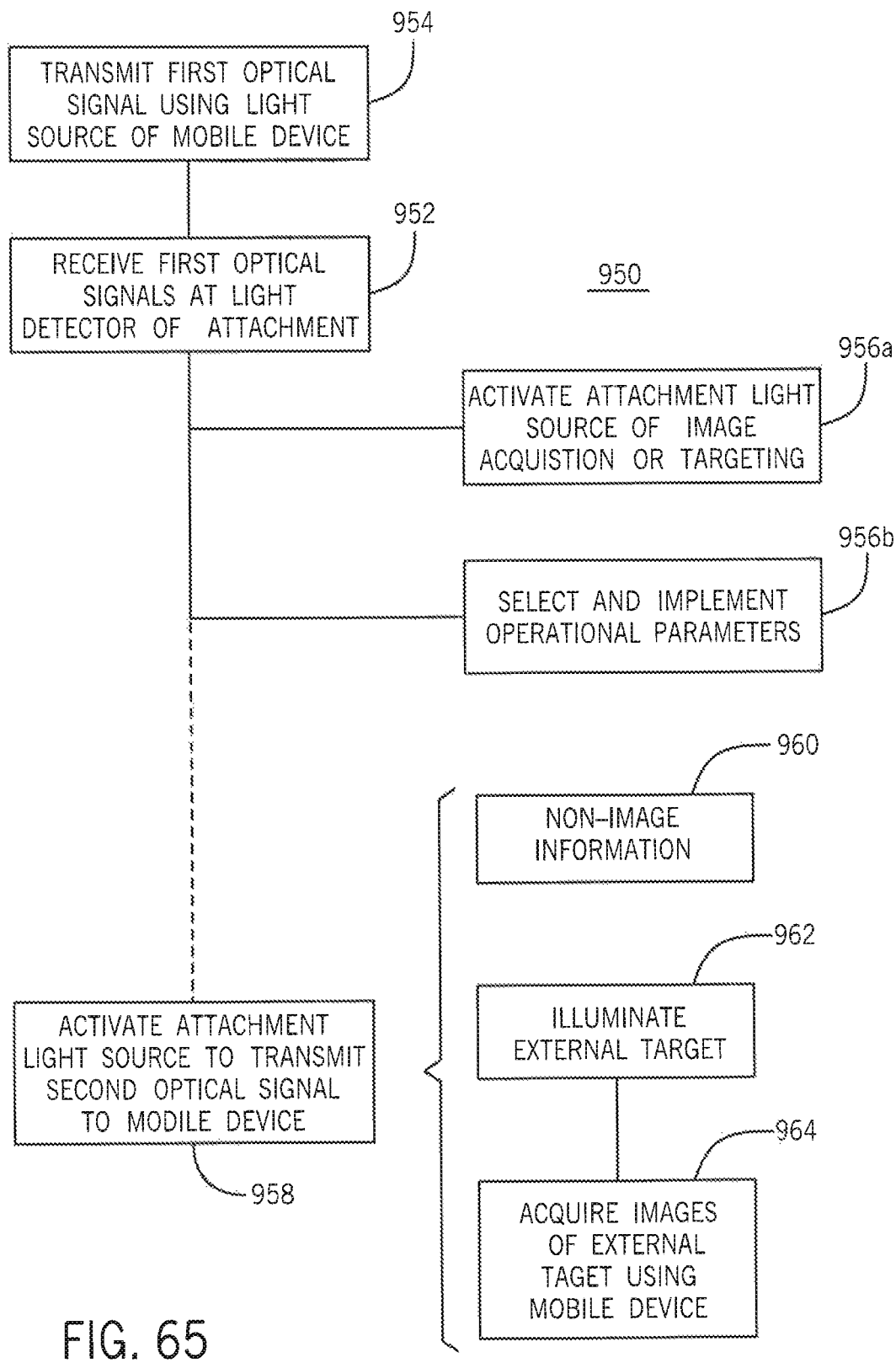
FIG. 65 is a schematic view of a communication and control method according to this disclosure.

Consistent with the discussion above, some embodiments of the invention can include a communication and control method 950 as illustrated in FIG. 65. As illustrated in FIG. 65, the spatial order of operations does not necessarily correlate with the temporal order of the operations during implementation of the method 950. Likewise, connections between operations as illustrated in FIG. 65 (e.g., as may indicate flow of data between software modules) are provided by way of example only. In some implementations, the various illustrated operations (or others) can be interconnected and can otherwise interoperate in various ways.

Generally, under the method 950, first optical signals can be received 952 at a light detector of an attachment for a mobile device. In some implementations, the first optical signals can be transmitted 954 to the attachment by a light source of the mobile device. The transmitted 954 first optical signals can include various information, including instructions for initialization or operation of the attachment. In some implementations, for example, based on receiving the first optical signals, a processing device can activate 956a at least one light source of the attachment for use in image acquisition or targeting (e.g., projection of an illuminated target pattern). In some implementations, based on receiving the first optical signals, a processing device can undertake other operations. For example, the processing device can select and implement 956b particular operational (e.g., illumination) parameters for the attachment, configure the attachment for communication with the particular mobile device, and so on.

Also under the method 950, the processing device can activate 958 the at least one light source of the attachment in order to provide second optical signals to the imaging device. In this way, for example, non-image information 960 such as identification information for the attachment, firmware information for the attachment, power-source status for the attachment, information regarding illumination or other parameters for the attachment, and so on, can be transmitted from the attachment to the mobile device.

In some implementations, the attachment can include at least two light sources. Accordingly, for example, a first light source can be activated 956a for use in image acquisition or targeting, and a second light source can be activated 958 to transmit non-image information 960 to the mobile device. In this regard, for example, activation 958 of a light source for transmission of optical signals to the mobile device can occur independently of, or in coordination with, activation 956a of a light source for image acquisition or targeting or various other operations.

In some implementations, the non-image information 960 can be transmitted to the mobile device by activating 958 an attachment light source to illuminate 962 an external target, then acquiring 964 images of the target with the imaging device of the mobile device. In this way, although the imaging device may acquire one or more images of the target as part of the communication of the non-image information 960, upon decoding the captured images can provide the non-image information 960 in non-image form. For example, the illumination 962 can be modulated on and off in order to encode binary data for transmission to the imaging device in order to transmit identification information, firmware information, power-source (e.g., battery) status, and so on.

In some implementations, communication of the non-image information 960 via the illumination 962 of an external target can proceed without requiring a detailed image of the external target (e.g., an image in which features of the external target can be visually distinguished). Likewise, the external target for the illumination 962 may not necessarily be a target with a symbol or other specific aspect that is intended to be imaged for further analysis. Further, the external target for the illumination 962 may not necessarily be an external target that is remotely disposed relative to the relevant attachment and imaging devices.

Similarly, in some embodiments, a mobile device can be configured to receive the non-image information 960 based on a general determination of luminosity (e.g., rather than based on acquisition of a detailed image). In this regard, for example, a relevant light source can be activated (or deactivated) in accordance with an encoding of non-image information. Based on sensing by an imaging device, a processor (e.g., of a related mobile device) can then determine whether the overall sensed luminosity exceeds a threshold (e.g., indicates a binary "1") or does not exceed a threshold (e.g., indicates a binary "0"), without necessarily needing to acquire an image suitable for other detailed analysis.

Correspondingly, for example, rather than be pointed at a remote target to be imaged, the relevant mobile device and attachment can be placed on a surface, such as a table-top, with an imaging window of the attachment close to or flush with the surface (e.g., with the mobile device "face down," from the perspective of the imaging device). With the mobile device and the attachment thus disposed, communication of non-image information 960 by a light source of the attachment can be commenced. The imaging device can then determine (e.g., based on a luminosity threshold) whether the relevant light source is on or off, even if the imaging device cannot acquire an otherwise useful image of the surface on which the mobile device and attachment are resting (e.g., an image that could be analyzed to decode a barcode or other symbol).

Figure 66:
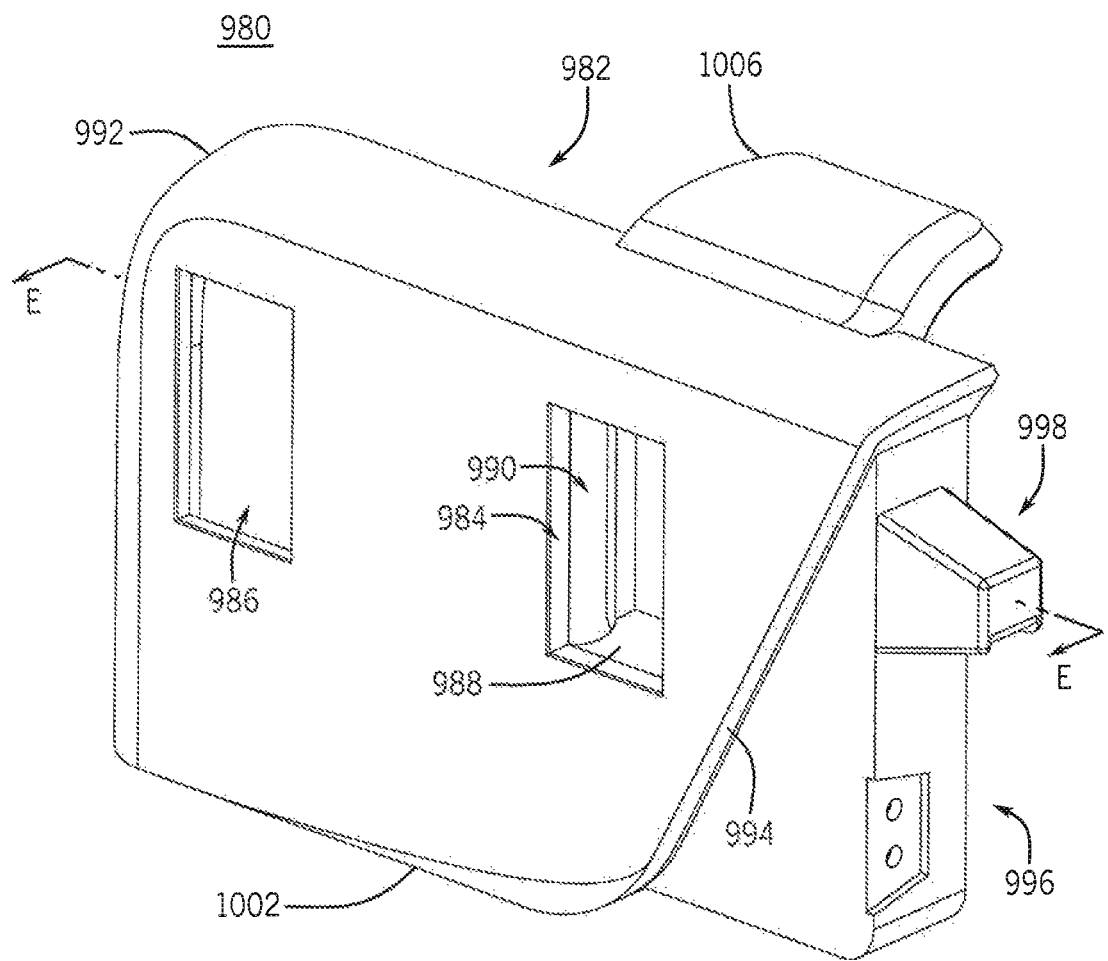
FIG. 66 is a top, rear perspective view of a cover for an attachment according to this disclosure.

In other embodiments, other configurations are possible. For example, FIGS. 66 and 67A illustrate a cover 980 for an attachment assembly that can be used with a variety of sizes of mobile devices. The cover 980 is generally rectangular, with an interior cavity 982 (see FIG. 67A) that includes a rounded corner 982a and an acutely angled corner 982b. A set of windows 984 and 986 provide openings through the cover 980 into the interior cavity 982. Within the interior cavity 982, one of the windows 984 is surrounded by an interior support structure 988 with a side opening 990.

An exterior shell 992 of the cover 980 includes a generally square shoulder 994 that extends at an oblique angle between top and bottom ends of the shell 992. A generally squared attachment portion 996 extends away from the shoulder 994 and supports a latching feature 998. As illustrated in FIGS. 67A and 67B, the latching feature 998 includes an internal hook structure 1000. In other embodiments, other types of latching features can be used.

As illustrated in FIG. 67A in particular, a set of attachment rails 1002 extend partly along the bottom end of the shell 992. The rails 1002 together define an attachment groove 1004 therebetween. In the embodiment illustrated, the groove 1004 includes a closed (or "blind") end 1004a and generally exhibits a dove-tail shape, with a larger width closer to the shell 992. In other embodiments, other configurations are possible.

At the top end of the shell 992, a curved attachment tab 1006 extends upward and rearward. A tooth-like protrusion 1008 extends generally downward near the free end of the tab 1006. As also discussed below, the tab 1006 can help to secure the shell 992 to a mobile device (e.g., via attachment to a mobile-device case). In other embodiments, the tab 1006 can be configured differently, in order to help secure the shell 992 to a variety of different structures.

Figure 68:
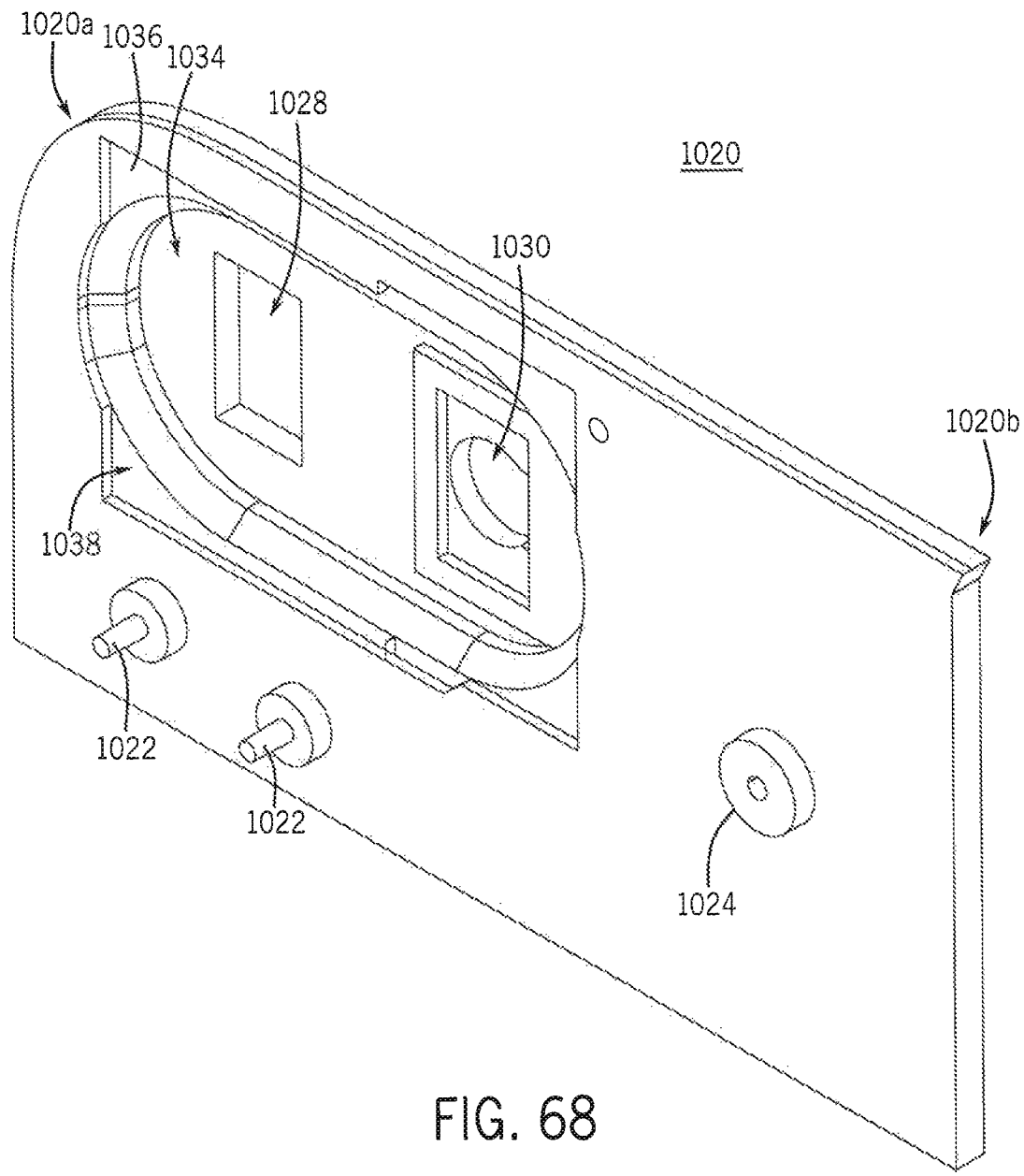
FIG. 68 is a top, rear perspective view of a base for use with the cover of FIG. 66.
Figure 69:
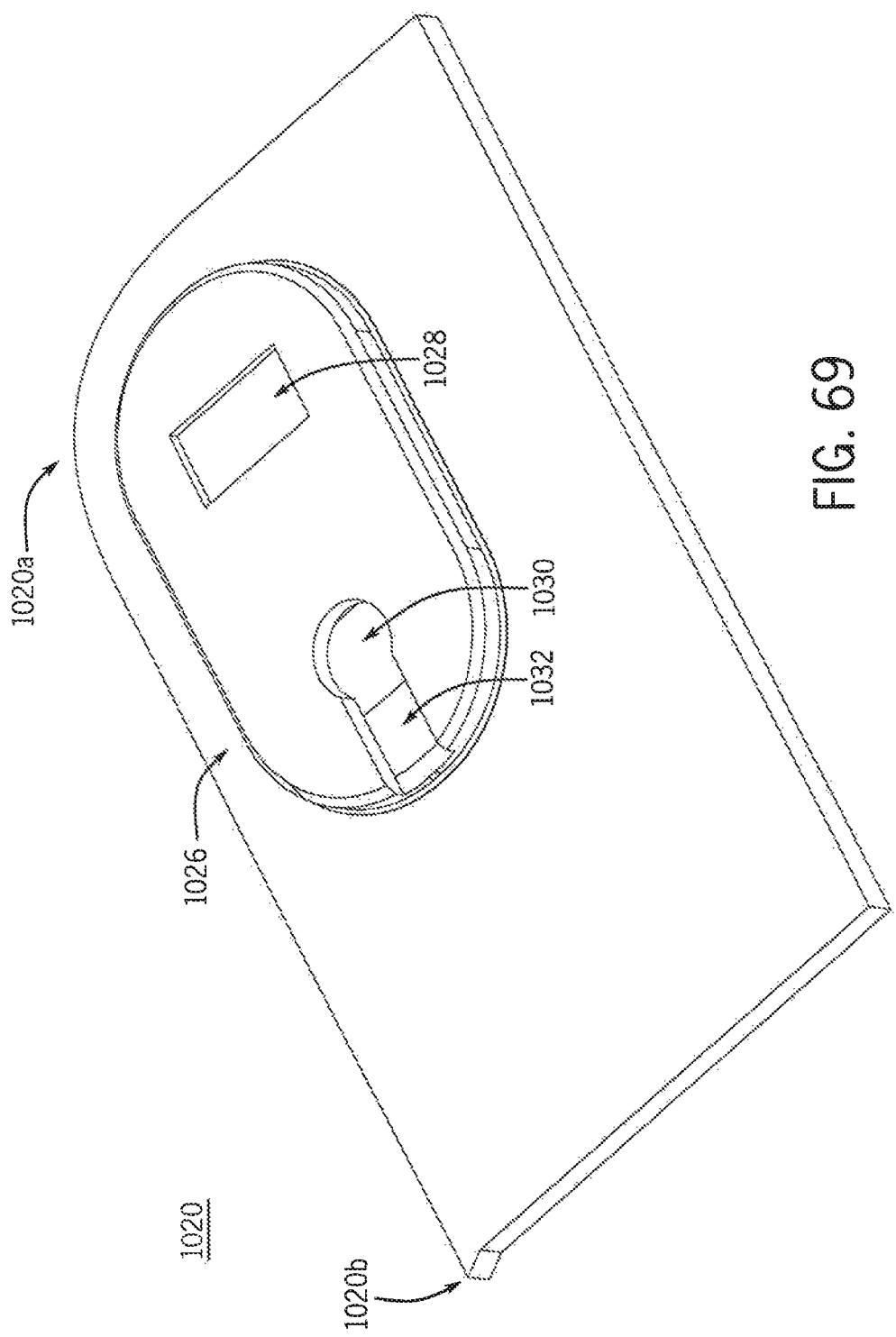
FIG. 69 is a bottom, front perspective view of the base of FIG. 68.

FIGS. 68 and 69 illustrate a base 1020 for use with the cover 980. The base 1020 is also generally rectangular, with a rounded corner 1020a and an acutely angled corner 1020b, both of which are generally congruent, respectively, with the rounded and angled corners 982a and 982b of the interior cavity 982 of the cover 980. Locating features, such as posts 1022 and boss 1024 can be disposed on the base 1020, as appropriate, in order to assist in securing other components (e.g., different electronics) to the base 1020.

Other features can also be included. For example, as illustrated in FIG. 69, the base 1020 includes a rounded protrusion 1026 with a rectangular window 1028 and a keyhole window 1030 aligned with an open-top channel 1032. On an opposite side, as illustrated in FIG. 68, the base 1020 includes a rounded recess 1034, partially surrounded by a shelf 1036 that defines a rectangular recess 1038.

Figure 70:
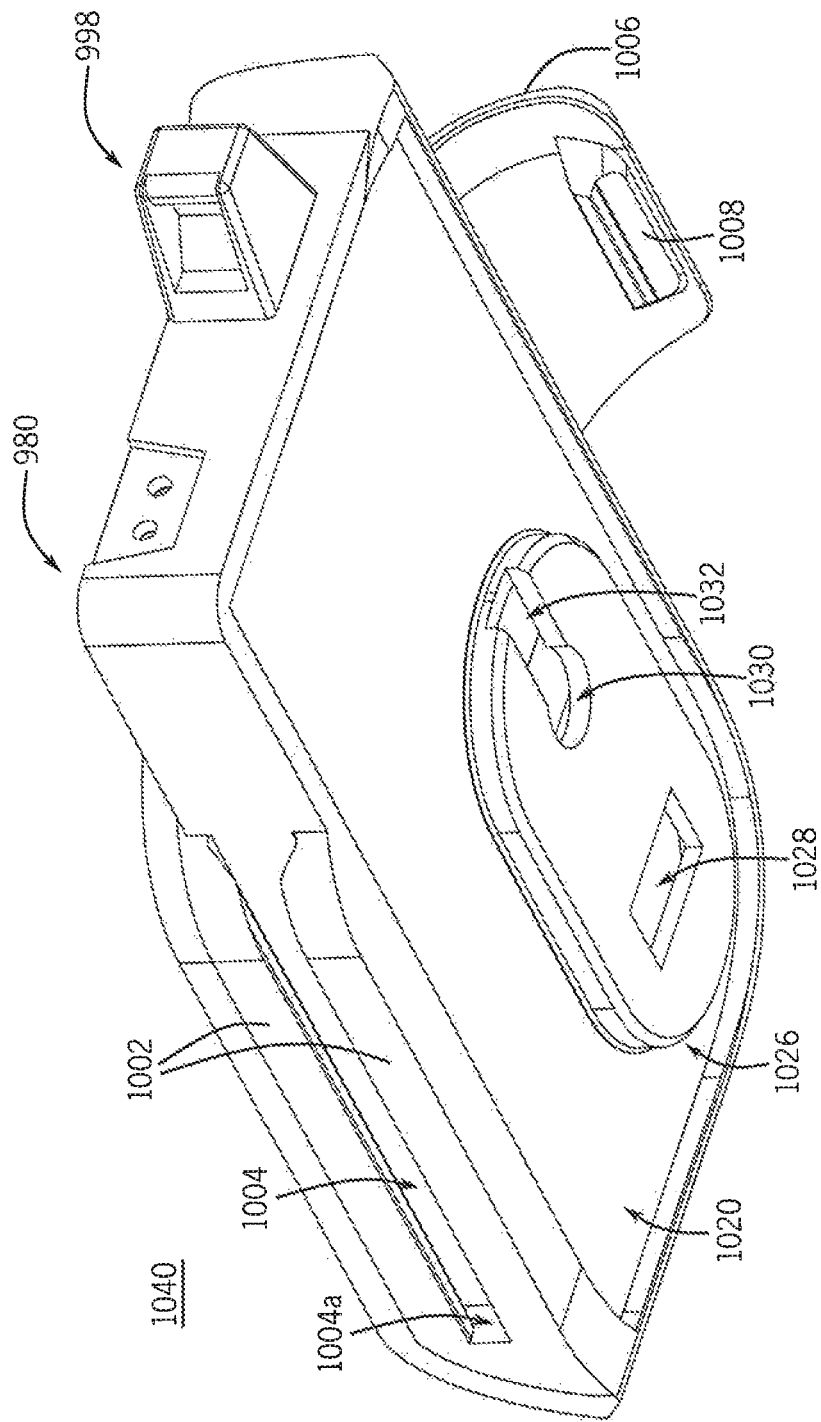
FIG. 70 is a bottom, front perspective view of the base of FIG. 68 assembled with the cover of FIG. 66.

As illustrated in FIG. 70, the cover 980 can be secured to the base 1020 in order to form an attachment body 1040. For example, the rounded and angled corners 1020a and 1020b of the base 1020 can be aligned with the rounded and angled corners 982a and 982b of the interior cavity 982 of the cover 980, respectively, so that the base 1020 can be firmly inserted into engagement of the cover 980 (e.g., with a press-fit connection). As appropriate, the junction between the base 1020 and the cover 980 can be sealed (e.g., welded) in order to secure the base 1020 and the cover 980 together, as well as to protect against leaks (e.g., of water or dust into the attachment body 1040). The attachment body 1040, as with other attachment bodies discussed herein, can accordingly provide a useful case to support and protect optical and other equipment for use with a mobile device.

Figure 71A:
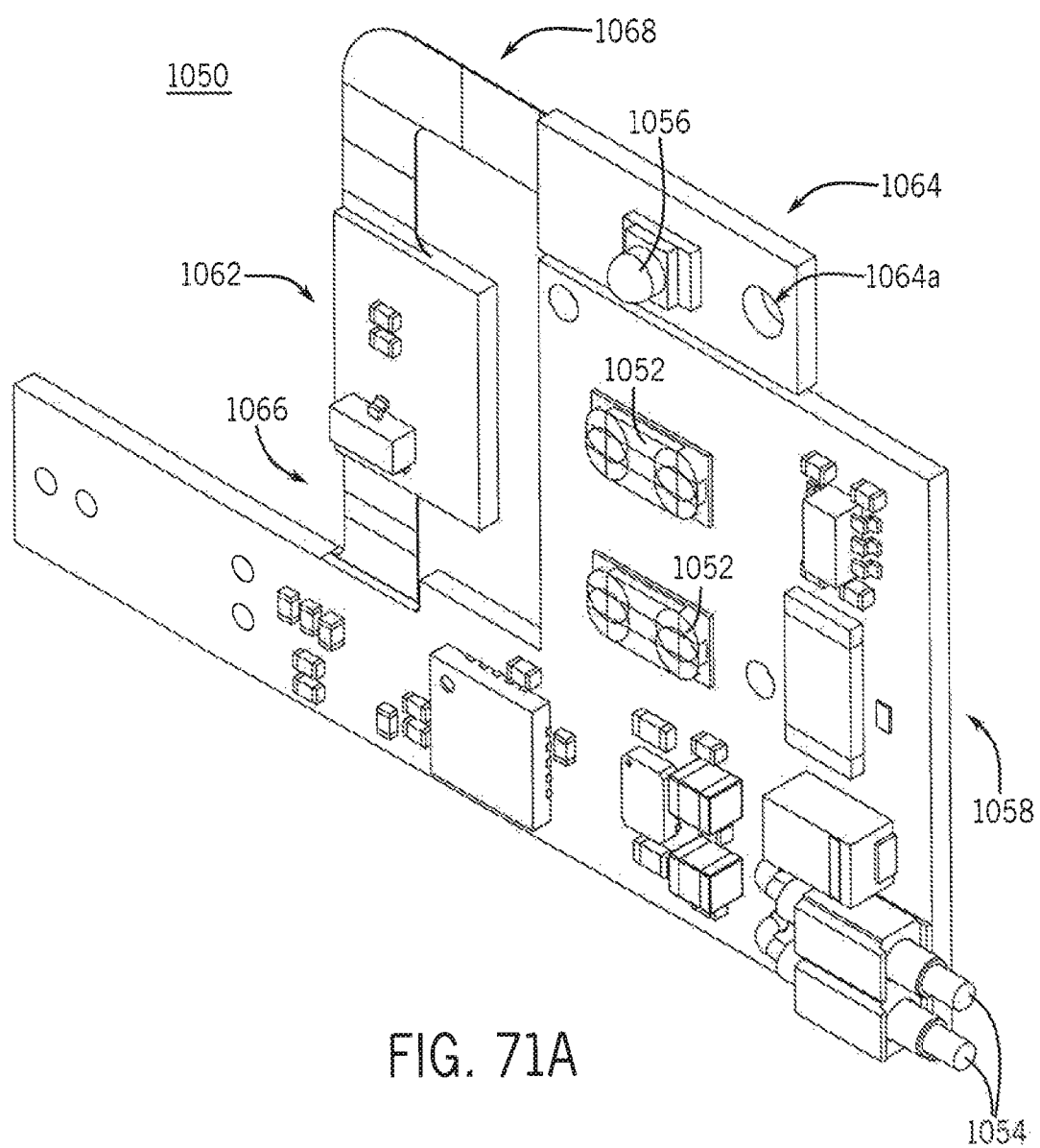
FIG. 71A is a top, rear perspective view of a circuit assembly for the assembly of FIG. 70, in an unfolded configuration.

In different embodiments, different types and configurations of optical and other devices, such as circuit assemblies, can be configured to be contained and supported by the attachment body 1040. In some embodiments, a flexible or partly flexible (e.g., semi-rigid) circuit assembly can be configured for inclusion in the attachment body 1040. For example, a circuit assembly 1050, illustrated in FIG. 71A in an unfolded configuration, can include a variety of electronics, including a set of illumination LEDs 1052, power connectors 1054, an aimer LED 1056, and so on.

Various configurations for the circuit assembly 1050 are possible, depending on the spatial and functional needs of a final assembly. In the embodiment illustrated, for example, the LEDs 1052 and the power connectors 1054 are supported on a main PCB 1058, and an optical sensor 1060 (see FIG. 72) and the aimer LED 1956 are supported on secondary PCBs 1062 and 1064, respectively. The main PCB 1058 is secured to the secondary PCB 1062 by a flexible connector 1066, and the secondary PCBs 1062 and 1064 are connected to each other by a flexible connector 1068.

Figure 71B:
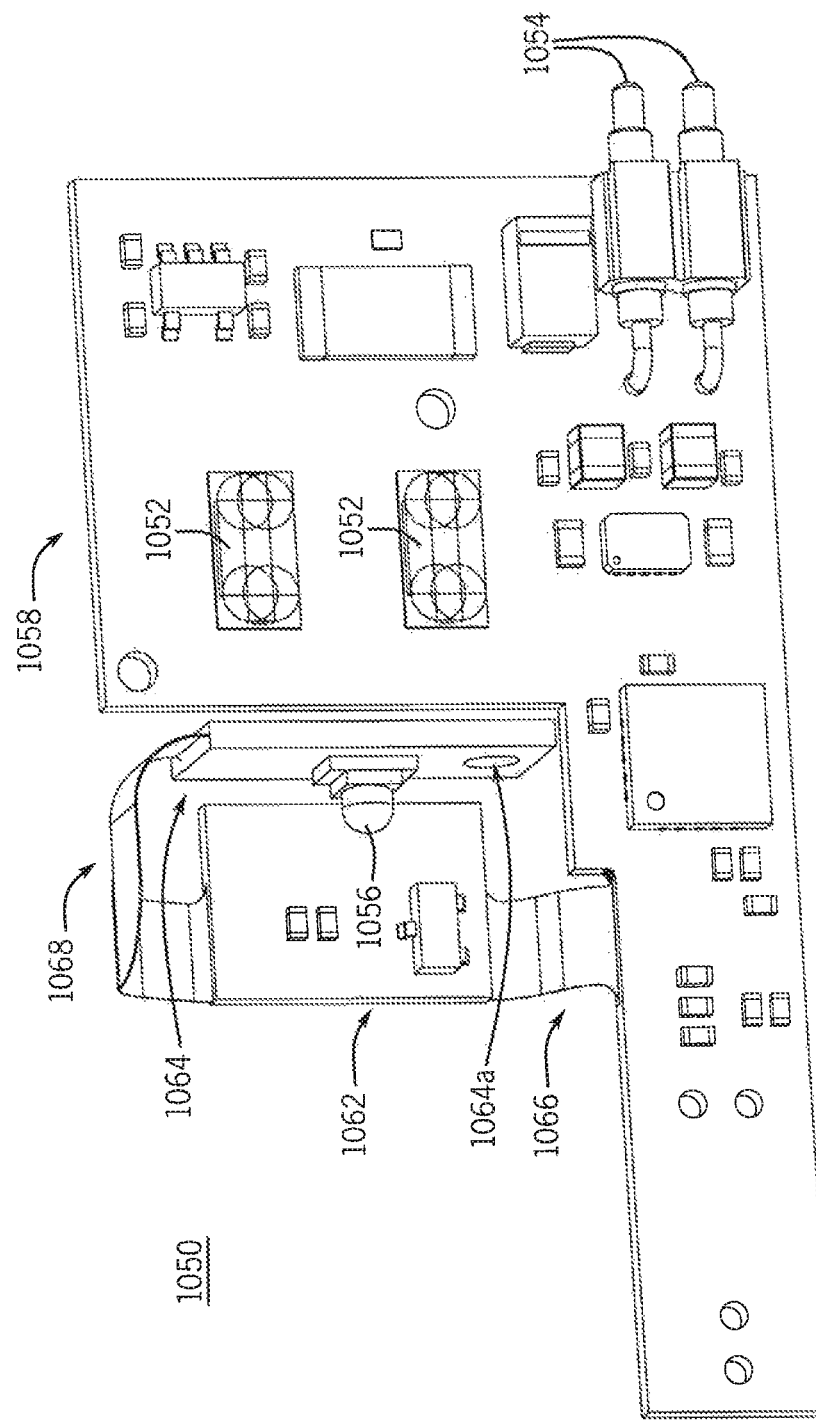
FIG. 71B is a top, rear perspective view of the circuit assembly of FIG. 71A, in a folded configuration.
Figure 72:
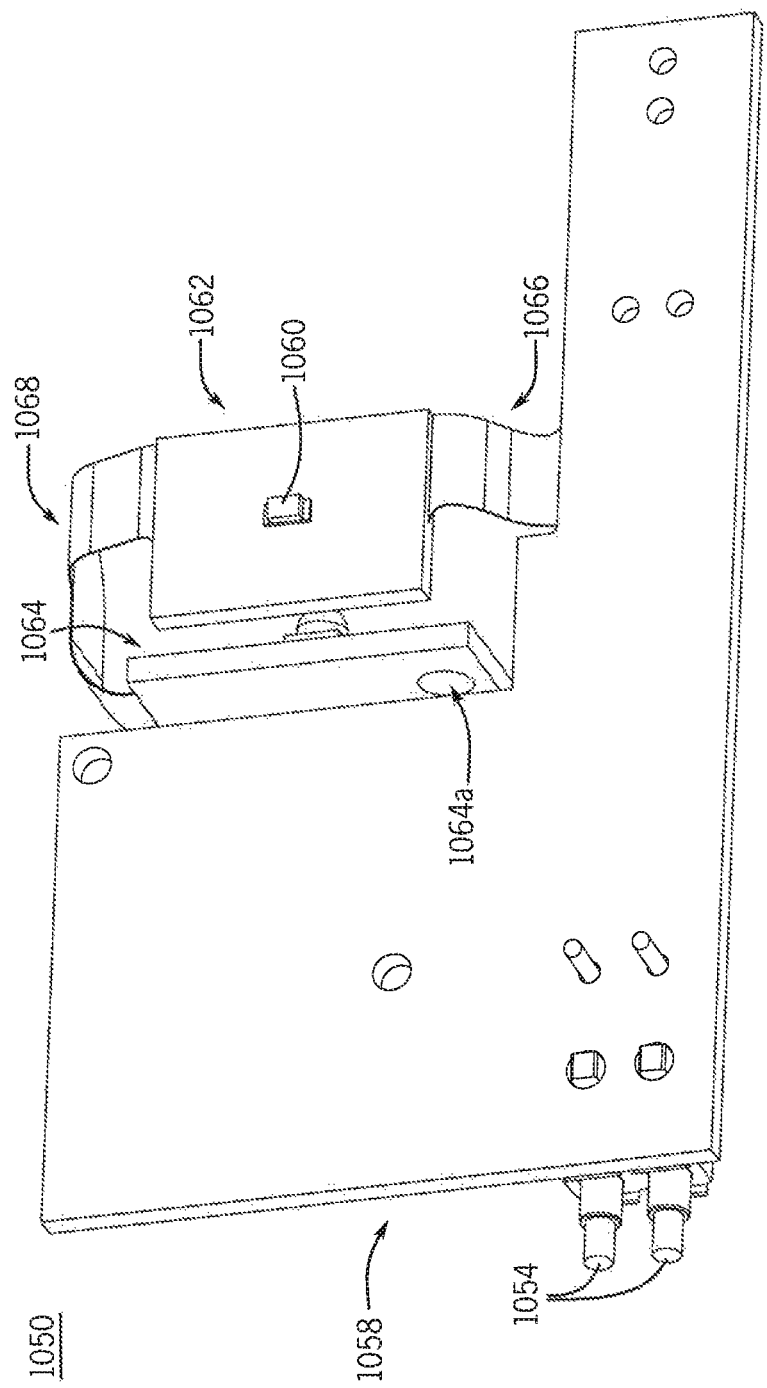
FIG. 72 is a bottom, front perspective view of the circuit assembly of FIG. 71A, in the folded configuration.

As illustrated in FIGS. 71B and 72, when the circuit assembly 1050 is folded for installation, the flexible connector 1066 is bent twice around parallel axes to dispose the PCB 1062 parallel to, but out of plane relative to, the PCB 1058. Likewise, the flexible connector 1068 is bent twice around perpendicular axes to dispose the PCB 1064 perpendicularly to the PCB 1062 and to the PCB 1058. In other embodiments, other configurations are possible.

As illustrated in 71A through 72, the PCB 1058 includes a number of openings (not numbered). In some embodiments, these openings can be aligned with features on the base 1020 (see, e.g., FIG. 68), such as the posts 1022 and the boss 1024, in order to facilitate attaching the PCB 1058 (and the circuit assembly 1050, generally) to the base 1020 (and the attachment body 1040, generally). In other embodiments, other approaches are possible.

Certain features of the PCBs 1058, 1062, and 1064 are not discussed in detail herein. One of skill in the art, however, will recognize the inherent inclusion of various features. For example, it will be understood that one or more of the PCBs 1058, 1062, and 1064 can include one or more processor devices, in order to execute appropriate computer logic (e.g., for illumination control). Further, in some embodiments, communication devices can be included, such as USB, near-field communication, Bluetooth®, or other wired or wireless communication devices. (Bluetooth is a registered trademark of the Bluetooth Special Interest Group in the United States and/or other jurisdictions.)

FIGS. 73 through 77 illustrate a universal chassis 1080 to support optical devices and parts of the circuit assembly 1050 within the attachment body 1040. Generally, the chassis 1080 is configured to secure the aimer LED 1056 (along with the PCB 1064), as well as a beam splitter 1082, aperture block 1084, and other equipment (e.g., a concentrator lens (not shown)), in appropriate alignment within the attachment body 1040.

Figure 75:
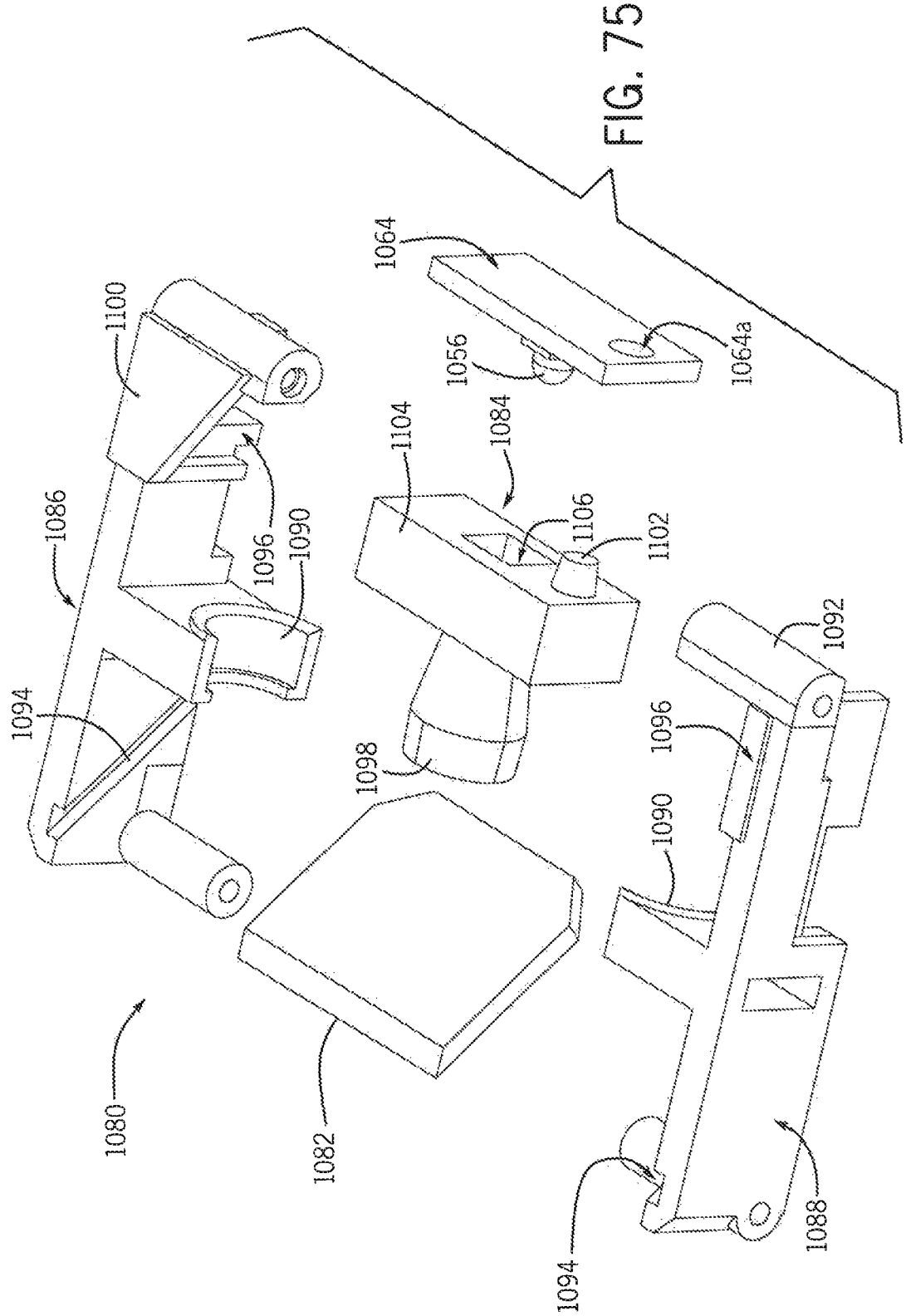
FIG. 75 is an exploded bottom, rear perspective view of the optical chassis assembly of FIG. 73.
Figure 76:
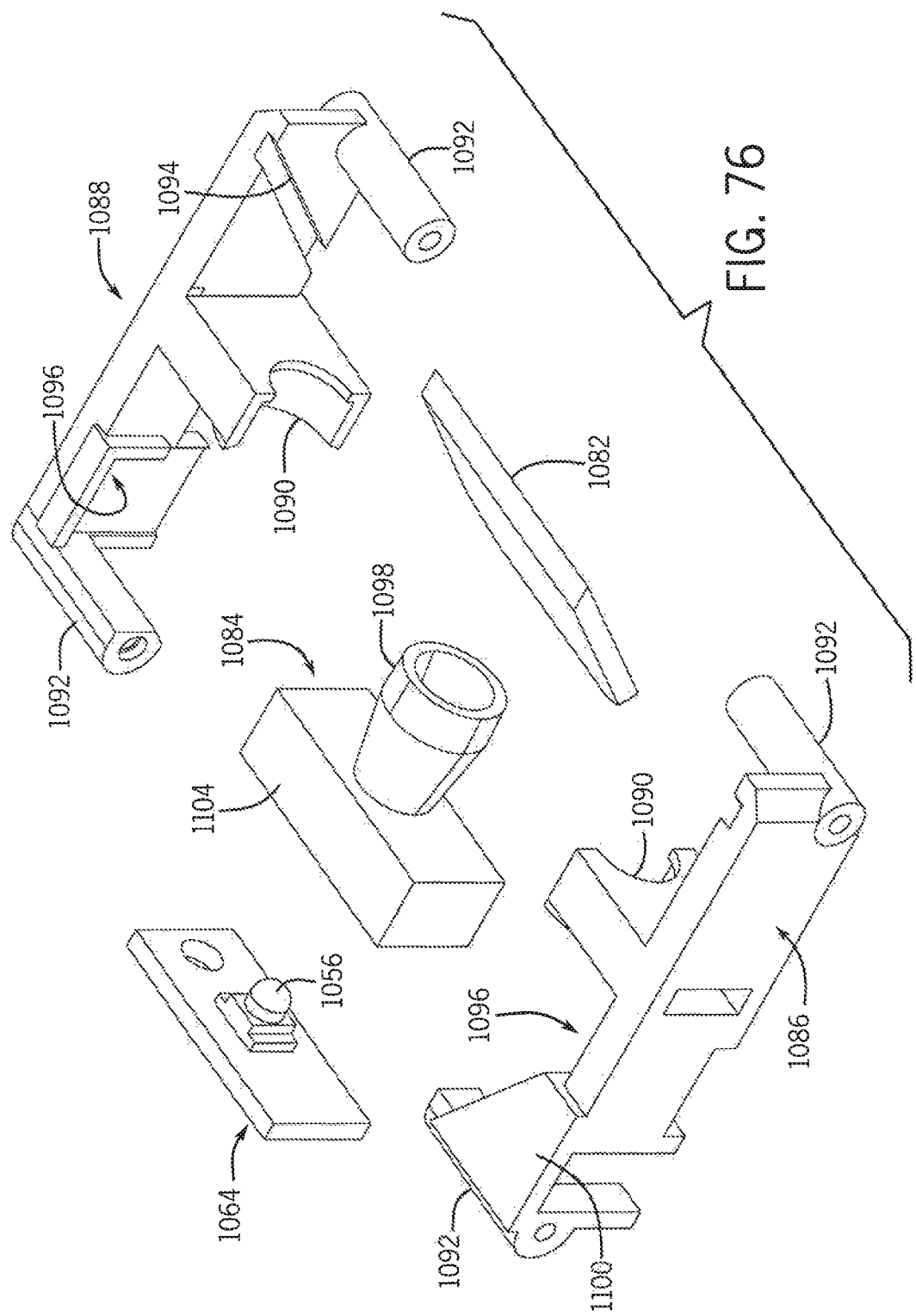
FIG. 76 is an exploded top, rear perspective view of the optical chassis assembly of FIG. 73.

As illustrated in FIGS. 75 and 76 in particular, the chassis 1080 includes a set of generally similar support structures 1086 and 1088, each with generally similar half collars 1090, attachment posts 1092, angled shelves 1094, and rectangular recesses 1096.

Figure 73:
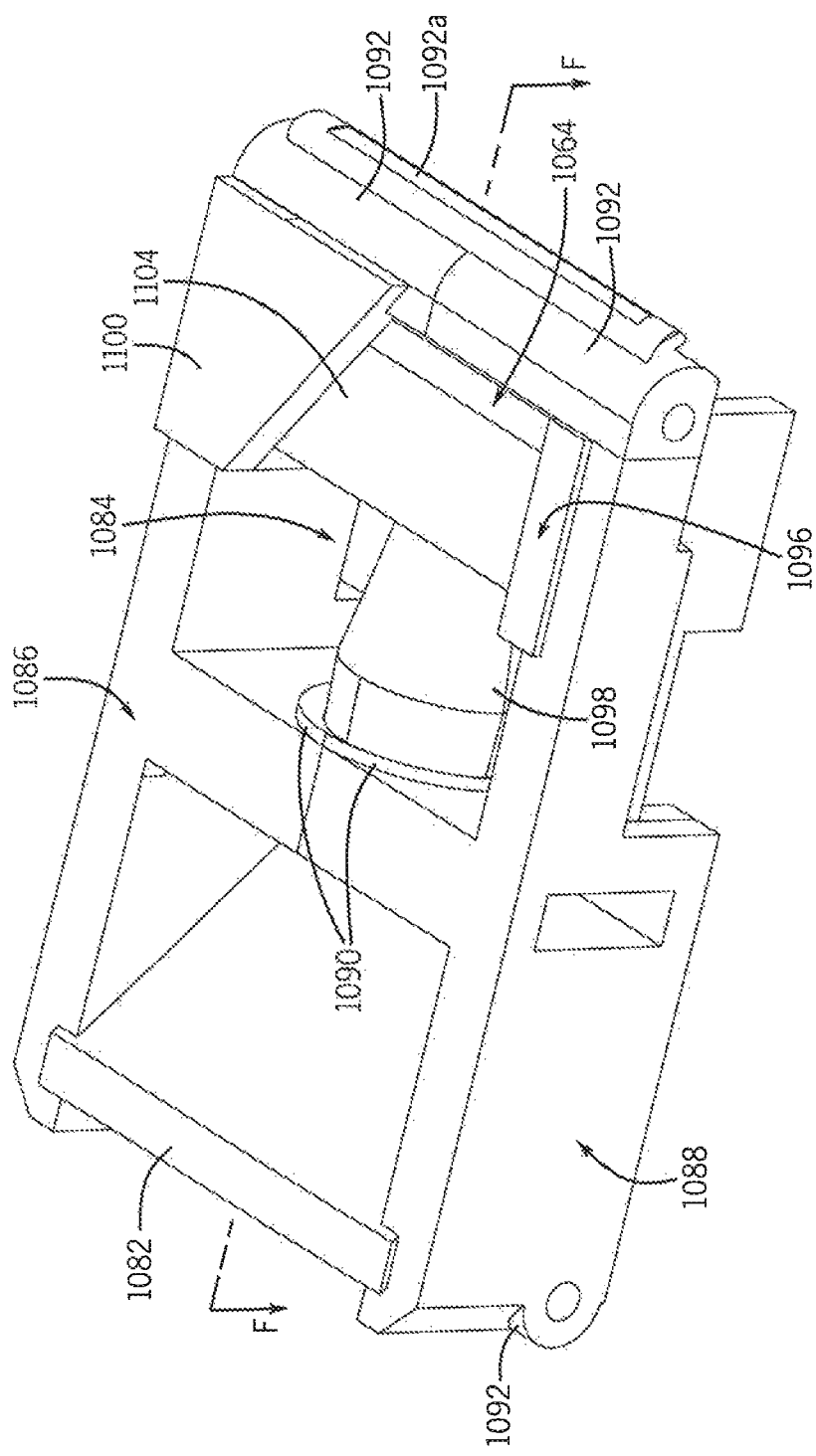
FIG. 73 is a bottom, rear perspective view of an optical chassis assembly for use with the assembly of FIG. 70.
Figure 74:
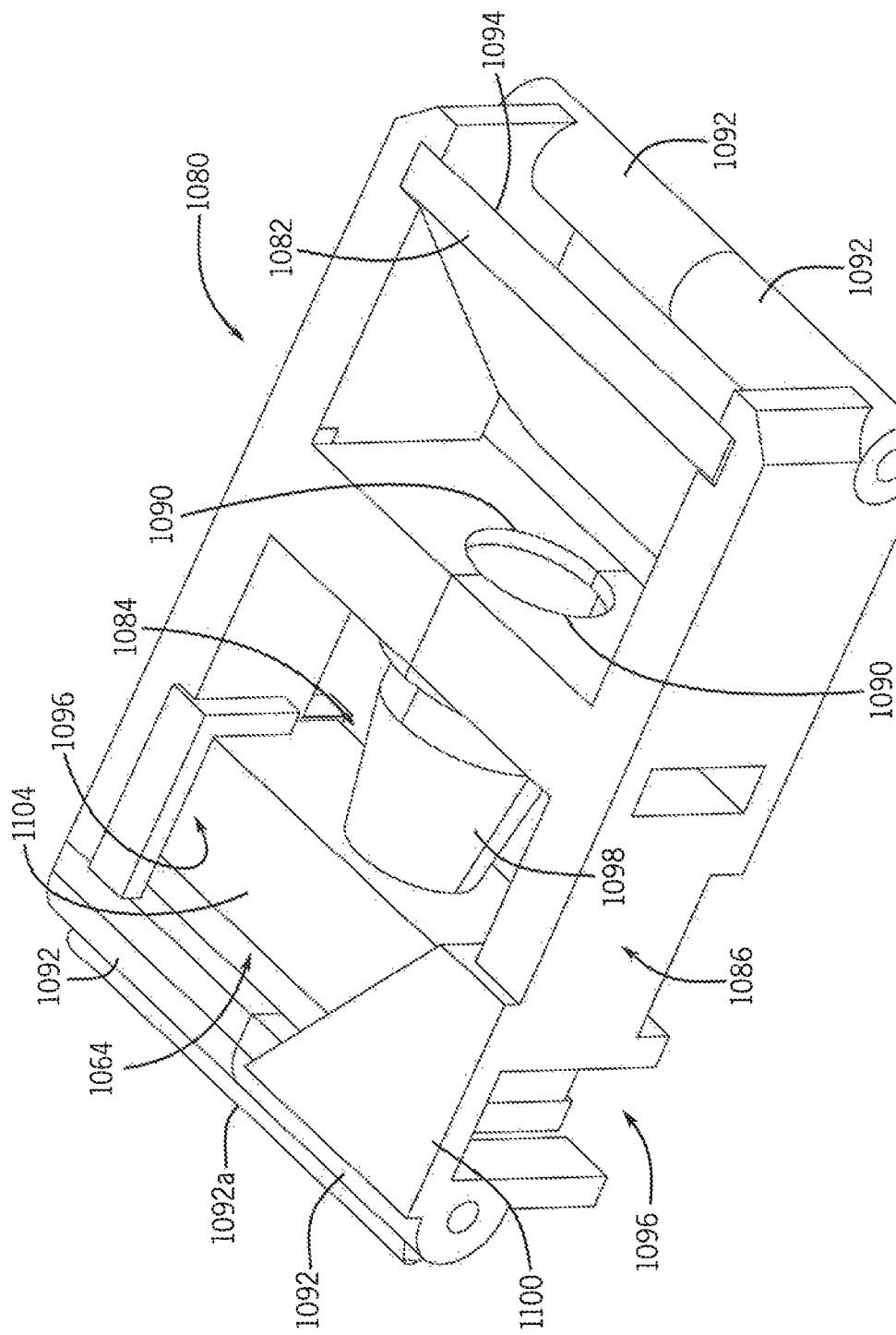
FIG. 74 is a top, rear perspective view of the optical chassis assembly of FIG. 73.

With the chassis 1080 fully assembled, as illustrated in FIGS. 73 and 74, the half collars 1090 form a full annular collar, to capture and support a barrel 1098 of the aperture block 1084 (as well as, for example, a lens or other device (not shown)). Similarly, the rectangular recesses 1096 along with a corner shelf 1100 of the support structure 1086, receive and secure a rectangular block portion 1104 of the aperture block 1084. Additionally, the beam splitter 1082 can be secured between the side walls of the support structures 1086 and 1088, as supported on the angled shelves 1094. With the various components thus arranged, the two support structures 1086 and 1088 can be secured together with fasteners extending through the attachment posts 1092 (or otherwise, such as by welding).

Figure 77:
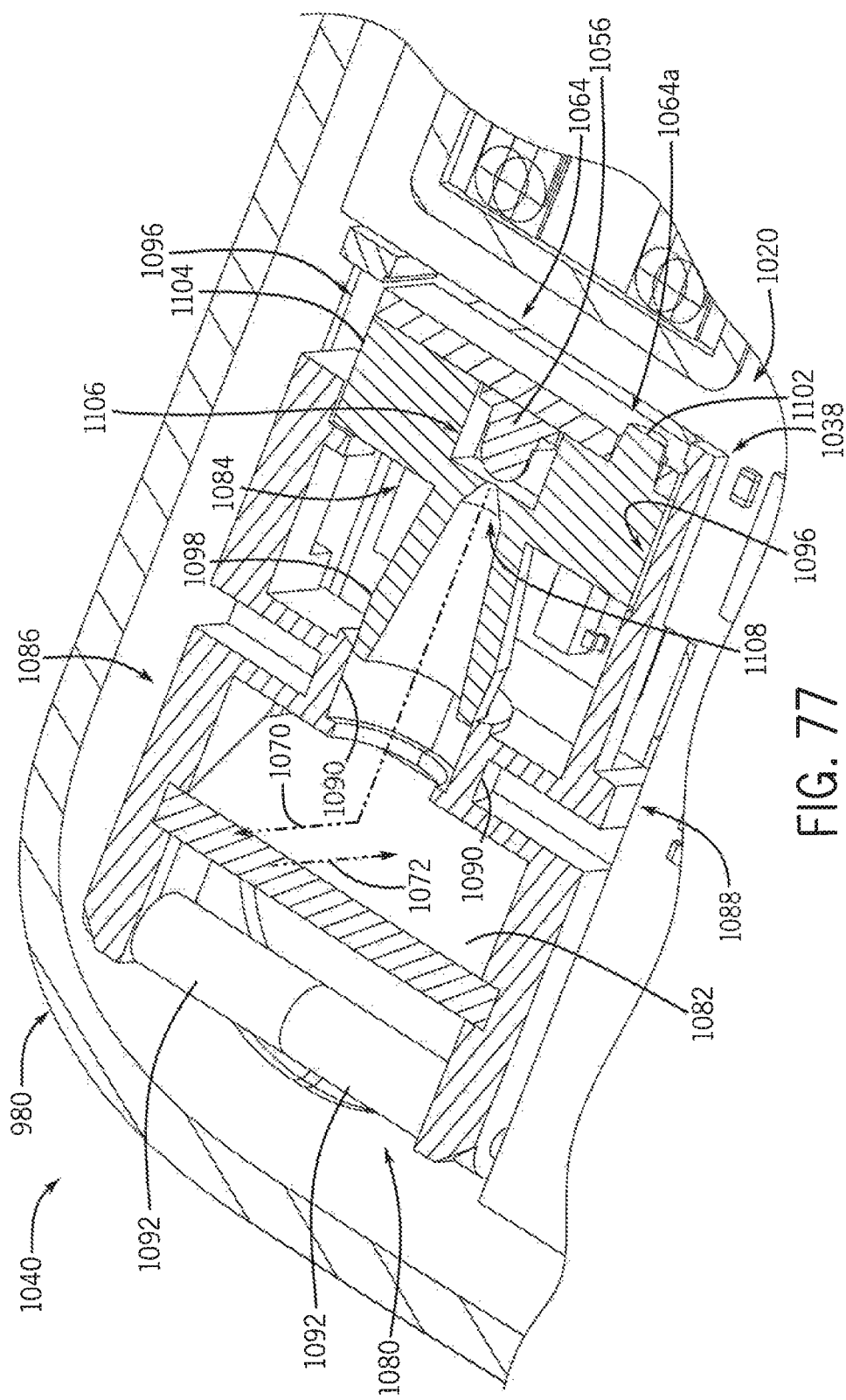
FIG. 77 is a cross-sectional perspective view of the optical chassis assembly of FIG. 73, taken along plane F-F of FIG. 73.

As illustrated in FIG. 77 in particular, the assembled chassis 1080 can usefully secure the LED 1056 (and the PCB 1064) in appropriate alignment with the aperture block 1084, with a lens (not shown) that is supported in the half collars 1090, and with the beam splitter 1082. In this regard, for example, a post 1102 of the block portion 1104 can engage an opening 1064*a* on the PCB 1064, in order to secure the PCB 1064 relative to the aperture block 1084 and the chassis 1080 generally. Further, with the support structure 1086 and 1088 seated within the rectangular recess 1038 of the base 1020 of the attachment body 1040, the beam splitter 1082 can also be aligned with the window 1028, and the optical sensor 1060 (e.g., a visible light detector), as supported by the chassis via the PCB 1064 and the flexible connector 1068, can be aligned with the window 1030 (see FIG. 78). In some configurations, an extension 1092*a* of the attachment posts 1092 can engage the side opening 990 in the support structure 988 of the cover 980, to further secure the chassis 1080 within the attachment body 1040 (see FIG. 79).

Figure 79:
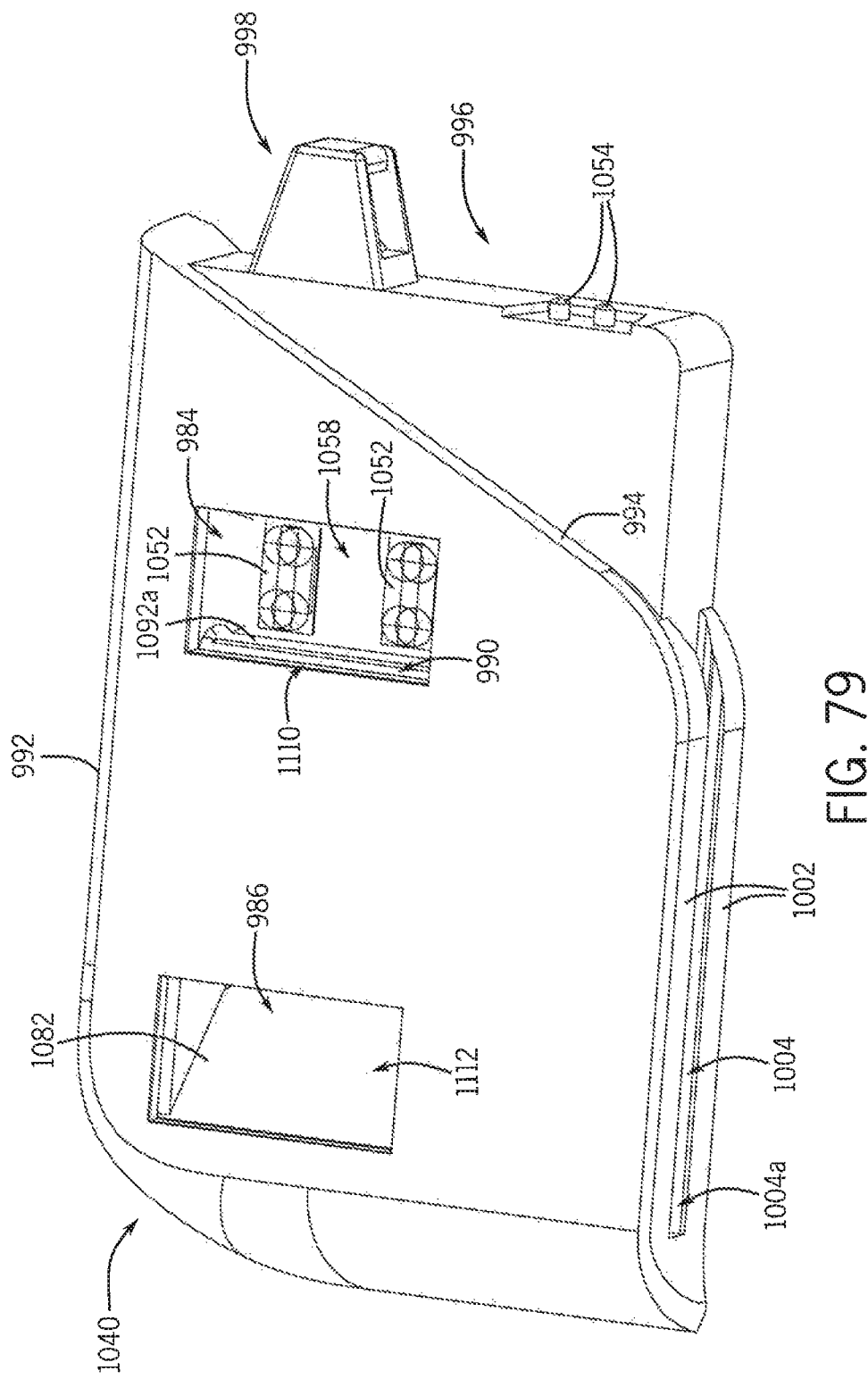
FIG. 79 is a is a bottom, rear perspective view of the assembly of FIG. 78.

As illustrated in FIG. 79, with the chassis 1080 (and the circuit assembly 1050) installed within the attachment body 1040, other appropriate alignments are also achieved. For example, the beam splitter 1082 is generally aligned with the window 986 and the LEDs 1052 are generally aligned with the window 984. Further, the power connectors 1054 extend partly outside of the shell 992 for engagement with a power source (as also discussed below).

Usefully, as also discussed below, the chassis 1080 can be used with a variety of different attachments, including the attachment body 1040 and others. In particular, the chassis 1080 can reliably secure optical devices in appropriate alignment with each other and with the chassis 1080 itself (e.g., with appropriate internal and external spacing and angular orientations), so that the optical devices can be reliably used for image capture and other operations, with a variety of different types of attachments.

A variety of configurations are possible for the optical and other devices supported by the attachment body 1040. In some embodiments, the LED 1056 can be a green LED configured for use to provide aiming patterns on a target surface. As illustrated in FIG. 77, for example, the chassis 1080 is configured to secure the PCB 1064 so that the LED 1056 is disposed within a recess 1106 in the block portion 1104 of the aperture block 1084, in optical alignment with an aperture 1108 of the aperture block 1084.

With the aperture block 1084, a concentrator or other lens (not shown), and the beam splitter 1082 also secured in place by the chassis 1080, the LED 1056 is accordingly positioned to controllably project light out of the window 986. With the use of appropriate masks (as desired), or other devices, one or more patterns (e.g., as also discussed above) can accordingly be projected onto a target surface in order to assist a user in aligning a mobile device to capture images. In some embodiments, as also discussed above and below, the LED 1056 can be controlled to similarly project light onto a target surface in order to communicate commands or other information to a mobile device via imaging of the light by the mobile device. For example, as illustrated in FIG. 77, light from the LED can be projected out of the attachment body 1040 along optical path 1070, and can return through the attachment body 1040 for imaging (e.g., by an associated mobile-device camera) along optical path 1072.

In other embodiments, other devices can also (or alternatively) be disposed along the optical path of light traveling from the LED 1056 out of the attachment body 1040. For example, a diffusion cap or other diffuser can be disposed at the LED 1056 or between the LED 1056 and the exterior of the attachment body 1040, in order to appropriately diffuse light from the LED 1056.

In some embodiments, the LEDs 1052 can be configured as white LEDs. In some embodiments, the LEDs 1052 can be configured to be separately controlled. As noted above, the LEDs 1052 are generally aligned with the window 984 of the cover 980. Accordingly, with appropriate configuration, the LEDs 1052 can be used to provide illumination for imaging, or various other functionality. In some embodiments, for example, the LEDs 1052 can be configure to provide sufficient illumination that a mobile device can still image a target with high reliability, via the window 986, despite the loss of some light due to the imposition of the beam splitter 1082 between the window 986 and a relevant imaging device (e.g., a camera of a mobile device).

In other embodiments, the LEDs 1052 (or other LEDs) can be differently configured. In some embodiments, one or more non-white LEDs can be employed, in order to provide appropriate lighting in a variety of environments. For example, red or amber lighting can be provided for highly reflective environments, infrared or other lighting can be provided to illuminate specialized barcodes (e.g., barcodes that are rendered visible only when illuminated with non-visible light), and so on.

As noted above, in the embodiment illustrated in FIGS. 71A through 79, the beam splitter 1082 is disposed in optical alignment with the window 986. Accordingly, as also discussed below, images can be captured through the window 986 using light that has passed through the beam splitter 1082. In this regard, in some embodiments, a beam splitter provides a useful alternative to the use of a dichroic mirror (e.g., as also discussed above). For example, a dichroic mirror can filter certain colors of light that are incident on the mirror, so that images captured via the dichroic mirror may have reduced prevalence of those colors. For some mobile devices, this can result in images that are not as well-lit as desired (or that exhibit other deficiencies). Further, in some cases, the absence of certain colors can make focusing operations (e.g., auto-focus operations) somewhat difficult. A beam splitter, however, may not necessarily filter specific colors of light. Accordingly, attachments that use beam splitters (e.g., instead of dichroic mirrors) may sometimes be less prone to the noted detrimental effects.

It will be noted that a beam splitter may still generally reduce the incidence of light on an image sensor disposed behind the beam splitter (e.g., as part of a camera of a mobile device for use with the attachment body 1040). Accordingly, in some embodiments, it may be useful to pair a beam splitter with appropriately powerful light sources (e.g., the LEDs 1052), so that appropriately detailed images can be acquired. For example, the combination of the LEDs 1052 and the beam splitter 1082 can allow for relatively detailed images to be acquired through the window 986 (and the attachment body 1040 generally), whether for capturing and decoding bar codes or for other detailed imaging.

As another example, in some cases, covers of various configurations can be provided at one or more windows in an attachment body. As illustrated in FIG. 79, for example, front covers 1110 and 1112 are disposed within the windows 984 and 986. In some cases, the covers 1110 and 1112 can be configured as purely transparent covers, which merely allow light to pass while preventing ingress of liquid, dust, or other materials into the attachment body 1040 via the windows 984 and 986. In some cases, one or both of the covers 1110 and 1112 can be configured as a lens or other operative optical body. For example, the cover 1110 for the window 984 can be configured as a lens in which microscale material alignment can bend and shape light passing therethrough. This can be useful, for example, in order to provide for a highly customizable manipulation of light from the LEDs 1052 (e.g., to selectively diffuse light from the LEDs 1052 over a wide angular range). In some embodiments, similar covers (not numbered) can be installed at the windows 1028 and 1030 and along the channel 1032 (see, e.g., FIG. 87).

In some cases, the covers 1110 and 1112 (and others) can be securely fixed to the shell 992 or other components (e.g., via ultrasonic welding), so as to provide appropriate leak sealing (e.g., to satisfy Ingress Protection 54 rating for sealed enclosures or other relevant ratings requirements). In some cases, different instances of the covers 1110 and 1112 (and others) that exhibit different properties (e.g., different lens types, different opacities, and so on) can be configured to be interchangeable (e.g., during manufacturing) so that customized properties can be provided without necessarily varying other aspects of an attachment's design.

In view of the example components discussed above, such as the relatively highly-powered LEDs 1052, it may be useful to provide a power source for the attachment body 1040 that is separate (at least in part) from an integrated power source of an associated mobile device. In some embodiments, as discussed above with regard to the aimer accessory 700, an internal power source (e.g., a set of internal batteries) can be provided to this end. In some embodiments, a separate battery pack can be used.

Figure 81:
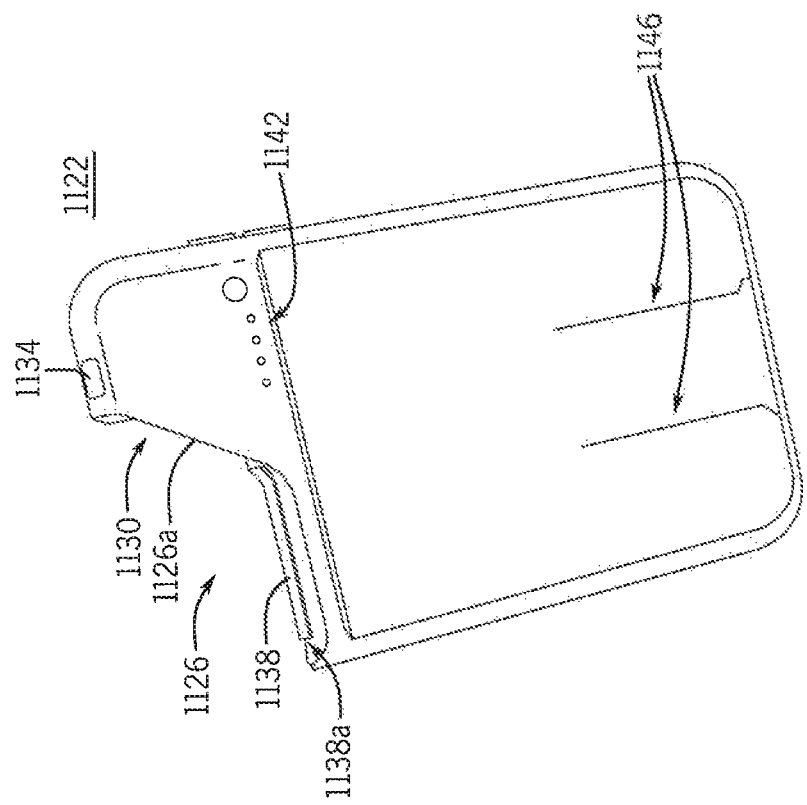
FIG. 81 is a top, rear perspective view of another battery case configured to engage the assembly of FIG. 78.
Figure 80A:
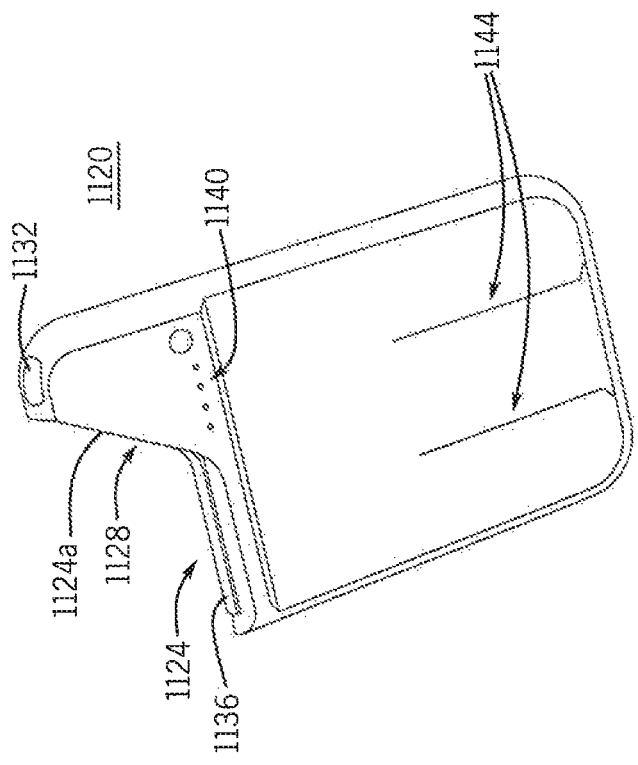
FIG. 80A is a top, rear perspective view of a battery case configured to engage the assembly of FIG. 78.

FIGS. 80A and 81 illustrate example separate battery packs 1120 and 1122 for use with the attachment body 1040. As also discussed below, the battery packs 1120 and 1122 are generally configured as intermediate attachment bases, which can serve to connect the attachment body 1040 to a mobile device via a mobile device case (not shown in FIGS. 80A and 81). As such, for example, each of the battery packs 1120 and 1122 can include an attachment mechanism (not shown) for securing the battery packs 1120 and 1122 to a separate mobile device or mobile-device case.

Each of the battery packs 1120 and 1122 can be configured to secure the attachment body 1040, as illustrated in the various FIGS., to the respective battery packs 1120 and 1122. In this regard, for example, the top corners of each of the battery packs 1120 and 1122 include substantially identical cut-outs 1124 and 1126, with angled end walls 1124a and 1126a that are generally complementary to the angled shoulder 994 on the shell 992 of the cover 980 of the attachment body 1040. Likewise, recesses 1128 and 1130 extend into the bodies of the battery packs 1120 and 1122 adjacent to the end walls 1124a and 1126a, with a latching mechanism (not shown) to engage the hook structure 1000 of the latching feature 998 of the cover 980 (see, e.g., FIG. 67B) within the recesses 1128 and 1130. A release button 1132 and 1134 to release the latching mechanism is generally disposed on an exterior of the battery packs 1120 and 1122.

Figure 80B:
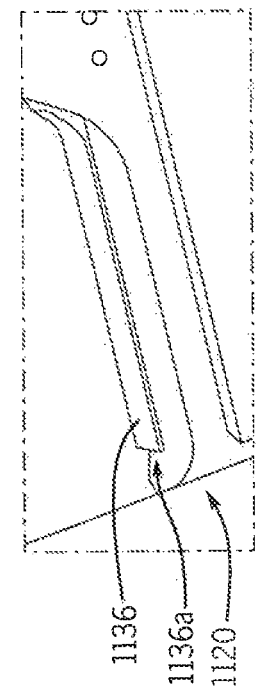
FIG. 80B is an enlarged top, rear perspective view of an attachment rail of the battery case of FIG. 80A.

In order to further assist in securing the attachment body 1040, each of the battery packs 1120 and 1122 also includes an attachment rail 1136 and 1138 (see, e.g., FIG. 80B). The attachment rails 1136 and 1138, like the cut-outs 1124 and 1126, are substantially identical, and include a geometry (e.g., dove-tailed profile) that is generally complementary to the attachment groove 1004 of the cover 980. As illustrated in FIG. 80B, in particular, the attachment rail 1136 (like the attachment rail 1138) extends only partly along the length of the cut-out 1124, with a free end 1136a configured to seat against the closed end 1004a of the groove 1004 of the cover 980 (see, e.g., FIG. 67A).

Other features can also be included. For example, in the embodiment illustrated, status lights 1140 and 1142 are provide, as are additional attachment rails 1144 and 1146 to secure further accessories to the battery packs 1120 and 1122. In some embodiments, the battery packs 1120 and 1122 can be configured to provide electrical power to an associated mobile device, as well as to the attachment body 1040.

Figure 82:
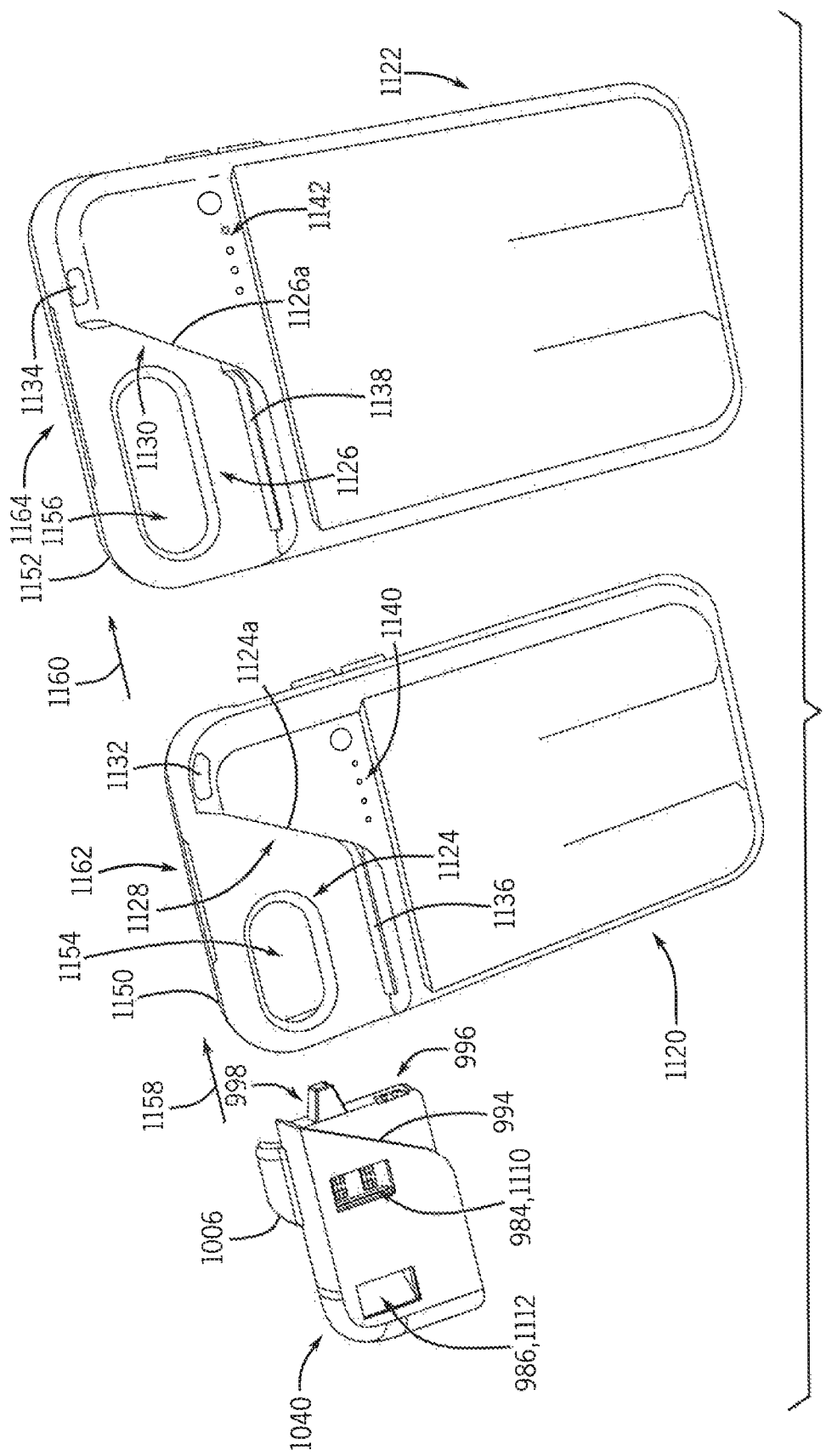
FIG. 82 is a top, rear perspective view of the assembly of FIG. 78 positioned for attachment to either of the battery cases of FIGS. 80A and 81, with each of the battery cases attached to a respective case for a mobile device.
Figure 84:
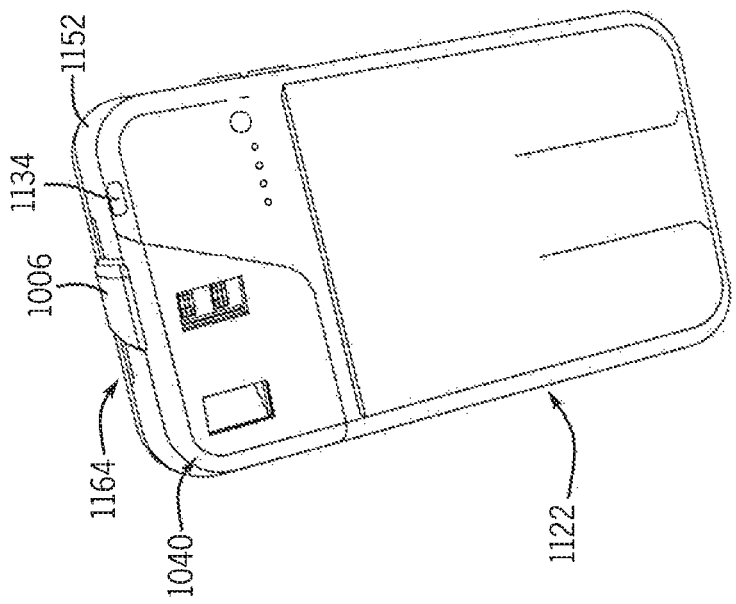
FIG. 84 is a top, rear perspective view of the assembly of FIG. 78 attached to the battery case of FIG. 81 and the case for the mobile device.
Figure 83:
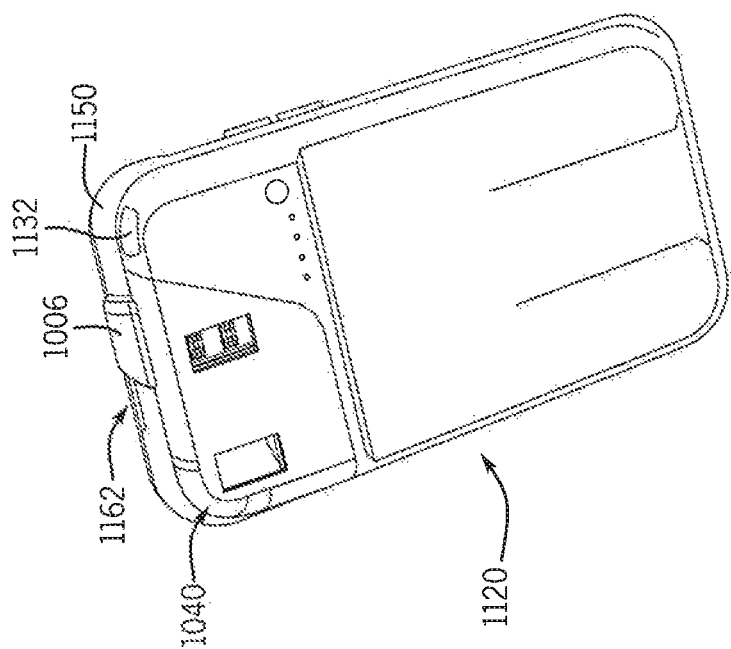
FIG. 83 is a top, rear perspective view of the assembly of FIG. 78 attached to the battery case of FIG. 80A and the case for the mobile device.

A method of attaching the attachment body 1040 to the battery packs 1120 and 1122 is illustrated in FIGS. 82 through 84. For example, the battery packs 1120 and 1122 can be secured (e.g., via internal rails (not shown)) to separate cases 1150 and 1152 for differently sized mobile devices, so that the cut-outs 1124 and 1126 are generally aligned with camera openings 1154 and 1156 of the cases 1150 and 1152 (and with the imaging equipment of the respective mobile devices). The attachment body 1040 can then be aligned with either of the cut-outs 1124 and 1126, and slid (e.g., as indicated by arrows 1158 and 1160 in FIG. 82) so that the attachment groove 1004 (see, e.g., FIG. 67A) engages the relevant attachment rail 1136 or 1138.

As with other embodiments discussed above, it should be noted that the described rail and groove arrangement for the attachment body 1040 and the battery packs 1120 and 1122 can be reversed, as desired. For example, an attachment rail similar to the rails 1136 and 1138 can be provided on the attachment body 1040, with an attachment groove similar to the groove 1004 provided on the battery packs 1120 and 1122.

Figure 85:
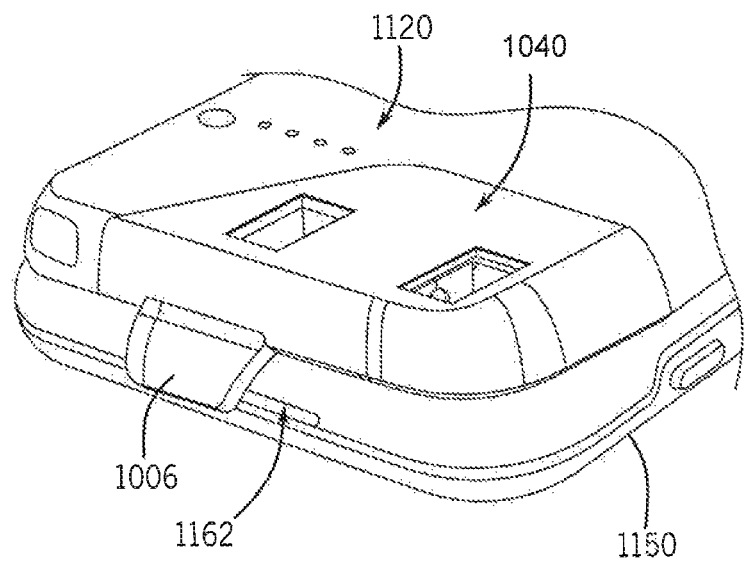
FIG. 85 is another top, rear perspective view of the assembly of FIG. 78 attached to the battery case of FIG. 80A and the case for the mobile device.
Figure 86:
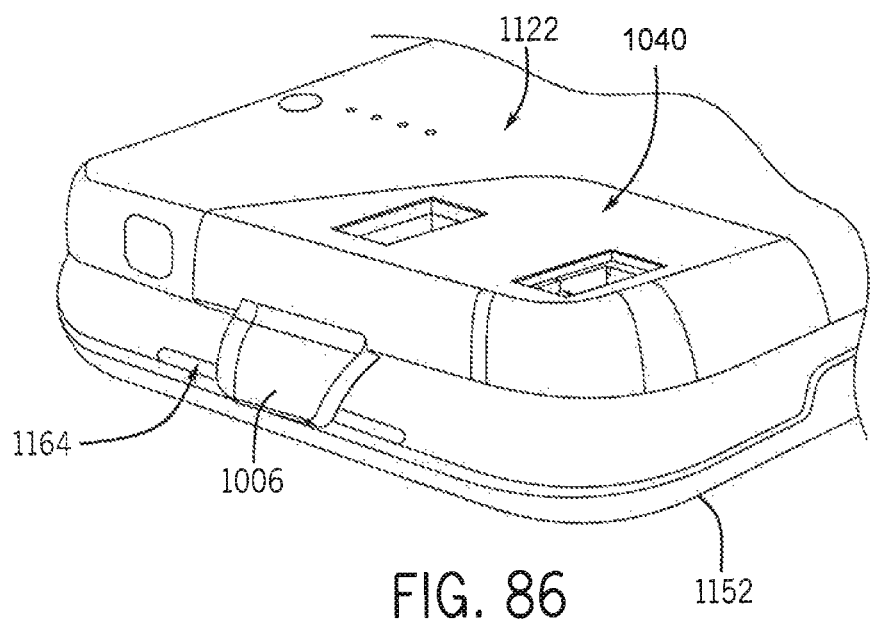
FIG. 86 is another top, rear perspective view of the assembly of FIG. 78 attached to the battery case of FIG. 81 and the case for the mobile device.

With the attachment body 1040 moved fully into either of the cut-outs 1124 and 1126, as illustrated in FIGS. 83 and 84, the attachment portion 996 of the attachment body 1040 is inserted into the respective recess 1128 or 1130 of the battery pack 1120 or 1122. With the attachment body 1040 thus disposed, the power connectors 1054 are accordingly placed to receive power from the respective battery pack 1120 or 1122, with the latching feature 998 engaged within the respective recess 1128 or 1130 to hold the attachment body 1040 in place (e.g., until the respective release button 1132 or 1134 is depressed). To further secure the attachment body 1040, as illustrated in FIGS. 85 and 86, the geometry of the attachment tab 1006 disposes the protrusion 1008 (see, e.g., FIG. 67A) to engage an attachment groove 1162 or 1164 on the case 1150 or 1152, respectively, when the attachment body 1040 is fully inserted into the relevant cut-out 1124 or 1126.

Figure 87:
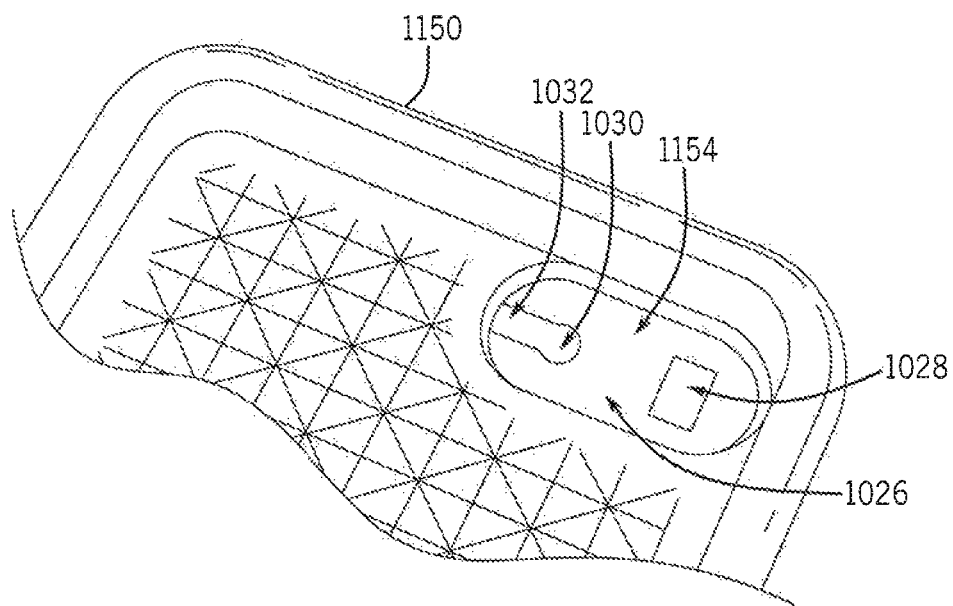
FIG. 87 is a bottom, front perspective view of the assembly of FIG. 78 attached to the battery case of FIG. 80A and the case for the mobile device.
Figure 88:
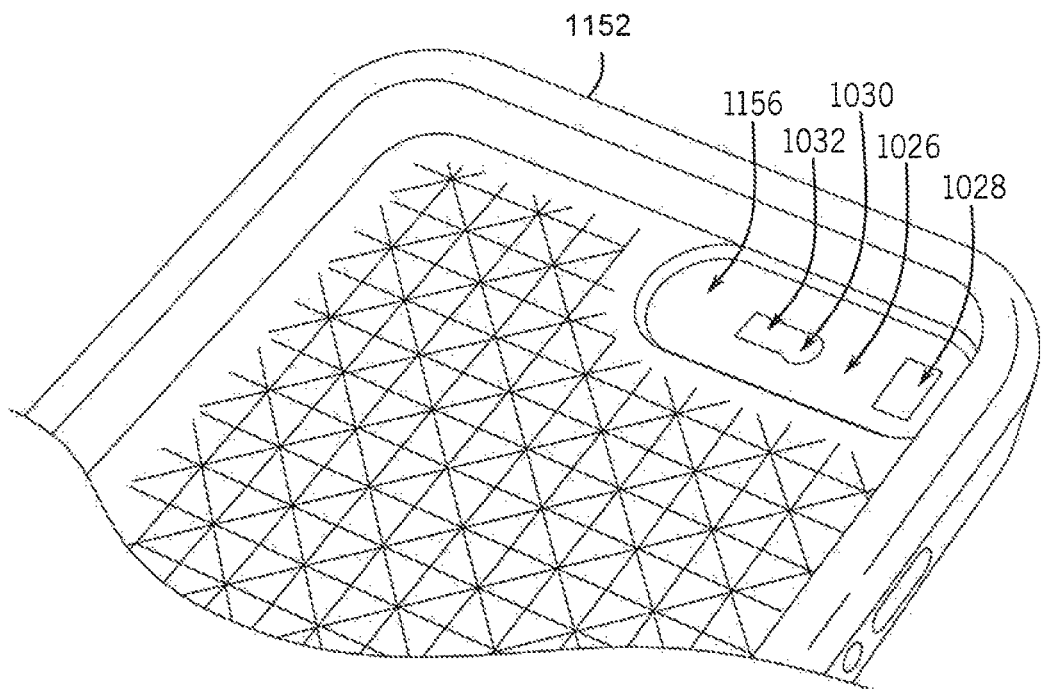
FIG. 88 is a bottom, front perspective view of the assembly of FIG. 78 attached to the battery case of FIG. 81 and the case for the mobile device.

With the attachment body 1040 secured to the battery pack 1120 or 1122, and the battery pack 1120 or 1122 secured to the case 1150 or 1152, other beneficial structural arrangements may also result. For example, as illustrated in FIGS. 87 and 88, the rounded protrusion 1026 is configured to seat relatively snugly within the camera openings 1154 and 1156 of the cases 1150 and 1152. This arrangement, for example, can usefully provide appropriate light-sealing so that images can be reliably captured by a camera of the relevant mobile device (not shown) via the camera openings 1154 and 1156 and the window 1028, without being affected by light leaking in along other paths to reach the camera. Further, this arrangement can appropriately align the keyhole window 1030 and the associated channel 1032 to receive optical signals from a light source of the mobile device (e.g., a camera flash), without those optical signals excessively interfering with imaging.

In some embodiments, the rounded protrusion 1026 can snap into the relevant camera opening 1154 or 1156, in order to provide useful tactile and auditory feedback to users. In some embodiments, the rounded protrusion 1026 may not entirely fill the relevant camera opening. For example, as illustrated in FIG. 87, the rounded protrusion entirely occludes the camera opening 1154. In contrast, as illustrated in FIG. 88, the rounded protrusion 1026 entirely occludes the camera opening 1156 in a vertical direction, but fills the camera opening 1156 only partially in a horizontal direction.

Generally, as well as providing for secure attachment of the attachment body 1040 to a mobile device, the example arrangement described above (and other similar arrangements) can provide significant flexibility with regard to the particular mobile device with which the attachment body 1040 is to be used. For example, as illustrated in FIGS. 81 through 88, although differently sized mobile devices (not shown) and corresponding cases 1150 and 1152 can be provided, the battery packs 1120 and 1122 (via the cut-outs 1124 and 1126) can still appropriately align a single configuration of the attachment body 1040 for use with the relevant optical equipment (e.g., camera, light source, and so on) of either mobile device. Accordingly, for example, users can purchase or stock only a single attachment body 1040 (or multiple of the attachment bodies 1040, each with the same configuration) for use with a variety of different mobile devices.

Figure 89:
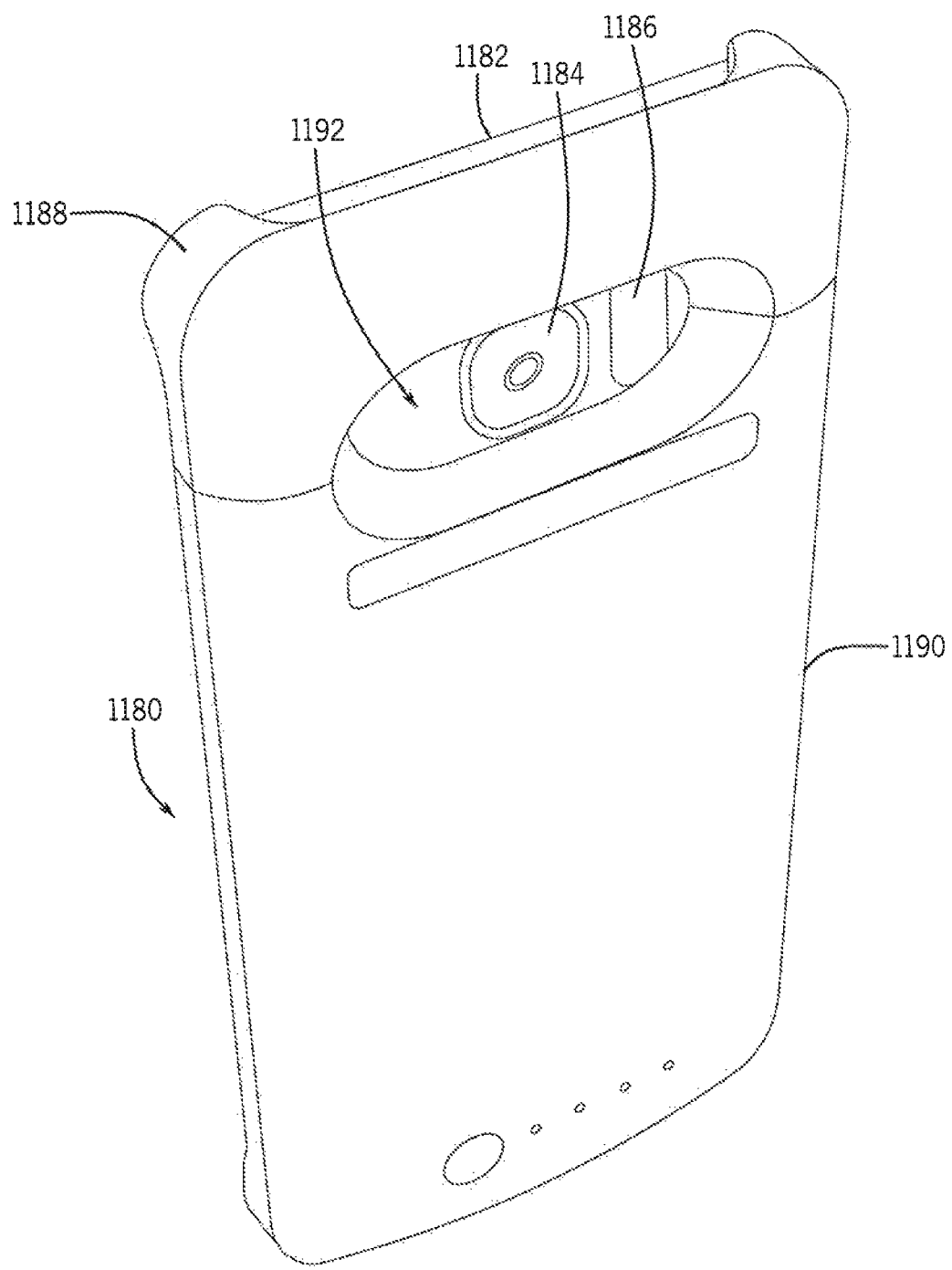
FIG. 89 is a top, rear perspective view of a battery case and a mobile device.
Figure 90A:
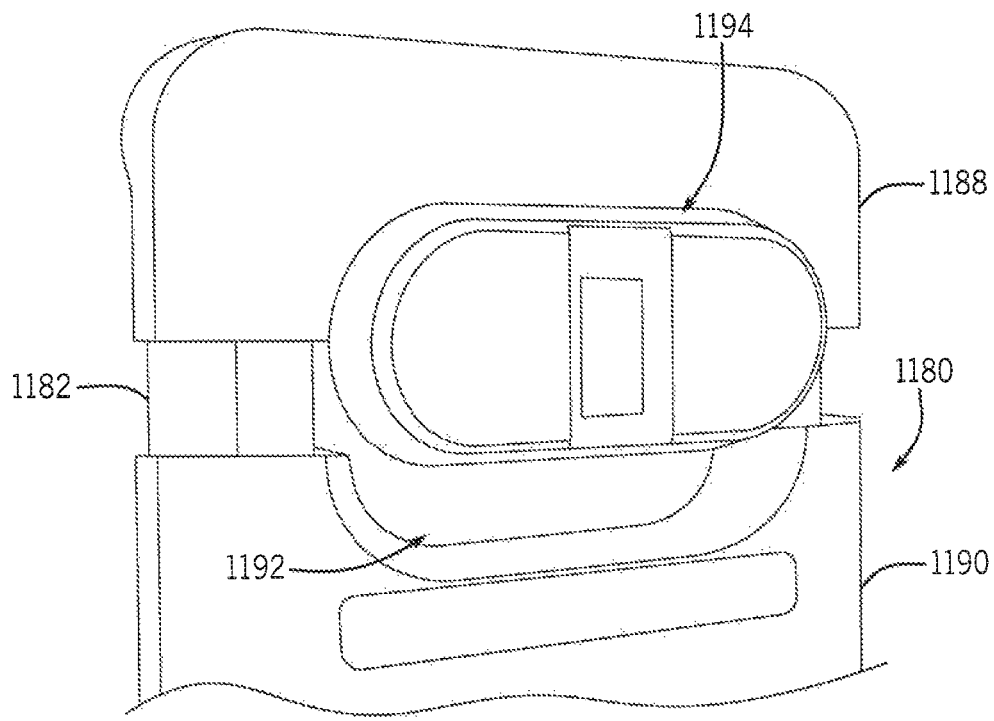
FIGS. 90A and 90B are bottom, rear perspective views of a method to secure an attachment to the mobile device with the battery case.
Figure 90B:
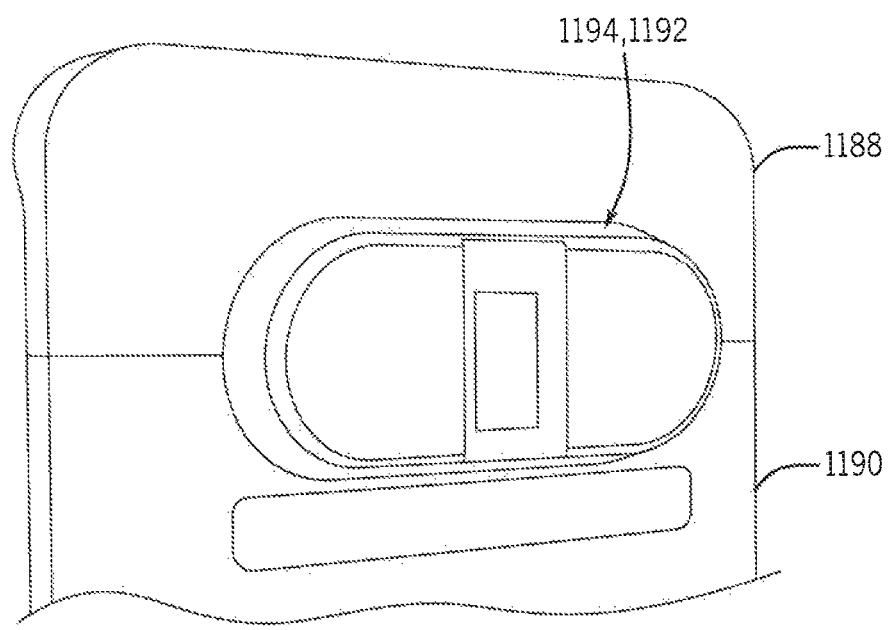

In other embodiments, other configurations are possible. For example, as illustrated in FIG. 89, an alternative battery pack 1180, for use with a mobile device 1182 with a central camera 1184 and flash 1186, includes a top portion 1188 and a bottom portion 1190 that define a central optical opening 1192. As illustrated in FIGS. 90A and 90B, the two portions 1188 and 1190 of the battery pack 1180 can be slid apart in order to receive an attachment body 1194 (see FIG. 90A), then slid together in order to secure the attachment body 1194 within the optical opening 1192, in alignment with the camera 1184 and the flash 1186 (see FIG. 90B). In this regard, for example, the attachment body 1194 can be equipped with a groove (not shown) to receive a lip of the two portions 1188 and 1190 of the battery pack 1180, or can be otherwise secured in place (e.g., pre-welded or otherwise pre-attached to one of the portions 1188 and 1190).

Usefully, in some embodiments, some internal aspects of the attachment body 1194 can be similar to some internal aspects of the attachment body 1040 (see, e.g., FIGS. 71A through 77). For example, the attachment body 1194 can be configured to receive a foldable circuit assembly similar to the circuit assembly 1050 (see, e.g., FIGS. 71B and 72), along with a chassis similar to the chassis 1080 (see, e.g., FIG. 73) in order to hold various internal components of the attachment body 1194 in appropriate optical (or other) alignment.

Figure 91:
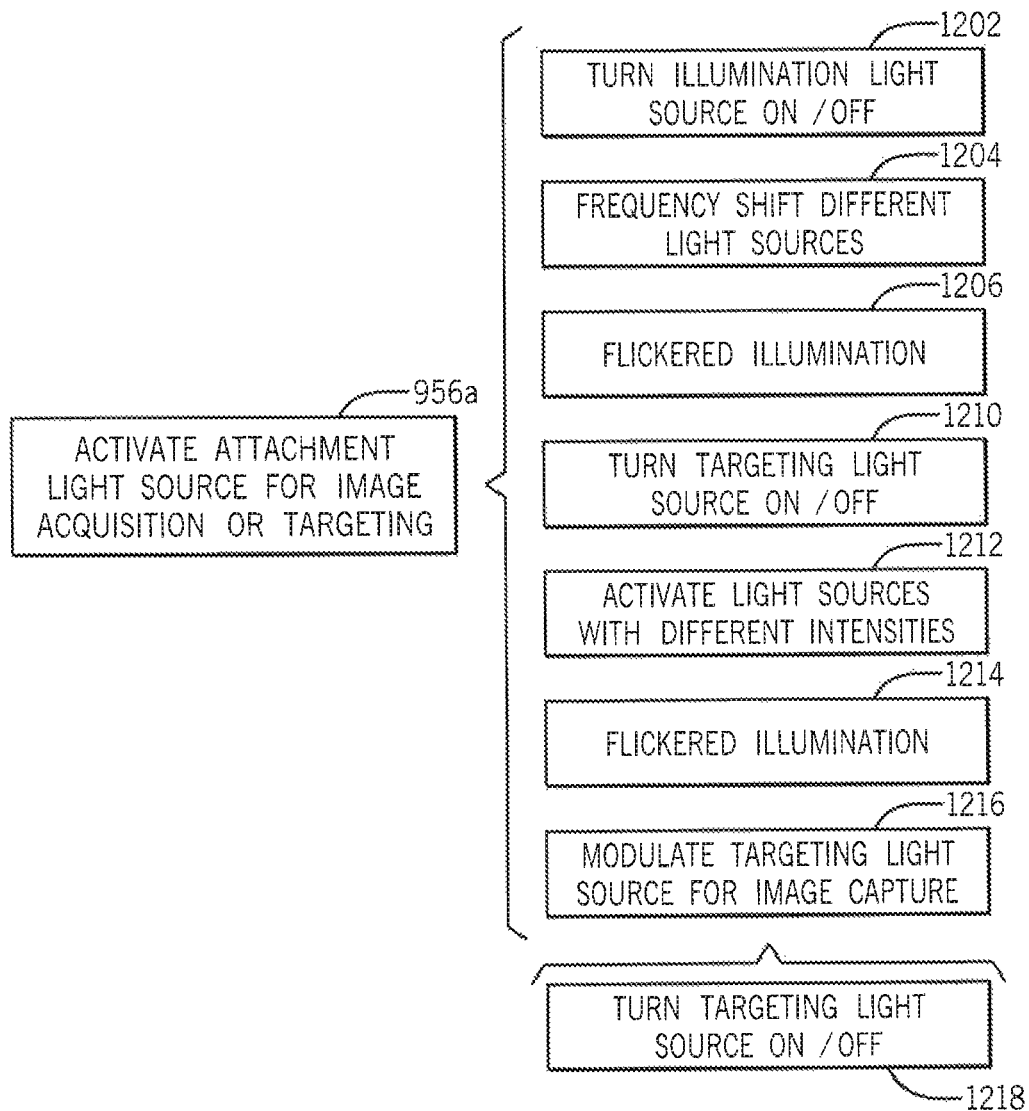
FIG. 91 is a schematic view of a communication and control method according to this disclosure, as may be used in combination with the method of FIG. 65.

In some cases, operation of the attachment bodies 1040 and 1194 can be controlled as discussed above (e.g., as outlined in FIG. 65 and accompanying discussion). In some implementations, additional (or alternative) operations can be enabled. For example, as illustrated in FIG. 65, receipt 952 of an optical control signal at the optical sensor 1060 can trigger activation 956a of a light source for image acquisition (e.g., using the LEDs 1052), or for targeting (e.g., using the LED 1056). As illustrated in FIG. 91, in some implementations, light sources for image acquisition (e.g., the LEDs 1052) can be turned on or off 1202, or can be otherwise modulated in various ways. For example, as appropriate, illumination of the LEDs 1052 can be frequency shifted 1204 relative to each other or to other relevant events (e.g., illumination for aiming using the LED 1056), can be flickered 1206 in unison, independently, or otherwise, and otherwise controlled.

In some implementations, light sources for targeting (e.g., the LED 1056) also can be turned on or off 1210, can be activated with different intensities 1212, can be flickered 1214, and so on. In some implementations, operation of an aiming light source (e.g., the LED 1056) can be modulated 1216 to facilitate image acquisition (e.g., via frame capture from a video stream of an imaging device of a relevant mobile device, as controlled by an application on the mobile device). For example, where light from the aiming light source is sufficiently bright so as to potentially interfere with image acquisition, the aiming light source can be turned on and off 1218 relatively rapidly (e.g., every 10 ms). This can provide the aiming pattern with a flickering appearance, which may help a user to more easily identify the aiming pattern and align the aiming pattern over a target. Further, an application on the relevant mobile device can be configured to cause image acquisition (e.g., via video frame capture) when the aiming light source is momentarily off, so that the image (e.g., of a barcode to be decoded) may not be overly obscured by the aiming pattern.

In some implementations, light sources for targeting (e.g., the LED 1056) can be modulated 1216 in conjunction with light sources for image acquisition (e.g., the LEDs 1052) to facilitate image capture. For example, the LED 1056 can be turned off to cease targeting (at least temporarily) as one or both of the LEDs 1052 are turned on to illuminate a target for image capture.

In some implementations, it may be possible to control an attachment body, including the attachment body 1040, to provide a variety of aiming patterns. For example, a mechanism for electronically implemented masking or filtering can be controlled, in order to provide an appropriate illumination pattern for an appropriate application or context.

In some implementations, the optical sensor 1060 can be configured mainly to receive communication from a mobile device (e.g., via a flash or other light source of the mobile device), in order for the mobile device to control operation of the attachment body 1040. Correspondingly, for example, the attachment body 1040 can communicate to the mobile device via modulated illumination of one or more of the LEDs 1052 or 1056, which can be received by the mobile device via acquisition of images of an illuminated target area by a camera of the mobile device. For example, as similarly described above, the attachment body 1040 can be placed "face down" on a surface, with the windows 984 and 986 flush with (or otherwise close to) the surface. The illumination LEDs 1052 can then be activated in order to transmit non-image information, which can be received and interpreted at the relevant mobile device based on luminosity analysis of signals from the relevant imaging device.

In other embodiments, other configurations and approaches may be possible. For example, an optical device (e.g., a mirror, light pipe, or beam splitter) can be configured to route optical signals directly from one of the LEDs 1052 or 1056 (or another light source of an attachment body) to a camera of a mobile device, in order to directly communicate with the mobile device.

Figure 92:
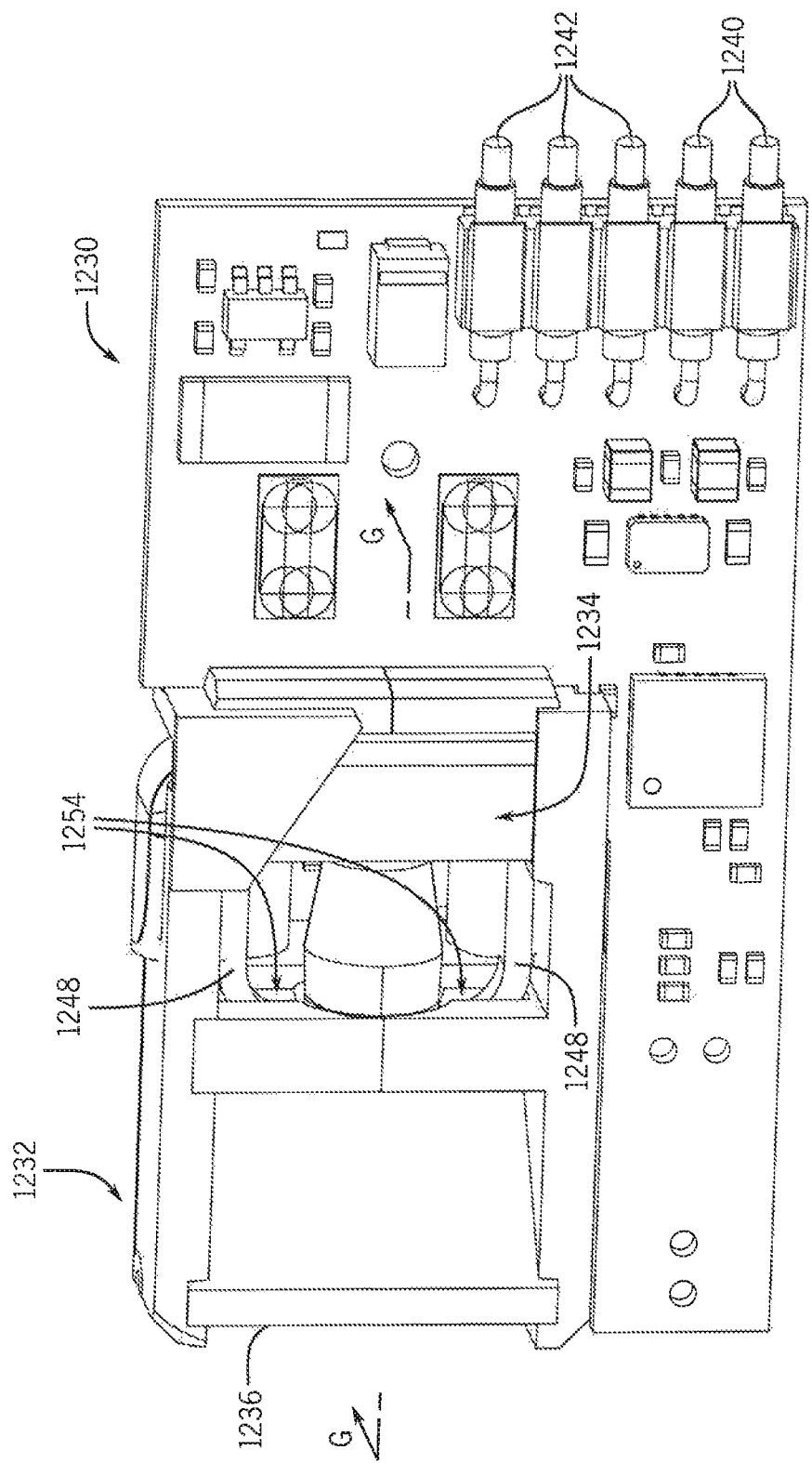
FIG. 92 is a bottom, rear perspective view of an electrical and optical assembly for use with an attachment according to this disclosure.
Figure 93:
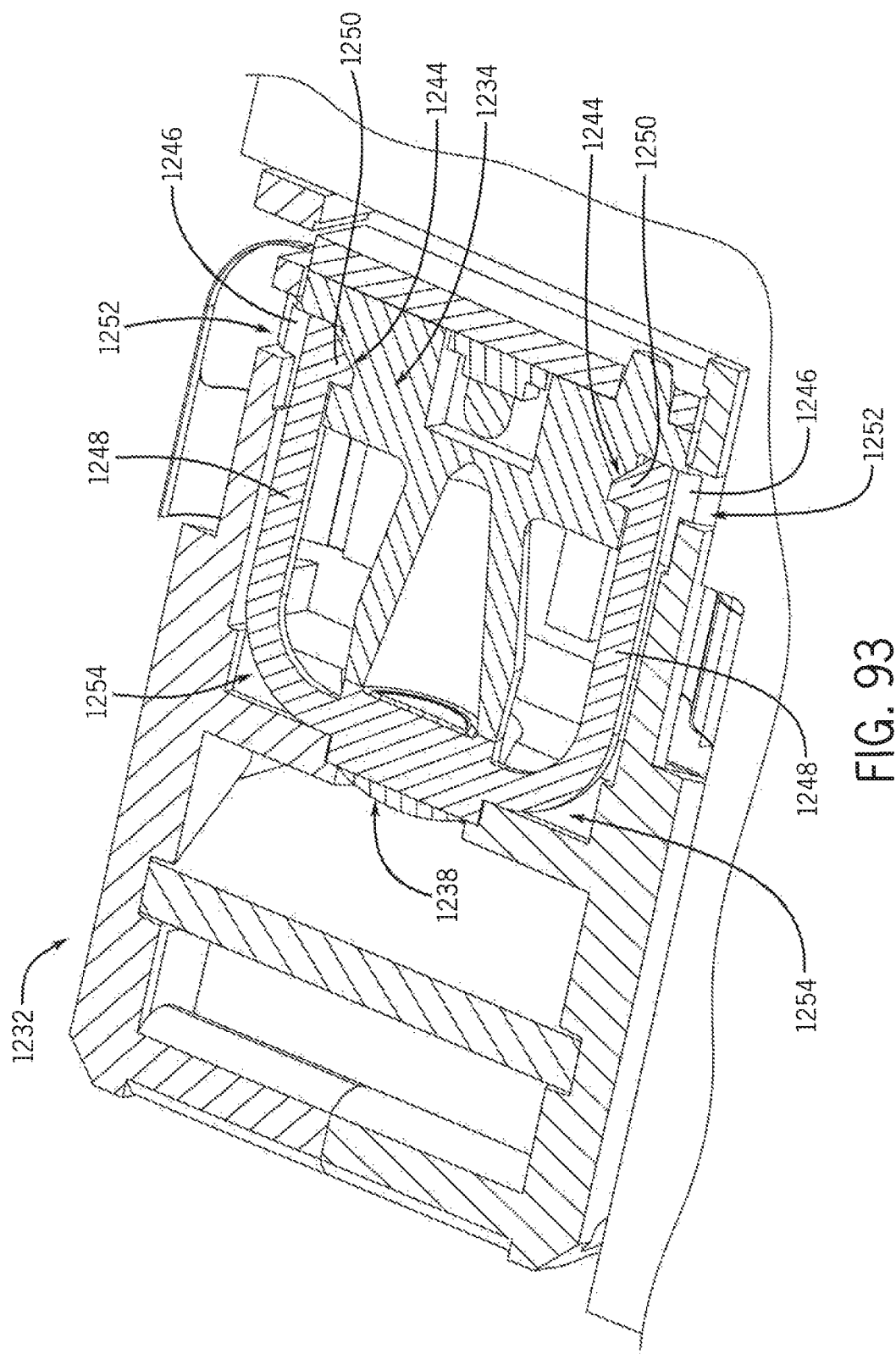
FIG. 93 is a partial cross-sectional perspective view of the assembly of FIG. 92, taken along plane G-G of FIG. 92.

Another example of internal components for an attachment according to this disclosure is partially illustrated in FIGS. 92 and 93. Generally, the components are similar to those illustrated in FIGS. 71A through 77, and, accordingly, the components of FIGS. 92 and 93 can be used with the attachment body 1040 or other attachment bodies according to this disclosure. For example, a circuit assembly 1230 is provided (not shown in FIG. 93), along with a chassis 1232, which supports and aligns the circuit assembly 1230, an aperture block 1234, a beam splitter 1236, and a lens 1238 (see FIG. 93), as well as other components (e.g., an LED or other aiming light source).

In some aspects, however, the components illustrated in FIGS. 92 and 93 differ from those illustrated in FIGS. 71A through 77. For example, in addition to two power connectors 1240, the circuit assembly 1230 also includes three additional electrical connectors 1242. In some embodiments, the connectors 1242 can be configured to engage with a cable or other interface in order to transmit data to and from the circuit assembly 1230. For example, the connectors 1242 can be configured to connect, via a cable (not shown), to a separate computing device (not shown), in order to receive firmware or other updates. In some cases, a cable can be configured to simultaneously connect to the connectors 1240 and 1242 (or a subset thereof) to transmit both power and data.

As another example, additional features can be provided to help secure the lens 1238 to the aperture block 1234, and to help secure the lens 1238 and the aperture bock 1234, collectively, to the chassis 1232. For example, as illustrated in particular in FIG. 93, sides of a block portion of the aperture block 1234 include a set of recesses 1244, and a set of ramped protrusions 1246. Correspondingly, the lens 1238 includes a set of attachment arms 1248 with ramped end protrusions 1250, and the chassis 1232 includes a set of side openings 1252 and an elongate slot 1254. With this example arrangement, the lens 1238 can be secured to the aperture block 1234 by aligning a barrel of the lens 1238 with a barrel of the aperture block 1234, and snapping the protrusions 1250 of the attachment arms 1248 into the recesses 1244 in the aperture block 1234. The aperture block 1234 and the lens 1238 can then be collectively secured to the chassis 1232 by inserting the barrel of the lens 1238 into a collar of the chassis 1232, with clearance for the attachment arms 1248 being provided by the slot 1254 of the chassis 1232, and by snapping the protrusions 1246 of the aperture block 1234 into the openings 1252 of the chassis 1232.

Figure 94:
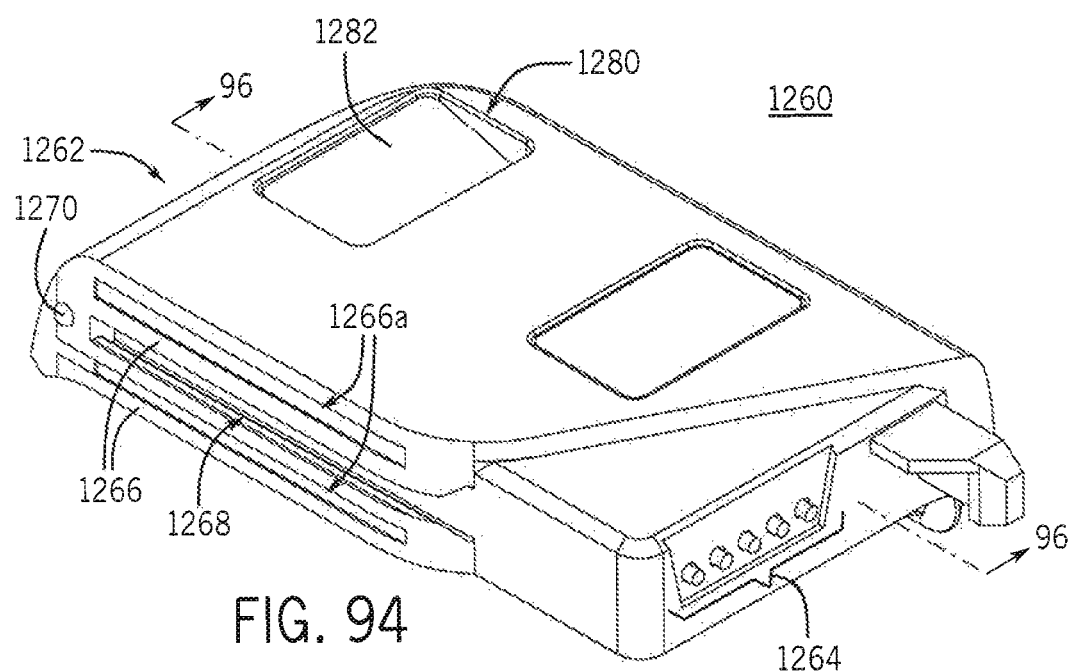
FIGS. 94 and 95 are bottom perspective views of an attachment assembly according to this disclosure.
Figure 95:
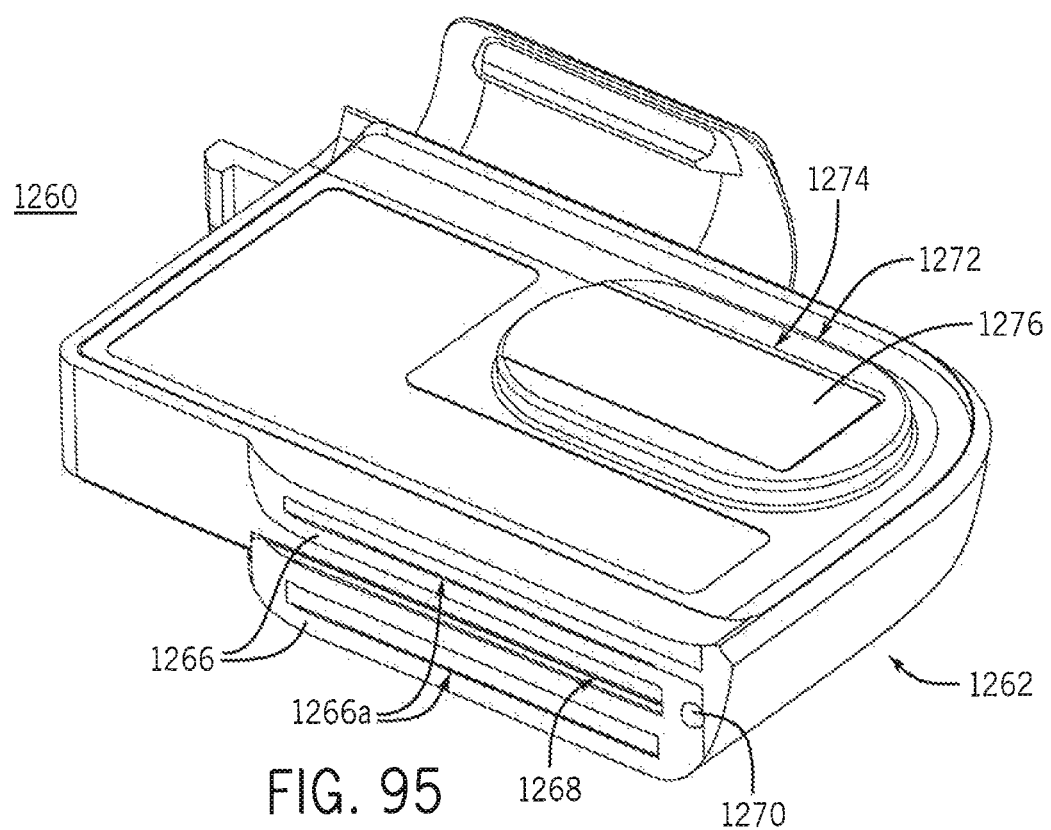
Figure 96:
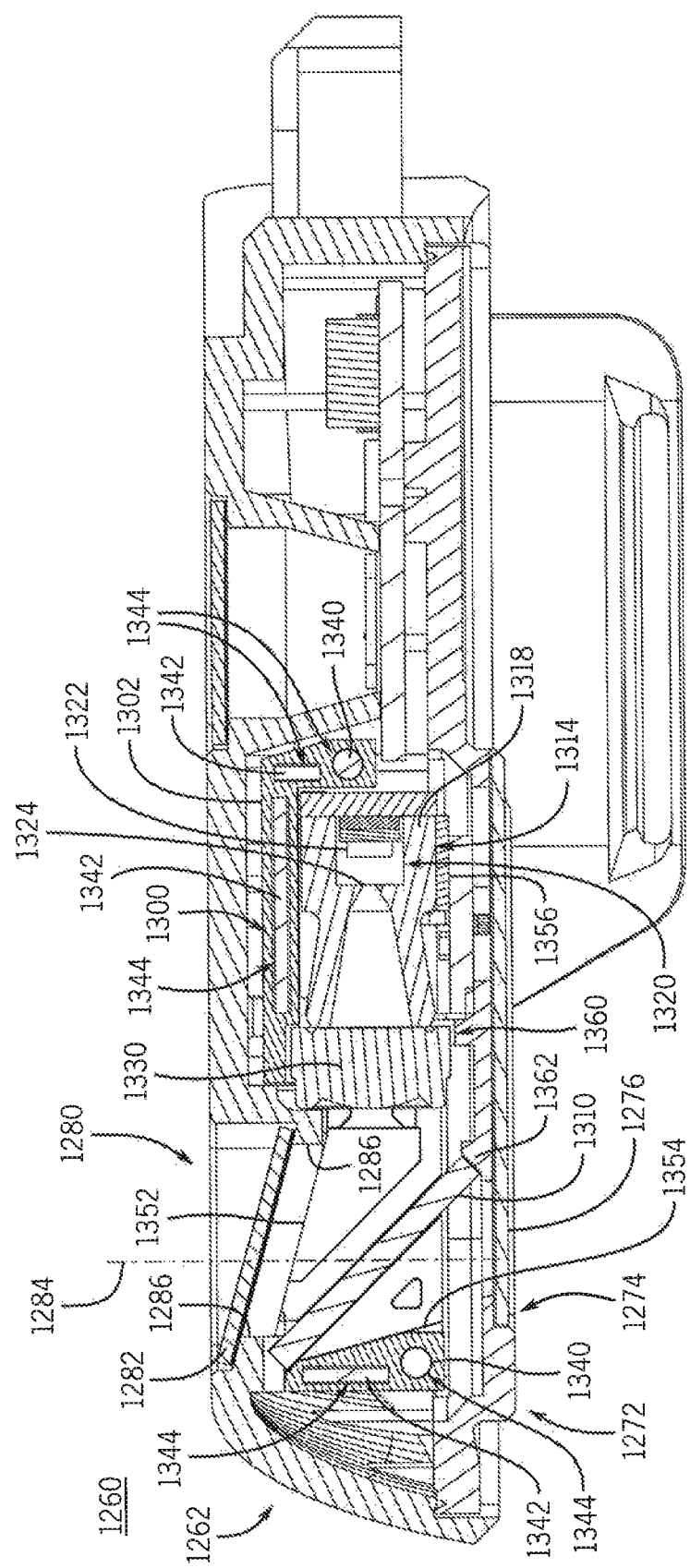
FIG. 96 is a cross-sectional view of the attachment assembly of FIGS. 94 and 95, taken along plane H-H of FIG. 94.
Figure 97:
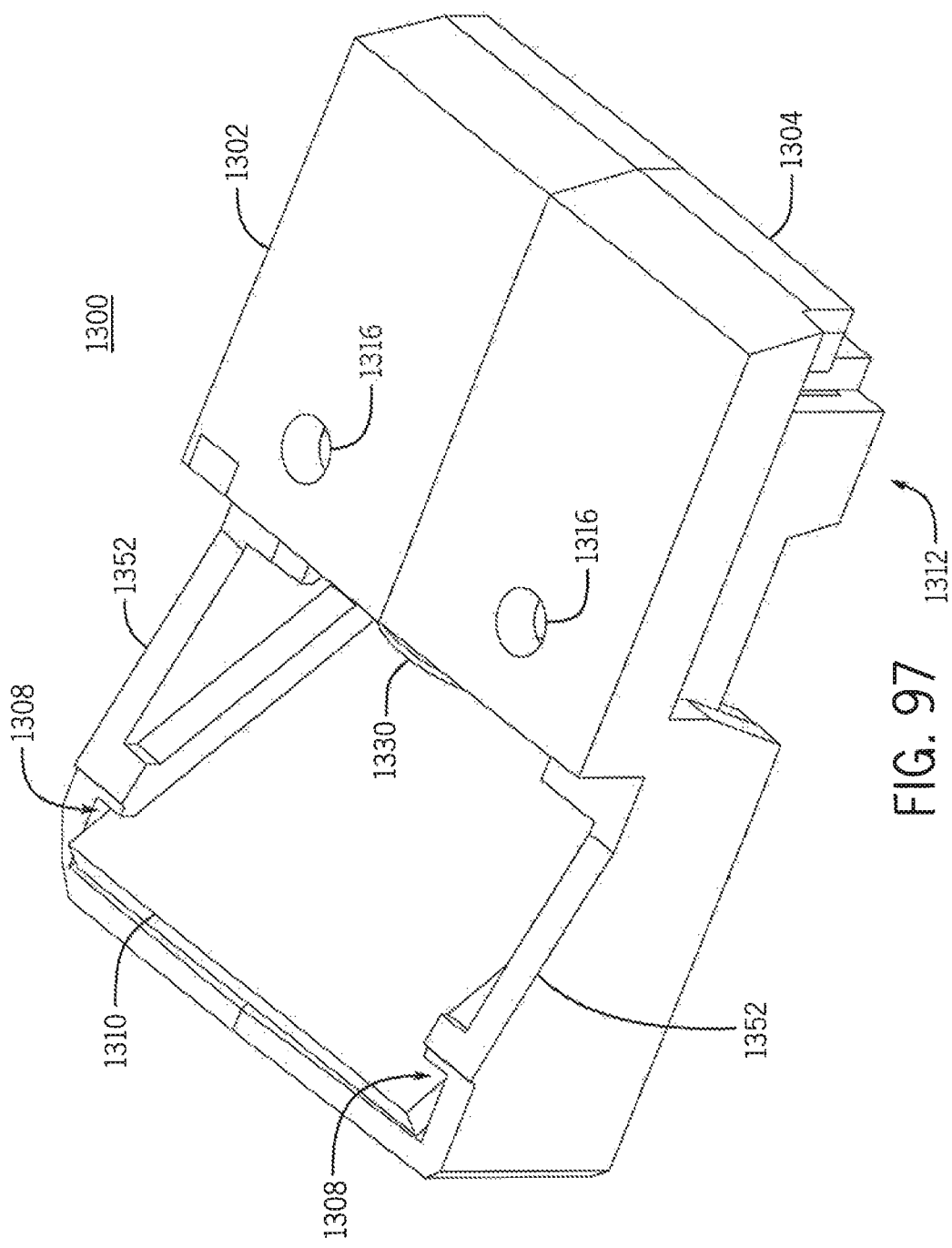
FIGS. 97 and 98 are perspective views of an optical chassis and associated components according to this disclosure, for use with the attachment assembly of FIGS. 94 and 95.
Figure 98:
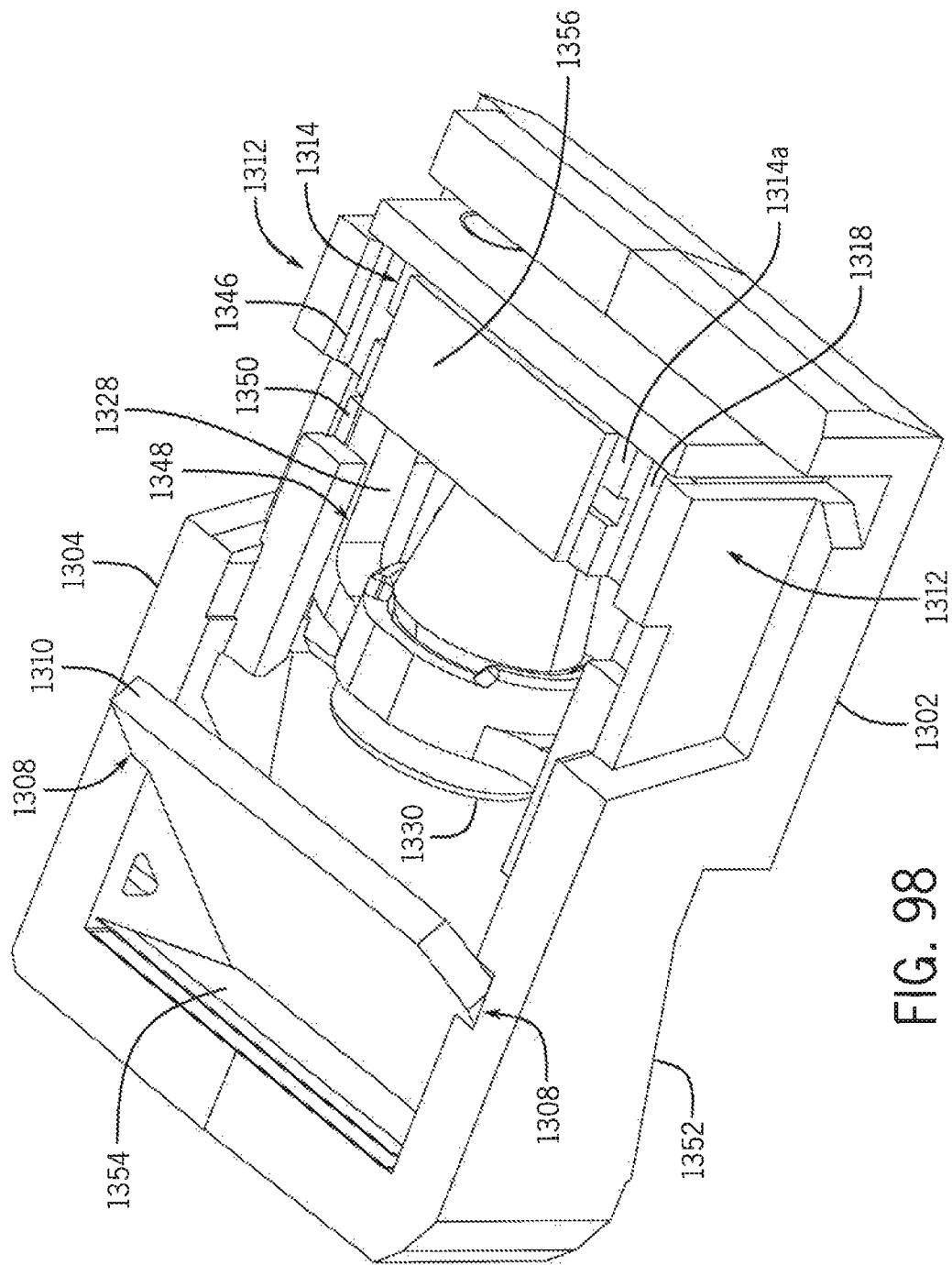

In other embodiments, other configurations are possible. FIGS. 94 through 96, for example, illustrate an attachment assembly 1260 according to an embodiment of the invention. Generally, the attachment assembly 1260 is configured similarly to the assembly illustrated in FIGS. 78 and 79. For example, the attachment assembly 1260 includes an attachment body 1262 with a generally similar geometry as the attachment body 1040 (see, e.g., FIG. 79), and a similar two-piece outer construction. Similarly to the attachment body 1040, the attachment body 1262 can generally support a chassis with optical devices, integrated circuits and related devices, and other features (e.g., as discussed below), and can help to secure these components (and the attachment assembly 1260 in general) to a case or base for a mobile device (e.g., the battery packs 1120 and 1122 of FIGS. 80A and 81).

Figure 78:
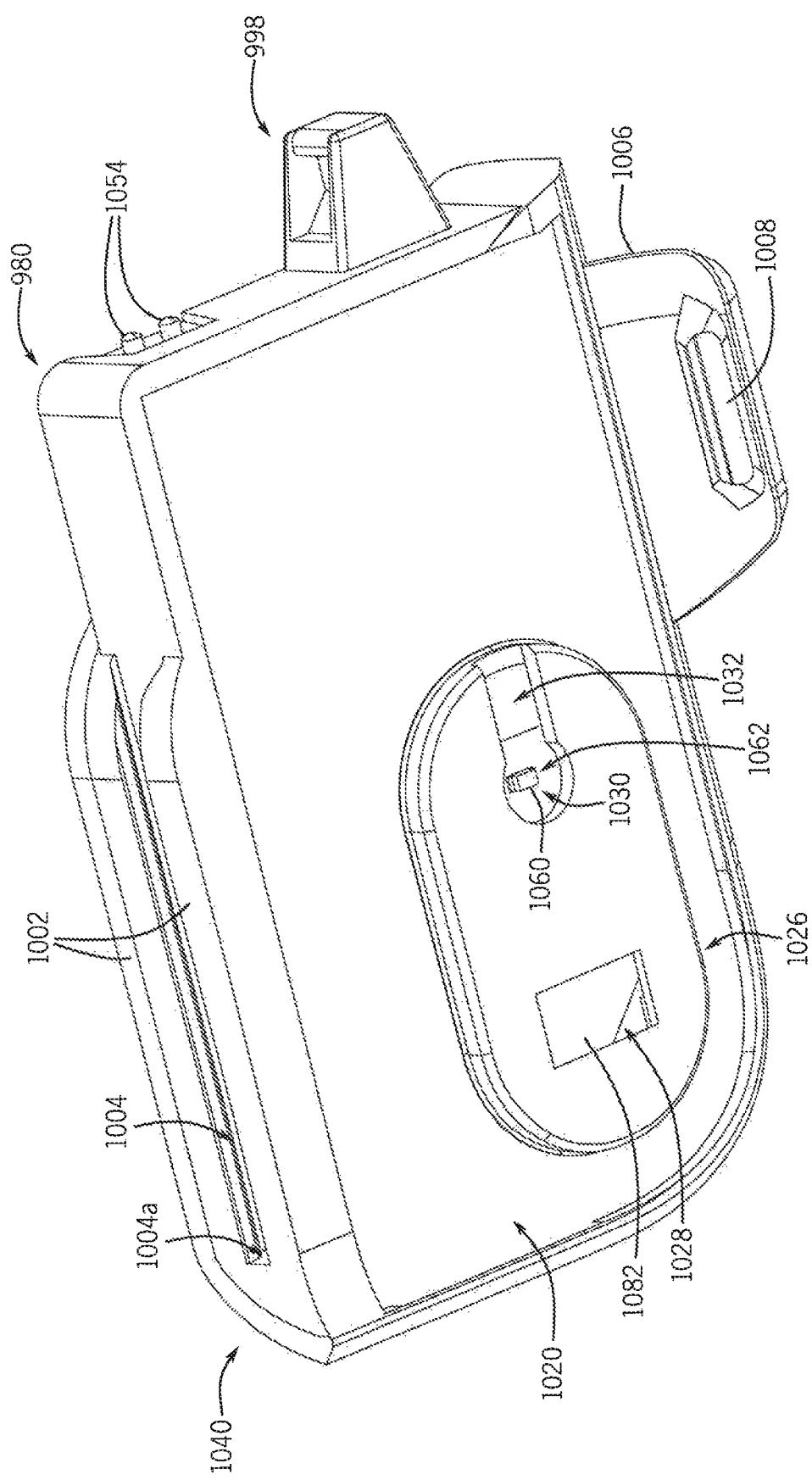
FIG. 78 is a bottom, front perspective view of the assembly of FIG. 70, with the optical chassis assembly of FIG. 73 and the folded circuit board assembly of FIG. 71B included.

In some aspects, the attachment assembly 1260 may differ from the assembly illustrated in FIGS. 78 and 79. For example, as illustrated in FIG. 94, five connector pins 1264 extend from the attachment body 1262. The connector pins 1264 can be configured similarly to the power connectors 1240 and the electrical connectors 1242 of the circuit assembly 1230 (see FIG. 92), or can be configured for other purposes or interfaces (e.g., with different geometries or electrical connections). In some embodiments, the connector pins 1264 can be configured to engage with a cable or other interface (not shown) in order to transmit data to and from the assembly 1260. For example, the connector pins 1264 can be configured to connect, via a cable (not shown), to a separate computing device (not shown), in order to receive firmware or other updates for the attachment assembly 1260, power for recharging, or other signals. In some cases, a subset of the connector pins 1264 can be configured for power transmission and a different subset of the connectors pins 1264 can be configured for data transmission.

As illustrated in FIGS. 94 and 95, the attachment body 1262 includes a set of attachment rails 1266 that extend partly along the bottom of the attachment body 1262, and are generally similar to the attachment rails 1002 (see, e.g., FIG. 79). Like the rails 1002, the rails 1266 together define an attachment groove 1268 therebetween, which can engage an attachment rail on a case (e.g., the attachment rails 1136 and 1138, as illustrated in FIGS. 80A and 81), or other similar feature. In other aspects, however, the rails 1266 may differ from the rails 1002. For example, unlike the rails 1002, the bottom of each of the rails 1266 includes an additional groove 1266a.

In some embodiments, the grooves 1266a can allow for customizable adjustment of the quality (e.g., stiffness) of an engagement between the rails 1266 and attachment rails on a case. For example, by changing the geometry (e.g., depth, length, or width) of the grooves 1266a, it may be possible to generally adjust the flexibility of the attachment rails 1266 to a desired level (or range thereof). Usefully, in some cases, such adjustments can be made using inserts into existing tooling during manufacturing, so that installation characteristics of a particular attachment (e.g., stiffness of engagement of sets of attachment rails) can be adjusted without changes to main tooling.

Also as illustrated in FIGS. 94 and 95, the attachment body 1262 includes a body catch feature 1270 configured to engage a corresponding catch feature on a case or other component to which the attachment body 1262 is occurred. This arrangement, for example, can assist with alignment of the attachment body 1262 during installation, help to secure the attachment body 1262 to another component (e.g., through physical engagement with a corresponding catch feature on a relevant case), and provide useful feedback for a user during installation. For example, the vibration of the attachment body 1262 that may be generated when the body catch feature 1270 "snaps" into a corresponding other catch feature (e.g., on a case) can provide tactile and/or auditory feedback to alert a user that the attachment body 1262 is appropriately installed (e.g., fully secured, with appropriate optical alignment). In the illustrated embodiment, the catch feature 1270 is formed as a rounded protrusion, which may be complemented, for example, with a corresponding catch feature configured as rounded depression (e.g., on a case near a corresponding attachment rail). In other embodiments, other configurations are possible (e.g., multiple protrusions, protrusions with different geometries, depressions, and so on).

As illustrated in FIGS. 95 and 96 in particular, aspects of the back side of the attachment assembly 1260 may also differ from example attachment assemblies (and components thereof) illustrated in preceding FIGS. For example, like the attachment body 1040, the base of the attachment body 1262 includes a generally rounded protrusion 1272 that can be configured, for example, to engage with a camera opening of a case (e.g., the camera openings 1154 and 1156 of the cases 1150 and 1152, as illustrated in FIG. 82). Generally, as also described above, this can help to ensure that optical devices within the attachment assembly 1260 are appropriately aligned with a camera and/or light source of a relevant mobile device.

Generally, the protrusion 1272 include one or more openings for optical signals (e.g., openings similar to the rectangular window 1028 and the keyhole window 1030 illustrated in FIG. 78). In the embodiment illustrated, the protrusion 1272 further includes a recessed channel 1274 configured to receive a single-piece cover 1276 (e.g., a glass or plastic sheet or lens). This arrangement, for example, can help to protect components within the attachment assembly 1260, while also permitting appropriate optical signals to be transmitted into and out of the attachment body 1262.

In some embodiments, as illustrated in FIG. 96 in particular, the protrusion 1272 can correspond to an expanded region within the attachment assembly 1260. This can be useful, for example, in order to appropriately locate an optical chassis for the attachment assembly 1260, including example chassis as discussed above and below.

In some embodiments, certain features can be provided to help reduce internal reflections or other undesirable effects. As illustrated in FIGS. 94 and 96, for example, the attachment body 1262 includes a window 1280, which can generally be useful to allow targeting and image acquisition (e.g., similarly to the window 986 illustrated in FIG. 66). As shown in FIG. 96 in particular, the attachment body 1262 can be configured to support a cover 1282 (e.g., a glass or plastic sheet or lens) for the window 1280, with the cover 1282 oriented at an oblique angle relative to an optical axis 1284. In the embodiment illustrated, for example, the attachment body 1262 includes a set of offset shelves 1286, on opposite sides of the window 1280, which can support the cover 1282 at an appropriate angle. In some embodiments, the shelves 1286 can be part of a continuous feature or set of features extending around the window 1280 (e.g., with correspondingly angled shelves (not shown) connecting, and extending generally perpendicular to, the two shelves 1286). Generally, the oblique angle between the cover 1282 and the optical axis 1284 can help to reduce adverse optical effects (e.g., undesired reflections) during operation, in order, for example, to improve the quality of images acquired by a camera of an associated mobile device.

As also discussed above, embodiments of the invention can usefully include an optical chassis, in order to appropriately support and align optical and other components within an attachment assembly. An example optical chassis 1300 is illustrated in FIGS. 97 through 100, along with associated other components.

Generally, the optical chassis 1300 and associated components are configured similarly to the chassis 1080 and 1232 (see, e.g., FIGS. 71A through 77 and 93), and can be configured for use with the attachment bodies 1040 and 1262, or other attachment bodies according to this disclosure. As such, for example, the optical chassis 1300 can generally be useful for supporting and aligning optical devices, electronics, and other components for precise operation (e.g., targeting, image acquisition, and so on), including in attachment bodies with different configurations (e.g., attachment bodies configured for attachment to differently configured mobile devices and/or cases).

In the embodiment illustrated, the chassis 1300 includes a set of similar support structures 1302 and 1304, which are generally configured to support optical and other equipment at relatively precise locations and orientations within the attachment body 1262 (see, e.g., FIG. 96). For example, the support structures 1302 and 1304 include respective grooves 1308 (with corresponding internal shelves) to support a beam splitter 1310 (or other optical component), retention structures 1312 to support and retain an aperture block 1314, locating holes 1316 for help in attaching the support structures 1302 and 1304 within the attachment body 1262, and so on.

Figure 99:
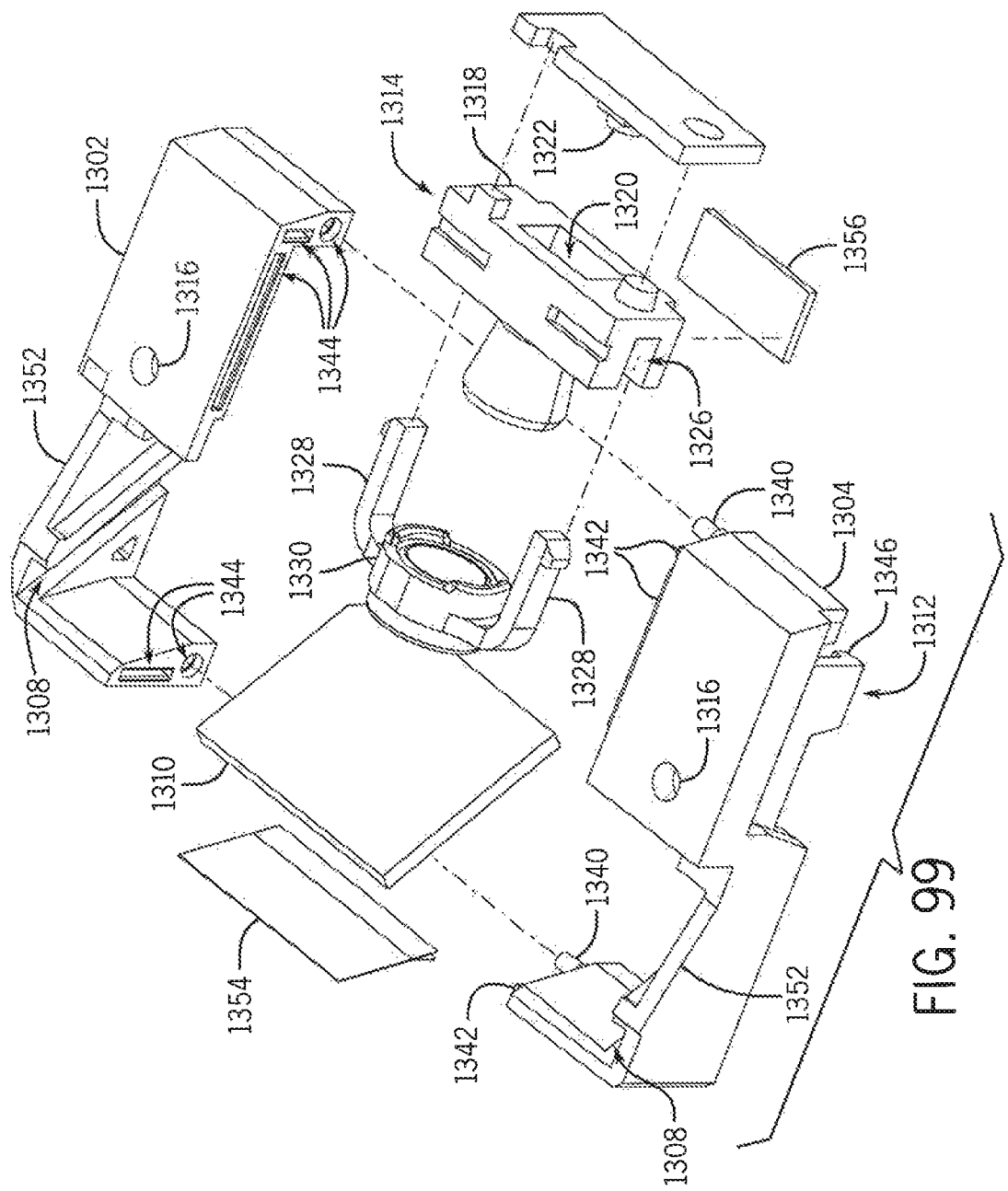
FIGS. 99 and 100 are exploded perspective views of the optical chassis and associated components of FIGS. 97 and 98.

In some embodiments, the aperture block 1314 can be generally similar to the aperture block 1234 (see, e.g., FIGS. 93 and 99). For example, similar to the aperture block 1234, the aperture block 1314 includes a block portion 1318 with a recess 1320 to receive an LED 1322, and a generally conical extension with an aperture 1324 (see FIG. 96) to direct light from the LED 1322 (or other light source) onto the beam splitter 1310. Also similarly to the aperture block 1234, the aperture block 1314 includes a set of recesses 1326 to receive attachment arms 1328 of a lens 1330, and thereby secure the lens 1330 in appropriate alignment with the aperture block 1314, the beam splitter 1310, and the attachment body 1262 generally.

Figure 100:
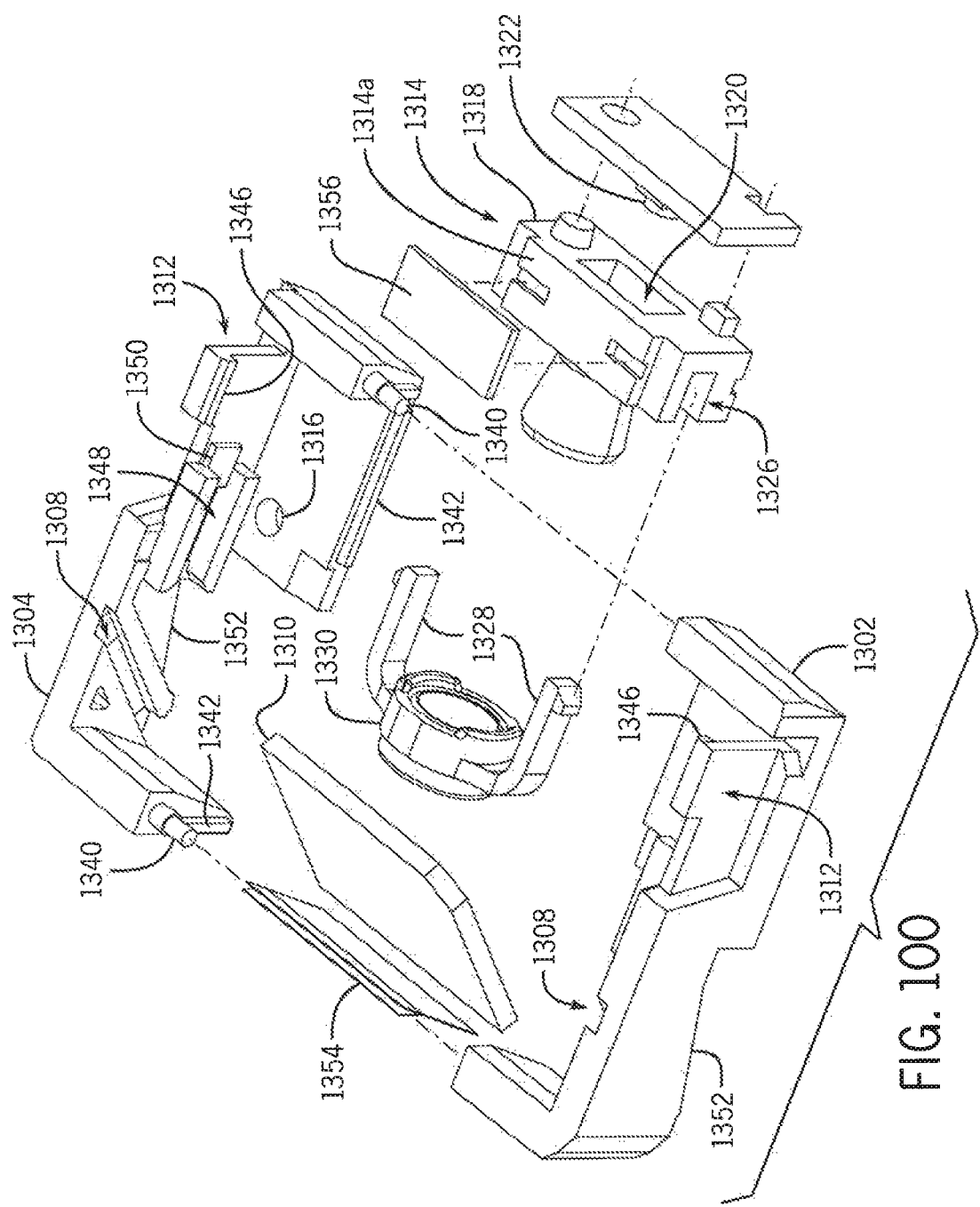

In some aspects, the chassis 1300 and associated components can differ from other examples discussed herein. For example, as illustrated in FIGS. 99 and 100, the support structures 1302 and 1304 include a set of complementary posts 1340, tabs 1342, and recesses 1344, that can nest together in order to align the support structures 1302 and 1304 for installation and operation. As another example, as illustrated in FIG. 100 in particular, the retention structures 1312 are configured with snap-on hooked tabs 1346 that are configured to allow the aperture block 1314 to be snapped securely into engagement with the chassis 1300, and to generally retain the aperture block 1314 on the chassis 1300 in the appropriate orientation.

As still another example, the support structures 1302 and 1304 includes respective grooves 1348 to receive the attachment arms 1328 of the lens 1330, and blocking features 1350 to engage the outwardly hooked ends of the attachment arms 1328. With the lens 1330 thus received, for example, the optical chassis 1300, the aperture block 1314, and the attachment body 1262 (e.g., via a rounded recess 1360 illustrated in FIG. 96) can securely hold the lens 1330 in appropriate optical alignment with the aperture block 1314, the beam splitter 1310, other optical devices, and the attachment assembly 1260 in general.

As still another example, aspects of the support structures 1302 and 1304 (or other components) can be configured to accommodate particular aspects of the attachment assembly 1260 (or another particular attachment assembly). For example, outer walls of the chassis 1300 generally include angled cut-outs 1352 that can provide appropriate clearance for the angled cover 1282 of the window 1280 (see, e.g., FIG. 96).

In some embodiments, the support structures 1302 and 1304 can be configured to exhibit particular anti-reflection properties or support other anti-reflection devices. For example, an angled internal wall of the support structures 1302 and 1304, opposite the beam splitter 1310 from the lens 1330, can be configured to receive an anti-reflective film 1354 or can be formed or coated with different types of anti-reflective materials.

In some embodiments, the aperture block 1314 can be configured to help secure the optical chassis 1300 within the attachment body 1262. For example, as illustrated in FIG. 100 in particular, a generally flat and grooved surface 1314*a* of the aperture block 1314 can be configured to receive an adhesive component (e.g., an adhesive pad 1356) to help directly secure the aperture block 1314 to the attachment body 1262 (or other feature).

In some embodiments, an optical chassis and an attachment body can be configured to cooperate to securely align optical (or other) devices. For example, as illustrated in FIG. 96 in particular, the attachment body 1262 includes an internal support configured as an elongate protrusion 1362. With the chassis 1300 installed within the attachment body 1262, the protrusion 1362 and the grooves 1308 on the chassis 1300 (see, e.g., FIG. 97) together support the beam splitter 1310 in an appropriate alignment. In other embodiments, other cooperative support of internal (or other) components is also be possible.

FIGS. 101A and 101B illustrate another example configuration according to an embodiment of the invention, configured as a mobile optical system 1370. In the embodiment illustrated, a mobile device 1372 is configured as a smartphone that includes a camera 1374 and a light source 1376. A mobile-device case 1378 is configured to receive and retain the mobile device 1372. In some embodiments, the case 1378 can be configured similarly to the cases 1150 or 1152 (see, e.g., FIGS. 83 and 84). In some embodiments, a different configuration can be used.

As also illustrated in FIGS. 101A and 101B, an attachment assembly 1380 is configured for attachment to and use with the mobile device 1372. For example, the case 1378 can be configured to receive the attachment assembly 1380 to secure the attachment assembly 1380 to the mobile device 1372. In some embodiments, the attachment assembly 1380 can include an attachment body that is configured similarly to the attachment body 1040 (see, e.g., FIGS. 78 and 79) and can accordingly be secured to the case 1378 in a similar fashion as the attachment body 1040 (see, e.g., FIGS. 82 through 86). In some embodiments, the attachment assembly 1380 can attach mechanically and electrically to the case 1378 similarly to the attachment body 1040, but may not necessarily be configured for optical communication with the mobile device 1372 in the same way as the attachment body 1040. For example, the attachment assembly 1380 may not include a protrusion similar to the protrusion 1026 or optical windows configured similarly to the windows 1028 or 1030 of the attachment body 1040 (see, e.g., FIG. 78). In other embodiments, other configurations can be used.

Similarly to other attachment assemblies disclosed herein, the attachment assembly 1380 generally includes an optical device such as an arrangement of one or more lenses, mirrors, or light pipes, or an arrangement of other optical equipment. In some embodiments, the optical device can form, or can be included in, a portable machine vision system, such as a vision engine 1382. In some embodiments, the vision engine 1382 can be configured to capture images at least partly independently of the camera 1374 or the light source 1376. In some embodiments, the vision engine 1382 can be configured to operate in conjunction with the camera 1374 or the light source 1376, or other components of the mobile device 1372. In some embodiments, the vision engine 1382 can be configured to analyze (e.g., decode) captured images alone, or in combination with the mobile device 1372 or other computer systems.

It will be understood that many variations on the embodiments discussed above may be possible, including variations combining elements of multiple of the embodiments together, variations substituting elements from one embodiment for elements of another embodiment, and variations rearranging elements of one or more embodiments, both together and separately. For example, with regard to the optical devices illustrated in FIGS. 44A through 49 (and others), it may be possible to include collimating elements (e.g., parabolic mirrors or reflecting surfaces, lenses, and so on) before a mask, after a mask, or both before and after a mask, relative to the path of light from a light source to a target. Likewise, in some embodiments, one or more masks can be disposed at various locations within the relevant optical device than those specifically illustrated, one or more mirrors can be used in combination with one or more transparent bodies and reflecting surfaces, projection patterns other than patterns of ovals can be used, and so on.

There is thus disclosed an aimer module, aimer accessory and method for a mobile device. In some embodiments, the aimer module collimates diffuse light from a lamp on a mobile device for use in capturing a barcode image. The aimer module includes a means for receiving light from a lamp of the mobile device, and a means for generating a light pattern on the surface containing a barcode. The receiving means and the generating means may include a grating and/or configuration of mirrors. Registration of the light pattern and the barcode in a scan area enhances the ability of the specialized software on the mobile device to read the barcode.

In one embodiment, an aimer module for a mobile device is provided. The aimer module includes a grating configured to receive light from a lamp of the mobile device and to generate a light pattern on the surface containing a barcode. Registration of the light pattern and the barcode in a scan area enhances the ability of the specialized software on the mobile device to read the barcode.

An optical element for receiving light from the lamp and providing the light to the grating may be included. The optical element may further include at least one of a lens, a reflective surface, a light pipe and an optical fiber. A collector may be included that is configured for collecting light incident upon the camera.

The grating may include at least one of a pair of substantially parallel slits and a substantially rectangular array of holes. The aimer accessory may be configured to offset light from the lamp away from the camera, and may be configured to extend an optical range for reading the barcode. The aimer accessory may be configured as one of a simple offset aimer, a basic aimer, an elongated offset aimer, a standard offset aimer, or a tube offset aimer.

The aimer accessory may be configured for reading a barcode including in a format that is one of: Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/ KIX; Telepen; UPC; as well as others.

The aimer accessory may be configured for reading a barcode including a format that is one of: Aztec Code; Code 1; ColorCode; Color Construct Code; CrontoSign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; SPARQCode; as well as others.

In another embodiment, a mobile device configured for blind or targeted scanning of a barcode is provided. The mobile device includes an aimer module affixed to the mobile device. The aimer module includes a grating configured to receive light from a lamp of the mobile device and to generate a light pattern on the surface containing a barcode. Registration of the light pattern and the barcode either in a scan area illuminated by the aimer module or in the near vicinity of the light pattern enhances the capability of a camera of the mobile device to read the barcode.

The mobile device may include one of a smartphone, a tablet computer, or other special purpose device. Blind and targeted scanning may enable reliable readout of the barcode without use of a display. The light pattern may include parallel lines, a single line, a square or rectangle, an image outline, a single or an array of dots, an arrow, a set of crosshairs, or other shapes or images.

The mobile device may include a computer program product that consists of machine executable instructions stored on non-transitory machine readable media, with the instructions configured for performing the functions depicted in FIG. 19.

According to a method of this disclosure, light is emitted from a lamp of the mobile device along a first optical path toward a barcode target. The first optical path defines a light axis L. The optical path of the emitted light is then changed from the first optical path to a second optical path that is oblique to the barcode target. The optical path of the emitted light is then changed again from the oblique optical path to a third optical path that is directed at the barcode target. The third optical path defines a light shifted axis L. Finally, the mobile device captures the image of the barcode target.

In some embodiments, an aimer accessory for a mobile device is provided. The aimer accessory includes a body configured for being affixed to the mobile device. The body includes a collimator terminating with a grating disposed in a distal portion thereof. The grating is configured to receive light from a lamp of the mobile device and to generate a light pattern on the surface containing a barcode. Registration of the light pattern and the barcode in a scan area enhances the ability of the mobile device to capture a barcode image. Registration may be configured for blind mode or target mode scanning. In blind mode scanning, the registration occurs on a detection of the light pattern and the barcode in a viewing angle of a camera of the mobile device. In target mode scanning, the registration occurs on a detection of the light pattern hovering over the barcode in a viewing angle of a camera of the mobile device.

The accessory may further include an optical element for receiving light from the lamp and providing the light to the grating. The optical element may include at least one of a lens, a reflective surface, a light pipe and an optical fiber. The accessory may further include a collector configured for collecting light incident upon the camera. The grating may include at least one of a pair of substantially parallel slits and a substantially rectangular array of holes.

The accessory may be configured to offset light from the lamp away from the camera. The offset may be configured to extend an optical range for reading the barcode. The accessory may be configured as one of a simple offset aimer, a basic aimer, an elongated offset aimer, a standard offset aimer, a tube offset aimer, and a fitted aimer.

The body of the accessory may further include a retainer for retaining the accessory on the mobile device. The retainer may terminate in a clip. The accessory may be configured as a clip-on accessory.

The accessory may be configured for reading a barcode including a format that is one of: Codabar; Code 25, non-interleaved 2 of 5; Code 25 interleaved 2 of 5; Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; and, U.P.C.

The accessory may be configured for reading a barcode comprising a format that is one of: Aztec Code; Code 1; ColorCode; Color Construct Code; CrontoSign; CyberCode; d-touch; DataGlyphs; DataGlyphs; Data Matrix; Datastrip Code; digital paper; EZcode; High Capacity Color; High Capacity Color Barcode; HueCode; InterCode; MaxiCode; MMCC; NexCode; Nintendo e-Reader # Dot code; PDF417; Qode; QR code; ShotCode; and, SPARQCode. The accessory may be configured for reading a barcode comprising a plurality of colors.

In another illustrative embodiment, a mobile device configured for either blind or targeted scanning of a barcode is provided. The mobile device includes a body configured for being clipped onto the mobile device. The body includes a collimator terminating with a grating disposed in a distal portion thereof. The grating is configured to receive light from a lamp of the mobile device and to generate a light pattern on the surface containing the barcode. Registration of the light pattern and the barcode in a scan area enhances the ability of the mobile device to capture a barcode image. Registration may be configured for blind mode or target mode scanning. In blind mode scanning, the registration occurs on a detection of the light pattern and the barcode in a viewing angle of a camera of the mobile device. In target mode scanning, the registration occurs on a detection of the light pattern hovering over the barcode in a viewing angle of a camera of the mobile device.

The mobile device may include one of a smart phone, a tablet computer and a special purpose device.

The either blind or targeted scanning enables reliable readout of the barcode without use of a display. The light pattern may include at least one of substantially parallel lines, an array of dots, and a set of crosshairs. Combinations of slits and holes may be used. A variety of orientations may be provided, and geometric patterns may be used as well.

In another illustrative embodiment, a method for configuring a mobile device for scanning a barcode is provided. The method includes selecting an aimer accessory for the mobile device. The aimer accessory includes a body configured for being affixed to the mobile device. The body includes a collimator terminating with a grating disposed in a distal portion thereof. The grating is configured to receive light from a lamp of the mobile device and to generate a light pattern on the surface containing a barcode. Registration of the light pattern and the barcode in a scan area enhances the ability of the mobile device to capture a barcode image. The aimer accessory is affixed to the mobile device. The method may further include detecting the light pattern and the barcode in a viewing angle of a camera of the mobile device and capturing the image of the barcode target. The method may further include detecting the light pattern as hovering over the barcode in a viewing angle of a camera of the mobile device and capturing the image of the barcode target.

The aimer accessory and the code reader application may be employed on a variety of mobile devices. Generally, it is only required that the mobile device include a camera, a lamp, and appropriate components for operation thereof. Examples of other mobile devices include tablet computers, as well as special purpose devices such as handheld units used for taking field inventory of assets, a dedicated barcode reader, and other such devices.

The grating may generate a variety of light patterns. For example, a set of dots, a single line, a square or rectangle, and crosshairs may be used. Combinations of slits and holes may be used. A variety of orientations may be provided, and geometric patterns may be used as well. In some embodiments, the grating is configured with regard for a particular type, or symbology, of barcode that will be read. For example, a substantially rectangular array of holes may be useful for registration with a substantially rectangular barcode, such as a PDF417 barcode.

In addition, a variety of techniques may be employed for barcode recognition. Use of horizontal bars, parallel lines, dots, crosshairs, and other such aiming patterns may be used to assist with barcode recognition.

An appropriately equipped aimer accessory may provide for re-concentrating light that would otherwise be dispersed.

Software may be downloaded onto or provided with the mobile device of this disclosure that produces a software-produced button on the display of the mobile device. In addition, initiation or triggering of a scan by the mobile device may be performed by programmatically re-mapping of one of the mobile device buttons for such use, or triggered externally using Wi-Fi, NFC, or other technology.

The software may further provide user feedback on "good" or "bad" images, or decode of a symbology, via user prompts such as an audible sound from the mobile device, a vibration from the mobile device, an activity on the display, such as blinking of the screen, a color change, a movement of an image displayed, etc. Additionally, the feedback may be wirelessly transmitted to a remote location for action, recording, etc.

The aimer module and accessory of this disclosure may further assist in battery conservation and power management since images may be captured more efficiently according to this disclosure.

In some embodiments, an aimer accessory can be formed to include an attachment base and an attachment body that can be removably secured to the attachment base. The attachment base can be configured to be secured to a mobile device or case through alignment with a case opening, adhesives, magnets, or other attachment mechanisms. The attachment body can include an optical device, such as a mirror arrangement, light pipe, or grating, and can be configured to be removably secured to the attachment base. In this way, for example, the attachment body can be removably secured to the mobile device or case so that the optical device of the attachment body can be used with a camera or light source of the mobile device.

In some embodiments, an attachment for use with a mobile device and a case for the mobile device can include an attachment base and an attachment body that can be removably secured to the attachment base. The attachment body can include an optical device, such as a mirror arrangement, light pipe, grating, LED or other light source, and so on. The attachment base can include an anchor portion configured to be disposed at least partly in an interior portion of the case, and a tongue configured to extend away from the anchor portion along an exterior portion of the case. A controller included in the attachment body can control some functions of a light source included in the attachment body based upon optical signals received from a light source of the mobile device at a light detector included in the attachment body. The light source can be controlled to illuminate an imaging target (e.g., with a targeting pattern) and can be controlled to optically communicate with the mobile device via an imaging device of the mobile device.

In some embodiments, a method of communication between a mobile device and an attachment can include a light source of the mobile device transmitting optical signals to a light detector of the attachment. The method can also include a light source of the attachment transmitting optical signals to an imaging device of the mobile device.

In some embodiments, an attachment assembly can be provided for use with a mobile device and a case for the mobile device, with the mobile device including an imaging device and a mobile-device light source, and the case including a case optical opening that is optically aligned with one or more of the imaging device and the mobile-device light source when the case is secured to the mobile device. An attachment base can be secured to the case with a cut-out disposed at least partly around the case optical opening. An attachment body can be removably secured to the attachment base, with a protrusion of the attachment body that includes a first window and a second window extending into the optical opening of the case, with the first window in optical alignment with the imaging device and the second window in optical alignment with the mobile-device light source.

In some embodiments, a system can be provided for communicating with a mobile device that is configured to acquire and analyze images of symbols, with the mobile device including an imaging device and a mobile-device light source. An attachment can include an optical sensor configured to receive optical signals from the mobile-device light source, and at least one attachment light source. Based upon the optical signals received at the optical sensor from mobile-device light source, a processor can activate the at least one attachment light source to direct light onto an external target; or can configure at least one illumination parameter for the attachment. The processor can be additionally configured to activate the at least one attachment light source to communicate with the mobile device via the imaging device.

In some embodiments, a method is provided for communicating information between a mobile device and an attachment, with the mobile device including an imaging device and a mobile-device light source, and with the attachment including an optical sensor and at least one attachment light source. First optical signals can be received at the optical sensor. Based on the first optical signals, one or more of the following can be implemented: activating the at least one attachment light source for one or more of image acquisition and image targeting; and configuring at least one illumination parameter for the attachment. The at least one attachment light source can be activated to provide second optical signals to the imaging device to transmit non-image information to the mobile device.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present invention or the embodiment(s) thereof, the articles "a," "an," and "the" are intended to mean, unless otherwise limited or defined, that there are one or more of the elements. Similarly, the adjective "another," when used to introduce an element, is intended to mean one or more elements. The terms "including", "comprising," "having" and variations thereof are intended to be inclusive such that there may be additional elements other than the listed elements. Similarly, unless otherwise limited or defined, the phrases "at least one of A, B, and C," "one or more of A, B, and C," and the like, are meant to indicate A, or B, or C, or any combination of A, B, and/or C, including, potentially, single or multiple instances of each of A, B, and/or C.

While the invention has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for communicating with a mobile device that is configured to acquire and analyze images of symbols, the mobile device including an imaging device and a mobile-device light source, the system comprising:
an attachment that includes:
an optical sensor configured to receive optical signals from the mobile-device light source; and
at least one attachment light source; and
a processor configured to:
based upon the optical signals received at the optical sensor from mobile-device light source, at least one of:
activate the at least one attachment light source to direct light onto an external target; and
configure at least one illumination parameter for the attachment; and
activate the at least one attachment light source to provide optical signals to the mobile device via the imaging device to transmit non-image information from the attachment to the mobile device.

2. The system of claim 1, wherein the attachment includes an attachment body that encloses the optical sensor and the at least one attachment light source, and an attachment base; and
wherein the attachment base includes a battery pack configured to be secured to a case of the mobile device in order to secure the attachment body relative to the mobile device, and to provide power to the attachment body when the attachment body is secured to the attachment base.

3. The system of claim 1, wherein the at least one attachment light source communicates with the mobile device to transmit the non-image information by projecting a series of flashes to vary luminosity, from image to image, among a series of images acquired by the imaging device.

4. The system of claim 1, wherein the at least one attachment light source includes:
a first light source arranged to direct light for image targeting through a first window of the attachment and onto an external target; and
a second light source arranged to direct light for image illumination through a second window of the attachment and onto the external target.

5. The system of claim 4, wherein the attachment is secured to the mobile device to allow image acquisition by the imaging device via the first window of the attachment.

6. The system of claim 4, wherein, based upon receipt of the optical signals at the optical sensor, the processor is configured to one or more of modulate a frequency of illumination of the first light source and modulate a frequency of illumination of the second light source.

7. The system of claim 6, wherein modulating the frequency of illumination of the first light source includes modulating the first light source on and off in order to provide a flickering targeting illumination on the external target, such that at least one image acquired by the mobile device during modulation of the first light source is acquired when the first light source is off.

8. A method of communicating information between a mobile device and an attachment, the mobile device including an imaging device and a mobile-device light source, and the attachment including an optical sensor and at least one attachment light source, the method comprising:
receiving first optical signals at the optical sensor and, based on the first optical signals, at least one of:
activating the at least one attachment light source for one or more of illumination for image acquisition and illumination for image targeting; and
configuring at least one illumination parameter for the attachment; and
activating the at least one attachment light source to provide second optical signals to the imaging device to transmit non-image information to the mobile device.

9. The method of claim 8, wherein the at least one attachment light source is further activated to project a targeting pattern onto an external target, to assist in image targeting;
wherein further activating the at least one attachment light source includes modulating the at least one attachment light source on and off in order to provide a flickering display of the targeting pattern on the external target; and
wherein the method further includes causing the mobile device to capture one or more images of the external target when the at least one attachment light source is off.

10. The method of claim 9, wherein the attachment includes an attachment body with a first window, a second window, and a third window; and
wherein the attachment body is secured to the mobile device:
to align the optical sensor to receive signals from the mobile-device light source via the second window;
to align the imaging device for image capture via the first and third windows; and
to align the at least one attachment light source to project the targeting pattern through the third window.

11. A system for communicating with a mobile device that is configured to acquire and analyze images of symbols, the mobile device including an imaging device and a mobile-device light source, the system comprising:
an attachment that includes:
an optical sensor configured to receive optical signals from the mobile-device light source; and
an optical device; and
a processor configured to, based upon the optical signals received at the optical sensor from mobile-device light source, at least one of:
activate the optical device to direct light onto an external target; and
configure at least one illumination parameter for the attachment;
wherein the optical device includes a beam splitter and a targeting light source; and
wherein the beam splitter is configured to direct light from the targeting light source.

12. The system of claim 11, wherein the beam splitter is configured to direct light from the targeting light source onto the external target.

13. The system of claim 12, wherein the beam splitter is disposed in optical alignment with the imaging device such that the imaging device acquires images through the beam splitter.

14. The system of claim 11, further comprising:
a circuit assembly including a plurality of printed circuit boards ("PCBs") secured to each other by flexible connectors;
wherein, the circuit assembly is configured to be installed within the attachment with the circuit assembly in a folded configuration, in which a first PCB with at least one attachment light source of the optical device is disposed perpendicularly to a second PCB with the optical sensor, and in which the second PCB is disposed parallel to but perpendicularly offset from a third PCB with a power connector.

15. The system of claim 11 wherein the attachment further includes an illumination window, at least one attachment light source of the optical device being disposed in optical alignment with the illumination window to provide illumination for image acquisition.

16. The system of claim 11, wherein activating the optical device includes at least one of:
causing at least one attachment light source to project a targeting pattern onto the external target, to assist in image targeting; and
modulating the at least one attachment light source of the optical device on and off in order to provide a flickering display of the targeting pattern on the external target.

17. The system of claim 16, wherein the attachment includes an attachment body with a first window, a second window, and a third window; and
wherein the attachment body is secured to the mobile device such that the optical sensor is aligned to receive signals from the mobile-device light source via the second window, the imaging device is aligned for image capture via the first and third windows, and the at least one attachment light source is aligned to project the targeting pattern through the third window.

18. The system of claim 11, wherein the processor is further configured to activate at least one attachment light source to communicate with the mobile device via the imaging device, the at least one attachment light source configured to communicate non-image information to the mobile device by projecting a series of flashes to vary luminosity during image acquisition.

19. The system of claim 11, wherein the attachment includes an attachment body that encloses the optical sensor and the optical device, and an attachment base; and
wherein the attachment base includes a power source configured to be secured to a portion of the mobile device in order to secure the attachment body relative to the mobile device, and to provide power to the attachment body.

20. The system of claim 11, with the mobile-device light source configured as a camera flash, wherein the optical sensor is configured to be disposed in optical alignment with the camera flash when the attachment is secured to the mobile device.

* * * * *